United States Patent [19]
Onishi et al.

[11] Patent Number: 6,154,720
[45] Date of Patent: Nov. 28, 2000

[54] CONVERSATIONAL SENTENCE TRANSLATION APPARATUS ALLOWING THE USER TO FREELY INPUT A SENTENCE TO BE TRANSLATED

[75] Inventors: Satoshi Onishi, Yamatokooriyama; Yukihiro Kubo, Souraku-gun; Kozue Kimura, Yamatokooriyama; Osamu Nishida, Nara, all of Japan

[73] Assignee: Sharp Kabushiki Kaisha, Osaka, Japan

[21] Appl. No.: 08/663,345

[22] Filed: Jun. 13, 1996

[30] Foreign Application Priority Data

Jun. 13, 1995 [JP] Japan .................................. 7-146150
Jan. 17, 1996 [JP] Japan .................................. 8-006102

[51] Int. Cl.$^7$ .................................................. G06F 15/38
[52] U.S. Cl. .......................................... 704/2; 704/3
[58] Field of Search ............................................ 704/1–7

[56] References Cited

U.S. PATENT DOCUMENTS

| | | | |
|---|---|---|---|
| 4,597,055 | 6/1986 | Hashimoto et al. | 704/2 |
| 4,654,798 | 3/1987 | Taki et al. | 704/2 |
| 5,128,865 | 7/1992 | Sadler | 704/1 |
| 5,220,503 | 6/1993 | Suzuki et al. | 704/4 |
| 5,285,386 | 2/1994 | Kuo | 704/2 |
| 5,373,441 | 12/1994 | Hirai et al. | 704/2 |
| 5,625,553 | 4/1997 | Kutsumi et al. | 704/2 |
| 5,652,890 | 7/1997 | Yamauchi et al. | 704/2 |
| 5,659,765 | 8/1997 | Nii | 704/2 |
| 5,678,051 | 10/1997 | Aoyama | 704/3 |
| 5,696,980 | 12/1997 | Brew | 704/2 |

FOREIGN PATENT DOCUMENTS

| | | | |
|---|---|---|---|
| 58-58714 | 12/1983 | Japan | G06F 15/38 |
| 60-24501 | 6/1985 | Japan | G06F 15/38 |
| 61-16117 | 4/1986 | Japan | G06F 15/38 |
| 5-324702 | 12/1993 | Japan | G06F 15/38 |
| 7182347 | 7/1995 | Japan . | |
| 8802516 | 4/1988 | WIPO . | |

*Primary Examiner*—David R. Hudspeth
*Assistant Examiner*—Patrick N. Edouard

[57] ABSTRACT

In a semantic feature dictionary, names of semantic features and character strings in a first language having the semantic features are stored in a mutually associated manner. In a bilingual database, information on various conversational sentence examples is stored. Information on each conversational sentence example includes a conversational sentence example in the first language, a translation in a second language of the conversational sentence example, and a string of semantic features contained in the conversational sentence example. An analyzer extracts semantic feature names from an input sentence, free entered through an input unit, by using the semantic feature dictionary. A semantic searcher selects from the bilingual database a conversational sentence example having the largest number of semantic feature names coincident with the extracted semantic feature names. A display unit displays the selected conversational sentence example along with its translation.

27 Claims, 67 Drawing Sheets

Fig.2

| Semantic feature name | Semantic feature expression |
|---|---|
| チェックイン<br>*chekkuin* | チェックイン<br>*chekkuin* |
| お願い<br>ONEGAI | お願いします<br>ONEGAI SHIMASU<br>お願い<br>ONEGAI<br>お願いしたい<br>ONEGAI SHITAI<br>お願いしたいのです<br>ONEGAI SHITAI NO DESU<br>お願いしたいのですが<br>ONEGAI SHITAI NO DESUGA<br>おねがい<br>ONEGAI<br>おねがいします<br>ONEGAI SHIMASU<br>たのむ<br>TANOMU<br>たのみます<br>TANOMIMASU<br>希望します<br>KIBO SHIMASU |
| ホテル<br>*hoteru* | ホテル<br>*hoteru* |
| 行き方<br>IKIKATA | 行き方<br>IKIKATA<br>行く方法<br>IKUHOHO |
| 教える<br>OSHIERU | 教え<br>OSHIE<br>教える<br>OSHIERU<br>おしえ<br>OSHIE<br>おしえる<br>OSHIERU<br>示<br>SHIME<br>しめ<br>SHIME |
| 下さい<br>KUDASAI | 下さい<br>KUDASAI<br>ください<br>KUDASAI |

チェックインをお願いします。
*chekkuin* WO O<u>NEGAI</u> SHIMASU
Check in, please.
チェックイン　　　お願い
*chekkuin*　　　　O<u>NEGAI</u>

そのホテルへの行き方を教えて下さい。
SONO *hoteru* HENO <u>IKIKATA</u> WO <u>OSHIETE</u> <u>KUDASA</u>I
Could you tell me how to get to the hotel ?
ホテル　　行き方　教える　　下さい
*hoteru*　　<u>IKIKATA</u> <u>OSHIERU</u> <u>KUDASA</u>I

| Semantic feature name | Semantic feature expression |
|---|---|
| 〈欲しい〉<br>〈*HOSHII*〉 | 欲しい<br>*HOSHII*<br>欲しいのです<br>*HOSHII NO DESU*<br>欲しいのですが<br>*HOSHII NO DESUGA* |
| 〈ですか〉<br>〈*DESUKA*〉 | ですか<br>*DESUKA* |
| 〈置き忘れた〉<br>〈*OKIWASURETA*〉 | 置き忘れた<br>*OKIWASURETA*<br>置き忘れました<br>*OKIWASURE MASHITA*<br>置き忘れてしまいました<br>*OKIWASURETE SHIMAI MASHITA*<br>忘れた<br>*WASURETA*<br>忘れました<br>*WASURE MASHITA*<br>忘れてしまいました<br>*WASURETE SHIMAI MASHITA* |
| 〈忘れた〉<br>〈*WASURETA*〉 | 忘れた<br>*WASURETA*<br>忘れました<br>*WASURE MASHITA*<br>忘れてしまいました<br>*WASURETE SHIMAI MASHITA* |

| Semantic feature name | Semantic feature expression |
|---|---|
| 付き<br>TSUKI | 付き<br>TSUKI<br>付きの<br>TSUKI NO<br>付<br>TSUKI<br>付の<br>TSUKI NO<br>つき<br>TSUKI<br>つきの<br>TSUKI NO |
| 部屋<br>HEYA | 部屋<br>HEYA<br>部屋が<br>HEYA GA<br>部屋を<br>HEYA WO<br>部屋は<br>HEYA HA<br>部屋に<br>HEYA NI<br>部屋には<br>HEYA NIHA |
| 鍵<br>KAGI | 鍵<br>KAGI<br>鍵が<br>KAGI GA<br>鍵を<br>KAGI WO<br>鍵は<br>KAGI HA<br>キー<br>ki<br>キーが<br>ki GA<br>キーを<br>ki WO<br>キーは<br>ki HA |

| Variable semantic feature name | |
|---|---|
| Variable semantic feature entry name | Translated variable semantic feature expression |
| Variable semantic feature expression | |

{ 部屋の種類 }
{ *HEYA NO SHURUI* }

シングルルーム        single
    *shingururumu*
        1人部屋
        *1NINBEYA*
        一人部屋
        *HITORIBEYA*
        シングルルーム
        *shingururumu*
        シングル
        *shinguru*
    ツインルーム          twin
    *tsuinrumu*
        2人部屋
        *2NINBEYA*
        二人部屋
        *FUTARIBEYA*
        ツインルーム
        *tsuinrumu*
        ツイン
        *tsuin*
    トリプルルーム        triple
    *toripururumu*
        3人部屋
        *3NINBEYA*
        三人部屋
        *SANNINBEYA*
        トリプルルーム
        *toripururumu*
        トリプル
        *toripuru*

| Fig.8A |
|---|
| Fig.8B |

Fig.8B

```
{ ベッド }
{ beddo }

シングルベッド           single bed
    shingurubeddo
            シングルベッド
            shingurubeddo
    ダブルベッド             double bed
    daburubeddo
            ダブルベッド
            daburubeddo
    ツインベッド             twin bed
    tsuinbeddo
            ツインベッド
            tsuinbeddo
```

```
{ 風呂 }
{ FURO }

浴室                    bath
    YOKUSHITSU
            浴室
            YOKUSHITSU
        風呂
        FURO
    シャワー                 shower
    shawa
            シャワー
            shawa
```

Fig.9

{1人部屋}が欲しいのです。
{1NINBEYA} GA HOSHII NO DESU
I'd like a {single} room.
{部屋の種類} 〈欲しい〉
{HEYA NO SYURUI} 〈HOSHII〉
Negotiation of Rooms {シングルベッド}つきの部屋が欲しいのです。
{shingurubeddo} TSUKI NO HEYA GA HOSHII NO DESU
I'd like a room with {single bed}.
{ベッド} @20 付き 部屋 〈欲しい〉
{beddo} @20 TSUKI HEYA 〈HOSHII〉
Negotiation of Rooms {浴室}付きですか。
{YOKUSHITSU} TSUKI DESUKA
Is it with {bath}?
{風呂} @20 付き 〈ですか〉
{FURO} @20 TSUKI 〈DESUKA〉
Negotiation of Rooms 鍵を部屋に置き忘れてしまいました。
KAGI WO HEYA NI OKIWASURETE SHIMAIMASHITA
I left my key in my room.
鍵 部屋 〈置き忘れた〉
KAGI HEYA 〈OKIWASURETA〉
Trouble

～21

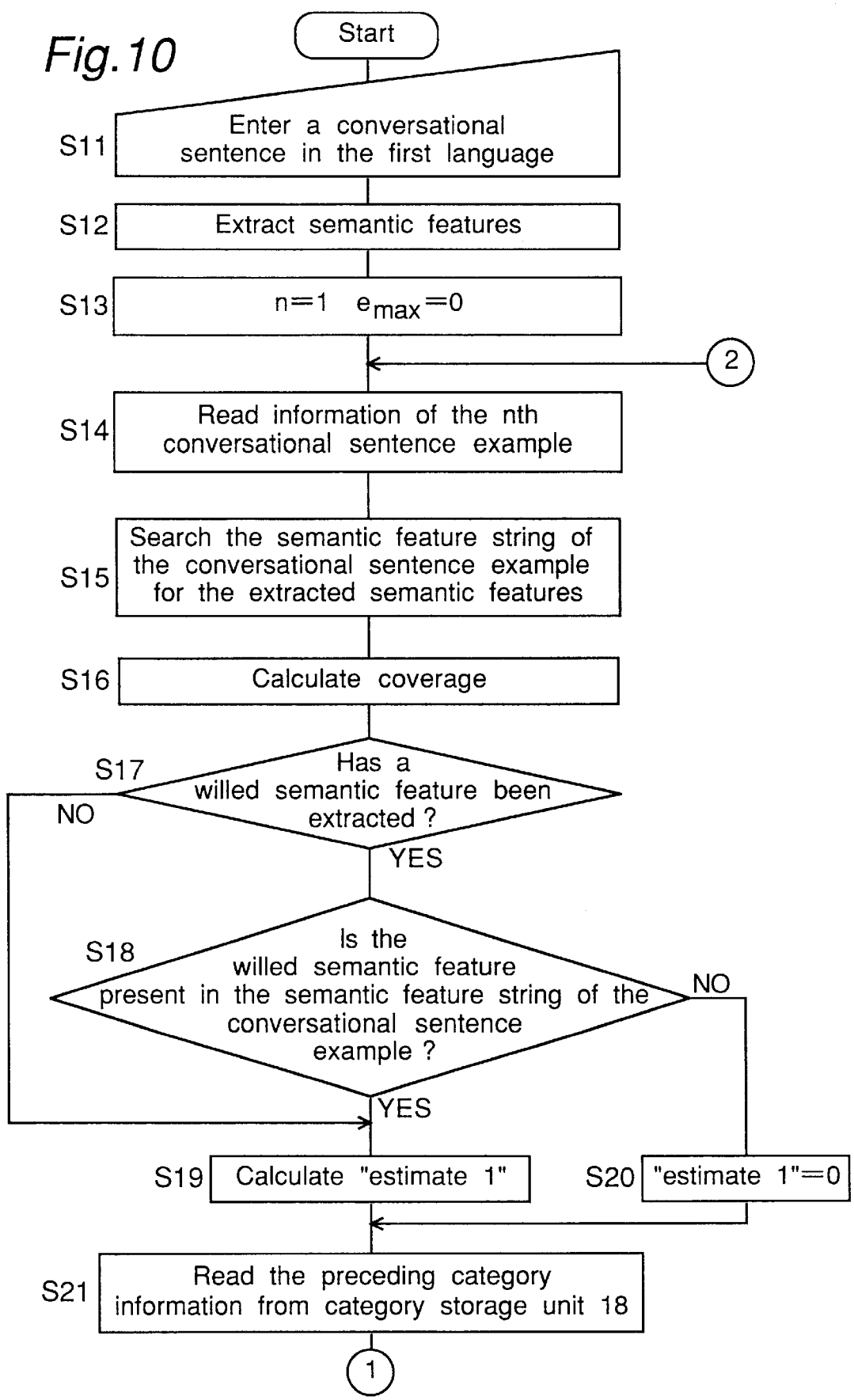

Fig.18

| Sequence No. | Partial character string | (variable)Semantic feature name | Translated variable semantic feature expression | Type of semantic feature |
|---|---|---|---|---|
| 1 | ロンドン<br>*rondon* | {地名}<br>*{CHIMEI}* | London | variable semantic feature |
| 2 | まで<br>*MADE* | まで<br>*MADE* | — | invariable semantic feature |
| 3 | いくら<br>*IKURA* | 幾ら<br>*IKURA* | — | invariable semantic feature |
| 4 | ですか<br>*DESUKA* | ですか<br>*DESUKA* | — | invariable semantic feature |

Fig.19

| Sequence No. | Partial character string | (variable) Semantic feature name | Translated variable semantic feature expression | Type of semantic feature |
|---|---|---|---|---|
| 1 | ロンドン<br>rondon | {地名}<br>{CHIME} | London | variable semantic feature |
| 2 | から<br>KARA | から<br>KARA | — | invariable semantic feature |
| 3 | オックスフォード<br>okkusufodo | {地名}<br>{CHIME} | Oxford | variable semantic feature |
| 4 | まで<br>MADE | まで<br>MADE | — | invariable semantic feature |
| 5 | いくら<br>IKURA | 幾ら<br>IKURA | — | invariable semantic feature |
| 6 | ですか<br>DESUKA | ですか<br>DESUKA | — | invariable semantic feature |

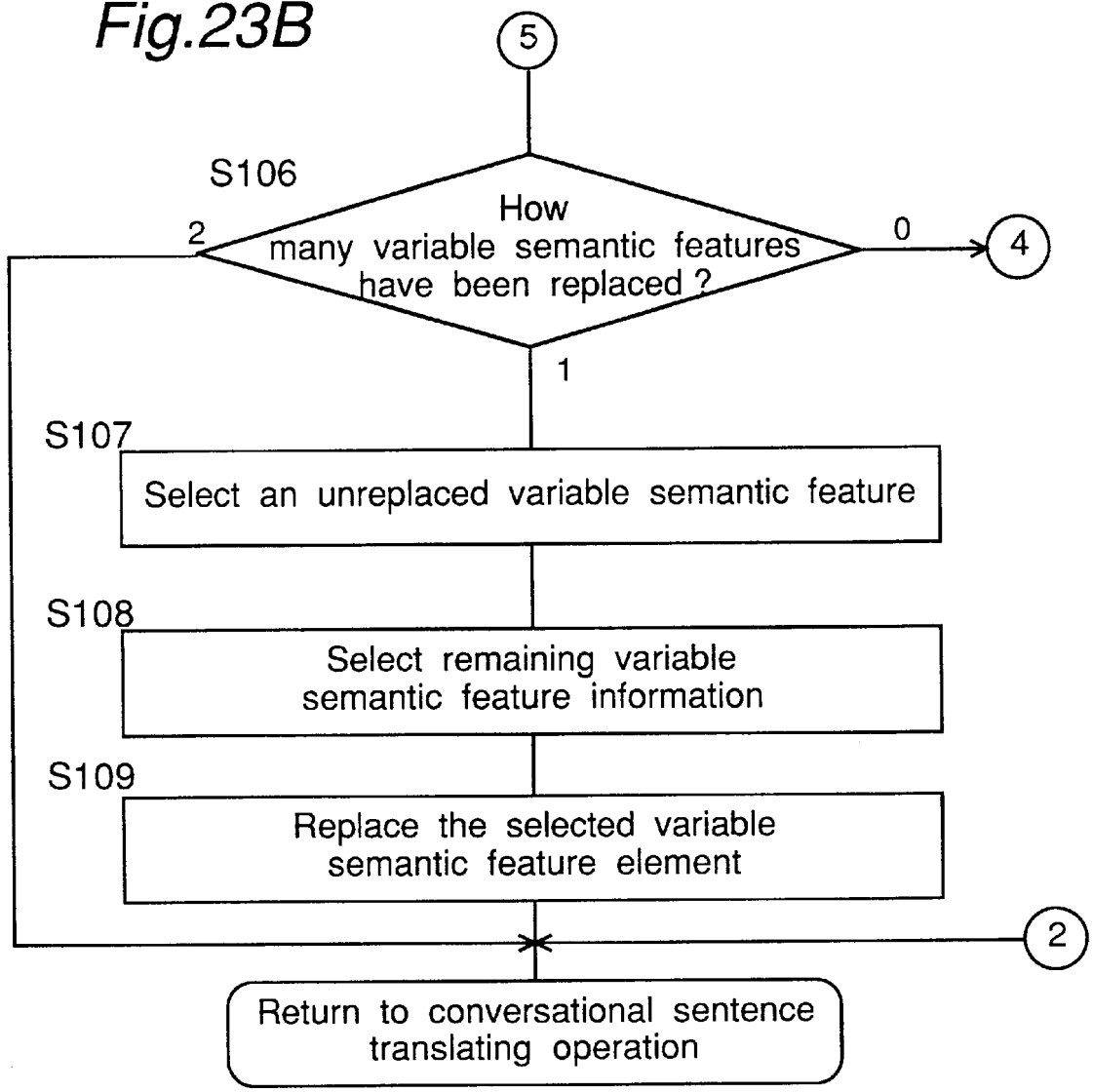

Fig.24

| Sequence No. | Partial character string | (variable) Semantic feature name | Translated variable semantic feature expression | Type of semantic feature |
|---|---|---|---|---|
| 1 | オックスフォード okkusufodo | {地名} {CHIMEI} | Oxford | variable semantic feature |
| 2 | まで MADE | まで MADE | — | invariable semantic feature |
| 3 | ロンドン rondon | {地名} {CHIMEI} | London | variable semantic feature |
| 4 | から KARA | から KARA | — | invariable semantic feature |
| 5 | いくら IKURA | 幾ら IKURA | — | invariable semantic feature |
| 6 | ですか DESUKA | ですか DESUKA | — | invariable semantic feature |

Fig.28

| Sequence No. | Partial character string | (variable) Semantic feature name | Translated variable semantic feature expression | Type of semantic feature |
|---|---|---|---|---|
| 1 | いく<br>*IKU* | 行く<br>*IKU* | — | invariable semantic feature |
| 2 | 電車<br>*DENSHA* | {交通機関}<br>{*KOTSUKIKAN*} | train | variable semantic feature |
| 3 | ありますか<br>*ARIMASUKA* | ありますか<br>*ARIMASUKA* | — | invariable semantic feature |

Fig.32

```
0001
{一人部屋}が欲しいのです。
{HITORIBEYA} GA HOSHII NO DESU
I'd like a {single} room.
{部屋の種類} 欲しい です
{HEYA NO SYURUI} HOSHII DESU
```

```
0002
{浴室}付きですか。
{YOKUSHITSU} TSUKI DESUKA
Is it with {bath}?
{風呂}@20 付き ですか
{FURO} @20 TSUKI DESUKA
```
~71

```
0003
この近くにある病院を教えて下さい。
KONO CHIKAKU NI ARU BYOIN WO OSHIETEKUDASAI
Could you tell me the nearest hospital?
この 近く 病院 教える 下さい
KONO CHIKAKU BYOIN OSHIERU KUDASAI
病院 場所 知りたい
BYOIN BASHO SHIRITAI
気分 悪い
KIBUN WARUI
```

Conversation sentence example data

{一人部屋}が欲しいのです。\0
{HITORIBEYA} GA HOSHII NO DESU\0
I'd like a single room. \0
23, 111, 517 \0

{浴室}付きですか。\0
{YOKUSHITSU} TSUKI DESUKA\0
Is it with {bath}? \0
35/20, 212, 620 \0

この近くにある病院を教えて下さい。\0
KONO CHIKAKU NI ARU BYOIN WO OSHIETEKUDASAI\0
Could you tell me the nearest hospital? \0
15, 100, 88, 205, 511 \0
205, 77, 584 \0
55, 321 \0

Conversation sentence example data index

| 0001 | 0002 | 0003 | 0004 | .......... |

Fig.34

| Basic semantic feature name | Basic semantic feature expression |
|---|---|
| 欲しい<br>*HOSHII* | 欲しい<br>*HOSHII*<br>ほしい<br>*HOSHII* |
| です<br>*DESU* | です<br>*DESU* |
| 部屋<br>*HEYA* | 部屋<br>*HEYA*<br>ルーム<br>*rumu* |
| 付き<br>*TSUKI* | つき<br>*TSUKI*<br>付き<br>*TSUKI* |
| この<br>*KONO* | この<br>*KONO* |
| 近く<br>*CHIKAKU* | 近く<br>*CHIKAKU*<br>あたり<br>*ATARI* |
| ある<br>*ARU* | ある<br>*ARU* |
| 病院<br>*BYOIN* | 病院<br>*BYOIN*<br>医院<br>*IIN*<br>診療所<br>*SHINRYOSHO* |
| 教える<br>*OSHIERU* | 教え<br>*OSHIE* |
| どこ<br>*DOKO* | どこ<br>*DOKO*<br>どのへん<br>*DONOHEN*<br>どのあたり<br>*DONOATARI* |
| ⋮ | ⋮ |

| Variable semantic feature name | |
|---|---|
| Variable semantic feature entry name | Translated variable semantic feature expression |
| Variable semantic feature expression | |

{ 部屋の種類 }
{ *HEYA NO SHURUI* }

シングルルーム         single
    *shingururumu*
        シングルルーム
        *shingururumu*
        シングル
        *shinguru*
        一人部屋
        *HITORIBEYA*
        1人部屋
        *1NINBEYA*

ツインルーム           twin
    *tsuinrumu*
        ツインルーム
        *tsuinrumu*
        ツイン
        *tsuin*
        二人部屋
        *FUTARIBEYA*
        2人部屋
        *2NINBEYA*

{ 風呂 }
{ *FURO* }

浴室                  bath
    *YOKUSHITSU*
        浴室
        *YOKUSHITSU*
        風呂
        *FURO*
        浴槽
        *YOKUSO*

シャワー            shower
    *shawa*
        シャワー
        *shawa*

74

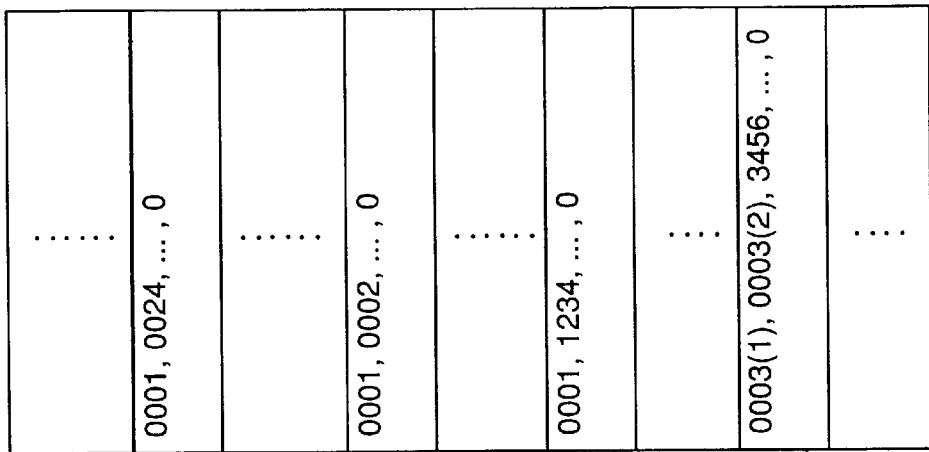
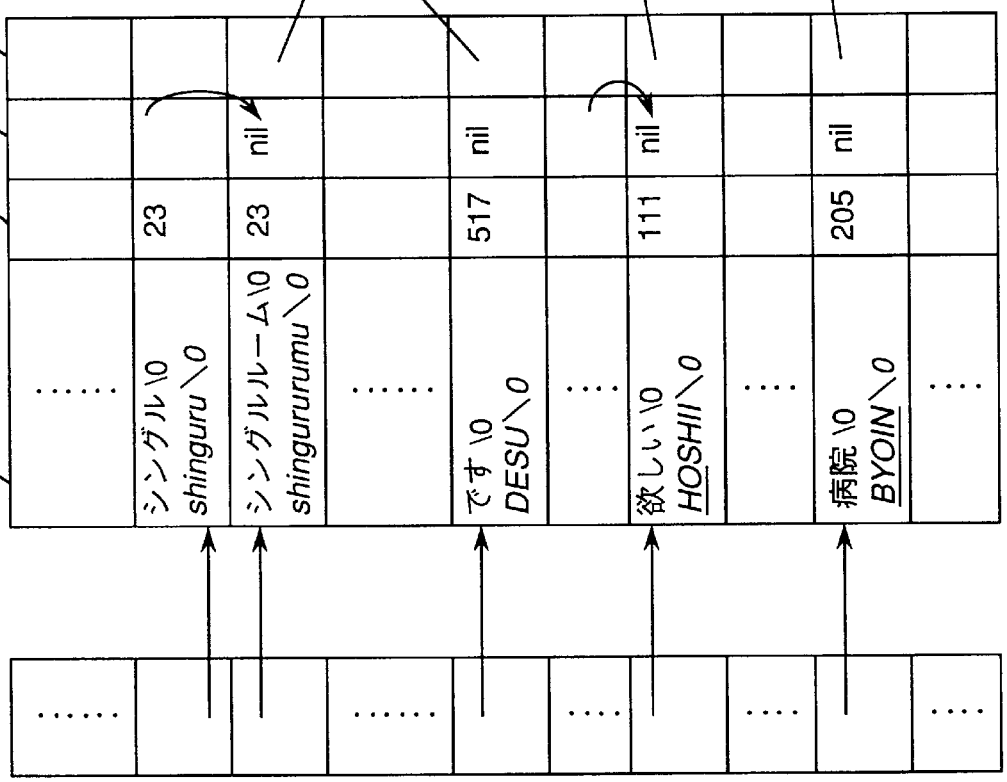
Fig.36A  Fig.36B  Fig.36C

Fig.41

```
0001
{一人部屋}が欲しいのです。
{HITORIBEYA} GA HOSHII NO DESU
I'd like a single room.
{部屋の種類} 欲しい です
{HEYA NO SYURUI} HOSHII DESU
```
⎯71

⋮

```
0103
Situation : Admission fee, etc.
料金は幾らですか。
RYOKIN HA IKURA DESUKA
How much is the fee ?
料金 いくら ですか
RYOKIN IKURA DESUKA
```

```
0104
Situation : Vehicles
料金は幾らですか。
RYOKIN HA IKURA DESUKA
How much is the fare ?
料金 いくら ですか
RYOKIN IKURA DESUKA
```

```
            71
0001
{一人部屋}が欲しいのです。
{HITORIBEYA} GA HOSHII NO DESU
I'd like a {single} room.
{部屋の種類} 欲しい です
{HEYA NO SYURUI} HOSHII DESU

⋮

0202
私は日本から来ました。
WATASHI HA NIPPON KARA KIMASHITA
I came from Japan.
(私) 日本 から 来る
(WATASHI) NIPPON KARA KURU

{Variable semantic
feature name}

Variable semantic      Translated variable
    feature entry name      semantic feature
                                                         expression
               Variable semantic
               feature expression

{Sこの・その}
{S KONO・SONO}

この                                     this
    KONO

この
                KONO

その                                     the
    SONO

その
                SONO nil                                        a
                              :
                              :

*Fig.46*

```
                                        ┌─74
┌─────────────────────────────────────────────────┐
│ {Variable semantic                              │
│  feature name}                                  │
│                                                 │
│     Variable semantic        Translated variable│
│     feature entry name       semantic feature   │
│                                      expression │
│              Variable semantic                  │
│              feature expression                 │
├─────────────────────────────────────────────────┤
│ {S単位}                                         │
│ {S TAN'I}                                       │
│                                                 │
│        つ                                   nil │
│        TSU                                      │
│                                                 │
│                    つ                           │
│                    TSU                          │
│                                                 │
│        個                                   nil │
│        KO                                       │
│                                                 │
│                    個                           │
│                    KO                           │
│                    こ                           │
│                    KO                           │
│                    :                            │
│                    :                            │
└─────────────────────────────────────────────────┘
```

Fig.50

| Semantic feature name | Semantic feature expression |
|---|---|
| チェックイン<br>*chekkuin* | チェックイン<br>*chekkuin* |
| お願い<br>ONEGAI | お願いします<br>ONEGAI SHIMASU<br>お願い<br>ONEGAI<br>お願いしたい<br>ONEGAI SHITAI<br>お願いしたいのです<br>ONEGAI SHITAI NO DESU<br>お願いしたいのですが<br>ONEGAI SHITAI NO DESUGA |
| 見所<br>MIDOKORO | 見所<br>MIDOKORO<br>名所<br>MEISHO |
| ホテル<br>*hoteru* | ホテル<br>*hoteru* |
| 行き方<br>IKIKATA | 行き方<br>IKIKATA<br>行く方法<br>IKUHOHO<br>道順<br>MICHIJUN<br>道<br>MICHI |
| 教える<br>OSHIERU | 教え<br>OSHIE<br>紹介<br>SHOKAI<br>呼<br>YO |
| 下さい<br>KUDASAI | 下さい<br>KUDASAI<br>もらえませんか<br>MORAEMASENKA |
| 別の<br>BETSUNO | 別の<br>BETSU NO<br>他の<br>HOKA NO<br>違う<br>CHIGAU |

チェックインをお願いします。
chekkuin WO ONEGAI SHIMASU
Check in, please.
チェックイン　　　お願い
chekkuin　　　　ONEGAI 見所を教えて下さい。
MIDOKORO WO OSHIETE KUDASAI
Please tell me the interesting things to see.
見所　　教える　下さい
MIDOKORO OSHIERU KUDASAI そのホテルへの行き方を教えて下さい。
SONO hoteru HENO IKIKATA WO OSHIETE KUDASAI
Could you tell me how to get to the hotel?
ホテル　　行き方　　教える　　下さい
hoteru　　IKIKATA OSHIETE KUDASAI 他のホテルを紹介してもらえませんか。
HOKA NO hoteru WO SHOKAI SHITE MORAEMASENKA
Would you suggest any other hotel?
別の　ホテル　教える　下さい
BETSU NO hoteru OSHIERU KUDASAI

Fig.53

| | Input sentence to input unit 88 | Display contents of display unit 94 |
|---|---|---|
| First time | [教えて] [OSHIETE] | [見所を教えて下さい。] [MIDOKORO WO OSHIETE KUDASAI] [私の電話番号を教えます。] [WATASHI NO DENWABANGO WO OSHIEMASU] [診療所を紹介して下さい。] [SHINRYOSHO WO SHOKAI SHITE KUDASAI] [キャンセルがあったら教えて下さい。] [kyanseru GA ATTARA OSHIETE KUDASAI] [席があいたら呼んで下さい。] [SEKI GA AITARA YONDE KUDASAI] |
| Second time | [教えて、ホテル] [OSHIETE, hoteru] | [ホテルへ着いたら教えて頂けますか。] [hoteru HE TSUITARA OSHIETE ITADAKEMASUKA] [いいホテルを紹介してもらえませんか。] [Il hoteru WO SHOKAI SHITE MORAEMASENKA] [ホテルの電話番号を教えて下さい。] [hoteru NO DENWABANGO WO OSHIETE KUDASAI] [他のホテルを紹介してもらえませんか。] [HOKA NO hoteru WO SHOKAI SHITE MORAEMASENKA] [ホテルの住所と電話番号を教えて下さい。] [hoteru NO JUSHO TO DENWABANGO WO OSHIETE KUDASAI] |
| Third time | [教えて、ホテルへの道] [OSHIETE, hoteru HENO MICHI] | [ホテルへ行く道順を教えて下さい。] [hoteru HE IKU MICHIJUN WO OSHIETE KUDASAI] |
| Selected second-language sentence | | English translation: Could you show me the way to the hotel? |

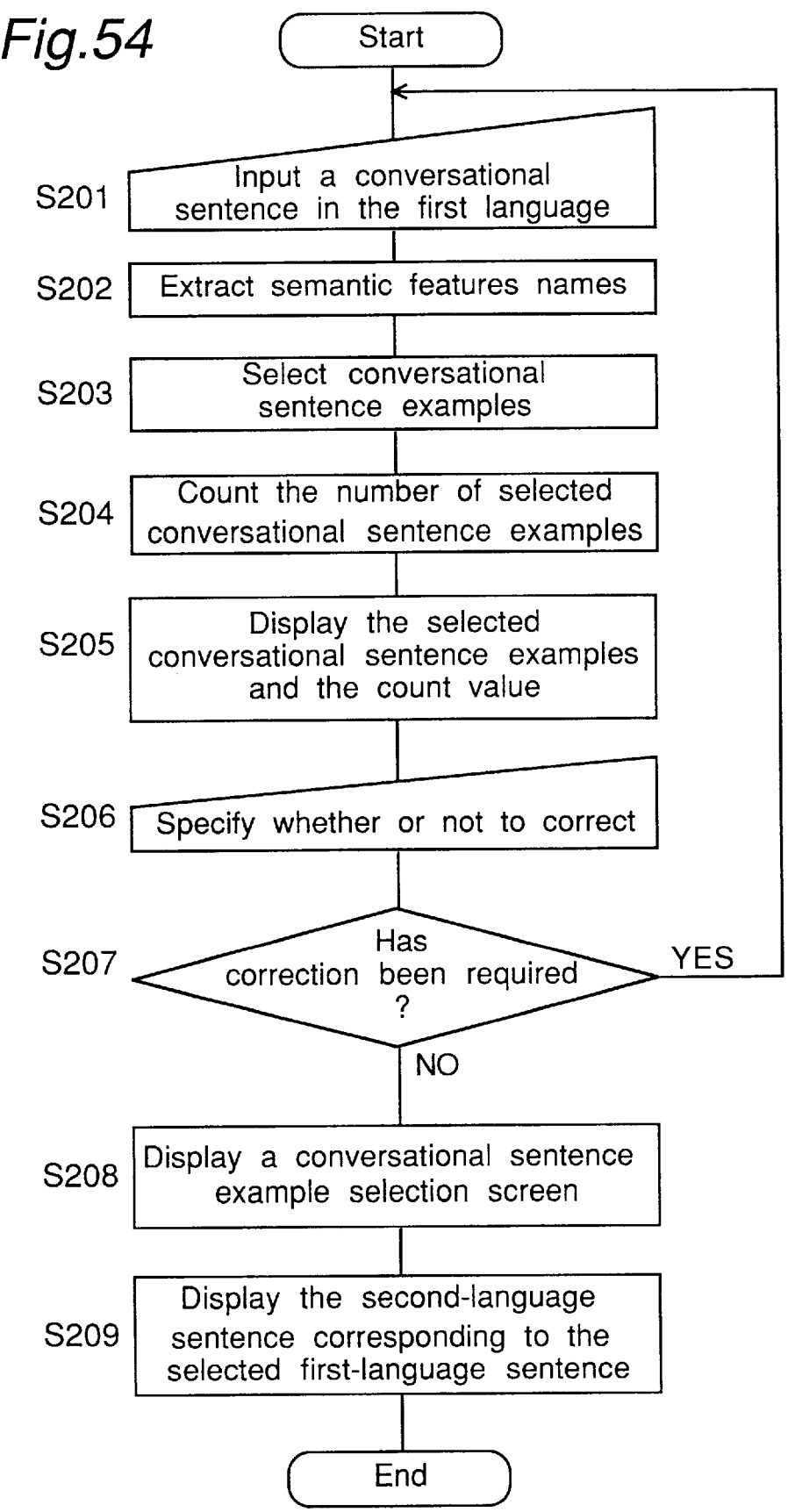

Fig. 55

| | Fig.55A |
|---|---|
| | Fig.55B |

Fig.55A

| | Input sentence to input unit 88 | Display contents of display unit 94 |
|---|---|---|
| First time | [教えて]<br>[<u>OSHIETE</u>] | Number of sentence examples: 20<br>Conversational sentence examples:<br>[見所を教えて下さい。]<br>[MIDOKORO WO <u>OSHIETE</u> KUDASAI]<br>[私の電話番号を教えます。]<br>[WATASHI NO DENWABANGO WO <u>OSHIEMASU</u>]<br>[診療所を紹介して下さい。]<br>[SHINRYOSHO WO SHOKAI SHITE KUDASAI]<br>[キャンセルがあったら教えて下さい。]<br>[kyanseru GA ATTARA <u>OSHIETE</u> KUDASAI]<br>[席があいたら呼んで下さい。]<br>[<u>SEKI GA AITARA YONDE KUDASAI</u>] |
| Second time | [教えて、ホテル]<br>[<u>OSHIETE</u>,<br><u>hoteru</u>] | Number of sentence examples: 12<br>Conversational sentence examples:<br>[ホテルへ着いたら教えて頂けますか。]<br>[<u>hoteru</u> HE TSUITARA <u>OSHIETE</u> ITADAKEMASUKA]<br>[いいホテルを紹介してもらえませんか。]<br>[II <u>hoteru</u> WO SHOKAI SHITE MORAEMASENKA]<br>[ホテルの電話番号を教えて下さい。]<br>[<u>hoteru</u> NO DENWABANGO WO <u>OSHIETE</u> KUDASAI]<br>[他のホテルを紹介してもらえませんか。]<br>[HOKA NO <u>hoteru</u> WO SHOKAI SHITE MORAEMASENKA]<br>[ホテルの住所と電話番号を教えて下さい。]<br>[<u>hoteru</u> NO JUSHO TO DENWABANGO WO <u>OSHIETE</u> KUDASAI] |

Fig. 55B

| Third time | Number of sentence examples: 1<br>Conversational sentence examples:<br>「教えて、ホテルへの道」<br>[OSHIETE, hoteru HENO MICHI] | 「ホテルへ行く道順を教えて下さい。」<br>[hoteru HE IKU MICHIJUN WO OSHIETE KUDASAI] |
|---|---|---|
| Selected second-language sentence | | English translation:<br>Could you show me the way to the hotel? |

Fig.57

| Input conversational sentence | Selection result |
|---|---|
| [教えて、ホテル]<br>[OSHIETE, hoteru] | [ホテルへ着いたら教えて頂けますか。]<br>[hoteru HE _TSUITARA OSHIETE ITADAKEMASUKA_]<br>[ホテルの住所と電話番号を教えて下さい。]<br>[hoteru NO _JUSHO TO DENWABANGO WO OSHIETE KUDASAI_]<br>[ホテルへ行く道順を教えて下さい。]<br>[hoteru HE _IKU MICHIJUN WO OSHIETE KUDASAI_] |

| | Input sentence to input unit 105 | Display contents of display unit 111 |
|---|---|---|
| First time | [教えて、ホテル]<br>[OSHIETE, hoteru] | Conversational sentence examples:<br>[ホテルへ着いたら教えて頂けますか。]<br>[hoteru HE TSUITARA OSHIETE ITADAKEMASUKA]<br>[ホテルの住所と電話番号を教えて下さい。]<br>[hoteru NO JUSHO TO DENWABANGO WO OSHIETE KUDASAI]<br>[ホテルへ行く道順を教えて下さい。]<br>[hoteru HE IKU MICHIJUN WO OSHIETE KUDASAI]<br><br>Difference from the preceding: None |
| Second time | [教えて、ホテルへの道]<br>[OSHIETE, hoteru HENO MICHI] | Conversational sentence examples:<br>[ホテルへ行く道順を教えて下さい。]<br>[hoteru HE IKU MICHIJUN WO OSHIETE KUDASAI]<br>[ホテルへ着いたら教えて頂けますか。]<br>[hoteru HE TSUITARA OSHIETE ITADAKEMASUKA]<br>[ホテルの住所と電話番号を教えて下さい。]<br>[hoteru NO JUSHO TO DENWABANGO WO OSHIETE KUDASAI]<br><br>Difference from the preceding: |
| Selected second-language sentence | | English translation:<br>Could you show me the way to the hotel? |

Fig. 62

| | Input sentence to input unit 115 | Display contents of display unit 121 |
|---|---|---|
| First time | [教えて]<br>[OSHIETE] | [見所を教えて下さい。]<br>[MIDOKORO WO OSHIETE KUDASAI]<br>[私の電話番号を教えます。]<br>[WATASHI NO DENWABANGO WO OSHIEMASU]<br>[診療所を紹介して下さい。]<br>[SHINRYOSHO WO SHOKAI SHITE KUDASAI]<br>[キャンセルがあったら教えて下さい。]<br>[kyanseru GA ATTARA OSHIETE KUDASAI]<br>[席があいたら呼んで下さい。]<br>[SEKI GA AITARA YONDE KUDASAI] |
| Second time | [ホテル]<br>[hoteru] | [ホテルへ着いたら教えて頂けますか。]<br>[hoteru HE TSUITARA OSHIETE ITADAKEMASUKA]<br>[いいホテルを紹介してもらえませんか。]<br>[Ii hoteru WO SHOKAI SHITE MORAEMASENKA]<br>[ホテルの電話番号を教えて下さい。]<br>[hoteru NO DENWABANGO WO OSHIETE KUDASAI]<br>[他のホテルを紹介してもらえませんか。]<br>[HOKA NO hoteru WO SHOKAI SHITE MORAEMASENKA]<br>[ホテルの住所と電話番号を教えて下さい。]<br>[hoteru NO JUSHO TO DENWABANGO WO OSHIETE KUDASAI] |
| Third time | [道]<br>[MICHI] | [ホテルへ行く道順を教えて下さい。]<br>[hoteru HE IKU MICHIJUN WO OSHIETE KUDASAI] |
| Selected second-language sentence | | English translation:<br>Could you show me the way to the hotel? |

CONVERSATIONAL SENTENCE TRANSLATION APPARATUS ALLOWING THE USER TO FREELY INPUT A SENTENCE TO BE TRANSLATED

BACKGROUND OF THE INVENTION

The present invention relates to a conversational sentence translation apparatus for translating a conversational sentence in a first language into a second language by making use of previously registered conversational sentence examples.

Nowadays, with increased opportunities of going abroad for sightseeing and other purposes, there have been published a variety of conversation example collections in which many conversational expressions with their translations are collected so as to help one to be successful with conversations in foreign countries. Also, conversational sentence translation apparatuses have been commercially available in which those conversation example collections are stored as electronic data, so that a conversational sentence example in one language is selected through key operation or the like by the user and that a previously prepared translation in another language of the selected conversational sentence example is automatically displayed.

Generally, such a conversational sentence translation apparatus is designed not to translate a freely prepared input, sentence in a first language into an equivalent in a second language by a machine translation system and output the obtained translation. Instead it selects one of the previously prepared conversational sentence examples and display a previously prepared translation of the selected conversational sentence example. That is, a sentence example selection method is adopted. The reasons for this are that:

(1) A machine translation system that translates free sentences in a first language is difficult to implement in a portable form because of its intricacy; and (2) Because of its technical immatureness in translating free sentences, translations by the machine translation system result in poor translation quality, in comparison with the sentence example selection method wherein previously prepared translated sentences of previously prepared conversational sentence examples are outputted.

Meanwhile, for the sentence example selection method, it is desirable to store a large number of conversational sentence examples with a view to matching a large number of situations of use. Further, as proposed in Japanese Patent Publication SHO 61-16117, if the stored conversational sentence examples contain replaceable portions so that the replaceable portions of the conversational sentence examples can be replaced with another, the scope within which the registered conversational sentence examples are applied can be expanded. However, the greater the number of conversational sentence examples, the more troublesome and difficult it becomes to select a target conversational sentence example from among the conversational sentence examples registered in the conversational sentence translation apparatus.

Thus, to solve such disadvantages, as seen in, for example, Japanese Patent Publication SHO 60-24501, there has been adopted a method that the conversational sentence examples are previously classified according to categories and stored in categories. By this method, the search scope for a desired conversational sentence example is narrowed by specifying a category corresponding to the situation of use.

Another method for narrowing the search scope is to specify a keyword so that a registered conversational sentence example containing the keyword is selected. For example, in Japanese Patent Publication SHO 58-58714, matching is made between an input keyword and words contained in each registered conversational sentence example, and a translation of a conversational sentence example using a word coincident with the keyword is outputted as the translation of the target conversational sentence example. In still another method, disclosed in Japanese Patent Laid-Open Publication HEI 5-324702, label information is previously added to each conversational sentence example, and a conversational sentence example to which specified label information has been added is selected.

However, in the conventional conversational sentence translation apparatus, an attempt to store even larger numbers of conversational sentence examples for a wider coverage of conversational situations would cause the problem of a difficulty in finding out a target conversational sentence example to arise again.

For example, in the method disclosed in Japanese Patent Publication SHO 60-24501, in which conversational sentence examples are previously stored in a classified manner, the number of categories to be stored is increased or the number of conversational sentence examples belonging to each category is increased. Therefore, a target conversational sentence example is difficult to find out. Further, to solve this disadvantage, there has been proposed a method in which the categories are built up hierarchically by creating sub-categories within one category so that the number of categories or conversational sentence examples to be selected in each layer of the hierarchy is decreased. Unfortunately, also in this case, according as the number of layers in the hierarchy of categories increases, the handling until the target conversational sentence example is reached becomes more complicated and therefore it becomes more difficult to find out the target conversational sentence example.

Further, in the above conversational sentence translation apparatus in which conversational sentence examples are classified according to categories, since the categorical classification of the conversational sentence examples is carried out by the developer of the apparatus, a target conversational sentence example does not necessarily belong to the category that the user has expected. This makes the apparatus inconvenient for use in some cases. Besides, building up a hierarchical categorical system as described above would add to the inconvenience in use.

In contrast to this, in the method in which a conversational sentence example is retrieved by the use of a keyword, as described before, a conversational sentence example is retrieved with an input word taken as the keyword. For example, when a Japanese word "KAGI" (which means "key" in English) is entered as the keyword, a conversational sentence example "KAGI WO KUDASAI" (which means "Give me the key.") or "KAGI WO NAKUSHIMASHITA" (which means "I have lost the key.") containing the keyword "KAGI" is selected. In another example of this method, keywords are previously added to the conversational sentence examples, and conversational sentence examples to which the keyword "KAGI" has been added are selected. With this method, when the user enters a word that makes the core of a conversational sentence example to be retrieved, conversational sentence examples associated with the keyword are selected and displayed. Then, the user is allowed to specify a target conversational sentence example more directly than when the user traces the categories until the target conversational sentence example is reached.

Unfortunately, in this method utilizing the keyword as well, as the number of stored conversational sentence examples increases, larger numbers of conversational sentence examples would be selected for one keyword, resulting in a difficulty in making a choice out of them. A solution to this problem may be to narrow the search scope for conversational sentence examples by specifying a plurality of keywords. However, this approach would involve an issue of how and which words should be chosen as keywords from among words constituting the conversational sentence example that the user wants to set.

As shown above, the conversational sentence translation apparatuses of the prior art as have been suffering from problems due to an input method, which is far from the ideal input method that allows a natural sentence to be entered in a first language.

The above problems occur when the user selects a target sentence that the user wants to input and translate, from among the previously registered conversational sentence examples. The user, in choosing a conversational sentence example, is inevitably required to be always conscious of "which category the sentence that the user wants to translate belongs to" or "which and what keyword the user should use for search".

SUMMARY OF THE INVENTION

The present invention has been developed with a view to substantially solving the above described disadvantages And has for its essential object to provide a conversational sentence translation apparatus which allows the user to freely enter a sentence to be translated, and which then automatically selects an optimal conversational sentence example and displays its translation.

In order to achieve the aforementioned object, the present invention provides a conversational sentence translation apparatus comprising:

input means through which a free conversational sentence in a first language is inputted in the apparatus;

a semantic feature dictionary in which information on various semantic features is stored, said information on each semantic feature including a name of the semantic feature and at least one character string in the first language having the semantic feature, said character strings serving as elements of sentences in the first language;

a bilingual database in which information on various conversational sentence examples is stored, said information on each conversational sentence example including a conversational sentence example in the first language, a translation in a second language of the conversational sentence example, and a string of semantic features contained in the conversational sentence example;

an analyzer for, with reference to the semantic feature dictionary, extracting semantic features from the conversational sentence input through the input means;

a semantic searcher for searching the bilingual database for the semantic features extracted by the analyzer to determine a degree of semantic coincidence between each conversational sentence example and the input conversational sentence and select a conversational sentence example having a highest degree of semantic coincidence; and display means for displaying the conversational sentence example selected by the semantic searcher and the translation thereof.

In this apparatus, semantic features are extracted from an input conversational sentence in the first language (i.e., source language) freely entered through the input means, by the analyzer with the use of the semantic feature dictionary. Then, the semantic feature strings of the conversational sentence examples registered in the bilingual database are searched for the extracted semantic features by the semantic searcher, so that a conversational sentence example having the highest degree of semantic coincidence is selected based on the search result. The selected conversational sentence example and its translation in the second language (i.e., target language) are displayed by the display means. Thus, a conversational sentence example semantically similar to the input conversational sentence freely entered through the input means is automatically selected and displayed along with its translation.

Therefore, according to this invention, the user is freed from the burden of selecting a conversational sentence example that the user wants to translate into the second language, from among a plurality of first-language conversational sentence examples previously registered. The user can get the translation of a targeted conversational sentence example automatically and promptly only by freely entering a conversational sentence in the first language.

In an embodiment, the semantic searcher selects a plurality of conversational sentence examples having highest degrees of semantic coincidence in the order of decreasing degree of semantic coincidence. Also, the apparatus further comprises a selector for selecting, through a dialogue with a user, a conversational sentence example semantically closer to the input conversational sentence than any other, from among the plurality of conversational sentence examples selected by the semantic searcher. And, the display means displays the conversational sentence example selected by the selector and the translation thereof. The apparatus of this embodiment obtains a conversational sentence example closer to the meaning that the user intends can be obtained accurately.

In an embodiment, the semantic feature dictionary includes:

a willed semantic feature dictionary listing the names and character strings of willed semantic features, each willed semantic feature representing a will of a sentence in the first language;

a contextual semantic feature dictionary listing the names and character strings of contextual semantic features other than the willed semantic features, each contextual semantic feature representing a context of a sentence in the first language.

In this embodiment, because the semantic feature dictionary includes the willed semantic feature dictionary and the contextual semantic feature dictionary, in the process of extracting semantic features by the analyzer, the semantic features are extracted in a classified manner into willed semantic features and contextual semantic features, so that the meaning of the input conversational sentence can be captured more accurately.

Thus, according to this invention, in the process of selecting a conversational sentence example by the semantic searcher, a conversational sentence example semantically closer to the input conversational sentence is selected with high precision.

In an embodiment, the semantic searcher includes a coverage calculating means for calculating a coverage that represents a ratio at which, with respect to each conversational sentence example, character strings of the input conversational sentence corresponding to the semantic features of the conversational sentence example found by the semantic searcher cover the entire character strings of the input conversational sentence, and the semantic searcher determines the degree of semantic coincidence by using the coverage. Accordingly, a conversational sentence example better matching the meaning of the input conversational sentence can be accurately selected from among the plurality of conversational sentence examples registered in the bilingual database.

In an embodiment, a weight is added to each of the semantic features registered for the individual conversational sentence examples in the bilingual database, and the semantic searcher determines the degree of semantic coincidence by using the weights.

That is, in this embodiment, in selecting a conversational sentence example by the semantic searcher, the significance of each semantic feature in the input conversational sentence is taken into account. Thus, a conversational sentence example even better matching the meaning of the input conversational sentence can be selected.

In an embodiment, the semantic feature dictionary includes a variable semantic feature dictionary in which information on variable semantic features is stored, each variable semantic feature being such a semantic feature that its corresponding character string is replaceable with another character string, said information on each variable semantic feature including a name of the variable semantic feature, one or more entry names of the variable semantic feature, one or more character strings in the first language for each entry name which are elements of sentences in the first language, and a translation in the second language of each entry name. Also, in the bilingual database, variable semantic feature information for specifying a variable semantic feature is annexed to each conversational sentence example and its translation and the semantic feature string for the conversational sentence example, respectively. And, the apparatus further comprises a feature element replacer for, with reference to the variable semantic feature dictionary and the variable semantic feature information, replacing character strings corresponding to a variable semantic feature in the conversational sentence example selected by the semantic searcher and its translation with an entry name of a variable semantic feature in the input conversational sentence and a translation in the second language of the entry name, respectively.

This embodiment offers a great variety of conversational sentence examples, so that a conversational sentence example reflecting nuance of the input conversational sentence can be obtained and displayed along with its translation, without increasing the number of conversational sentence examples to be registered in the bilingual database.

In an embodiment, the variable semantic feature information is annexed to only each conversational sentence example and the translation thereof in the bilingual database. And, with reference to the variable semantic feature dictionary and the variable semantic feature information and through a dialogue with a user, the feature element selector selectively replaces a character string corresponding to a variable semantic feature in the conversational sentence example selected by the semantic searcher and the translation thereof with an entry name specified by the user of the variable semantic feature and a translation in the second language of the specified entry name, respectively.

According to this embodiment, the registered conversational sentence examples are varied through the dialogue with the user. Therefore, a conversational sentence example better matching the meaning of the input conversational sentence is obtained.

In an embodiment, the information on each conversational sentence example in the bilingual database further includes category information indicative of a category of the conversational sentence example. And, the apparatus further comprises a category storage means for storing the category information of a conversational sentence example precedingly selected by the semantic searcher and established to be a targeted conversational sentence example. Further, the semantic searcher includes a coincidence deciding means for deciding whether or not the category information of each conversational sentence example and the category information stored in the category storage means are coincident with each other, and preferentially selects a conversational sentence example having a category information coincident with the category information stored in the category storage means as a conversational sentence example semantically close to the input conversational sentence.

The apparatus thus constructed preferentially selects conversational sentence examples on the same topic as that of the input conversational sentence that is currently under translation, so that the targeted input conversational sentence and its translation are obtained promptly.

In an embodiment, the information on each conversational sentence example in the bilingual database further includes category information indicative of a category of the conversational sentence example. And, the selector comprises a category information display means for displaying category information of each of a plurality of conversational sentence examples selected by the semantic searcher, and a restricting means for restricting the plurality of conversational sentence examples selected by the semantic searcher to fewer conversational sentence examples according to a category information selected from among the displayed category information through a dialogue with a user.

With this arrangement, even if a large number of conversational sentence examples have been selected by the semantic searcher, the selection of an appropriate conversational sentence example is carried out promptly and easily by the selector.

In an embodiment, the selector is enabled to select a plurality of conversational sentence examples semantically closest to the input conversational sentence through the dialogue with the user, and the display means is enabled to display both the plurality of conversational sentence examples selected by the selector and the translations thereof.

With this arrangement, if a conversational sentence containing plurality of meanings, or contents, is entered, and there is no conversational sentence example representing all of the meanings, the selector selects a plurality of conversational sentence examples which respectively have the individual meanings of the input sentence. Thus, the input conversational sentence having a plurality of meanings or contents and a translation thereof can be expressed with a plurality of conversational sentence examples and their respective translations.

In an embodiment, the feature element replacer comprises a character string detecting means for, with reference to the semantic features extracted by the analyzer, detecting a character string corresponding to a variable semantic feature that is a replacement object in the input conversational sentence; and a coincidence deciding means for, with reference to the semantic features extracted from the input conversational sentence by the analyzer and the variable semantic feature information, deciding whether or not a semantic feature present at a specified position relative to the replacement-object variable semantic feature in the conversational sentence example selected by the semantic searcher or the conversational sentence example selected by the selector is coincident with a semantic feature present at the specified position relative to the character string detected by the character string detecting means in the input conversational sentence. If the decision result by the coincidence deciding means is a non-coincidence, the character string detecting means detects another character string. On the other hand, if the decision result by the coincidence deciding means is a coincidence, then the feature element replacer replaces the character string corresponding to the replacement-object variable semantic feature in the selected conversational sentence example and in the translation thereof with a variable semantic feature entry name corresponding to the character string detected by the character string detecting means and a translation of the variable semantic feature entry name, respectively.

With this arrangement, even if a plurality of character strings belonging to the same variable semantic feature (i.e., having the same variable semantic feature name) are present in the input conversational sentence, a character string corresponding to the variable semantic feature in the conversational sentence example is prevented from being replaced with an inappropriate character string in the input sentence. Thus, a correct conversational sentence example semantically matching the input conversational sentence, as well as its translation, is obtained.

In an embodiment, the feature element replacer comprises a character string detecting means for, with reference to the variable semantic feature information, detecting a character string corresponding to a variable semantic feature that is a replacement object, from the conversational sentence example selected by the semantic searcher or the conversational sentence example selected by the selector, and a coincidence deciding means for, with reference to the semantic features extracted by the analyzer and the variable semantic feature information, deciding whether or not a semantic feature present at a specified position relative to the replacement-object variable semantic feature in the input conversational sentence is coincident with a semantic feature present at the specified position relative to the character string detected by the character string detecting means in the selected conversational sentence example. If the decision result is a non-coincidence, the character string detecting means detects another character string. On the other hand, if the decision result by the coincidence deciding means is a coincidence, then the feature element replacer replaces the character string detected by the character string detecting means in the selected conversational sentence example and a corresponding character string in the translation of the selected conversational sentence example with an entry name of the replacement-object variable semantic feature in the input conversational sentence and a translation of the entry name, respectively.

With this arrangement, even if a plurality of character strings belonging to the same variable semantic feature name are present in the conversational sentence example, a character string corresponding to the variable semantic feature in the conversational sentence example is prevented from being replaced with an inappropriate character string in the input sentence. Thus, a correct conversational sentence example semantically matching the input conversational sentence, as well as its translation, is obtained.

In the case of a combination of the immediately above two embodiments, even if a plurality of character strings belonging to the same variable semantic feature name are present in the input conversational sentence and/or the conversational sentence example, a character string corresponding to the variable semantic feature in the conversational sentence example is prevented from being replaced with an inappropriate character string in the input sentence. Thus, a correct conversational sentence example semantically matching the input conversational sentence, as well as its translation, is obtained.

In an embodiment, the information on a conversational sentence example registered in the bilingual database includes a flag for specifying a position of a character string corresponding to a variable semantic feature that becomes a replacement object in the conversational sentence example. And, the feature element replacer comprises a character string position detecting means for detecting the position of the character string specified by the flag. The feature element replacer replaces both a character string present at the position detected by the character string position detecting means in the conversational sentence example selected by the semantic searcher or the conversational sentence example selected by the selector, and a corresponding character string in the translation of the selected conversational sentence example, with an entry name of the replacement-object variable semantic feature in the input conversational sentence, and an translation of the entry name, respectively.

With this arrangement, the ambiguity as to which character string in the conversational sentence example is to be replaced is eliminated. Thus, a correct conversational sentence example semantically matching the input conversational sentence, as well as its translation, can be obtained easily by simple processing.

In an embodiment, the information on a conversational sentence example registered in the bilingual database includes a flag for specifying a replacement method for an unreplaced character string corresponding to a replacement-object variable semantic feature in the conversational sentence example. Also, the apparatus further comprises a flag discriminator for discriminating whether or not the flag is set for a conversational sentence example of which a character string and a corresponding character string in the translation of the conversational sentence example have been replaced with a variable semantic feature entry name and its translation, respectively, of a variable semantic feature of the input conversational sentence by the feature element replacer; a replacement method detector for detecting a replacement method specified by the flag with respect to a conversational sentence example on which it has been discriminated by the flag discriminator that the flag is set; and a variable semantic feature dictionary searcher for searching the variable semantic feature dictionary to obtain a variable semantic feature entry name which corresponds to a replacement-object variable semantic feature, which is different from the variable semantic feature entry name used in the preceding replacement, and which is suited to the replacement method detected by the replacement method detector, and a translation of the variable semantic feature entry name. The feature element replacer replaces the unreplaced character string in the conversational sentence example which has been discriminated by the flag discriminator that the flag is set, and a corresponding unreplaced character string in the translation of the conversational sentence example, with the variable semantic feature entry name and its translation obtained by the variable semantic feature dictionary searcher.

With this arrangement, in the case where a plurality of character strings corresponding to the replacement-object variable semantic feature name are present in the selected conversational sentence example, after one of the character strings has been replaced, then another character string not yet replaced is replaced with a variable semantic feature entry name other than the variable semantic feature entry name used in the preceding replacement. In other words, the replacement processing on a conversational sentence example by the feature element replacer is performed in such a way that identical variable semantic feature entry names will not occur in the same conversational sentence example. Consequently, a semantically correct conversational sentence example and its translation can be obtained.

In an embodiment, the information on a conversational sentence example registered in the bilingual database includes a flag for specifying an impermissible combination of variable semantic feature entry names. Further, the apparatus further comprises a flag discriminator for discriminating whether or not the flag is set for a conversational sentence example of which a character string and a corresponding character string in the translation of the conversational sentence example have been replaced with a variable semantic feature entry name and its translation, respectively, of a variable semantic feature of the input conversational sentence by the feature element replacer; an unreplaced character string detector for detecting an unreplaced character string corresponding to an element of a combination of variable semantic feature entry names specified by the flag with respect to a conversational sentence example on which it has been discriminated by the flag discriminator that the flag is set; and a variable semantic feature dictionary searcher for searching the variable semantic feature dictionary to obtain a variable semantic feature entry name which is of a variable semantic feature identical to the variable semantic feature of the unreplaced character string detected by the unreplaced character string detector and which is different from the variable semantic feature entry name of the unreplaced character string, as well as a translation of the variable semantic feature entry name. The feature element replacer replaces the unreplaced character string in the conversational sentence example which has been discriminated by the flag discriminator that the flag is set, and a corresponding unreplaced character string in the translation of the conversational sentence example, with the variable semantic feature entry name and its translation obtained by the variable semantic feature dictionary searcher.

With this arrangement, because of the use of the flag specifying an impermissible combination of variable semantic feature entry names, a conversational sentence example and its translation having a semantically incorrect or unnatural combination of words or phrases are prevented from being generated.

In an embodiment, the information on a conversational sentence example registered in the bilingual database includes one or more semantic feature strings of one or more assumed sentences semantically similar to the conversational sentence example, in addition to the semantic feature string of the conversational sentence example itself. In this case, the semantic searcher performs the operation to search the bilingual database for the semantic features extracted by the analyzer to select a conversational sentence example, for each of the plurality of semantic feature strings of the pertinent conversational sentence example, independently.

With this arrangement, when one conversational sentence example is selected for a certain input conversational sentence, the same conversational sentence example will be also selected for other input conversational sentences that are semantically substantially the same as or similar to the certain input conversational sentence. That is, a single conversational sentence example is usable for a plurality of input conversational sentences which are semantically identical or similar to each other. Accordingly, it is unnecessary to register, in the bilingual database, all of conversational sentence examples corresponding to any similar input conversational sentences, so that the capacity of the bilingual database is reduced.

In an embodiment, the apparatus further comprises an index for associating a semantic feature with a set composed of a conversational sentence example registered in the bilingual database and a semantic feature string that is one of the semantic feature strings for the conversational sentence example and that contains the pertinent semantic feature, such that the set of the conversational sentence example and the semantic feature string is obtained from the semantic feature. And, the semantic searcher searches the individual semantic feature strings of each conversational sentence example registered in the bilingual database for the semantic features extracted from the analyzer by the use of the index.

With this arrangement, the semantic searcher can make a search by using the index for the semantic features extracted by the analyzer in the units of individual semantic feature strings associated with one conversational sentence example. Thus, according to this invention, input conversational sentences semantically identical to one another or conversational sentence examples semantically similar to one another can be treated with one conversational sentence example, so that the capacity of the bilingual database is prevented from increasing.

In an embodiment, the information on a conversational sentence example registered in the bilingual database further includes supplementary information representing a situation under which the conversational sentence example is used. And, during a dialogue with the user, the selector presents the user a plurality of conversational sentence examples selected by the semantic searcher along with the supplementary information for those conversational sentence examples.

With this arrangement, with reference to the supplementary information presented by the selector, the user is allowed to correctly select a conversational sentence example whose translation is suited to the situation of use. Thus, upon an input of such a conversational sentence that different translations should be outputted depending on the situation of their use, a translation suited to the situation of use is obtained.

In an embodiment, an optional semantic feature is set as a semantic feature to be registered in the semantic feature dictionary, and optional semantic feature information that specifies the optional semantic feature is added to pertinent semantic feature strings registered in the bilingual database. Further, the semantic searcher performs the conversational sentence example selection with reference to the optional semantic feature information, by deeming that, if the input conversational sentence has no character string corresponding to the optional semantic feature present in a semantic feature string of a conversational sentence example registered in the bilingual database, the semantic feature string of the conversational sentence example contains no optional semantic feature.

With this arrangement, by choosing a semantic feature that tends to be omitted due to its low semantic significance in sentences as an optional semantic feature, it is possible to prevent the degrees of semantic coincidence between each of input sentences and an identical conversational sentence example from differing due to the presence or absence of a semantic feature with low semantic significance in the sentences. That is, trivial differences in input expressions are absorbed, so that an appropriate conversational sentence example and its translation are obtained.

In an embodiment, the analyzer has a specific character string detecting means for searching the input conversational sentence to detect a specific character string that cannot be registered in the semantic feature dictionary, and outputting the detected specific character string along with a variable semantic feature associated with this specific character string, so as to detect the specific character string and output the detected specific character string along with its associated variable semantic feature by means of the specific character string detecting means prior to extraction of semantic features from the input conversational sentence with the use of the variable semantic feature dictionary. If a character string corresponding to the same variable semantic feature as the variable semantic feature outputted from the specific character string detecting means is present in the conversational sentence example selected by the semantic searcher or by the selector and the translation thereof, then the feature element replacer replaces the character string with the specific character string outputted from the specific character string detecting means.

With this arrangement, such a specific character string that could not be registered in the semantic feature dictionary can also be treated as if it were registered in the semantic feature dictionary. Thus, according to this invention, specific character strings such as room numbers of hotels, if present in the input conversational sentence, are treated as ordinary variable semantic features, and subjected to the replacement processing by the feature element replacer. As a result, a conversational sentence example semantically matching the input conversational sentence, as well as its translation, is obtained.

In an embodiment, an optional semantic feature whose variable semantic feature entry name is nil is set as a semantic feature registered in the semantic feature dictionary. If the optional variable semantic feature is present in the conversational sentence example selected by the semantic searcher or by the selector but not present in the input conversational sentence, then, in rendering the replacement on a character string corresponding to the optional variable semantic feature in the conversational sentence example selected by the semantic searcher or by the selector and on a corresponding character string in the translation of the selected conversational sentence example, the feature element replacer replaces the character string in the conversational sentence example with a null character string.

With this arrangement, by registering variable semantic features that would be used in the second language but rarely used in the first language, as the optional variable semantic features, when a character string having such a variable semantic feature is absent from an input sentence, a conversational sentence example and its translation are obtained appropriately. For example, even if a Japanese word corresponding to an English indefinite article, "a", is absent from the input conversational sentence, a conversational sentence example in which the corresponding portion has been replaced with a blank character string, and its translation in which the corresponding portion has been replaced with the indefinite article, "a", can be obtained.

In an embodiment, a passive variable semantic feature whose entry name has a translated expression of nil is set as a variable semantic feature registered in the variable semantic feature dictionary. And, when rendering the replacement on a character string corresponding to the passive variable semantic feature in the conversational sentence example selected by the semantic searcher or by the selector and in the translation of the conversational sentence example, the feature element replacer replaces the character string in the translation of the conversational sentence example with a null character string.

With this arrangement, by registering variable semantic features that would be used in the first language but rarely used in the second language, as the passive variable semantic features, it is possible to obtain a natural translated sentence in which a character string corresponding to the character string of a passive variable semantic feature of the conversational sentence example has automatically been replaced with a null character string. For example, when a Japanese word or phrase that has no English equivalent, such as a Japanese suffix, "TSU", which is added to numbers, occurs in the input conversational sentence in the Japanese language, a conversational sentence example containing the suffix, "TSU", and its translation having the corresponding portion replaced with a null character string, are obtained.

In an embodiment, the selector comprises a correction deciding means for presenting a plurality of conversational sentence examples selected by the semantic searcher prior to the selection of a conversational sentence example to decide through a dialogue with the user whether or not a correction to the conversational sentence entered through the input means is necessary, and for, if deciding that a correction is necessary, transmitting a control signal to the input means and the analyzer. The input means, upon receiving the control signal from the correction deciding means, permits an input of an additional sentence to be added to the last input conversational sentence. Also, the analyzer comprises a conversational sentence retaining means for retaining an input conversational sentence, so that upon receiving the control signal from the correction deciding means, the analyzer extracts the semantic features from an input conversational sentence generated by adding the additional sentence, entered through the input means, to the input conversational sentence retained in the conversational sentence retaining means.

With this arrangement, by entering a short phrase or word at the beginning and iteratively correcting it through a dialogue with the selector, the user can easily get a targeted conversational sentence example and its translation. Thus, it is possible to eliminate a possibility that making the effort of entering a long sentence may result in only a short conversational sentence example with the effort half in vain.

In an embodiment, the semantic searcher comprises a counting means for counting the number of conversational sentence examples in which semantic features extracted by the analyzer are contained in the semantic feature strings thereof, based on a result of searching the semantic features. And, the correction deciding means presents a count value obtained by the counting means, in addition to the plurality of conversational sentence examples selected by the semantic searcher.

With this arrangement, in entering the additional sentence, the user is allowed to enter an optimum additional sentence with reference to the presented count value. Thus, according to this invention, the user can get a targeted conversational sentence example and its translation promptly.

In an embodiment, the apparatus further comprises a selection result storage means for storing a selection result of conversational sentence examples by the semantic searcher; and a comparator for comparing a preceding selection result stored in the selection result storage means with a selection result currently obtained by the semantic searcher, to determine a difference between the preceding selection result and the current selection result. In this embodiment, the correction deciding means presents the difference obtained by the comparator, in addition to the plurality of conversational sentence examples currently selected by the semantic searcher.

With this arrangement, the user is allowed to see whether or not the last input conversational sentence is appropriate, by referring to the presented difference. Thus, according to this invention, by entering an optimum additional sentence taking into consideration the appropriateness of the last input conversational sentence, the user can get a targeted conversational sentence example and its translation promptly.

In an embodiment, the apparatus further comprises a semantic feature storage means for storing semantic feature strings extracted from character strings entered through the input means, and a translation controller for deciding whether or not a phrase in a specified lingual unit has been entered through the input means and, if it is decided that the phrase in the specified lingual unit has been entered, activating the semantic searcher and transmitting the semantic feature string stored in the semantic feature storage means to the semantic searcher. In this embodiment, the analyzer extracts semantic features from character strings sequentially transmitted from the input means, and transmits the extracted semantic features to the semantic feature storage means so that the semantic features are stored therein.

With this arrangement, each time a word or phrase in a specified lingual unit is input, the conversational sentence example selection processing is performed by the semantic searcher. Accordingly, the user is enabled to enter optimum phrases in the specified lingual unit by referencing the conversational sentence examples and their translations displayed each time phrases or words in the specified lingual unit are entered. Thus, a targeted conversational sentence example and its translation can be obtained with input of short phrases or words.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a conceptual view showing an example of the contents of the semantic feature dictionary of FIG. 1;

FIG. 3 is a conceptual view showing an example of the contents of the bilingual database of FIG. 1;

FIG. 6 is a conceptual view showing an example of the contents of the willed semantic feature dictionary of FIG. 5;

FIG. 7 is a conceptual view showing an example of the contents of the contextual semantic feature dictionary of FIG. 5;

FIG. 8 is a conceptual view showing an example of the contents of the variable semantic feature dictionary of FIG. 5;

FIG. 9 is a view showing an example of the contents of the bilingual database of FIG. 5;

FIGS. 10, 11, 12, and 13 are flow charts of a conversational sentence translating operation to be executed under the control of the controller of FIG. 5;

FIG. 18 is a view showing an example of the search result by the semantic searcher of FIG. 14;

FIG. 19 is a view showing another search result by the semantic searcher of FIG. 14;

FIG. 24 is a view showing a search result by the semantic searcher of FIG. 14;

FIG. 28 is a view showing a search result by the semantic searcher of FIG. 14;

FIG. 32 is a view showing an example of the contents of the bilingual database of FIG. 30;

FIGS. 33A and 33B show the structure of the bilingual database shown in FIG. 32, wherein FIG. 33A illustrates index for data of conversational example sentences, while FIG. 33B illustrates the data of conversational example sentences;

FIG. 34 conceptually illustrates an example of the contents of the basic semantic feature dictionary shown in FIG. 30;

FIG. 35 conceptually illustrates an example of the contents of the variable semantic feature dictionary shown in FIG. 30;

FIGS. 36A, 36B and 36C show the structure of part of the basic semantic feature dictionary and variable semantic feature dictionary of FIG. 30, wherein FIG. 36A illustrates a binary research index, FIG. 36B illustrates data of semantic feature entry names, semantic feature codes, and pointers, and FIG. 36C illustrates a list of conversational example sentence numbers;

FIGS. 37A and 37B show the structure of a remaining part of the variable semantic feature dictionary of FIG. 30, wherein FIG. 37A illustrates semantic feature codes and FIG. 37B illustrates semantic feature data;

FIG. 41 shows an example of the contents of the bilingual database of FIG. 30 where supplementary information is described;

FIG. 42 shows an example of the contents of the bilingual database of FIG. 30 where optional semantic features are described;

FIG. 44 shows an example of the contents of the variable semantic feature dictionary of FIG. 30 where optional variable semantic features are described;

FIG. 46 shows an example of the contents of the variable semantic feature dictionary of FIG. 30 where passive variable semantic features are described;

FIG. 50 is a conceptual view showing an example of the contents of the semantic feature dictionary of FIG. 49;

FIG. 51 shows an example of the contents of the bilingual database of FIG. 49;

FIG. 53 shows an example of the transition of input conversational sentences (corrected sentences) and displayed first-language sentences in the conversational sentence translating operation shown in FIG. 52;

FIG. 54 is a flow chart of another conversational sentence translating operation;

FIG. 55 shows an example of the transition of input conversational sentences (corrected sentences) and displayed first-language sentences in the conversational sentence translating operation shown in FIG. 54;

FIG. 57 is a conceptual view showing an example of storage contents of the selection result storage unit of FIG. 56;

FIG. 59 shows an example of the transition of input conversational sentences (corrected sentences) and displayed first-language sentences in the conversational sentence translating operation shown in FIG. 58;

FIG. 62 shows an example of the transition of input conversational sentences (corrected sentences) and displayed first-language sentences in the conversational sentence translating operation shown in FIG. 61.

DETAILED DESCRIPTION OF THE PREFERRED EMBODIMENTS

The present invention is described in detail hereinbelow by embodiments thereof as illustrated in the accompanying drawings.

First Embodiment

Figure 1:
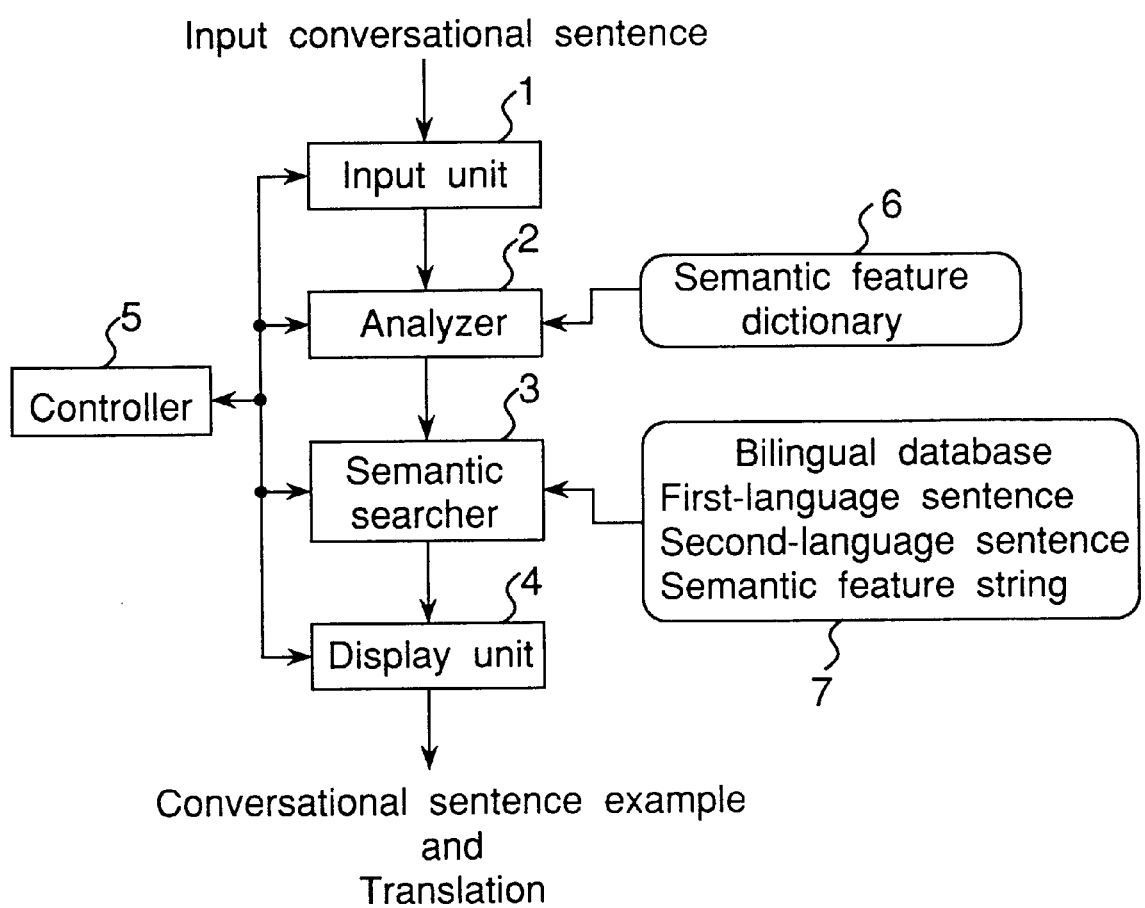
FIG. 1 is a block diagram of a conversational sentence translation apparatus according to a first embodiment of the present invention.

FIG. 1 is a block diagram of a conversational sentence translation apparatus of a first embodiment of the present invention.

The conversational sentence translation apparatus of the first present embodiment essentially consists of an input unit 1 to which a natural conversational sentence in a first language, or a source language, is entered freely by the user, an analyzer 2 for extracting semantic features representing the meanings of component elements of the input conversational sentence from character strings in the first language transmitted from the input unit 1, a semantic feature dictionary 6 to be used for the semantic feature extraction by the analyzer 2, a bilingual database 7 including sets of conversational sentence example in the first language, their translations in a second language, which is a target language, and semantic feature strings of the conversational sentence examples, a semantic searcher 3 for selecting an appropriate conversational sentence example in the first language from the bilingual database 7 based on the semantic features extracted by the analyzer 2, a display unit 4 for displaying the selected conversational sentence example and, a second-language sentence equivalent to the first-language conversational sentence example, and a controller 5 for controlling the input unit 1, the analyzer 2, the semantic searcher 3, and the display unit 4 to execute the conversational sentence translating operation.

Note that in the present and following embodiments, the Japanese language is used as the first language, and the English language is used as the second language. The first and second languages, however, are not limited to these languages. Also, in this specification and the attached drawings, small letters in italic indicate Japanese "katakana" characters, capital letters in italic represent Japanese "hirakana" characters, and underlined capital letters in italic represent "kanji" characters.

In the present embodiment, the semantic features are given principally by fundamental forms of independent words that serve as the unit of meaning, such as, for example, nouns, verbs, adjectives, and adverbs, out of component elements of Japanese sentences. In this case, for nouns and adverbs, those expressed in different ways but representing the same meaning are treated as the same semantic feature. Examples of those words are "RYOKEN" and "PASUPOTO" (both of which mean a "passport" in English), "SUKOSHI" and "SHOSHO" (both of which mean "a little" in English), and so on. Doing so allows some variations of input conversational sentences to be absorbed.

The input unit 1, implemented by a keyboard, a handwriting recognition system or a speech recognition system, transforms an input natural conversational sentence in the first language into character strings and transfers them to the analyzer 2 one by one.

The semantic feature dictionary 6 is so constructed that semantic feature names are associated with semantic feature expressions that show from what character strings those semantic feature names are extracted. FIG. 2 is a conceptual view showing an example of the contents of the semantic feature dictionary 6. This means that, in the example shown in FIG. 2, if a character string "chekku in" is present in the input conversational sentence, then a semantic feature having a semantic feature name of "chekku in" (which means "check in" in English) is obtained. Likewise, if any of the character strings, "ONEGAI SHIMASU", "ONEGAI", "O NEGAI SHITAI", "ONEGAI SHITAI NO DESU", "O NEGAI SHITAI NO DESU GA", "ONEGAI", "ONEGAI SHIMASU", "TANOMU", "TANOMIMASU", or "KIBO SHIMASU", is present, then a semantic feature having a semantic feature name of "ONEGAI" (which means "please" in English) is obtained.

The analyzer 2, with reference to the semantic feature dictionary 6 as described above, extracts semantic features contained in the input sentence from the first-language character strings transferred from the input unit 1, and outputs them.

For this process, it is contributory to an accurate extraction of necessary semantic features that as many as possible phrases and expressions are registered as the semantic feature expressions associated with each semantic feature name, as in the case of the semantic feature name "O NEGAI" in the semantic feature dictionary 6.

The bilingual database 7 has a plurality of sets of a conversational sentence example in the first language, a translated sentence in the second language equivalent to the conversational sentence example, and a semantic feature string representing the meaning of the conversational sentence example.

FIG. 3 is a conceptual view showing an example of the contents of the bilingual database 7. In the example shown in FIG. 3, the conversational sentence example in the first language is "chekkuin WO ONEGAI SHIMASU.", the second-language translation of the conversational sentence example is "Check in, please.", and the semantic feature string representing the meaning of the conversational sentence example is "chekkuin ONEGAI". Likewise, in the next example, the conversational sentence example in the first language is "SONO hoteru HENO IKIKATA WO OSHIETE KUDASAI.", the second-language translation of the conversational sentence example is "Could you tell me how to get to the hotel?", and the semantic feature string is "hoteru IKIKATA OSHIERU KUDASAI".

The semantic searcher 3 searches the semantic feature strings contained in the conversational sentence examples within the bilingual database 7, for the semantic features extracted by the analyzer 2, and selects a conversational sentence example having the largest number of found semantic features.

The display unit 4 reads from the bilingual database 7 and displays the conversational sentence example in the first language selected by the semantic searcher 3, as well as its second language equivalent.

Figure 4:
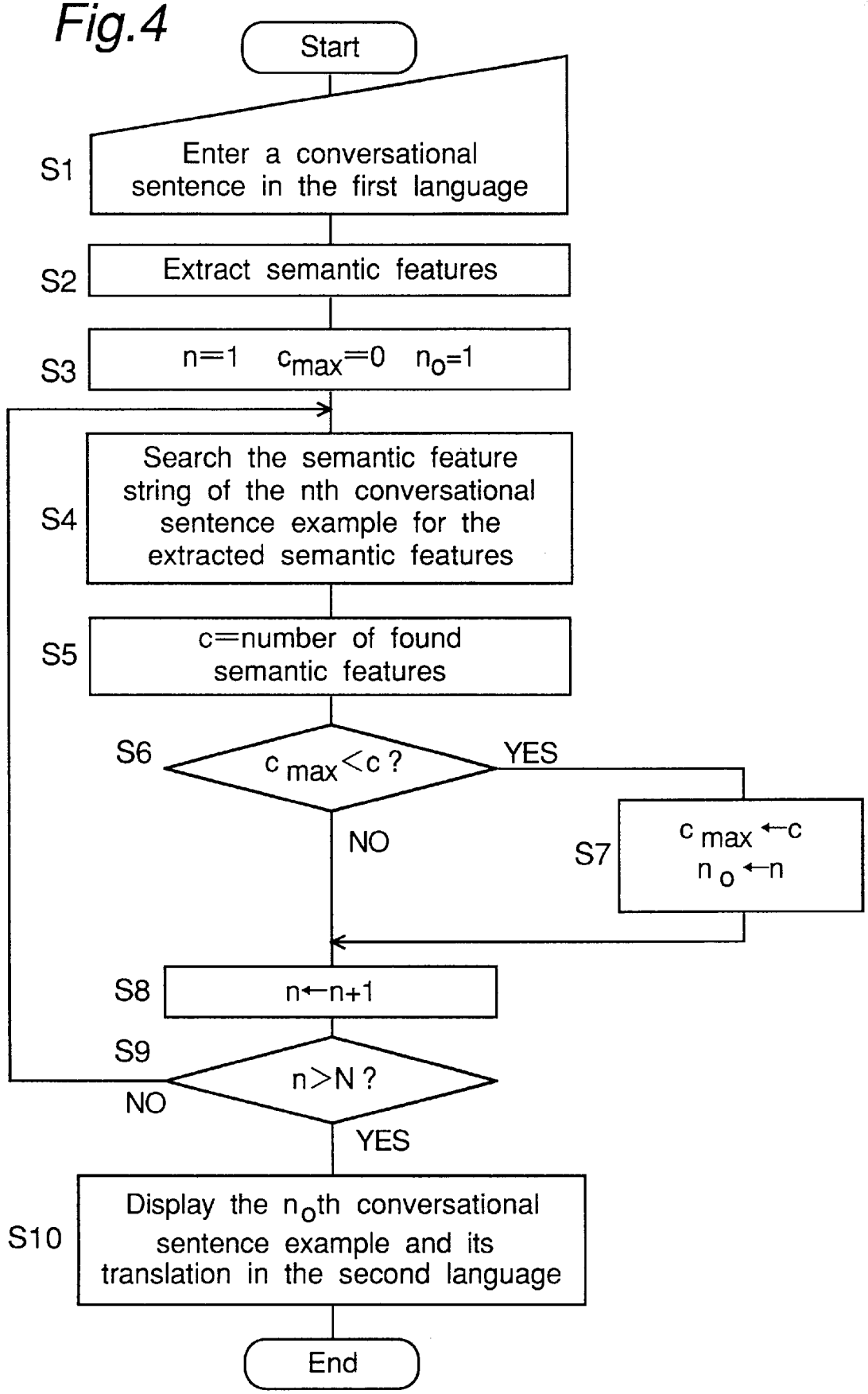
FIG. 4 is a flow chart of a conversational sentence translating operation to be executed under the control of the controller of FIG. 1.

FIG. 4 is a flow chart of a conversational sentence translating operation to be executed by the input unit 1, the analyzer 2, the semantic searcher 3, and the display unit 4 under the control of the controller 5. This is described below in detail, referring to FIG. 4 and taking as an example the case where a free conversational sentence, "chekkuin NO O NEGAI", in Japanese (the first language) is entered (step S1) and an English (second language) translation thereof is outputted (step S10).

It is noted that "in" in FIG. 4 denotes a conversational sentence example number (max. "N") in the bilingual database 7, "c" denotes the number of found semantic features, "$c_{max}$" denotes a maximum value of the number of semantic features "c", and "$n_0$" denotes a conversational sentence example number showing the maximum number of semantic features "$c_{max}$".

The input unit 1 transforms the input conversational sentence, "chekkuin NO ONEGAI", into character strings and transmits them to the analyzer 2. Then, the analyzer 2 searches the input sentence, "chekkuin NO ONEGAI", for any character string coincident with the semantic feature expressions registered in the semantic feature dictionary 6. As a result, the semantic feature expressions "chekkuin" and "ONEGAI" are found, so that the semantic feature names "chekkuin" and "ONEGAI" are extracted. The analyzer 2 transmits the thus extracted semantic feature names "chekkuin" and "ONEGAI" to the semantic searcher 3.

. . . steps S1, S2

Then, the semantic searcher 3, based on the semantic feature names transmitted from the analyzer 2, selects a conversational sentence example matching the input conversational sentence "chekkuin NO ONEGAI" by using the bilingual database 7. In the present example, the semantic searcher 3 finds out the semantic feature names "chekkuin" and "ONEGAI" extracted at step S2 from the semantic feature strings of two conversational sentence examples registered in the bilingual database 7, and selects the conversational sentence example in which the largest number of semantic feature names have been found, as a conversational sentence example matching the input sentence.

More specifically, the first (n=1) conversational sentence example, "chekkuin WO ONEGAI SHIMASU.", registered in the bilingual database 7 contains both "chekkuin" and "O NEGAI" (c=2). On the other hand, the second (n=2) conversational sentence example, "SONO hoteru HENO IKI KATA WO OSHIETE KUDASAI.", contains none of the semantic feature names (c=0). Therefore, the semantic searcher 3 selects the first ($n_0$=1) conversational sentence example, "chekkuin WO ONEGAI SHIMASU.", and transmits the selected information to the display unit 4.

. . . steps S3 to S9

Upon receiving from the semantic searcher 3 the information indicating that the first conversational sentence example, "chekkuin WO ONEGAI SHIMASU.", registered in the bilingual database 7 has been selected as mentioned above, the display unit 4 displays the pertinent conversational sentence example as well as its second-language equivalent, "Check in, please.", which is a translation result.
. . . step S10

In the above example, the input conversational sentence example contains all of the plurality of semantic features contained in the corresponding conversational sentence example registered in the bilingual database 7. In the next example, an input conversational sentence contains only part of a plurality of semantic features contained in the corresponding conversational sentence example registered in the bilingual database 7.

Assume, that a conversational sentence, "hoteru HENO MICHI WO OSHIETE", has been inputted by the input unit 1. Then, the analyzer 2, with reference to the semantic feature dictionary 6, extracts a semantic feature expression "hoteru" having a semantic feature name "hoteru" and a semantic feature expression "OSHIE" having a semantic feature name "OSHIERU", from the input conversational sentence "hoteru HENO MICHI WO OSHIETE". The analyzer 2 then transmits the extracted semantic feature names "hoteru" and "OSHIE" to the semantic searcher 3.

The semantic searcher 3 finds out the extracted semantic feature names "hoteru" and "OSHIERU" in the semantic feature strings of the two conversational sentence examples registered in the bilingual database 7. Then, the semantic searcher 3 selects the conversational sentence example in which the larger number of semantic features have been found out.

More specifically, the first conversational sentence example, "chekkuin WO ONEGAI SHIMASU.", registered in the bilingual database 7 contains none of those semantic feature names, while the second conversational sentence example, "SONO hoteru HENO IKIKATA WO OSHIETE KUDASAI.", contains both semantic feature names "hoteru" and "OSHIERU". Further, the second conversational sentence example, "SONO hoteru HENO IKIKATA WO OSHIETE KUDASAI.", contains additional semantic feature names "IKIKATA" and "KUDASAI", which are not extracted from the input conversational sentence, "hoteru HENO MICHI WO OSHIETE". Yet, also in such a case, since the second conversational sentence example, "SONO hoteru HENO IKIKATA WO OSHIETE KUDASAI.", contains a larger number of semantic feature names that are coincident with the semantic feature names extracted from the input conversational sentence than the first conversational sentence example, the semantic searcher 3 selects the second conversational sentence example, and transmits, to the display unit 4, information indicating that the second conversational sentence example has been selected.

Upon receiving from the semantic searcher 3 the information indicating that the second conversational sentence example, "SONO hoteru HENO IKIKATA WO OSHIETE KUDASAI.", has been selected from among the conversational sentence examples registered in the bilingual database 7, which has been transmitted, the display unit 4 displays the Japanese conversational sentence example as well as its English equivalent, "Could you tell me how to get to the hotel?", which is a translation result.

As described before, the present embodiment has the semantic feature dictionary 6 and the bilingual database 7. The semantic feature dictionary 6 contains semantic features (semantic feature names) representing the meanings of words or phrases in the first language, and semantic feature expressions that are character strings used for extracting the semantic feature names, in a mutually associated manner. Also, the bilingual database 7 contains conversational sentence examples in the first language, their translations in the second language, and semantic feature (semantic feature name) strings representing the meanings of the conversational sentence examples, in a mutually associated manner.

Then, referring to the semantic feature dictionary 6, the analyzer 2 extracts semantic feature names from the character strings of a natural conversational sentence in the first language transmitted from the input unit 1. Subsequently, a conversational sentence example associated with the semantic feature string in which the largest number of the extracted semantic feature names are found out is selected from the bilingual database 7 by the semantic searcher 3. Then, the selected conversational sentence example in the first language and its translation in the second language are outputted on the display unit 4.

In other words, only with an operation of inputting, into the input unit 1, a sentence in the first language, which sentence, is to be translated into the second language, the conversational sentence translation apparatus is able to automatically select an optimal conversational sentence example by the analyzer 2 and the semantic searcher 3, and to then display the selected conversational sentence example in the first language as well as the translated sentence in the second language. This display is done by the display unit 4.

Consequently, according to the present embodiment, the user is not required at all to select a conversational sentence example that the user wants to be translated, from among a large number of previously registered conversational sentence examples. Instead, only by freely entering into the input unit 1 a sentence whose translation the user wants, the user can obtain a translation of an optimal conversational sentence example simply, promptly, and accurately.

Second Embodiment

In the, present embodiment(the second embodiment), semantic feature elements in a selected conversational sentence example are replaceable with another so that a conversational sentence example representing the meaning of the input conversational sentence more accurately as well as its translation can be obtained without increasing the number of conversational sentence examples to be registered.

Figure 5:
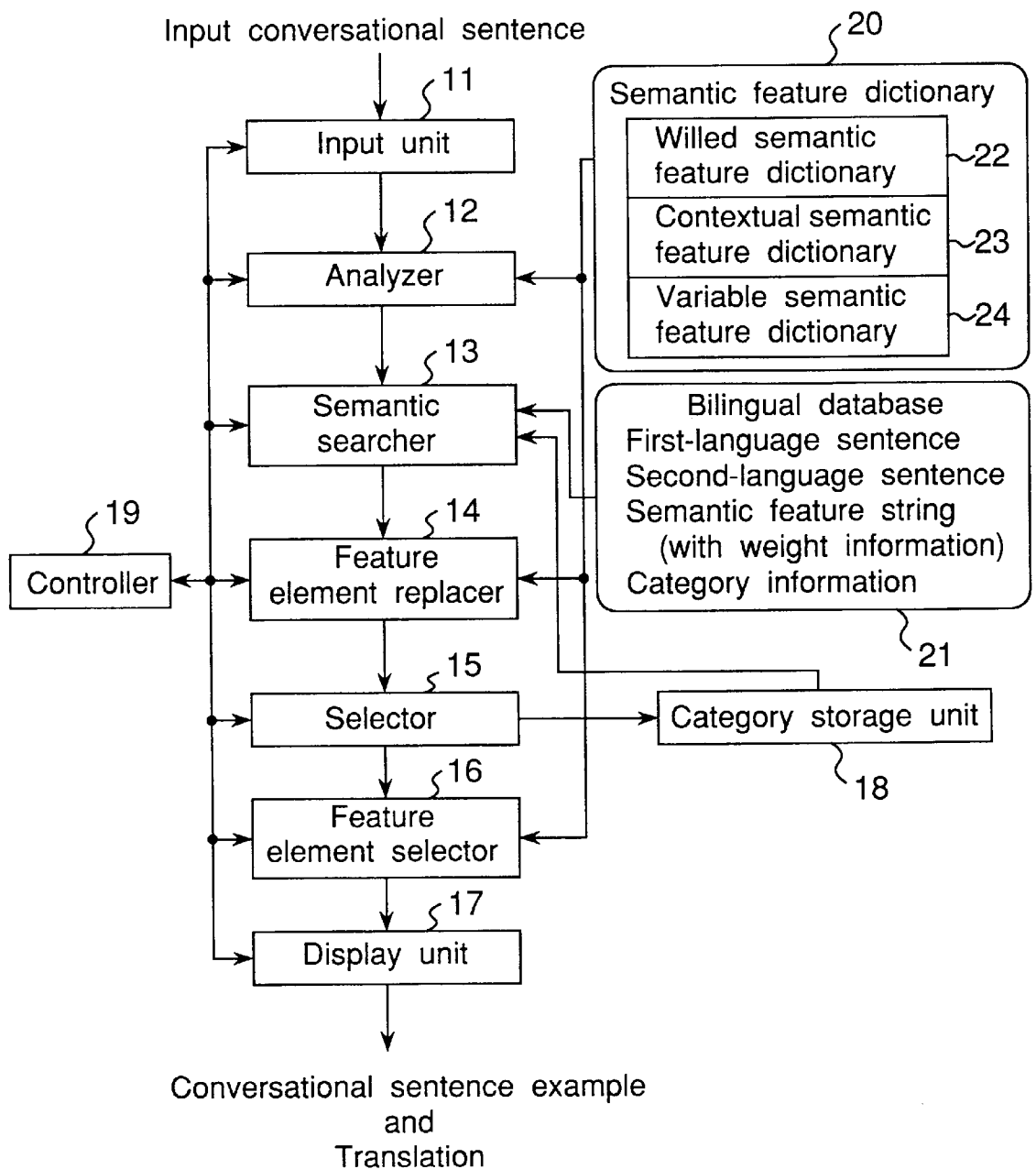
FIG. 5 is a block diagram of a conversational sentence translation apparatus according to a second embodiment of the present invention.
Figure 11:
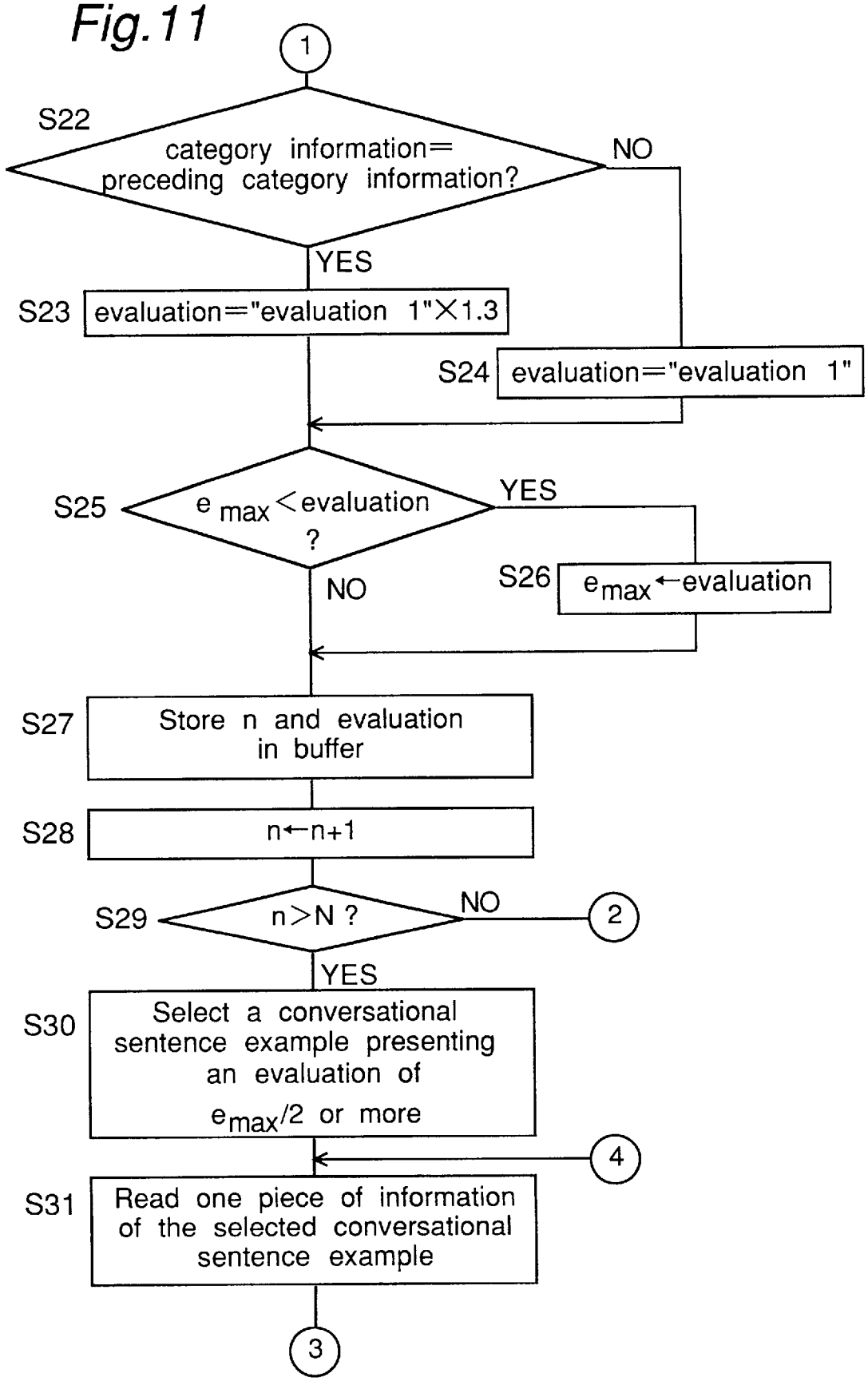
Figure 12:
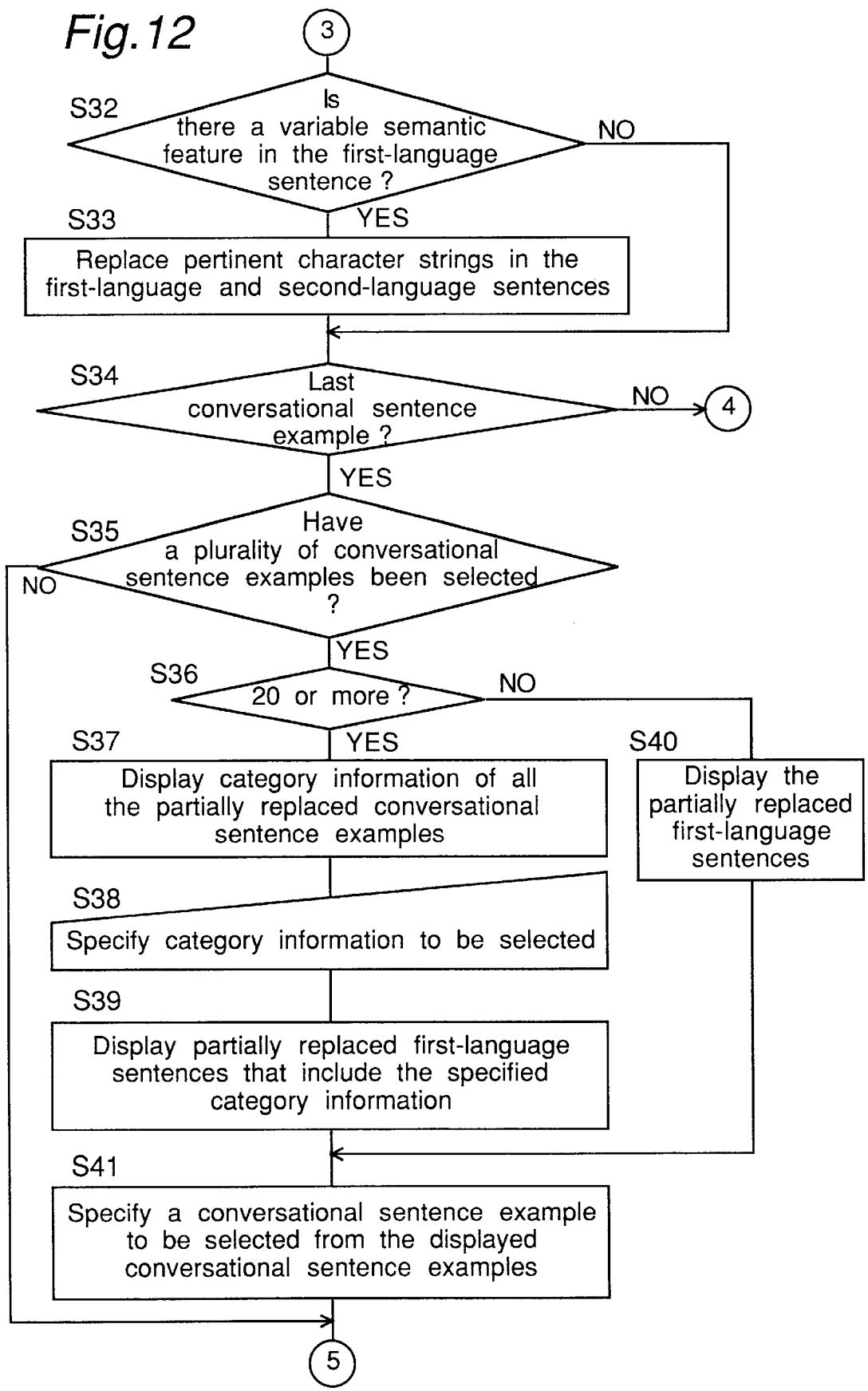
Figure 13:
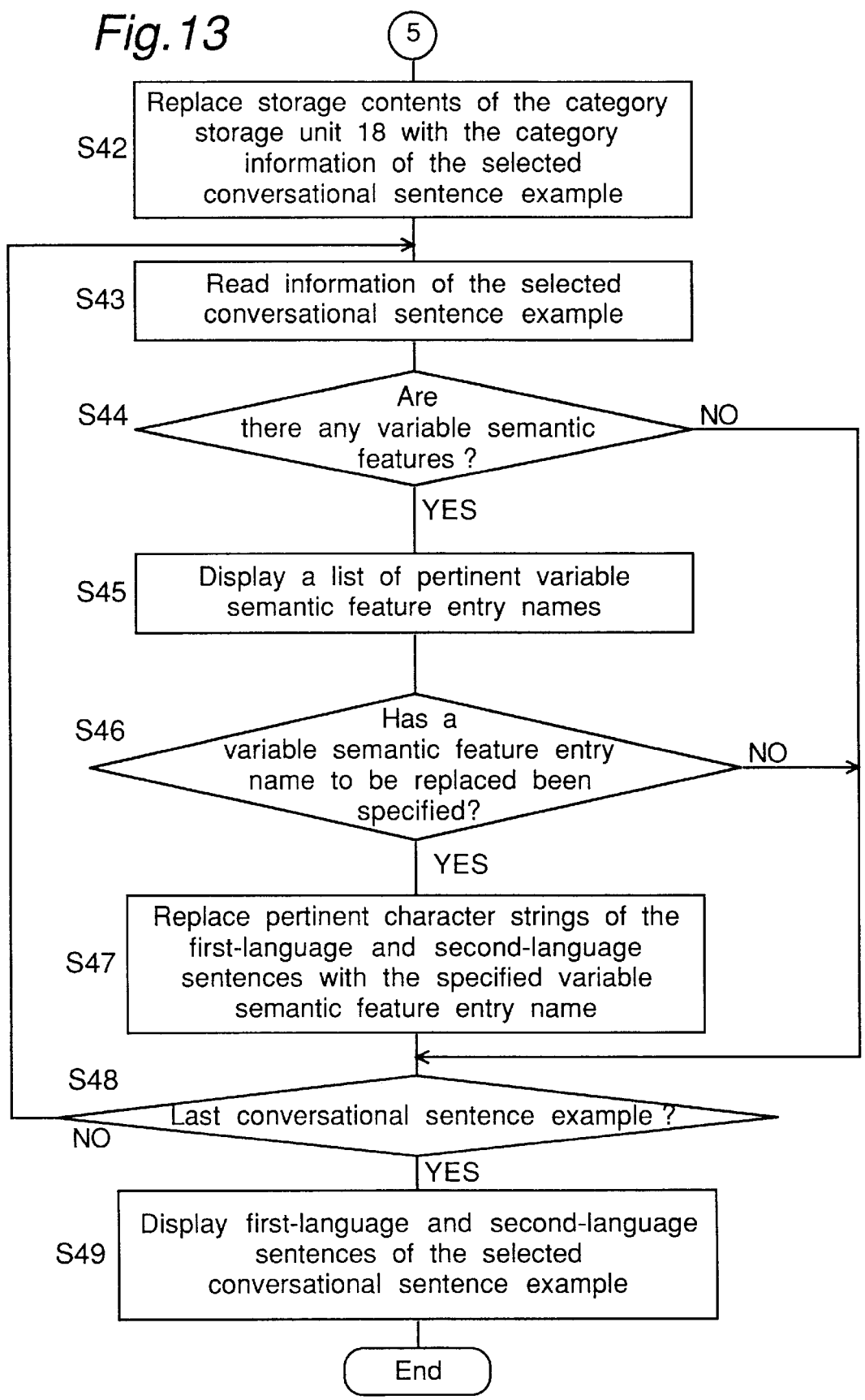

FIG. 5 is a block diagram of a conversational sentence translation apparatus of the second embodiment.

The conversational sentence translation apparatus in the present embodiment has an input unit 11 to which a free conversational sentence in a first language is entered by the user, an analyzer 12 for extracting semantic features from character strings in the first language inputted by the input unit 11, a semantic feature dictionary 20 to be used for the semantic feature extraction by the analyzer 12. The apparatus also has a bilingual database 21 containing sets each of a conversational sentence example in the first language, its translation in a second language, a semantic feature name string of the conversational sentence examples, and category information indicative of a category of situation under which the conversational sentence example is used. Further, the apparatus has a category storage unit 18 in which the category information of the last selected conversational sentence example is stored, and a semantic searcher 13 for choosing one or more appropriate conversational sentence examples from the bilingual database 21 based on the semantic features extracted by the analyzer 12.

The conversational sentence translation apparatus also has a feature element replacer 14 for replacing a portion corresponding to a variable semantic feature of each of the one or more selected conversational sentence examples, which variable semantic feature is one of the semantic features of each conversational sentence example, according to a variable semantic feature extracted from the input conversational sentence, a selector 15 for selecting one or more conversational sentence examples, through a dialogue with the user, from among the conversational sentence examples chosen by the semantic searcher 13 and then partly replaced by the feature element replacer 14, a feature element selector 16 for replacing a character string corresponding to the variable semantic feature in the selected conversational sentence example or examples with another through a dialogue with the user, a display unit 17 for displaying a finally selected conversational sentence example as well as its translation in a second-language, and a controller 19 for controlling the input unit 11, the analyzer 12, the semantic searcher 13, the feature element replacer 14, the selector 15, the feature element selector 16, and the display unit 17 to execute the conversational sentence translating operation.

The input unit 11, of the second embodiment like the input unit 1 in the first embodiment, transforms an input conversational sentence in the first language from the user into character strings, and transmits them one by one to the analyzer 12.

The semantic feature dictionary 20 is composed of a willed semantic feature dictionary 22, a contextual semantic feature dictionary 23, and a variable semantic feature dictionary 24, which will be described in detail below.

FIG. 6 is a conceptual view showing an example of the contents of the willed semantic feature dictionary 22. The willed semantic feature dictionary 22 contains semantic feature names and one or more associated semantic feature expressions that are character strings used for extracting the corresponding semantic feature name. The semantic feature names are each enclosed by the symbol < >, indicating that the semantic feature is a willed semantic feature representing contents of a will or intention to be communicated by the input conversational sentence. This means that, for example, if a character string "HOSHII NO DESU GA" is present in an input conversational sentence, then a willed semantic feature having a semantic feature name, "HOSHII", is obtained.

It is desirable to register as many phrases and expressions as possible, as semantic feature expressions for each willed semantic feature. For example, in the case of a semantic feature name "<OKIWASURETA>", even an expression " WASURETA" is registered.

FIG. 7 is a conceptual view showing an example of the contents of the contextual semantic feature dictionary 23. The contextual semantic feature dictionary 23 contains semantic feature names and one or more semantic feature expressions that are character strings used for extracting the corresponding semantic feature name. Each semantic feature name is associated with the corresponding semantic feature or features. The semantic feature names in this dictionary 23 are not enclosed by any symbol, indicating that the semantic feature is a semantic feature representing the context of an input conversational sentence, i.e., a contextual semantic feature other than the willed semantic features. The construction of the dictionary 23 means that, for example, if a character string "TSUKI" or "TSUKI"i is present in an input conversational sentence, then a contextual semantic feature having a semantic feature name, "TSUKI", is obtained.

FIG. 8 is a conceptual view showing an example of the contents of the variable semantic feature dictionary 24. The variable semantic feature dictionary 24 contains the following (1) variable semantic feature names (which are each enclosed by the stymbol { }, indicating that the semantic feature is a variable semantic feature that can be a replacement target of the input conversational sentence), (2) variable semantic feature entry names as the items of the variable semantic feature names, (3) variable semantic feature translations which are equivalent words in the second language of the variable semantic feature entry names, and (4) one or more variable semantic feature expressions that are character strings used for extracting the corresponding variable semantic feature entry name. The above four kinds of data are associated with one another. This means that, for example, if a character string "SANNNINBEYA" (which means "triple room" in English) is present in an input conversational sentence, then a semantic feature which belongs to a variable semantic feature having a variable semantic feature name "HEYA NO SHURUI" (which means "type of rooms" in English) and which has a variable semantic feature entry name, "toripururumu", is obtained.

The analyzer 12 extracts willed semantic features, contextual semantic features, and variable semantic features contained in the input conversational sentence from the character strings in the first language transmitted from the input unit 11, with reference to the willed semantic feature dictionary 22, contextual semantic feature dictionary 23, and variable semantic feature dictionary 24 in the semantic feature dictionary 20, and transmits the extracted semantic features to the semantic searcher 13.

The bilingual database 21 contains a plurality of sets each set of a first-language sentence which is a conversational sentence example in the first language, a second-language sentence which is a translated sentence in the second language of the first-language sentence, a semantic feature string referred to for selecting the first-language sentence, and category information indicative of the category of situation under which the first-language sentence is used. The semantic features forming the semantic feature string of each set are each given weight information representing the significance, or degree of importance, of the corresponding semantic feature in the input conversational sentence.

FIG. 9 is a conceptual view showing an example of the contents of the bilingual database 21. In the bilingual database 21, as information for each conversational sentence example, a first-language sentence is described on the first line, a second-language sentence is described on the second line, a semantic feature string is described on the third line, and the category information is described on the fourth line. In the first-language sentence on the first line, the variable semantic feature expression is enclosed by the symbol { } indicative of the variable semantic feature information. In the second-language sentence on the second line, the variable semantic feature translation is enclosed by the symbol { }. In the semantic feature string on the third line, each semantic feature has been given its corresponding weight information.

The weight information added to the individual semantic features forming the semantic feature string is expressed by a numeral preceded by a symbol @. Note that the weight of a semantic feature with no description of the weight information is regarded as "10". Also, each semantic feature string is composed generally of one willed semantic feature and zero or more contextual semantic features and variable semantic features.

The semantic searcher 13 searches the semantic feature strings in the bilingual database 21 for semantic features equal to those extracted by the analyzer 12 from the input conversational sentence, with reference to the category information of the last selected conversational sentence example stored in the category storage unit 18. Then, based, on the found semantic features, the semantic searcher 13 evaluates whether or not each conversational sentence example is appropriate as a sentence example for the input conversational sentence. Further, based on the evaluation result, the semantic searcher 13 selects one or more conversational sentence examples from the registered conversational sentence examples.

The evaluation method uses an evaluation which is calculated from factors such as the number and weight of contextual semantic features and variable semantic features found out of the semantic feature strings described in the bilingual database 21, whether or not a willed semantic feature having coincident contents has been found out, and a coverage which is a ratio at which a character string length of the input conversational sentence corresponding to the found semantic feature covers the entire character string length of the input conversational sentence.

Practically, the evaluation is calculated, for example, in the following way:

(1) When the contents of the category information of a conversational sentence example are identical to the contents of the category information stored in the category storage unit 18, evaluation="evaluation 1"×1.3

(2) When the contents of the category information of the conversational sentence example are different from the contents of the category information stored in the category storage unit 18, evaluation="evaluation 1"

where the "evaluation 1" is calculated, for example, in the following way:

(a) For cases where the willed semantic feature extracted from the input conversational sentence is absent in the conversational sentence example, "evaluation 1"=0

(b) For the other cases,

"evaluation 1"=
(sum of weights added to the coincident semantic features×2−sum of weights added to the semantic features which are present in the conversational sentence example but absent in the input conversational sentence)×coverage wherein coverage=(character string length of the input conversational sentence corresponding to the found semantic features)/(entire character string length of the input conversational sentence)

The reason why the evaluation is determined by multiplying "evaluation 1" by 1.3 when the contents of the category information of the conversational sentence example are identical to the contents of the category information stored in the category storage unit 18 is that it is intended that a conversational sentence example of the same category as that of the last selected conversational sentence example be preferentially selected, where the value of the multiplier may be changed depending on the type of the conversational sentence example, the assumed situation of use, for example (note that the value of the multiplier should be greater than 1).

Also, when the willed semantic feature extracted from the input conversational sentence is different from the willed semantic feature of the pertinent conversational sentence example, in which case the wills or intentions in the two sentences are absolutely different from each other, the "evaluation 1" is set to "0" so that the evaluation becomes "0", even if the contextual semantic features or variable semantic features in the input conversational sentence and the pertinent conversational sentence example are coincident with each other.

Also, by previously registering as many semantic feature expressions as possible including the same character string as a core (for example, for a willed semantic feature < HOSHII>, "HOSHII", "HOSHII NO DESU", and "HOSHII NO DESU GA" containing the same character string "HOSHII" which means "want", "would like" for example in English) in the willed semantic feature dictionary 22 or the contextual semantic feature dictionary 23, more accurate selection of a conversational sentence example can be achieved.

More specifically, assuming that a conversational sentence "WASHINTON YUKI NO KIPPU GA HOSHII NO DESU GA" is entered, the willed semantic feature <HOSHII>will be extracted based on the registered semantic feature expression "HOSHII" even if "HOSHII NO DESU GA" has not been registered as a semantic feature expression in the willed semantic feature dictionary 22. However, if "HOSHII NO DESU GA" has been registered as a semantic feature expression, the coverage for the semantic feature "HOSHII" becomes greater than otherwise, so that a conversational sentence example can be selected more accurately with an emphasis placed on the "evaluation 1".

Based on the evaluations calculated in this way, the semantic searcher 13 takes as a first candidate a conversational sentence example showing a positive maximum evaluation, and then selects as candidates the conversational sentence examples showing evaluations of ½ or more of the maximum evaluation, according to the magnitude of evaluations.

It is noted that the criterion value "½" of the maximum evaluation used above in selecting the candidates, may be set as desired depending on the assumed situation of use or the like.

In the category storage unit 18, "NULL", information indicating that there is no coincidence in category, is stored in the initial state.

The feature element replacer 14 receives information on the conversational sentence examples selected by the semantic searcher 13 as well as information on the variable semantic feature extracted from the input conversational sentence. If a variable semantic feature identical to the extracted variable semantic feature is present in the first-language sentence of a pertinent selected conversational sentence example, then the feature element replacer 14 replaces a character string corresponding to the variable semantic feature in the first-language sentence with a variable semantic feature entry name that represents the content of the extracted variable semantic feature. Further, the feature element replacer 14 replaces a character string corresponding to the variable semantic feature in the second-language sentence, which is a translation of the first-language sentence, with a translated variable semantic feature expression, which is a translation of the variable semantic feature entry name of the extracted variable semantic feature.

The selector 15 receives a singularity or plurality of post-replacement conversational sentence examples from the feature element replacer 14. Then, if the selector 15 receives a plurality of conversational sentence examples, it displays the first-language sentences of all of the received conversational sentence examples so as to allow the user to select any one of the first-language sentences. In this process, when the number of the first-language sentences is as large as 20 or more, which makes it difficult to select one, the selector 15 displays only the category information on the selected 20 or more first-language sentences so as to allow the user to first select an appropriate piece of category information, and then displays only the first-language sentences that belong to the selected category, to allow the user to select a single first-language sentence.

Once a first-language sentence is selected, the selector 15 transmits to the feature element selector 16 the information on the conversational sentence example corresponding to the selected first-language sentence. Also, the selector 15 rewrites the storage contents of the category storage unit 18 by the category information of the selected first-language sentence.

The feature element selector 16 receives information on the conversational sentence example corresponding to the first-language sentence selected by the selector 15. If any variable semantic feature is present in the conversational sentence example, the feature element selector 16 executes a further rewrite operation of the character string corresponding to the variable semantic feature in response to the user's direction.

More specifically, the feature element selector 16 displays all the variable semantic feature entry names belonging to the pertinent variable semantic feature names in menu form by using the variable semantic feature dictionary 24 so as to allow the user to select one. Then, the feature element selector 16 replaces a character string corresponding to the variable semantic feature in the first-language sentence with the selected variable semantic feature entry name, and besides replaces a character string corresponding to the variable semantic feature in the second-language sentence with its corresponding translated variable semantic feature expression.

The display unit 17 receives information on the single conversational sentence example from the feature element selector 16, and displays the first-language and second-language sentences of the received conversational sentence example.

FIG. 10 is a flow chart of a conversational sentence translating operation to be executed by the input unit 11, the analyzer 12, the semantic searcher 13, the feature element replacer 14, the selector 15, the feature element selector 16, and the display unit 17 under the control of the controller 19. With reference to FIG. 10, the following describes in detail a case where a free conversational sentence in Japanese (first language), "daburubeddo NO HEYA GA HOSHII", is entered and an English (second language) translation thereof "I'd like a room with double bed." is outputted.

It is assumed here that immediately before the above conversational sentence is entered, a conversational sentence example with a category of "negotiation of rooms" was selected and used and therefore that the category information "negotiation of rooms" is stored in the category storage unit 18. Also, reference character "n" in FIG. 10 indicates a number (max. "N") assigned to a conversational sentence example within the bilingual database 21, and "$e_{max}$" is a maximum value of the aforementioned evaluations.

From within the input conversational sentence, "daburubeddo NO HEYA GA HOSHII", entered into the input unit 11 at step S11, the analyzer 12 detects a variable semantic feature expression "daburubeddo" corresponding to a variable semantic feature entry name "daburubeddo" for the variable semantic feature name {beddo}, semantic feature expressions "HEYA", "HEYA GA" of a contextual semantic feature name "HEYA", and a semantic feature expression "HOSHII" of a willed semantic feature name <HOSHII>.

Input Sentence: "daburubeddo NO HEYA GA HOSHII"

daburubeddo   → "daburubeddo → {beddo}

HEYA GA     → HEYA

HEYA

HOSHII     → ⟨HOSHII⟩

Thus, the analyzer 12 extracts the variable semantic feature, contextual semantic feature, and willed semantic feature. These semantic features extracted in this way are transmitted to the semantic searcher 13.

. . . steps S11, S12

Then, based on the semantic feature information extracted by the analyzer 12, the semantic searcher 13 evaluates the conversational sentence examples registered in the bilingual database 21 as follows:

First, the semantic searcher 13 evaluates a first-language sentence "{HITORIBEYA} GA HOSHII NO DESU" (meaning "I'd like a {single} room" in English) of a conversational sentence example, registered in the bilingual database 21 at the 1st (n=1) place, in the following way.

As seen from FIG. 9, the first-language sentence has, as semantic features, a variable semantic feature of {HEYA NO SHURUI} (which means "a type of a room" in English) and a willed semantic feature of <HOSHII> (which means "would like", "want" in English). In comparison of these semantic features of the first-language sentence with the variable semantic feature {beddo}, the contextual semantic feature "HEYA", and the willed semantic feature <HOSHII>, which have been extracted from the input conversational sentence as described above, it is found that the willed semantic feature <HOSHII> is the only semantic feature that is coincident between the first-language sentence and the input conversational sentence. Accordingly, the following coverage is obtained.

coverage = (character string length of "HOSHII")/

(character string length of "daburubeddo NO HEYA

GA HOSHII")

= 3/13

= 0.23

... steps S13 to S16

Also, since the willed semantic feature <HOSHII> present in the input conversational sentence is also present in the conversational sentence example, the "evaluation 1" is calculated as follows:

"evaluation 1" = (weight for "HOSHII" × 2 − weight for

"HEYA NO SHURUI") × coverage

= (10 × 2 − 10) × 0.23

= 2.3

... steps S17 to S19

Also, since the content of the category information of the conversational sentence example and the content of the category information stored in the category storage unit 18 are coincidently "negotiation of rooms", the evaluation is calculated as shown below.

$$\begin{aligned}\text{evaluation} &= \text{"evaluation 1"} \times 1.3 \\ &= 2.3 \times 1.3 \\ &= 3.0\end{aligned}$$

... steps $S21$ to $S23$,

Since the calculated evaluation in this case is larger than $e_{max}$, the calculated evaluation is stored in buffer, along with a value of "n".

... steps S25 to S27

Likewise, in the case that the first-language sentence of a conversational sentence example is "{shingurubeddo} TSUKI NO HEYA GA HOSHII NO DESU", which is the second (n=2) example registered in the bilingual database 21, the first-language sentence and the input conversational sentence are coincident with respect the semantic features "{beddo}" meaning "bed" in English, "HEYA" meaning "room" in English, and "<HOSHII>". Accordingly, the coverage is calculated as follows.

$$\begin{aligned}\text{coverage} &= (\text{character string length of "}daburubeddo\text{"} + \\ &\quad \text{character string length of "}\underline{HEYA}\text{ }\underline{GA}\text{"} + \\ &\quad \text{character string length of "}\underline{HOSHII}\text{"})/ \\ &\quad (\text{character string length of "}daburubeddo\text{ }NO \\ &\quad \underline{HEYA}\text{ }\underline{GA}\text{ }\underline{HOSHII}\text{"}) \\ &= (6+3+3)/13 \\ &= 0.92\end{aligned}$$

Also, since the willed semantic feature <HOSHII> is present in the two sentences, "evaluation 1" is calculated as follows.

$$\begin{aligned}\text{"evaluation 1"} &= \{(\text{weight for "}beddo\text{"} + \text{weight for} \\ &\quad \text{"}\underline{HEYA}\text{"} + \text{weight for "}\underline{HOSHII}\text{"}) \times \\ &\quad 2 - \text{weight for "}\underline{TSUKI}\text{"}\} \times \text{coverage} \\ &= \{(20+10+10) \times 2 - 10\} \times 0.92 = 64.4\end{aligned}$$

Also, since the content of the category information of the present conversational sentence example and the content of the category information currently stored in the category storage unit 18 are coincidently "negotiation of rooms", the evaluation is calculated as shown below, and stored in a buffer.

$$\begin{aligned}\text{evaluation} &= \text{"evaluation 1"} \times 1.3 \\ &= 64.4 \times 1.3 \\ &= 83.72\end{aligned}$$

... steps $S28$, $S29$, steps $S14$ to $S19$, steps $S21$ to $S23$, steps $S25$ to $S27$ Next, in the case of the first-language sentence of a conversational sentence example, "{YOKUSHITSU} TSUKI DESU KA.", which is the third (n=3) registered in the bilingual database 21, there is no semantic feature that is coincident with any semantic feature of the input conversational sentence. Accordingly, the coverage is "0".

... steps S28, S29, steps S14 to S16

Also, although the willed semantic feature <HOSHII> is extracted from the input conversational sentence, the same willed semantic feature is not present in the first-language sentence of the third example. Accordingly, "evaluation 1" also becomes "0".

Thus, the calculation result of the evaluation is 0.

... steps S17, S18, S20
 steps S21 to S23,
 steps S25, S27

Next, in the case of the first-language sentence of a conversational sentence example, "KAGI WO HEYA NI OKIWASURETE SHIMAIMASHITA." meaning "I have left a key in the room" in English, which is the fourth (n=4) registered in the bilingual database 21, the semantic feature "HEYA" is coincident with a semantic feature of the input conversational sentence. Accordingly, the coverage is calculated as follows.

$$\begin{aligned}\text{coverage} &= (\text{character string length of "}\underline{HEYA}\text{ }\underline{GA}\text{"})/ \\ &\quad (\text{character string length of "}daburubeddo\text{ }NO\text{ }\underline{HEYA} \\ &\quad \underline{GA}\text{ }\underline{HOSHII}\text{"}) \\ &= 3/13 \\ &= 0.23\end{aligned}$$

... steps $S28$, $S29$, steps $S14$ to $S16$

Also, the willed semantic feature <HOSHII> extracted from the input conversational sentence is not present in the first-language sentence of the fourth example. Accordingly, "evaluation 1" is "0".

... steps S17, S18, S20

The content of the category information of the fourth conversational sentence example is "trouble", which is different from the content of the category information currently stored in the category storage unit 18. Thus, the evaluation becomes equal to the value of "evaluation 1", being "0".

... steps S21, S22, S24, S25, S27

As a result of the above evaluation, the first-language sentence having the maximum evaluation $e_{max}$ among the conversational sentence examples registered in the bilingual database 21 is of the second conversational sentence example, where its evaluation is 83.72. Also, the first-language sentence having a next largest evaluation is of the first conversational sentence example, where its evaluation is 3.0, which is less than ½ of the maximum evaluation $e_{max}$=83.72. Accordingly, the second conversational sentence example alone is selected as an optimal conversational sentence example for the input conversational sentence, "daburubeddo NO HEYA GA HOSHII".

... steps S28 to S30

The feature element replacer 14 receives the following information on the conversational sentence example selected by the semantic searcher 13:

{shingurubeddo} TSUKI NO HEYA GA HOSHII NO DESU.

I'd like a room with {single bed}.

{beddo} @20 TSUKI HEYA <HOSHII>

Negotiation of Rooms

The feature element replacer 14 further receives the information on the semantic features extracted from the input conversational sentence, including the variable semantic feature expression "daburubeddo", which has a variable semantic feature entry name "daburubeddo" and a variable semantic feature name {beddo}, as well as the semantic feature expressions "<u>HEYA</u>", "<u>HEYA</u> GA" having the contextual semantic feature name "<u>HEYA</u>", and the semantic feature expression "<u>HOSHII</u>" having the willed semantic feature name <<u>HOSHII</u>>.

Since a variable semantic feature name {beddo} identical to that of the semantic feature extracted from the input conversational sentence is contained in the semantic feature string of the first-language sentence of the conversational sentence example selected by the semantic searcher 13, the feature element replacer 14 replaces the character string "shingurubeddo" for the variable semantic feature name {beddo} in the first-language sentence of the conversational sentence example, "{shingurubeddo} TSUKI NO <u>HEYA</u> GA <u>HOSHII</u> NO DESU.", with a variable semantic feature entry name "daburubeddo" for the variable semantic feature name {beddo} extracted from the input conversational sentence. Likewise, the feature element replacer 14 replaces the character string "single bed" corresponding to the variable semantic feature name {beddo} in the second-language sentence of the conversational sentence example, "I'd like a room with a {single bed}.", with a translated variable semantic feature expression "double bed" for the variable semantic feature name {beddo} extracted from the input conversational sentence.

. . . steps S31 to S33

Then, since the selector 15 receives, from the feature element replacer 14, only one conversational sentence example that has undergone the replacement, the selector 15 outputs the conversational sentence example to the feature element selector 16, as it is, without allowing the user to make a choice. Further, the selector 15 rewrites the contents of the category storage unit 18 with the category information "negotiation of rooms" of the pertinent conversational sentence example.

. . . steps S34, S35, S42

The feature element selector 16 displays the first-language sentence, "{daburubeddo} TSUKI NO <u>HEYA</u> GA <u>HOSHII</u> NO DESU.", of the conversational sentence example selected and partially replaced, and at the same time it also displays a list of all the variable semantic feature entry names, "shingurubeddo" (which means "single bed" in English), "daburubeddo" (which means "double bed" in English), and "tsuinbeddo" (which means "twin bed in English) for the variable semantic feature name {beddo} (which means "bed" in English) extracted from the input conversational sentence, by referring to the variable semantic feature dictionary 24 (see FIG. 8). Subsequently, if the variable semantic feature entry name "shingurubeddo" or "tsuinbeddo" is selected by the user and a change to the selected variable semantic feature entry name is specified, the character string "daburubeddo" corresponding to the variable semantic feature {beddo} in the post-replacement first-language sentence, "{fdaburubeddo} TSUKI NO <u>HEYA</u> GA <u>HOSHII</u> NO DESU.", is changed to the specified variable semantic feature entry name "shingurubeddo" or "tsuinbeddo". Besides, a character string corresponding to the variable semantic feature {beddo} in the second-language sentence is also changed to the corresponding translated variable semantic feature expression.

. . . steps S43 to S48

In this way, in the case where a character string has been automatically replaced with an improper one by the feature element replacer 14 or where the character string replacement by the feature element replacer 14 has not been performed because no corresponding variable semantic feature is extracted from the input conversational sentence, the user is allowed to manually change variable semantic feature portions of conversational sentence examples.

The display unit 17 receives from the feature element selector 16, and displays, the finally determined first-language sentence and second-language sentence. That is, if manual replacement of the variable semantic feature has not been done by the feature element selector 16, then the following sentences:

Selected sentence: {daburubeddo} TSUKI NO <u>HEYA</u> GA <u>HOSHII</u> NO DESU.

Translated sentence: I'd like a room with a {double bed}.

are displayed.

. . . step S49

In the example described above, only one conversational sentence example has been selected by the semantic searcher 13.

However, as the number of conversational sentence examples registered in the bilingual database 21 increases, it becomes likely that first-language sentences having approximate evaluations are found in the process of estimating the individual first-language sentences by the semantic searcher 13. As a result, in some cases, first-language sentences showing evaluations greater than ½ of the maximum evaluation are present, so that a plurality of conversational sentence examples are selected. In such a case, the feature element replacer 14 iterates the processing of steps S31 to S34, by which the automatic replacement of variable semantic feature portions are performed on the selected plurality of conversational sentence examples.

Then, at step S40, the selector 15 displays the first language sentences of the selected conversational sentence examples with the variable semantic feature portions replaced, while asking the operator which of the displayed conversational sentence examples should be chosen, as follows.

Conversational sentence example 1: (first-language sentence of conversational sentence example 1)

Conversational sentence example 2: (first-language sentence of conversational sentence example 2)

Conversational sentence example m: (first-language sentence of conversational sentence example m)

Which should be chosen? (1–m)

In this way, the user is allowed to choose a desired conversational sentence example. In this process, such a design as to allow the user to choose a plurality of conversational sentence examples can be adopted. This is to enable the following:

For example, when an input conversational sentence example:

"<u>FUTARIBEYA</u> DE daburubeddo NO <u>HEYA</u> GA <u>HOSHII</u> NO DESU."

(which means "I would like a double room with a double bed" in English)

is entered to the input unit 11, the selection and replacement processes with the bilingual database 21 of FIG. 8 result in the display of the following two conversational sentence examples:

"daburubeddo TSUKI NO <u>HEYA</u> GA <u>HOSHII</u> NO DESU."

(which means "I would like a room with a double bed" in English), and

"<u>FUTARIBEYA</u> GA <u>HOSHII</u> NO DESU.

(which means "I would like a double room." in English.) In such a case, since both conversational sentence examples are needed for the input conversational sentence, the two conversational sentence examples are selected and displayed along with the translated expressions in order that what the operator wants to say can be expressed certainly.

In some cases, so many numbers of conversational sentence examples may be selected by the semantic searcher 13 that they cannot be displayed on screen at the same time by the selector 15. In such a case, they could be displayed and selected by using the screen switch or scroll technique as has been traditionally practiced. However, as the number of selected conversational sentence examples increases, the number of operations for screen switch or scroll also increases, so that it takes longer time to find and select an optimal conversational sentence example.

Accordingly, when 20 or more conversational sentence examples are selected, category information as to which categories the selected conversational sentence examples belong to is displayed (steps S35 to S37) such that the user is urged to make a choice out of the categories for the conversational sentence examples. Then, at steps S38 to S41, only the conversational sentence examples belonging to the category chosen by the user are displayed, so that a conversational sentence example can be selected efficiently with less amount of display. Also, by so doing, the user is allowed to select a conversational sentence example according to the user's situation of use, so that a better matched conversational sentence example can be selected.

As shown above, the conversational sentence translation apparatus of the present embodiment comprises the semantic feature dictionary 20 and the bilingual database 21. The semantic feature dictionary 20 is equipped with the willed semantic feature dictionary 22 in which semantic feature names representing willed semantic features in the first language and semantic feature expressions that are character strings for extracting the willed semantic feature names are contained as they are associated with each other, the contextual semantic feature dictionary 23 in which semantic feature names representing contextual semantic features in the first language and semantic feature expressions that are character strings for extracting the semantic feature names are contained as they are associated with each other, and the variable semantic feature dictionary 24 in which variable semantic feature names representing variable semantic features in the first language, variable semantic feature entry names that are entries of the variable semantic feature names, translated variable semantic feature expressions that are translations of the variable semantic feature entry names, and variable semantic feature expressions that are character strings for extracting the variable semantic feature entry names are contained as they are associated with one another. Also, in the bilingual database 21, conversational sentence examples in the first language (first-language sentences), their translations in the second language (second-language sentences), semantic feature (semantic feature name) strings of the first-language sentences, and category information of the conversational sentence examples are described as they are associated with one another.

With this arrangement, semantic feature names are extracted from the character strings of a natural conversational sentence in the first language transferred from the input unit 11, by the analyzer 12 with the use of the semantic feature dictionary 20. Then, the information on conversational sentence examples in the bilingual database 21 is searched for the extracted semantic features by the semantic searcher 13, so that the conversational sentence examples are evaluated. Depending on the evaluation result, one or more conversational sentence examples are selected. Subsequently, character strings corresponding to a variable semantic feature in the first-language and second-language sentences of each selected conversational sentence example are automatically replaced with a variable semantic feature entry name of the variable semantic feature extracted from the input conversational sentence and its translated variable semantic feature expression, respectively.

After this, in the case where a plurality of conversational sentence examples have been selected by the semantic searcher 13, an appropriate conversational sentence example is selected by the selector 15 through a dialogue with the user, and further the character strings corresponding to the variable semantic features in the first-language and second-language sentences of the selected conversational sentence example are replaced with another variable semantic feature entry name and translated variable semantic feature expression by the feature element selector 16 through a dialogue with the user. In this way, the finally obtained first-language and second-language sentences of the conversational sentence example are outputted to the display unit 17.

In other words, with an entry into the input unit 11 of a conversational sentence in the first language which is to be translated into the second language, an optimal conversational sentence example is automatically selected by the analyzer 12 and the semantic searcher 13 character strings of variable semantic feature portions in the selected conversational sentence example are replaced with variable semantic features extracted from the input conversational sentence or with variable semantic feature entry names of variable semantic features registered in the variable semantic feature dictionary 24 by the feature element replacer 14 and the feature element selector 16. Finally, the results are outputted to the display unit 17.

Therefore, according to the second embodiment, not only a conversational sentence example semantically closest to the input conversational sentence can be automatically selected, but also character strings of variable semantic feature portions in conversational sentence examples can be replaced optimally according to the input conversational sentence. That is, conversational sentence examples having more detailed contents can be obtained more easily, more promptly, and more accurately without increasing the number of conversational sentence examples to be registered in the bilingual database 21.

In the above second embodiment, although the category information in the bilingual database 21 is constructed singly and in a single-layer hierarchical structure, it is also possible to set a plurality of items of category information for each conversational sentence example, or to set the category information into a multi-layer hierarchical structure.

It has been also arranged that character data themselves of conversational sentence examples are selected by the semantic searcher 13 and the selected character data are transmitted to the feature element replacer 14, the selector 15, the feature element selector 16, or the display unit 17. However, without being limited to such arrangement, the present invention can be arranged such that sentence numbers are added to the conversational sentence examples registered in the bilingual database 21 and only these sentence numbers are selected and transmitted to other units. In such a case, the following can be done. That is, without replacing the character strings themselves of conversational sentence examples with others, the feature element replacer 14 and the feature element selector 16 retain replacement information as to what numbered variable semantic feature in a conversational sentence example is replaced with what numbered variable semantic feature entry name in the variable semantic feature dictionary 24. Then, the display unit 17 displays the first-language and second-language sentences of the conversational sentence example that have undergone replacement with actual character strings based on the replacement information.

Although the willed semantic feature dictionary 22, the contextual semantic feature dictionary 23, and the variable semantic feature dictionary 24 are installed together as the semantic feature dictionary 20 in the present embodiment, they may be provided as completely separate dictionaries.

Third Embodiment

In the second embodiment as described above, replacement of semantic feature elements of a selected conversational sentence example with others enables obtainment of a conversational sentence example representing the meaning of an input conversational sentence, its translation, without increasing the number of conversational sentence examples. However, if a plurality of character strings having the same variable semantic feature name or a plurality of character strings having variable semantic feature entry names associated with one another are present in the input conversational sentence or selected conversational sentence examples, then in some cases a semantically unnatural conversational sentence example may be generated due to the transformation of pertinent character strings in the selected conversational sentence examples.

For example, assume that the first-language sentence of a selected conversational sentence example is "{nyuyoku} MADE IKURA DESUKA" (which means "How much is it to New York?")and that the character string "nyuyoku" (which means "New York") in the sentence is a variable semantic feature entry name whose variable semantic feature name is {CHIMEI} which means "place name" in English. On the other hand, assume that the input conversational sentence is "rondon KARA okkusufodo MADE IKURA DESUKA" (which means "How much is it from London to Oxford?") Then, since two variable semantic feature expressions "rondon" (which means "London") and "okkusufodo" (which means "Oxford") having the same variable semantic feature name of {CHIMEI} are present in the input conversational sentence, the variable semantic feature "nyuyoku" in the first-language sentence is changed to the variable semantic feature "rondon" first detected in the input conversational sentence, so that a new first-language sentence "rondon MADE IKURA DESUKA." (which means "How much is it to London?") is generated.

However, considering the meaning of the input conversational sentence, a first-language sentence "okkusufodo MADE IKURA DESUKA." (which means "How much is it to Oxford?") should have been generated.

Meanwhile, assume that the first-language sentence of a selected conversational sentence example is "{nyuyoku} KARA {shikago} MADE IKURA DESUKA." (which means "How much is it from New York to Chicago?") and that the variable semantic feature names of the variable semantic feature entry names, "nyuyoku" and "shikago" (which means "Chicago"), in the sentence are both { CHIMEI} (which means "place name"). On the other hand, assume that the input conversational sentence is "rondon MADE IKURA DESUKA." (which means "How much is it to London?"). Then, since two variable semantic feature entry names "nyuyoku" and "shikago" with the variable semantic feature name of {CHIMEI} are present in the first-language sentence, the variable semantic feature "nyuyoku" first detected in the first-language sentence is changed to the variable semantic feature "rondon" in the input conversational sentence, so that a new first-language sentence "rondon KARA shikago MADE IKURA DESUKA." (which means "How much is it from London to Chicago?") is generated.

However, in the light of the meaning of the input conversational sentence, the variable semantic feature "shikago" detected later in the first-language sentence should have been changed and thereby a first-language sentence "nyuyoku KARA rondon MADE IKURA DESUKA." (which means "How much is it from New York to London?") should have been generated.

There would arise another disadvantage as described below. Assume that the first-language sentence of a selected conversational sentence example is "{nyuyoku} KARA {shikago} MADE IKURA DESUKA." (which means "How much is it from New York to Chicago?"), and that the input conversational sentence is "okkusufodo MADE rondon KARA IKURA DESUKA." (which means "How much is it from London to Oxford?"). Then, the variable semantic feature "nyuyoku" first detected in the first-language sentence is changed to the variable semantic feature "okkusufodo" first detected in the input conversational sentence, while the variable semantic feature "shikago" later detected in the first-language sentence is changed to the variable semantic feature "rondon" later detected in the input conversational sentence. As a result, a new first-language sentence, "okkusufodo KARA rondon MADE IKURA DESUKA." (which means "How much is it from Oxford to London?") is generated.

However, in the light of the meaning of the input conversational sentence, the starting point and the arrival point have been reversed to each other in the generated new first-language sentence.

The following disadvantage would also take place. Assume that the first-language sentence of a selected conversational sentence example is "{EKI} HE IKU {basu} HA ARIMASUKA" (which means "Are there buses bound for the station?" in English) and that the character strings in the sentence, "EKI" meaning "station" and "basu" meaning "bus", are variable semantic feature entry names which correspond to different variable semantic feature names { BASHO} meaning "place" and {KOTSUKIKAN} meaning "means of transportation", respectively, and which are associated with each other. On the other hand, assume that the input conversational sentence is "DENSHA DE IKEMASUKA." meaning "Can I go by train?". Then, since a variable semantic feature expression "DENSHA" (which means "train") with the variable semantic feature name of { KOTSUKIKAN} is present in the input conversational sentence, the variable semantic feature "basu" in the first-language sentence is changed to the variable semantic feature "DENSHA" having the same variable semantic feature name in the input conversational sentence. Thus, a new first-language sentence "EKI HE IKU DENSHA HA ARIMASUKA" (which means "Are there trains bound for the station?") is generated.

This generated new first-language sentence is semantically unnatural, giving an odd impression to the user.

Accordingly, the third embodiment is intended to make it possible to obtain a conversational sentence example that accurately represents the meaning of an input conversational sentence even if a plurality of variable semantic features having the same variable semantic feature name are present or variable semantic features having variable semantic feature entry names associated with each other or one another are present in the input conversational sentence or conversational sentence examples.

Figure 14:
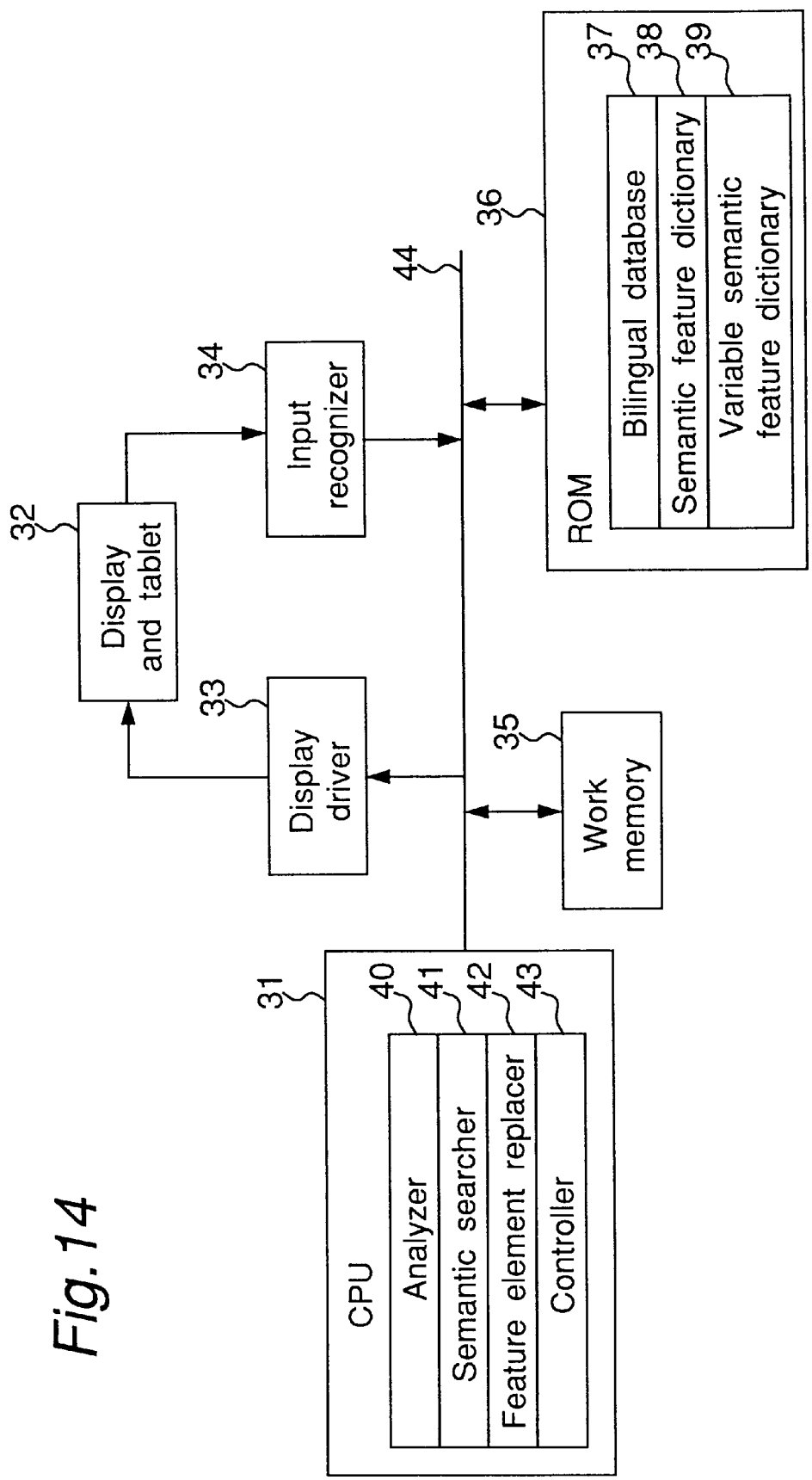
FIG. 14 is a block diagram of a conversational sentence translation apparatus according to a third embodiment of the present invention.
Figure 15:
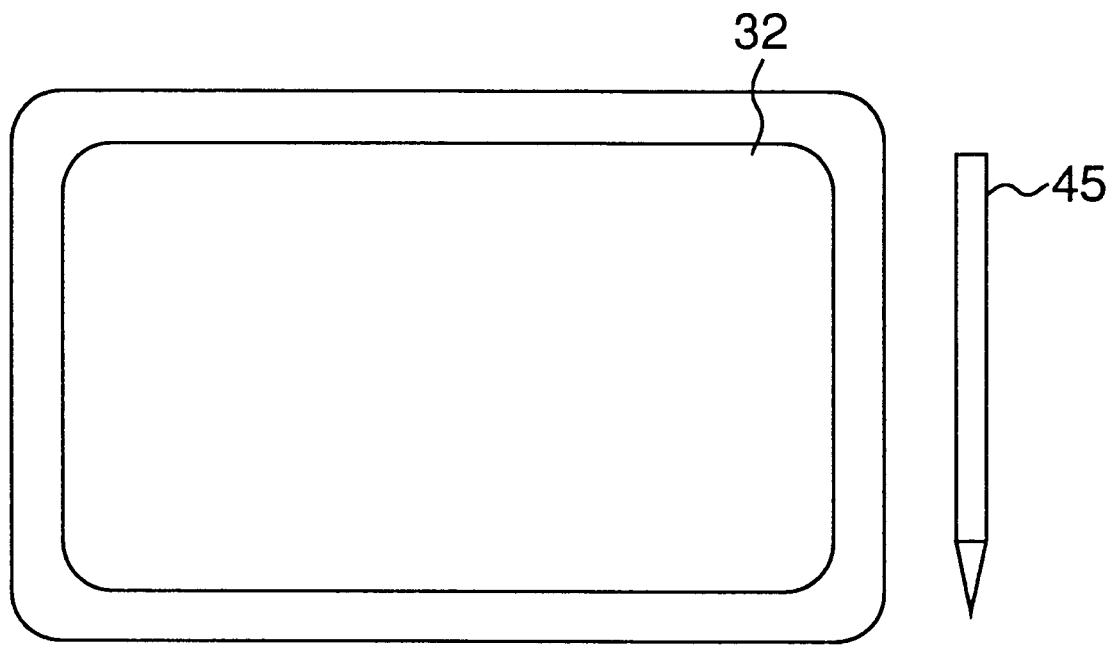
FIG. 15 shows an appearance of the conversational sentence translation apparatus shown in FIG. 14.

FIG. 14 is a block diagram of a conversationas sentence translation apparatus according to the third embodiment. FIG. 15 is a schematic occurrence view of the conversational sentence translation apparatus of the present embodiment.

This conversational sentence translation apparatus, as shown in FIG. 15, is so formed as to be convenient to carry for overseas travels, the arrangement being such that conversational sentence examples internally stored in abundance can be displayed onto a display and tablet 32. The apparatus employs a hand-writing input system for the display and tablet 32 by means of an e electronic pen 45 as the man-machine interface.

This is only an example, and the display and tablet 32 may be divided into a display device such as a liquid crystal display or CRT (cathode ray tube), and an input device such as a speech input device or keyboard.

Referring to FIG. 14, a CPU (central processing unit) 31 for executing various processings, such as conversational sentence translation, is connected via a bus 44 such as a data bus with a display driver 33, an input recognizer 34, a work memory 35, and a ROM (read only memory) 36.

The display driver 33 drives a display section (liquid crystal display) of the display and tablet 32 to make an input conversational sentence, conversational sentence examples, and other information displayed thereon. The input recognizer 34 recognizes characters entered to the display and tablet 32 by hand-writing with the electronic pen 45. The work memory 35 temporarily stores necessary data when executing various processings such as conversational sentence translation. The ROM 36, having large capacity (16 M bits in this embodiment), is to store the programs, dictionaries, and databases to be used for the CPU 31 to execute various types of control.

In the ROM 36, a bilingual database 37, a semantic feature dictionary 38, and a variable semantic feature dictionary 39 are stored.

The bilingual database 37 is constructed basically as shown in FIG. 9, which shows a bilingual database for the second embodiment. In the present embodiment, however, willed semantic features and weight information, which have no direct relation to this description, are omitted from the semantic feature string on the third line, and besides, category information on the fourth line not related directly to the description, either, is also omitted.

In the following description, conversational sentence example information registered in the bilingual database, comprising first-language sentences that are conversational sentence examples in the first language, second-language sentences that are translated sentences in the second language equivalent to the first-language sentences, and semantic feature strings for selecting a first-language sentence, will be referred to simply as conversational sentence examples.

The semantic feature dictionary 38, which is a unification of the willed semantic feature dictionary and the contextual semantic feature dictionary in the second embodiment, is constructed as the dictionary shown in FIG. 7. It is assumed that the following semantic feature information is registered in the semantic feature dictionary 38.

| Semantic feature name | Semantic feature expression |
| --- | --- |
| KARA | KARA |
| MADE | MADE |
| IKURA | IKURA |
|  | IKURA |
| DESUKA | DESUKA |
|  | NANO DESUKA |

The variable semantic feature dictionary 39 is constructed as the dictionary shown in FIG. 8 which is given for the second embodiment. It is assumed that the following variable semantic feature information is registered in the variable semantic feature dictionary 39.

| Variable semantic feature name | Variable semantic feature entry name | Variable semantic feature expression | Translated variable feature expression |
| --- | --- | --- | --- |
| {CHIMEI} |  |  |  |
|  | nyuyoku |  | New York |
|  |  | nyuyoku |  |
|  | shikago |  | Chicago |
|  |  | shikago |  |
|  | rondon |  | London |
|  |  | rondon |  |
|  | okkusufodo |  | Oxford |
|  |  | okkusufodo |  |

The CPU 31 has an analyzer 40, a semantic searcher 41, a feature element replacer 42, and a controller 43 for executing the conversational sentence translating process.

The analyzer 40 analyzes a first-language character string recognized by the input recognizer 34 to generate a partial character string which will be described later. Then, with reference to the semantic feature dictionary 38 and the variable semantic feature dictionary 39, the analyzer 40 searches for semantic features and variable semantic features contained in the input conversational sentence.

The semantic searcher 41 selects out the detected semantic feature from among the semantic feature strings described in the bilingual database 37, and evaluates based on the selected semantic feature whether or not each conversational sentence example is appropriate as a sentence example for the input conversational sentence. Then, the semantic searcher 41 selects one or more conversational sentence examples based on the evaluation result. The method of evaluation for this process is not particularly limited.

The feature element replacer 42 receives information on the conversational sentence examples selected by the semantic searcher 41, as well as information on the variable semantic feature extracted from the input conversational sentence. If a variable semantic feature having the same variable semantic feature name as that of the extracted variable semantic feature is present in the first-language sentence of each selected conversational sentence example, then the feature element replacer 42 replaces the character string corresponding to the variable semantic feature in the first-language sentence with the variable semantic feature entry name that represents the content of the extracted variable semantic feature. Further, the feature element replacer 42 replaces the character string corresponding to the variable semantic feature in the second-language sentence, which is the translation of the first-language sentence, with the translated variable semantic feature expression of the extracted variable semantic feature.

The controller 43 controls the display driver 33, the analyzer 40, the semantic searcher 41, and the feature element replacer 42 to execute a conversational sentence translating operation.

Figure 16:
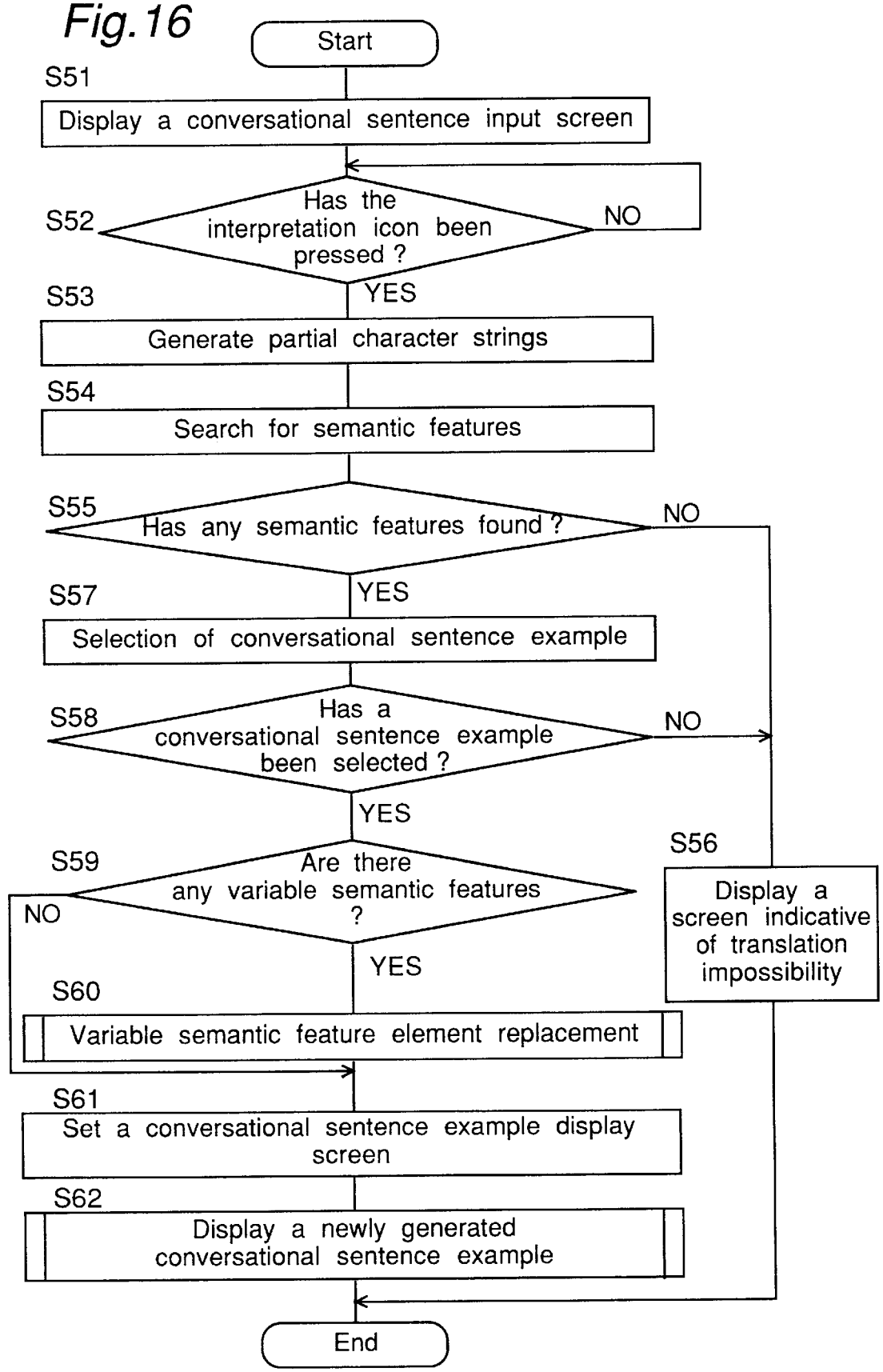
FIG. 16 is a flow chart of a conversational sentence translating operation to be executed under the control of the controller of FIG. 14.

FIG. 16 is a schematic flow chart of a conversational sentence translating operation to be executed by the display driver 33, the analyzer 40, the semantic searcher 41, and the feature element replacer 42 under the control of the controller 43. Below, by referring to FIG. 16, the conversational sentence translating operation is described in detail on the case, as an example, where a free conversational sentence "rondon MADE IKURA DESUKA" in Japanese (first language) is entered and an English (second language) equivalent thereof is put out.

Figure 17A:
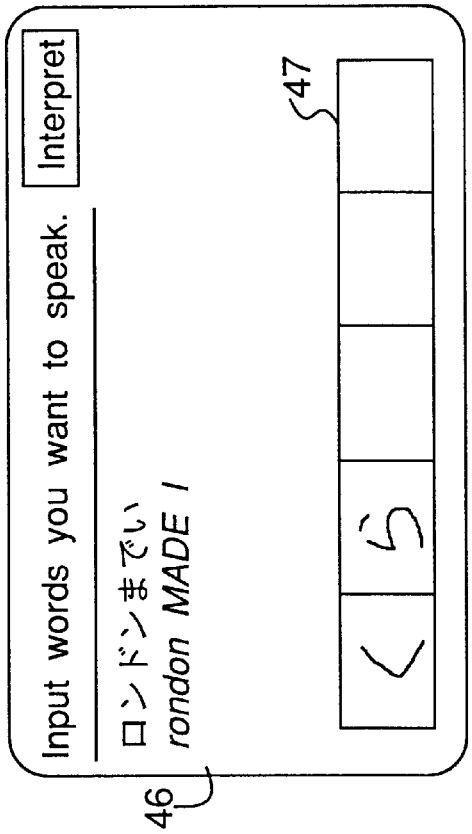
FIG. 17A, 17B, 17C, 17D, 17E and 17F illustrate an example of the display contents of the tablet with display during the conversational sentence translating operation shown in FIG. 16.

At step S51, the display and tablet 32 is driven by the display driver 33 so that a message prompting the user to input a conversational sentence is displayed on a display screen 46 of the display and tablet 32 as shown in FIG. 17A.

Figure 17B:
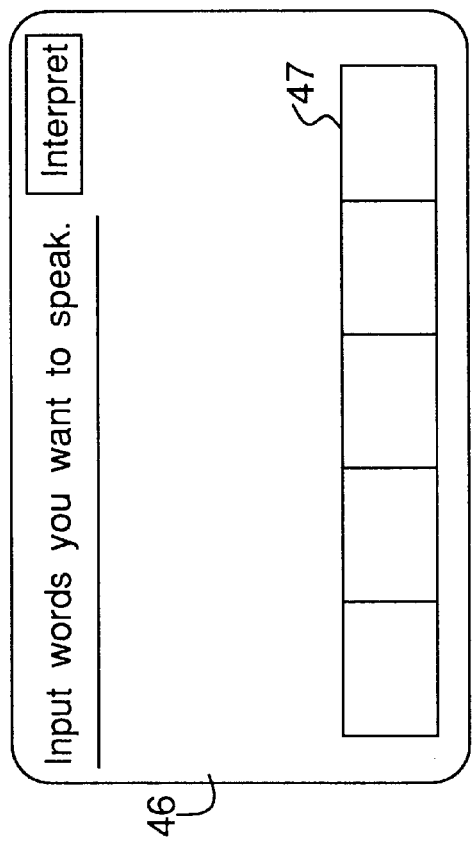

Then, as shown in FIG. 17B, a conversational sentence is written in a character input field 47 of the display and tablet 32 by the user with the electronic pen 45, and a portion of the character string recognized by the input recognizer 34 is caused to be displayed on the display screen 46 by the display driver 33. Upon the completion of the writing of the conversational sentence, an interpretation icon 48 as shown in FIG. 17C is pressed.

At step S52, it is decided by the input recognizer 34 whether or not the interpretation icon 48 has been pressed. If it has, the program goes to step S53.

At step S53, the recognition result of the input character string is transferred to and stored in the work memory 35 by the input recognizer 34. After this, from the input conversational sentence stored in the work memory 35, partial character strings are generated by the analyzer 40 as shown below and stored in the work memory 35.

In the present example, from the input conversational sentence "rondon MADE IKURA DESUKA", partial character strings are generated as follows.

```
ro
ron
rondo
rondon
            MA
            MADE
                            IKU
                            IKURA
            .
            .
            .
```

At step S54, taking as the key the partial character strings read from the work memory 35 in the increasing order of addresses, the analyzer 40 searches the semantic feature dictionary 38 and the variable semantic feature dictionary 39 for semantic features and variable semantic features.

In the present example, the search with a key of, for example, the partial character string "IKURA" stored in the work memory 35 is carried out as follows:

First, the semantic feature information comprising pairs of semantic feature name and semantic feature expression is read out line by line from the semantic feature dictionary 38 in the increasing order of addresses and stored in the work memory 35. Then, by comparing the read semantic feature expressions with the key, a piece of semantic feature information having a semantic feature expression of the same character string as the key is searched out. In this process, as described before, since the following semantic feature name and semantic feature expression:

| Semantic | Semantic feature expression |
|---|---|
| IKURA | IKURA | have been registered in the semantic feature dictionary 38, the key "IKURA" and the semantic feature expression "IKURA" are coincident with each other, so that the semantic feature name "IKURA" is added to the partial character string "IKURA" and stored in the work memory 35. Thereafter, since no other semantic features having the semantic feature expression "IKURA" are registered in the semantic feature dictionary 38, the search for semantic features is ended.

Next, a search for the variable semantic feature is made. Because no variable semantic feature information having the variable semantic feature expression "IKURA" is registered in the variable semantic feature dictionary 39 as mentioned above, no variable semantic feature is found with the partial character string "IKURA" of the key and the search for the variable semantic feature is ended.

Another search with the partial character string "rondon" taken as the key is carried out as follows:

First, the semantic feature dictionary 38 is searched for semantic features as in the case of the partial character string "IKURA". In this process, since no semantic feature names having the semantic feature expression "rondon" are registered in the semantic feature dictionary 38 as mentioned above, no semantic features are found with the partial character string "rondons of the key. Therefore, the search for semantic features is ended and the program moves to the search for variable semantic features.

As in the search for semantic features, variable semantic feature information made up from sets of a variable semantic feature name, a variable semantic feature entry name, a translated variable semantic feature expression, and a variable semantic feature expression is read out, and the variable semantic feature expression in each read piece of variable semantic feature information is compared with the key, by which a piece of variable semantic feature information having a variable semantic feature expression of the same character string as the key is searched out. Then, a variable semantic feature name {CHIMEI} and a translated variable semantic feature expression "London" are added to the partial character string "rondon" and stored in the work memory 35. Then, because no other variable semantic features having the variable semantic feature expression "rondon" are registered in the variable semantic feature dictionary 39, the search for variable semantic features is ended.

The operation as described above is executed for all the partial character strings stored in the work memory 35, by which the semantic features and variable semantic features as shown in FIG. 18 are found out. Hereinbelow, semantic features other than variable semantic features will be referred to as invariable semantic features.

It is noted that the term "Sequence No." in FIG. 18 represents an order in which the partial character strings have been read out from the work memory 35.

At step S55, the semantic searcher 41 refers to the work memory 35 and decides whether or not a variable or an invariable semantic feature has been found at step S54. If it has, the program goes to step S57, and if not, the program goes to step S56.

Figure 17D:
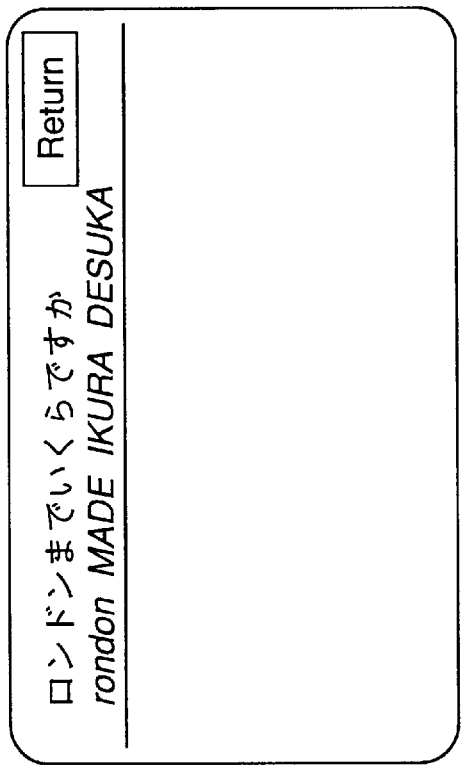
Figure 17C:
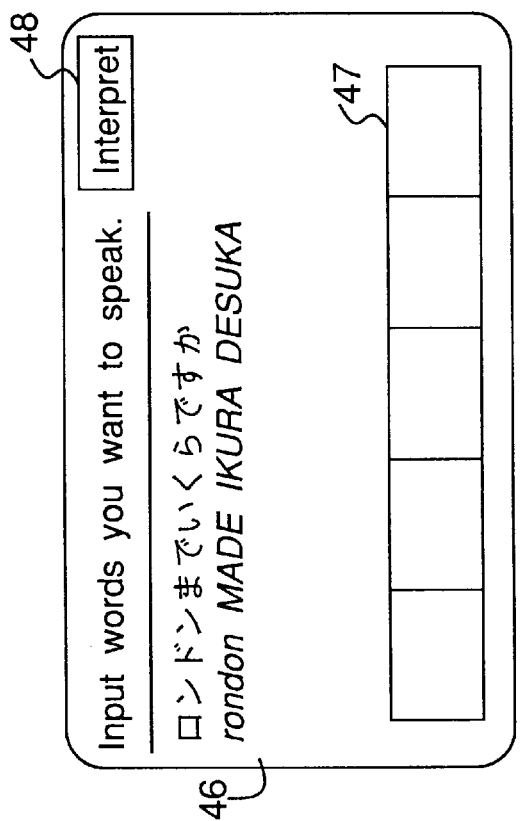
Figure 17F:
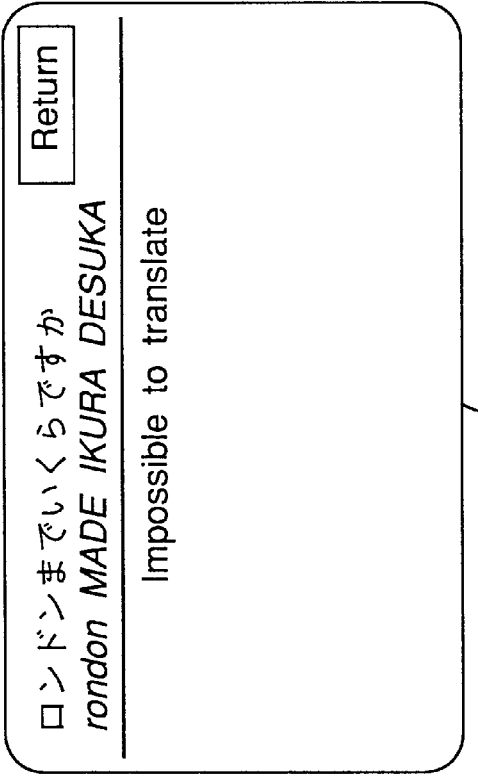

At step S56, the display and tablet 32 is driven by the display driver 33 so that a message representing that the input conversational sentence is impossible to translate is displayed on the display screen 46 as shown in FIG. 17F. After that, the conversational sentence translating operation is ended.

At step S57, by taking as the key the semantic feature name and variable semantic feature name found by and stored in the work memory 35 at step S54, the semantic searcher 41 selects a conversational sentence example from the bilingual database 37. Then, the selected conversational sentence example is stored in the work memory 35.

In the present example, first, with the first semantic feature name {CHIMEI} in FIG. 18 taken as the key, the semantic feature string on the third line in each of the conversational sentence examples registered in the bilingual database 37 is searched.

It is assumed here that the following information of conversational sentence example 1 is stored in the bilingual database 37:

Conversational sentence example 1:
{nyuyoku} MADE IKURA DESUKA.
How much is it to (New York)?
{CHIMEI} MADE IKURA DESUKA Then, since a semantic feature name {CHIMEI} is present in the semantic feature string of the conversational sentence example 1, the conversational sentence example 1 is found and selected.

At step S58, it is decided by the semantic searcher 41 with reference to the work memory 35 whether or not a conversational sentence example has been selected at step S57. As a result, if it has, the program goes to step S59. If not, the program goes to step S56, where a message representing that the input conversational sentence cannot be translated is displayed.

At step S59, whether or not a variable semantic feature name is present in the semantic feature string of the conversational sentence example selected at step S57 is decided by the feature element replacer 42 with reference to the work memory 35. As a result, if it is, the program goes to step S60, and if not, the program goes to step S61.

At step S60, a variable semantic feature element replacement subroutine as will be detailed later is executed by the feature element replacer 42, by which a character string corresponding to the variable semantic feature name in the first-language sentence of the conversational sentence example that has been decided at step S59 to have that variable semantic feature name is replaced with a partial character string corresponding to the same variable semantic feature name in the input conversational sentence. Further, a character string corresponding to the variable semantic feature name in the second-language sentence of the conversational sentence example is replaced with a translated variable semantic feature expression having the substitute partial character string as its variable semantic feature entry name.

Then, the newly generated conversational sentence example is stored in the work memory 35.

In the present example, the character string "nyuyoku" corresponding to the variable semantic feature name { CHIMEI} in the first-language sentence "{nyuyoku} MADE IKURA DESUKA.} of the conversational sentence example 1 is replaced with the character string "rondon" corresponding to the variable semantic feature name { CHIMEI} in the input conversational sentence "rondon MADE IKURA DESUKA." Thus, a new first-language sentence "{rondon} MADE IKURA DESUKA." is generated. Further, the character string "New York" in the second-language sentence "How much is it to {New York}?" is replaced with the translated variable semantic feature expression "London". Thus, a new second-language sentence "How much is it to {London}?" is generated.

The following conversational sentence example is newly generated in this way:

{rondon} MADE IKURA DESUKA.
How much is it to {London}?
{CHIMEI} MADE IKURA DESUKA is stored in the work memory 35.

At step S61, the display and tablet 32 is driven by the display driver 33, by which the display contents of the display screen 46 are changed from those of FIG. 17C to those of FIG. 17D so that a conversational sentence example display screen is set.

At step S62, a conversational sentence example display subroutine as will be detailed later is executed, by which a first-language sentence and a second-language sentence of the new conversational sentence example stored in the work memory 35 are read out and displayed on the display screen 46.

Figure 17E:
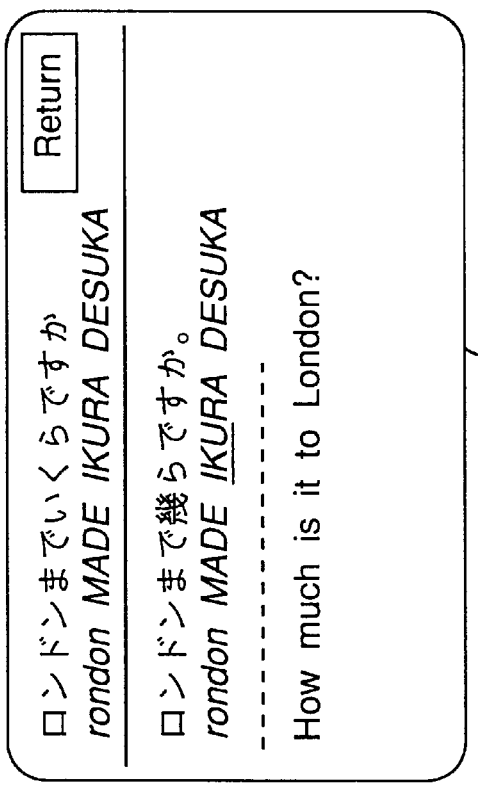

In the present example, the following first-language sentence and second-language sentence:

{rondon} MADE IKURA DESUKA.
How much is it to (London)?
are displayed as shown in FIG. 17E.

Thereafter, the conversational sentence translating operation is ended.

Figure 20:
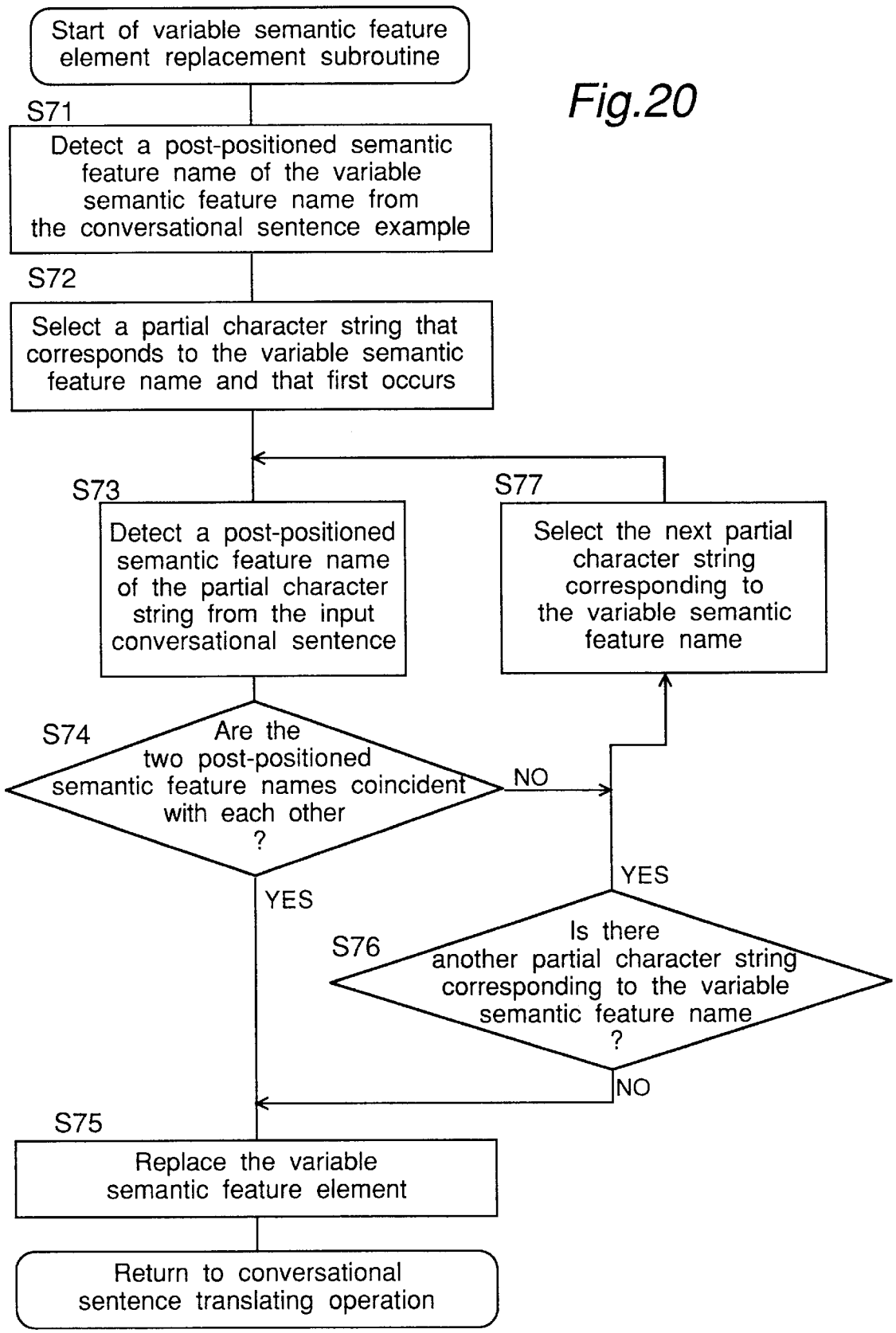
FIG. 20 is a flow chart of a variable semantic feature element replacement subroutine to be executed in the conversational sentence translating operation shown in FIG. 16.

Next, the variable semantic feature element replacement subroutine to be executed at step S60 in the flow chart of the conversational sentence translating operation shown in FIG. 16 is explained in detail. FIG. 20 shows a flow chart of the variable semantic feature element replacement subroutine.

At step S59 in the flow chart shown in FIG. 16, if it is decided that a variable semantic feature name is present in the semantic feature string of the conversational sentence example selected at step S57, then the variable semantic feature element replacement subroutine starts.

At step S71, with reference to the semantic feature string of the selected conversational sentence example stored in the work memory 35, a semantic feature name subsequent to the variable semantic feature name (post-positioned semantic feature name) is detected.

In the present example, an invariable semantic feature name "MADE" is detected.

At step S72, the partial character string that first occurs out of the partial character strings corresponding to the pertinent variable semantic feature name is selected from the detected variable and invariable semantic features stored in the work memory 35 (see FIG. 18).

In the present example, a partial character string "rondon" is selected.

At step S73, with reference to the detected variable and invariable semantic features of the input sentence (see FIG. 18), the post-positioned semantic feature name of the partial character string selected at step S72 is detected.

In the present example, a semantic feature name "MADE" is detected.

At step S74, it is decided whether or not the detected two post-positioned semantic feature names are coincident with each other. As a result, if they are, the program goes to step S75 and, if not, goes to step S76.

In the present example, the post-positioned semantic feature name "MADE" detected at step S71 and the post-positioned semantic feature name "MADE" detected at step S73 are coincident with each other. Therefore, the program goes to step S75.

At step S75, since the two post-positioned semantic feature names are coincident with each other, and thus, a character string of the pertinent variable semantic feature name in the selected conversational sentence example, and a partial character string corresponding to the pertinent variable semantic feature name in the input conversational sentence both represent an "arrival point", each one of them can be replaced with the other. Accordingly, the character string of the pertinent variable semantic feature name in the selected conversational sentence example is replaced with the partial character string of the pertinent variable semantic feature name in the input conversational sentence. Then, the newly generated conversational sentence example is stored in the work memory 35.

After that, the variable semantic feature element replacement subroutine is ended, and the program-returns to step S61 in the flow chart of the conversational sentence translating operation shown in FIG. 16.

In the present example, as described above, the character string "nyuyoku" in the first-language sentence, "{nyuyoku}" MADE IKURA DESUKA.", of the conversational sentence example 1 is replaced with the character string "rondon" in the input conversational sentence, "rondon MADE IKURA DESUKA." Further, the character string "New York" in the second-language sentence, "How much is it to {New York}?", is replaced with a translated variable semantic feature expression "London".

At step S76, with reference to the detected variable and invariable semantic features (see FIG. 18), it is decided whether or not a partial character string that corresponds to the pertinent variable semantic feature name and that is different from the already selected character string is present. If it is, the program goes to step S77. If not, the program goes to step S75, where the character string corresponding to the variable semantic feature name in the selected conversational sentence example is replaced with the last selected partial character string.

At step S77, a partial character string corresponding to the variable semantic feature name and occurring next to the already selected character string is selected from the detected variable and invariable semantic features (see FIG. 18).

Then, turning back to step S73, the program moves to the decision as to whether or not the post-positioned semantic feature name of the selected partial character string is coincident with the post-positioned semantic feature name selected at step S71. If it is decided at step S74 that the two post-positioned semantic feature names are coincident with each other or if it is decided at step S76 that no further partial character string corresponding to the variable semantic feature name is present, then the variable semantic feature element is replaced at step S75, followed by the program returning to step S61 in the flow chart of the conversational sentence translating operation shown in FIG. 16.

In the present embodiment, as described above, if it is decided at step S76 that no further partial character string belonging to the variable semantic feature name is present in the input conversational sentence, the program goes to step S75, where the character string of the pertinent variable semantic feature name in the conversational sentence example is replaced with the last selected partial character string. Instead, it can also be arranged that the program returns to step S56 of the flow chart of the conversational sentence translating operation shown in FIG. 16, where a message representing that the input conversational sentence is impossible to translate is displayed.

Also, in the present embodiment, it is decided based on the post-positioned semantic feature name following the pertinent variable semantic feature name whether or not a character string of the pertinent variable semantic feature name in the conversational sentence example should be replaced with a partial character string of the variable semantic feature name in the input conversational sentence. However, the present invention is not limited to this, and it may be decided also by a pre-positioned semantic feature name preceding the variable semantic feature name or by both pre-positioned and post-positioned semantic feature names. Otherwise, it may be decided by other peripheral semantic feature names.

The above description, like the second embodiment, has been directed to a conversational sentence translating operation in the case where an input conversational sentence and a selected conversational sentence example each have only one variable semantic feature and both the semantic features have the same variable semantic feature name.

Next described is a conversational sentence translating operation in the case where a plurality of variable semantic features having the same variable semantic feature name are present in the input conversational sentence, while only one variable semantic feature having the same variable semantic feature name as that of the variable semantic features in the input conversational sentence is present in conversational sentence examples.

Now assume that an input conversational sentence "rondon KARA okkusufodo MADE IKURA DESUKA" is entered by pen from the display and tablet 32. Then, steps S52 to S54 in the flow chart shown in FIG. 16 are executed, by which variable and invariable semantic features are searched out as shown in FIG. 19.

Further, step S55 and step S57 in the flow chart as shown in FIG. 16 are executed, by which a conversational sentence example 1 is selected:

Conversational sentence example 1:
{nyuyoku} MADE IKURA DESUKA.
How much is it to {New York}?
{CHIMEI} MADE IKURA DESUKA After this process, the variable semantic feature element replacement subroutine is executed at step S60 of the flow chart shown in FIG. 16, where the character string "nyuyoku" of the variable semantic feature in the first-language sentence, "{nyuyoku} MADE IKURA DESUKA", of the conversational sentence example 1 is replaced with another. In this case, since two variable semantic features, "rondon" and "okkusufodo", having an identical variable semantic feature name {CHIMEI} (which means "name of place") are present in the input conversational sentence, it is first decided which of the variable semantic feature expressions, "rondon" and "okkusufodo", the character string "nyuyoku" is replaced with, and then the replacement is effected.

This decision to be executed in the variable semantic feature element replacement subroutine is now described in more detail below.

In the same way as in the foregoing case of the input conversational sentence "rondon MADE IKURA DESUKA", a post-positioned semantic feature name "MADE" (which means "to") following the variable semantic feature name {CHIMEI} in the first-language sentence of the selected conversational sentence example 1 is detected at step S71. Further, at steps S72 and S73, the partial character string "rondon" that first occurs among the partial character strings corresponding to the variable semantic feature name {CHIMEI} is detected from the detected variable and invariable semantic features (see FIG. 19), and its post-positioned semantic feature name "KARA" is detected. Then, it is decided at the step S74 that the two post-positioned semantic feature names, "MADE" and "KARA" (the former means "to" and the latter means "from" in English), are not coincident with each other, so that the program goes to step S76.

Further, at steps S76 and S77, the next partial character string "okkusufodo" corresponding to the variable semantic feature name {CHIMEI} is selected. Then, the program turning back to step S73, the post-positioned semantic feature name "MADE" of the selected partial character string "okkusufodo" is detected.

Now that the detected post-positioned semantic feature name "MADE" is coincident with the post-positioned semantic feature name "MADE" detected at step S71, the character string "okkusufodo" in the input conversational sentence and the character string "nyuyoku" in the first-language sentence of the conversational sentence example 1 both represent an "arrival point", so that each one of them may be replaced with the other.

Accordingly, the character string, "nyuyoku", of the first-language sentence, {nyuyoku} MADE IKURA DESUKA." of the conversational sentence example 1 selected at step S57 is replaced with the partial character string, "okkusufodo", selected at step S77, by which a new first-language sentence, "{okkusufodo} MADE IKURA DESUKA." is generated. Further, the character string, "New York", of the second-language sentence, "How much is it to {New York}?", of the conversational sentence example 1 is replaced with the translated variable semantic feature expression, "Oxford", of the partial character string (variable semantic feature), "okkusufodo", by which a new second-language sentence, "How much is it to {Oxford}?", is generated.

Next, another example of the variable semantic feature element replacement subroutine is explained below.

The variable semantic feature element replacement subroutine of this example is a subroutine to be used in the case where a plurality of variable semantic features having the same variable semantic feature name are present in conversational sentence examples, while only one such variable semantic feature is present in the input conversational sentence.

In the present example, it is assumed that the input conversational sentence is "rondon MADE IKURA DESUKA.", and that the following information on conversational sentence examples is registered in the bilingual database 37 of the ROM 36:

Conversational sentence example 2:
{nyuyoku} KARA {shikago} MADE IKURA DESUKA.
How much is it from {New York}$1$ to {Chicago}$2$?
{CHIMEI} KARA {CHIMEI} MADE IKURA DESUKA It is noted that the symbol "$Number$" in the second-language sentence denotes the occurrence order number of character strings at which each character string occurs in the first-language sentence when a plurality of character strings corresponding to the same variable semantic feature name are present in the second-language sentence. In the case where a plurality of character strings corresponding to the same variable semantic feature name are present in a single sentence as shown above, the order in which the pertinent variable semantic feature names occur in the semantic feature string on the third line is so arranged as to be coincident with the order in which corresponding character strings appear in the first-language sentence.

In the present example, it is of importance which of the two character strings corresponding to the same variable semantic feature name that are present in the selected conversational sentence example should be replaced with the character string of the pertinent variable semantic feature name in the input conversational sentence. Thus, in the same way as in the above-described examples, the preparation of partial character strings by the analyzer 40 as well as the search for semantic features and the selection of a conversational sentence example by the semantic searcher 41 are carried out according to the flow chart of conversational sentence translating operation as shown in FIG. 16. Further, the variable semantic feature element replacement by the feature element replacer 42 is carried out in a variable semantic feature element replacement subroutine shown in FIG. 21.

First, at steps S51 to S53 in the flow chart of conversational sentence translating operation shown in FIG. 16, an input conversational sentence, "rondon MADE IKURA DESUKA." is entered and its partial character strings are prepared.

Figure 21:
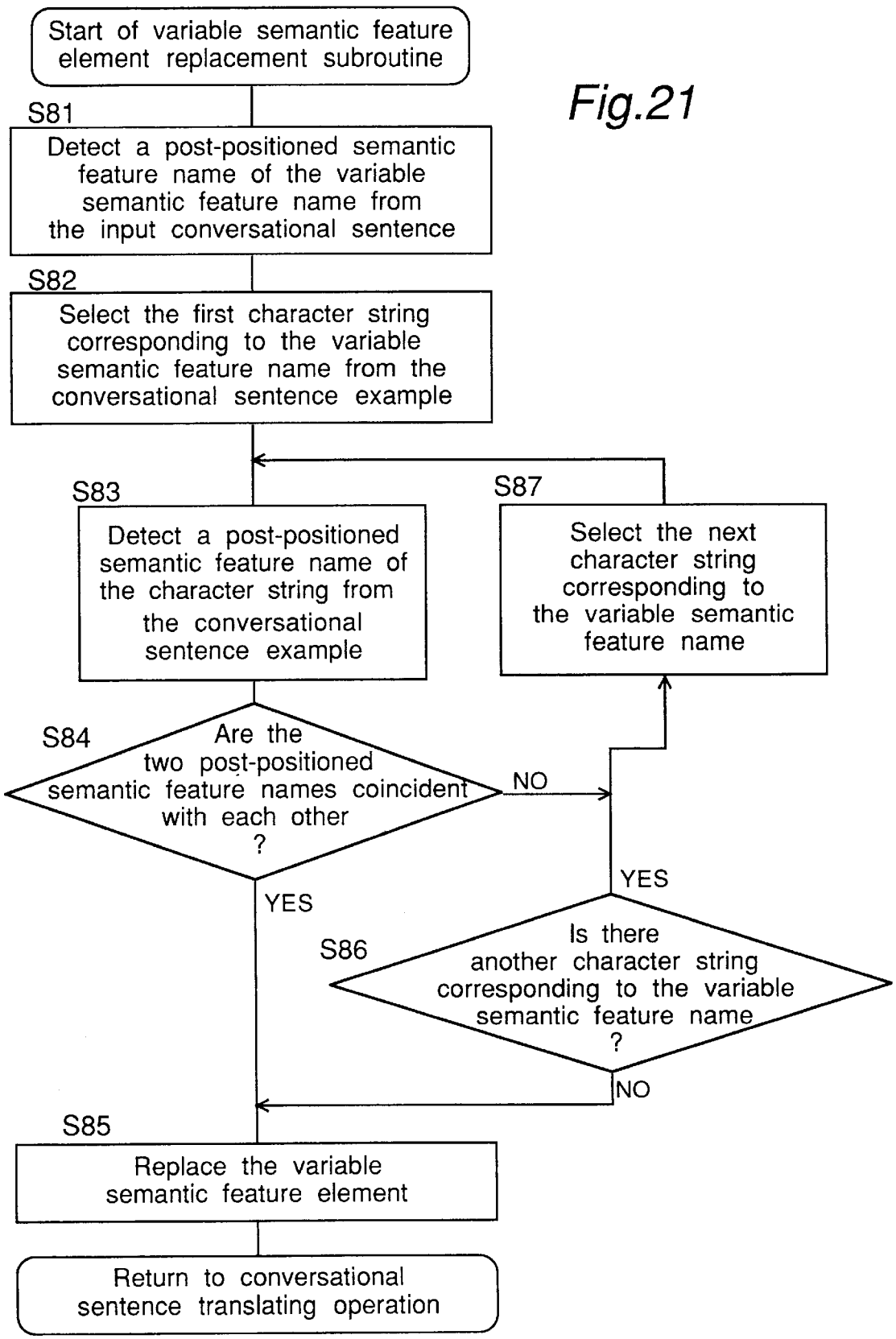
FIG. 21 is a flow chart of another variable semantic feature element replacement subroutine.

After that, at step S54, the semantic feature dictionary 38 and the variable semantic feature dictionary 39 of the ROM 36 are searched for semantic features. In the present example, semantic features are found as shown in FIG. 18. Further at step S57, a conversational sentence example is selected from the bilingual database 37. In the present example, the following conversational sentence example 2 is selected:

Conversational sentence example 2:
{nyuyoku} KARA {shikago} MADE IKURA DESUKA.
How much is it from {New York}$1$ to {Chicago}$2$?
{CHIMEI} KARA {CHIMEI} MADE IKURA DESUKA Then, if it is decided, at step S59 in the flow chart of conversational sentence translating operation shown in FIG. 16, that a variable semantic feature name is present in the semantic feature string of the selected conversational sentence example, then the variable semantic feature element replacement subroutine as shown in FIG. 21 is started.

At step S81, with reference to the variable and invariable semantic features of the input sentence stored in the work memory 35 (see FIG. 18), a post-positioned semantic feature name of the variable semantic feature name is detected.

In the present example, the semantic feature name "MADE" is detected.

At step S82, a character string that first occurs among the character strings corresponding to the variable semantic feature name is selected from the first-language sentence of the selected conversational sentence example stored in the work memory 35.

In the present example, the character string "nyuyokul" is selected.

At step S83, with reference to the semantic feature string of the selected conversational sentence example, a post-positioned semantic feature name of the character string selected at step S82 is detected.

In the present example, the semantic feature name "KARA" is detected.

At step S84, it is decided whether or not the detected two post-positioned semantic feature names are coincident with each other. As a result, if they are, the program goes to step S85, and if not, the program goes to step S86.

In the present example, the post-positioned semantic feature name "MADE" detected at step S81 is not coincident with the post-positioned semantic feature name "KARA" detected at step S83. Therefore, the program goes to step S86.

When two post-positioned semantic feature names are coincident with each other, the partial character string corresponding to the variable semantic feature name in the input conversational sentence and the selected character string corresponding to the variable semantic feature name in the selected conversational sentence example both represent either a "start point" or an "arrival point", so that each one of them may be replaced with the other. Accordingly, at step S85, the pertinent character string in the selected conversational sentence example is replaced with the pertinent partial character string in the input conversational sentence. Then, a newly generated conversational sentence example is stored in the work memory 35.

Then, the variable semantic feature element replacement subroutine is ended, where the program returns to step S61 in the flow chart of the conversational sentence translating operation shown in FIG. 16.

At step S86, with reference to the semantic feature string of the selected conversational sentence example, it is decided whether or not one more variable semantic feature name identical to the pertinent variable semantic feature name is present. As a result, if it is, the program goes to step S87. If not, the program goes to step S85, where the last selected character string corresponding to the variable semantic feature name in the conversational sentence example is replaced.

In the present example, since one more variable semantic feature name {CHIMEI} is present, the program goes to step S87.

At step S87, a character string corresponding to the pertinent variable semantic feature name and appearing next to the already selected character string is selected from the first-language sentence of the conversational sentence example.

In the present example, the next character string "shikago" corresponding to the variable semantic feature name {CHIMEI} is selected.

After that, turning back to step S83, the program moves to the decision as to whether or not the post-positioned semantic feature name of the selected character string is coincident with the post-positioned semantic feature name selected at step S81. If it is decided at step S84 that the two post-positioned semantic feature names are coincident with each other or it is decided at step S86 that no other partial character string corresponding to the variable semantic feature name is present, then the variable semantic feature name element is replaced with another at step S85, followed by the program returning to step S61 in the flow chart of the conversational sentence translating operation as shown in FIG. 16.

In the present example, since the post-positioned semantic feature name "MADE" of the selected character string "shikago" is coincident with the post-positioned semantic feature name "MADE" detected at step S81, the character string "shikago" in the first-language sentence, "{nyuyoku} KARA {shikago} MADE IKURA DESUKA." of the conversational sentence example 2 is replaced with the character string "rondon". Thus, a new first-language sentence, "{nyuyoku} KARA {rondon} MADE IKURA DESUKA.", is generated. Further, the character string "Chicago" of the second-language sentence, "How much is it from {New York}$1$ to {Chicago}$2$?", of the conversational sentence example 2 is replaced with the translated variable semantic feature expression "London" of the character string (variable semantic feature) "rondon", so that a new second-language sentence, "How much is it from {New York}$1$ to {London}$2$?", is generated.

Next, still another example of the variable semantic feature element replacement subroutine is explained.

The variable semantic feature element replacement subroutine of the present example is a subroutine to be used in the case where a plurality of variable semantic features having the same variable semantic feature name are present in both the input conversational sentence and the conversational sentence example.

In the present example, it is assumed that the input conversational sentence is "okkusufodo MADE rondon KARA IKURA DESUKA.", and that the information of the conversational sentence example 2 is registered in the bilingual database 37 of the ROM 36:

Conversational sentence example 2:

{nyuyoku} KARA {shikago} MADE IKURA DESUKA.
How much is it from {New York}$1$ to {Chicago}$2$?
{CHIMEI} KARA {CHIMEI} MADE IKURA DESUKA Also in the present example, it matters which of the plurality of character strings corresponding to the same variable semantic feature name in the selected conversational sentence example should be replaced with which of the plurality of character strings corresponding to the variable semantic feature name in the input conversational sentence. Thus, the preparation of partial character strings by the analyzer 40 as well as the search for semantic features and the selection of a conversational sentence example by the semantic searcher 41 are carried out according to the flow chart of conversational sentence translating operation as shown in FIG. 16. Also, the variable semantic feature element replacement by the feature element replacer 42 is carried out in a variable semantic feature element replacement subroutine shown in FIG. 22 and FIG. 23.

First, at steps S51 to S53 in the flow chart of conversational sentence translating operation shown in FIG. 16, an input conversational sentence, "okkusufodo MADE rondon KARA IKURA DESUKA." is entered and its partial character strings are prepared.

After that, at step S54, the semantic feature dictionary 38 and the variable semantic feature dictionary 39 of the ROM 36 are searched for semantic features. In the present example, semantic features are found as shown in FIG. 24. Further at step S57, a conversational sentence example is selected from the bilingual database 37. In the present example, the conversational sentence example 2 is selected.

Figure 22:
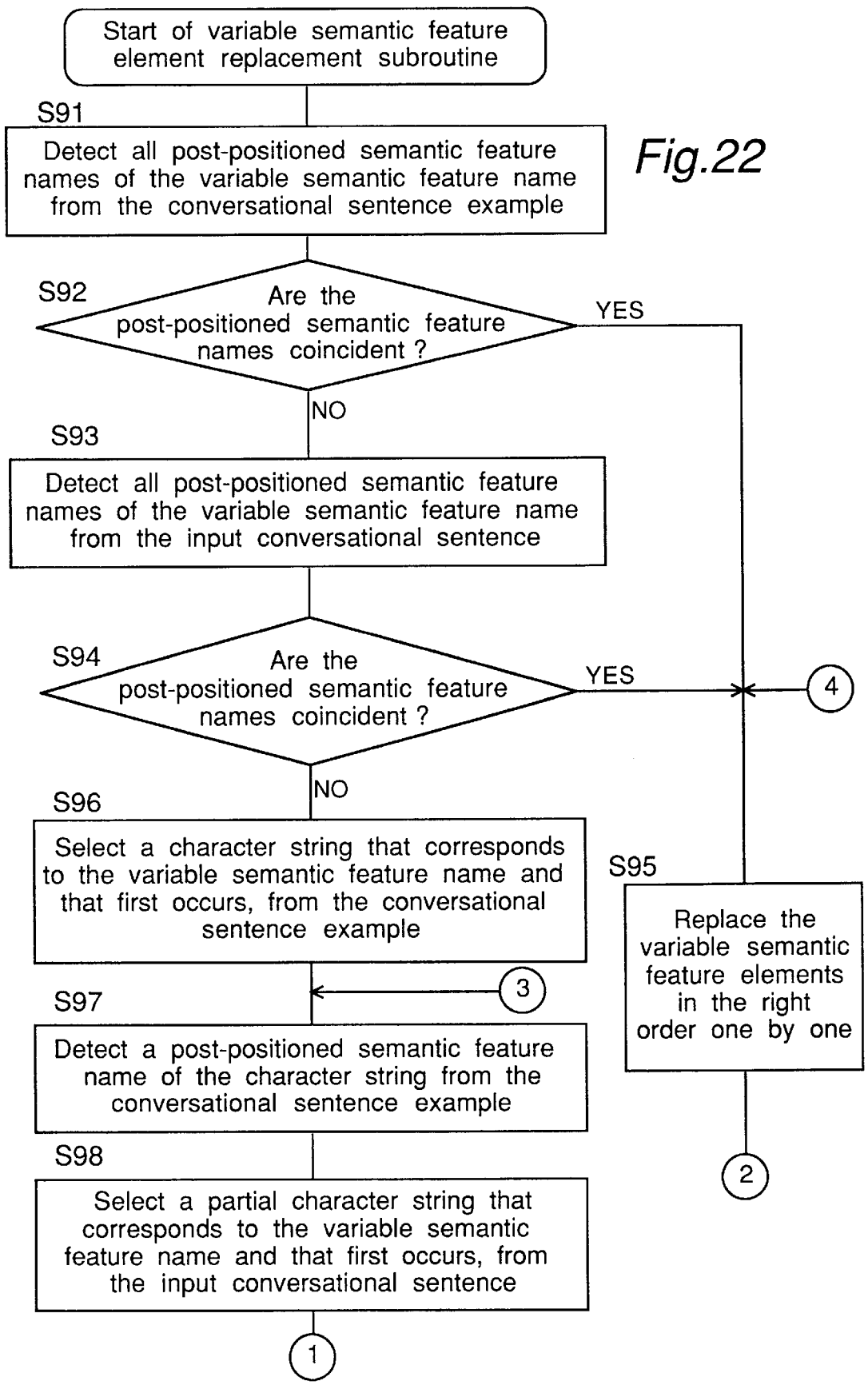
FIGS. 22 and 23 are flow charts of a variable semantic feature element replacement subroutine other than those of FIGS. 20 and 21.
Figure 23A:
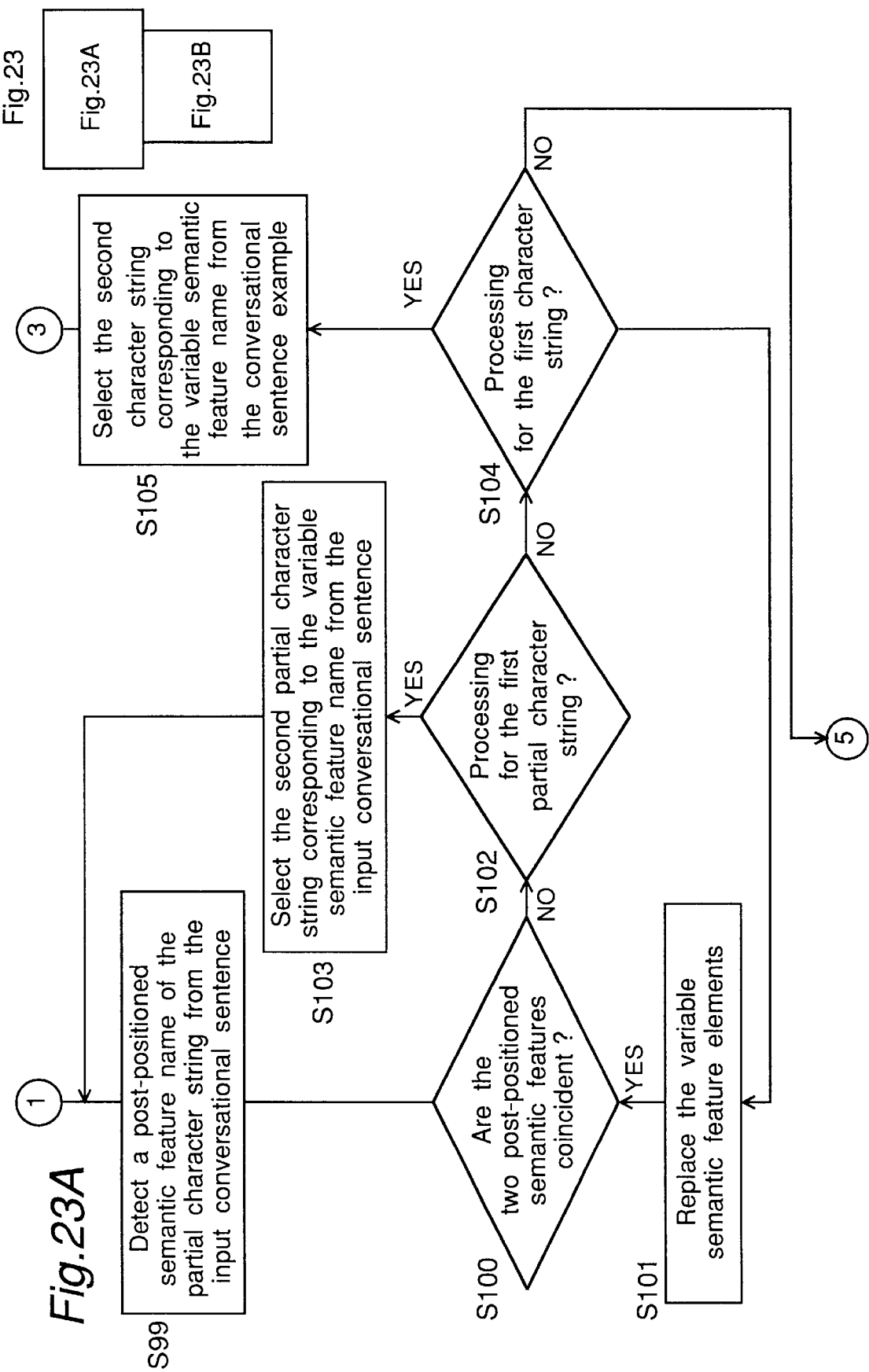

Then, if it is decided, at step S59 in the flow chart of conversational sentence translating operation shown in FIG. 16, that a variable semantic feature name is present in the semantic feature string of the selected conversational sentence example, then the variable semantic feature element replacement subroutine as shown in FIGS. 22 and 23 is started.

At step S91, with reference to the semantic feature string of the selected conversational sentence example stored in the work memory 35, all the post-positioned semantic feature names of the pertinent variable semantic feature name are detected.

In the present example, semantic feature names "KARA" and "MADE" are detected.

At step S92, it is decided whether or not the post-positioned semantic feature names detected at step S91 are coincident with each other. As a result, if they are, the program goes to step S95, and if not, goes to step S93.

In the present example, since the post-positioned semantic feature names "KARA" and "MADE" are not coincident with each other, the program goes to step S93.

At step S93, with reference to the detected variable and invariable semantic features of the input sentence (see FIG. 24), all the post-positioned semantic feature names of the pertinent variable semantic feature name in the input sentence are detected.

In the present example, semantic feature names "MADE" and "KARA" are detected.

At step S94, it is decided whether or not the post-positioned semantic feature names detected at step S93 are coincident with each other. As a result, if they are, the program goes to step S95, and if not it goes to step S96.

In the present example, since the post-positioned semantic feature names "MADE" and "KARA" are not coincident with each other, the program goes to step S96.

At step S95, all the character strings corresponding to the variable semantic feature name in the selected conversational sentence example are replaced one after another with the partial character strings corresponding to the variable semantic feature name in the input conversational sentence. Then, a newly generated conversational sentence example is stored in the work memory 35.

After that, the variable semantic feature element replacement subroutine is ended, where the program returns to step S61 in the flow chart of the conversational sentence translating operation as shown in FIG. 16.

At step S96, from the first-language sentence of the selected conversational sentence example, a character string that first occurs out of the character strings corresponding to the variable semantic feature name is selected.

In the present example, the character string "nyuyoku" is selected.

At step S97, with reference to the semantic feature string of the selected conversational sentence example, a post-positioned semantic feature name of the character string selected at step S96 is detected.

In the present example, the semantic feature name "KARA" is detected.

At step S98, a partial character string that first occurs out of the partial character strings corresponding to the variable semantic feature name is selected from the detected variable and invariable semantic features of the input sentence (see FIG. 24).

In the present example, the partial character string "okkusufodo" is detected.

At step S99, with reference to the detected variable and invariable semantic features (see FIG. 24), a post-positioned semantic feature name of the partial character string selected at step S98 is detected.

In the present example, the semantic feature name "MADE" is detected.

At step S100, it is decided whether or not the detected two post-positioned semantic feature names are coincident with each other. As a result, if they are, the program goes to step S101, and if not, the program goes to step S102.

In the present example, the post-positioned semantic feature name "KARA" detected at step S97 and the post-positioned semantic feature name "MADE" detected at step S99 are not coincident with each other. Therefore, the program goes to step S102.

When the two post-positioned semantic feature names are coincident with each other, the character string selected from the first-language sentence of the conversational sentence example is permitted to be replaced with the partial character string selected from the input conversational sentence. Accordingly, at step S101, the character string of the conversational sentence example is replaced with the pertinent partial character string of the input conversational sentence. Then, a newly generated conversational sentence example is stored in the work memory 35.

Further, the occurrence order number of the variable semantic feature name, is stored in the work memory 35. Besides, the variable semantic feature information on the partial character string that has replaced the corresponding character string in the first-language sentence is deleted from the work memory 35 storing the detected variable and invariable semantic features (see FIG. 24).

Then, the program goes to step S104.

At step S102, it is decided whether or not the coincidence decision process carried out at step S100 is a process for the first partial character string corresponding to the variable semantic feature name in the input conversational sentence. As a result, if it is for the first partial character string, the program goes to step S103, and if not, the program goes to step S104.

In the present example, the partial character string "okkusufodo" selected at step S98 is a partial character string that first occurs among the partial character strings corresponding to the variable semantic feature name { CHIMEI} in the input conversational sentence. Therefore, the program goes to step S103.

At step S103, the second-occurrence partial character string corresponding to the variable semantic feature name is selected from the detected variable and invariable semantic features of the input sentence (see FIG. 24). After that, the program turns back to step S99, starting the processing to the post-positioned semantic feature name of the second partial character string detected at the present step in the input conversational sentence, and the post-positioned semantic feature name of the first character string corresponding to the variable semantic feature name in the conversational sentence example. If the two post-positioned semantic feature names are coincident with each other at step S100, then the aforementioned process of replacing the variable semantic feature element is carried out at step S101.

In the present example, the second partial character string "rondon" of the input conversational sentence is selected, and the post-positioned semantic feature name "KARA" of the partial character string "rondon" is coincident with the post-positioned semantic feature name "KARA" of the first character string "nyuyoku" detected from the conversational sentence example 2. Accordingly, the character string "nyuyoku" of the first-language sentence, "{nyuyoku} KARA {shikago} MADE IKURA DESUKA.", of the conversational sentence example 2 is replaced with the character string "rondon", whereby a new first-language sentence "{rondon} KARA {shikago} MADE IKURA DESUKA." is generated. Further, the character string "New York" in the second-language sentence, "How much is it from {New York}$1$ to {Chicago}$2$?", of the conversational sentence example 2 is replaced with the translated variable semantic feature expression "London", so that a new second-language sentence, "How much is it from {London}$1$ to {Chicago}$2$?", is generated. Further, the occurrence order number 1 of the character string "nyuyoku" that has been replaced in the first-language sentence of the conversational sentence example 2 is stored in the work memory 35. Besides, the variable semantic feature information on the substitute partial character string "rondon" is deleted from the work memory 35.

At step S104, it is decided whether or not the process carried out up to step S103 is a process for the first character string corresponding to the variable semantic feature name in the conversational sentence example. As a result, if it is for the first character string, the program goes to step S105, and if not, goes to step S106.

In the present example, the character string "nyuyoku" selected at step S96 is a character string that corresponds to the variable semantic feature name {CHIMEI} and first occurs in the conversational sentence example. Therefore, the program goes to step S105.

At step S105, a second-occurrence character string that corresponds to the variable semantic feature name is selected from the first-language sentence of the conversational sentence example. After that, the program turns back to step S97, starting the processing to the post-positioned semantic feature name of the second character string in the conversational sentence example, and the post-positioned semantic feature name of the first partial character string corresponding to the variable semantic feature name in the input conversational sentence. If the two post-positioned semantic feature names are coincident with each other at step S100, then the aforementioned process of replacing the variable semantic feature element is carried out at step S101.

In the present example, the second character string "shikago" of the newly generated conversational sentence example is selected, and the post-positioned semantic feature name "MADE" of the character string "shikago" is coincident with the post-positioned semantic feature name "MADE" of the first partial character string "okkusufodo" detected from the input conversational sentence. Therefore, the character string "shikago" in the newly generated first-language sentence, "{rondon} KARA {shikago} MADE IKURA DESUKA.", of the conversational sentence example is replaced with the character string "okkusufodo", so that once more a new first-language sentence, "{rondon} KARA {okkusufodo} MADE IKURA DESUKA." is generated. Further, the character string "Chicago" of the newly generated second-language sentence, "How much is it from {London}$1$ to {Chicago}$2$?", is replaced with the translated variable semantic feature expression "Oxford", so that once more a new second-language sentence, "How much is it from {London}$1$ to {Oxford}$2$?", is generated. Further, the occurrence order number "2" of the replaced character string "shikago" in the first-language sentence of the conversational sentence example 2 is stored in the work memory 35. Besides, the variable semantic feature information on the substitute partial character string "okkusufodo" is deleted from the work memory 35.

In this way, the processing to the second partial character string corresponding to the variable semantic feature name in the input conversational sentence as well as to the second character string corresponding to the variable semantic feature name in the conversational sentence example is ended, and the program goes to step S106.

At step S106, it is decided how many variable semantic features have been replaced. As a result, if zero variable semantic features have been replaced, there are no more variable semantic features that correspond to the pertinent variable semantic feature name and that have the same post-positioned semantic feature name, in the input conversational sentence and the conversational sentence example. Therefore, the program turns back to step S95, where all the character strings corresponding to the variable semantic feature names are replaced one after another. If two such variable semantic features have been replaced, the variable semantic feature element replacement subroutine is ended. If one such variable semantic feature has been replaced, the program goes to step S107.

In the above process, the number of variable semantic features that have already been replaced is determined in the following way. Each time a variable semantic feature element is replaced at step S101, the occurrence order number of the replaced character string in the first-language sentence of the conversational sentence example is stored in the work memory 35. Therefore, if the occurrence order number stored in the work memory 35 is either "1" or "2", then the number of variable semantic features that have been already replaced is determined to be 1. If both occurrence order numbers "1" and "2" are stored, then the number, of variable semantic features is determined to be 2. If no occurrence order number has been stored, the number of such variable semantic features is determined to be 0.

In the present example, since the two variable semantic features, "nyuyoku" and "shikago", have already been replaced, the variable semantic feature element replacement subroutine is ended, and the program returns to step S61 in the flow chart of conversational sentence translating operation shown in FIG. 16.

At step S107, with reference to the occurrence order number stored in the work memory 35, an unreplaced variable semantic feature in the conversational sentence example is selected.

At step S108, out of the semantic features and variable semantic features stored in the work memory 35, the remaining variable semantic feature information is selected.

At step S109, the character string corresponding to the variable semantic feature in the first-language sentence of the conversational sentence example selected at step S107 is replaced with the partial character string of the variable semantic feature information selected at step S108. Further, the corresponding character string in the second-language sentence of the conversational sentence example is replaced with the translated variable semantic feature expression of the selected variable semantic feature information.

After that, the variable semantic feature element replacement subroutine is ended, and the program returns to step S61 in the flow chart of conversational sentence translating operation shown in FIG. 16.

The present example has been described on a case where two variable semantic features having the same variable semantic feature name are present in the input conversational sentence and the conversational sentence example. However, also in the case where three or more such variable semantic features are present, the variable semantic feature element replacement subroutine can be carried out by similar processing.

In the examples described above, whether or not a pertinent character string in the conversational sentence example should be replaced is decided depending on the coincidence between a post-positioned semantic feature of a partial character string corresponding to the variable semantic feature name in the input conversational sentence and a post-positioned semantic feature of a character string corresponding to the variable semantic feature name in the conversational sentence example.

Next, another example of the variable semantic feature element replacement subroutine is explained.

The variable semantic feature element replacement subroutine in the present example is intended to be used in the case where a flag is annexed to a conversational sentence example registered in the bilingual database 37 of the ROM 36 and judgement as to whether or not a character string in the conversational sentence example should be replaced is effected based on this flag.

In the present example, the following flag is added to every conversational sentence example which has a plurality of variable semantic features having the same variable semantic feature name out of the conversational sentence examples stored in the bilingual database 37 of the ROM 36:

Conversational sentence example 3:
twinslot(last)
{nyuyoku} KARA {shikago} MADE <u>IKURA DESUKA</u>.
How much is it from {New York}$1$ to {Chicago}$2$?
{<u>CHIMEI</u>} KARA {<u>CHIMEI</u>} MADE <u>IKURA DESUKA</u>

In this case, the flag, twinslot, is described on the first line. This flag, twinslot, is described in the form of "twinslot (position)" to specify a position for the variable semantic feature name of a character string that becomes an object of replacement in the conversational sentence example when only one character string corresponding to the variable semantic feature name is present in the input conversational sentence. The position "(last)" in the flag "twinslot(last)" added to the conversational sentence example 3 specifies that the last-positioned variable semantic feature out of the variable semantic features corresponding to the variable semantic feature name in the conversational sentence example 3 should be replaced. That is, the character strings "shikago" and "Chicago" are replaced in the case of the conversational sentence example 3. The position of a character string that becomes an object of replacement may be set to another position "(first)", which specifies that the first-positioned variable semantic feature out of the corresponding variable semantic features should be replaced, or to still another position "(occurrence order number)", which specifies that the nth variable semantic feature should be replaced.

In the present example, it matters which should be replaced out of a plurality of character strings that are present in a selected conversational sentence example and that correspond to the same variable semantic feature name. Thus, the preparation of partial character strings by the analyzer 40 as well as the search for semantic features and the selection of a conversational sentence example by the semantic searcher 41 are carried out according to the flow chart of conversational sentence translating operation shown in FIG. 16. Further, the variable semantic feature element replacement by the feature element replacer 42 is carried out by a variable semantic feature element replacement subroutine shown in FIG. 25.

Figure 25:
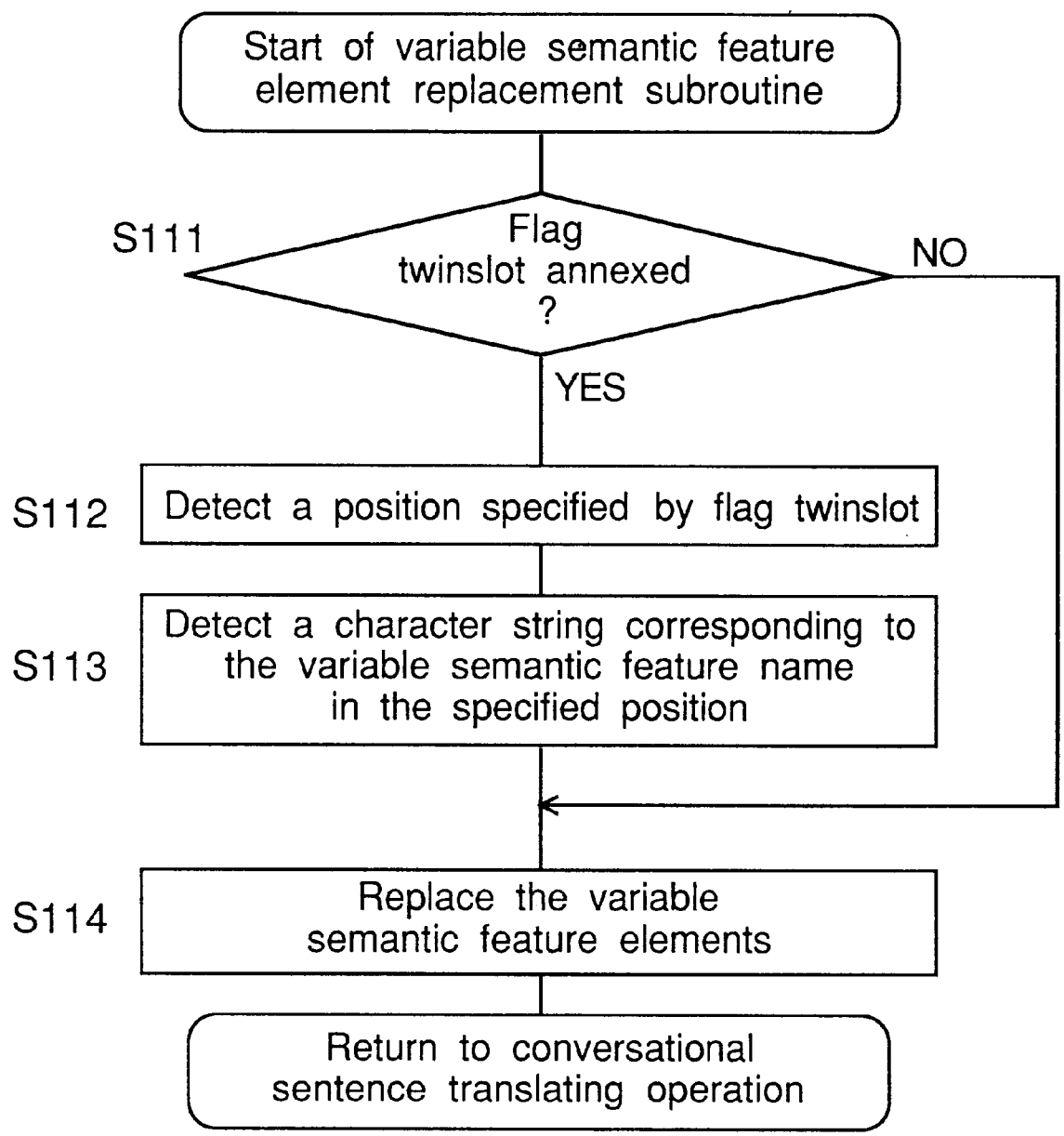
FIG. 25 is a flow chart of still another variable semantic feature element replacement subroutine.

Now the variable semantic feature element replacement subroutine shown in FIG. 25 is explained below.

In this case, it is assumed that the input conversational sentence is "rondon MADE IKURA DESUKA." It is also assumed that steps S51 to S59 in the flow chart of conversational sentence translating operation shown in FIG. 16 have been executed, by which semantic features including variable and invariable semantic features have been found as shown in FIG. 18 and conversational sentence example 3 has been selected.

At step S111, it is decided whether or not the flag twinslot has been annexed to the selected conversational sentence example stored in the work memory 35. If it has, the program goes to step S112, and if not, the program goes to step S114.

In the present example, since the flag twinslot has been annexed to the selected conversational sentence example 3, the program goes to step S112.

At step S112, the position specified by the flag twinslot annexed to the selected conversational sentence example is detected, and the detected specified position is stored in the work memory 35.

In the present example, since the added flag twinslot is a "twinslot(last)", a specified position "(last)" is detected.

At step S113, a character string corresponding to the variable semantic feature name present at the specified position detected at step S112 is detected from the conversational sentence example. Then, the occurrence order number of the detected character string with respect to the variable semantic feature name in the first-language sentence of the conversational sentence example is stored in the work memory 35.

In the present example, since the specified position "(last)" has been detected at step S112, the last-positioned character string "shikago" that corresponds to the variable semantic feature name {<u>CHIMEI</u>} in the first-language sentence of the conversational sentence example 3 is detected. Then, the occurrence order number "2" of the character string "shikago" of the variable semantic feature name {<u>CHIMEI</u>} is stored in the work memory 35.

At step S114, the character string detected at step S113 in the selected conversational sentence example is replaced with the partial character string corresponding to the variable semantic feature name in the input conversational sentence, and a new conversational sentence example obtained is stored in the work memory 35. After that, the variable semantic feature element replacement subroutine is ended, and the program returns to step S61 in the flow chart of conversational sentence translating operation shown in FIG. 16.

In the present example, the character string "shikago" in the first-language sentence of the conversational sentence example 3 is replaced with a partial character string {rondon} corresponding to the variable semantic feature name {<u>CHIMEI</u>} in the input sentence, by which a new first-language sentence, "{nyuyoku} KARA {rondon} MADE <u>IKURA DESUKA</u>.", is generated. Further, the character string "Chicago" in the second-language sentence of the conversational sentence example 3 is replaced with the translated variable semantic feature expression "London" of the partial character string "rondon", by which a new second-language sentence, "How much is it from {New York}$1$ to {London}$2$?", is generated.

The above describes an example in which an input conversational sentence has a single character string corresponding to the same variable semantic feature name. However, even with an input conversational sentence which has a plurality of the same variable semantic feature name character strings, replacement can be properly achieved through the similar processing. In such a case, however, a replacement position for the input conversational sentence as well as a replacement position for the conversational sentence example should be specified by describing the specified position in the flag twinslot, for example, as "(last, last)".

The above-described examples have been presented for the variable semantic feature element replacement subroutine to be executed at step S60 in the flow chart of conversational sentence translating operation shown in FIG. 16.

The following describes a conversational sentence example display subroutine to be executed at step S62 in the flow chart of conversational sentence translating operation shown in FIG. 16.

The conversational sentence example display subroutine in the present example is a subroutine for specifying a replacement process directed to an unreplaced variable semantic feature under the conditions that a plurality of variable semantic features having the same variable semantic feature name are present in the selected conversational sentence example. Only part of the variable semantic features have been replaced as a result of executing the foregoing variable semantic feature element replacement subroutine.

In the present example, a flag is annexed as shown below to conversational sentence examples which each have a plurality of variable semantic features having the same variable semantic feature name, out of the conversational sentence examples stored in the bilingual database 37 of the ROM 36:

Conversational sentence example 4:
slotdiff(diff)
{nyuyoku} KARA {shikago} MADE IKURA DESUKA.
How much is it from {New York}$1$ to {Chicago}$2$?
{CHIMEI} KARA {CHIMEI} MADE IKURA DESUKA In this case, the flag, slotdiff, is described on the first line. This flag, slotdiff, is described in the form of "slotdiff (replacement method)" to specify a replacement method for an unreplaced variable semantic feature out of a plurality of variable semantic features having the same variable semantic feature name in the conversational sentence example. The replacement method "(diff)" in the flag "slotdiff(diff)" added to the conversational sentence example 4 indicates that an unreplaced character string in the first-language and second-language sentences of the conversational sentence example 4 is replaced with a partial character string other than the replacement-processed partial character strings. That is, in the case of the conversational sentence example 4, when the character string "shikago" for the occurrence order number "2" of the first-language sentence, "{nyuyoku} KARA {shikago} MADE IKURA DESUKA.", is replaced with the partial character string "nyuyoku", a new first-language sentence, "{nyuyoku} KARA {nyuyoku} MADE IKURA DESUKA.", is generated. Accordingly, by specifying the replacement method "(diff)", the first-positioned unreplaced character string "nyuyoku" is replaced with a partial character string other than the partial character string "nyuyoku" that has been used for the preceding replacement.

In addition to the replacement method "diff", it is possible to use a replacement method "big", which specifies a partial character string having an ASCII code number greater than the partial character string that has been used for the preceding replacement, or a replacement method "small", which specifies a partial character string having a smaller ASCII code number.

In the present example, it matters how an unreplaced variable semantic feature should be replaced after the variable semantic feature element replacement subroutine is executed. Thus, the CPU 31 in FIG. 14 comprises, in addition to the analyzer 40, the semantic searcher 41, the feature element replacer 42, and the controller 43, a flag discriminator for discriminating whether or not the flag, slotdiff, has been annexed, a replacement method detector for detecting the replacement method "(diff)" by decoding the flag slotdiff, and a variable semantic feature dictionary searcher for searching the variable semantic feature dictionary 39 to obtain a variable semantic feature entry name other than the variable semantic feature entry name used for the preceding replacement, as well as its translated variable semantic feature expression.

The preparation of partial character strings by the analyzer 40, and the search for semantic features and the selection of a conversational sentence example by the semantic searcher 41 are carried out according to the flow chart of conversational sentence translating operation shown in FIG. 16. Further, the variable semantic feature element replacement by the feature element replacer 42 is carried out by the variable semantic feature element replacement subroutine as shown in FIG. 20 or FIG. 25. After that, a conversational sentence example display subroutine as shown in FIG. 26 is carried out by the flag discriminator, the semantic searcher 41, the replacement method detector, the variable semantic feature dictionary searcher, the feature element replacer 42, and the display driver 33.

Figure 26:
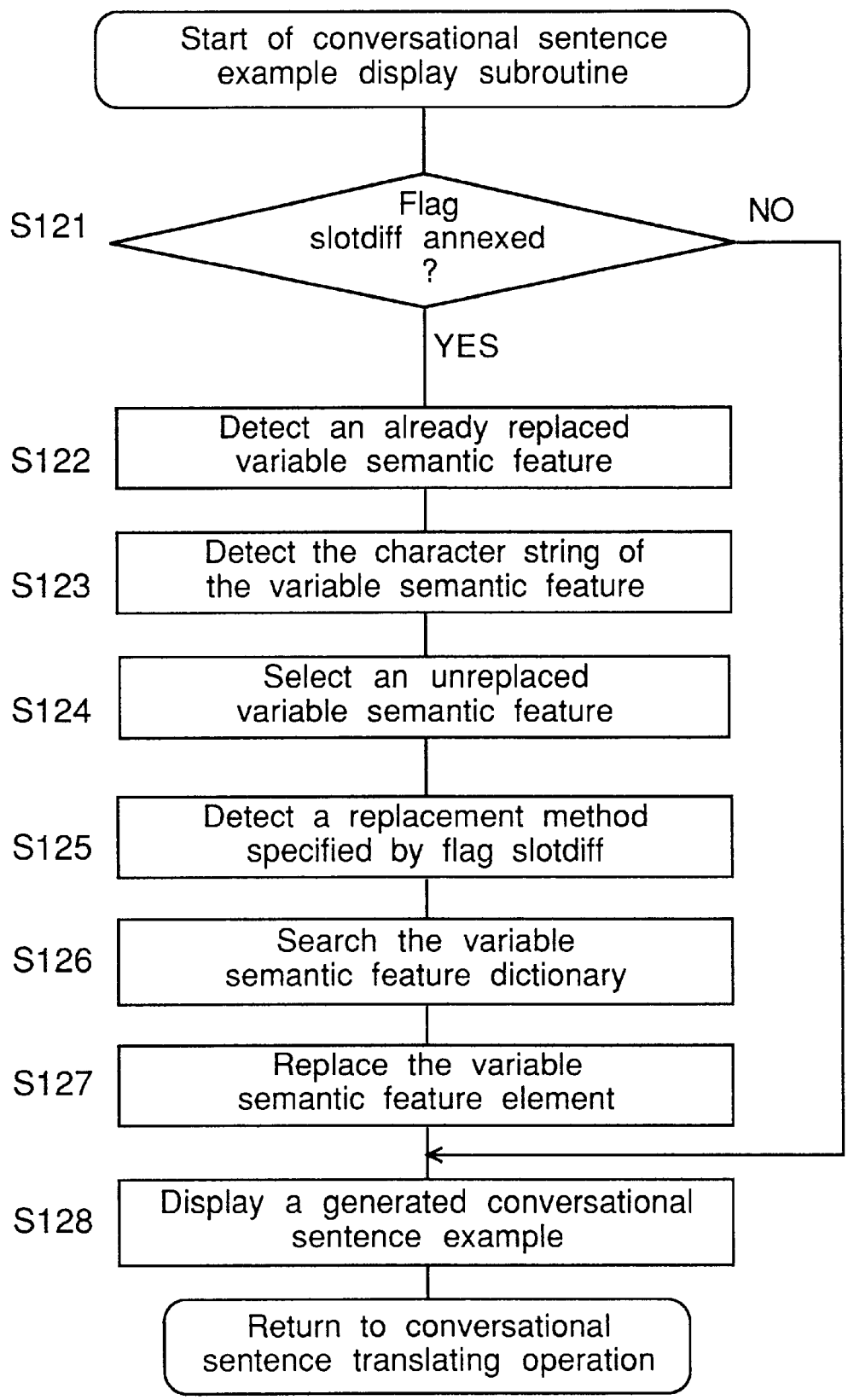
FIG. 26 is a flow chart of a conversational sentence example display subroutine to be executed in the conversational sentence translating operation shown in FIG. 16.

Now the conversational sentence example display subroutine as shown in FIG. 26 is explained below.

In this case, it is assumed that the input conversational sentence is "nyuyoku MADE IKURA DESUKA.". It is also assumed that steps S51 to S59 in the flow chart of conversational sentence translating operation as shown in FIG. 16 have been executed, by which variable and invariable semantic features have been found and a conversational sentence example 4 has been selected. Besides, it is assumed that the variable semantic feature element replacement subroutine has been executed at step S60, by which a plurality of character strings corresponding to the variable semantic feature name have been replaced. In addition, the variable semantic feature element replacement subroutine adopted here may be either the variable semantic feature element replacement subroutine as shown in FIG. 20 or the variable semantic feature element replacement subroutine as shown in FIG. 25.

In the present example, assuming that the variable semantic feature element replacement subroutine as shown in FIG. 20 has been executed, the second character string "shikago" out of two character strings corresponding to the variable semantic feature name {CHIMEI} of the conversational sentence example 4, as well as its translation "Chicago", are replaced with partial character strings "nyuyoku" and "New York", respectively, by which a new conversational sentence example as shown below is generated:

Conversational sentence example 4:
slotdiff(diff)
{nyuyoku} KARA {nyuyoku} MADE IKURA DESUKA.
How much is it from {New York}$1$ to {New York}$2$?
{CHIMEI} KARA {CHIMEI} MADE IKURA DESUKA In the work memory 35, the occurrence order number "21" is stored because the second character string corresponding to the variable semantic feature name {CHIMEI} in the selected. conversational sentence example 4 has been replaced.

When a conversational sentence example display screen is set at step S61 in the flow chart of conversational sentence translating operation as shown in FIG. 16, the conversational sentence example display subroutine is started.

At step S121, it is decided by the flag discriminator whether or not the flag, slotdiff, has been annexed to the conversational sentence example newly generated in the variable semantic feature element replacement subroutine and stored in the work memory 35. As a result, if it has, the program goes to step S122, and if not, goes to step S128.

At step S122, with reference to the occurrence order number on a replacement-processed variable semantic feature, which is stored in the work memory 35, the semantic searcher 41 detects the replacement-processed variable semantic feature in the newly generated conversational sentence example (hereinafter, referred to as a generated conversational sentence example).

In the present example, the occurrence order number "2" is stored in the work memory 35. Therefore, the variable semantic feature that is positioned at the second place with respect to the variable semantic feature name {CHIMEI} in the generated conversational sentence example 4' is detected as the target replacement-processed variable semantic feature.

At step S123, based on the detection result obtained at step S122, a replacement-processed character string is detected by the semantic searcher 41 from the first-language sentence of the generated conversational sentence example stored in the work memory 35. Then, the detected character string is stored in the work memory 35.

In the present example, it is known that a variable semantic feature that is the second positioned with respect to the variable semantic feature name {CHIMEI} is the replacement-processed variable semantic feature. Therefore, a character string "nyuyoku" that occurs in the second place with respect to the variable semantic feature name {CHIMEI} in the first-language sentence of the generated conversational sentence example 4' is detected.

At step S124, with reference to the occurrence order number on the replacement-processed variable semantic feature, which is stored in the work memory 35, the is semantic searcher 41 detects an unreplaced variable semantic feature in the generated conversational sentence example.

In the present example, the occurrence order number "2" is stored in the work memory 35. Therefore, a variable semantic feature that is the first with respect to the variable semantic feature name {CHIMEI} in the generated conversational sentence example 4' is detected as the target unreplaced variable semantic feature.

At step S125, the replacement method specified by the flag, slotdiff, annexed to the generated conversational sentence example is detected by the semantic searcher 41, and stored in the work memory 35.

In the present example, since the flag, slotdiff, added to the generated conversational sentence example 4' is "slotdiff (diff)", the replacement method "(diff)" is stored in the work memory 35.

[0190]

At step S126, the above content of the replacement method is detected by the replacement method detector. Based on the detected replacement method, and with the pertinent variable semantic feature name taken as the key, the variable semantic feature dictionary 39 of the ROM 36 is searched by the variable semantic feature dictionary searcher for a variable semantic feature other than the variable semantic feature whose variable semantic feature expression is a character string of the replacement-processed variable semantic feature found at step S123. Then, a variable semantic feature entry name and a translated variable semantic feature expression of the now detected variable semantic feature are selected and stored in the work memory 35.

In the present example, since the replacement method of the flag slotdiff is "(diff)", the search of the variable semantic feature dictionary is carried out in the following way. With the variable semantic feature name {CHIMEI} taken as the key, the variable semantic feature entry name "shikago" and its translated variable semantic feature expression "Chicago", which is registered next to the character string "nyuyoku" of the already replacement-processed variable semantic feature, are selected from the variable semantic feature dictionary 39.

As previously described, the variable semantic feature dictionary 39 has the following variable semantic feature information registered therein:

| Variable semantic feature name Variable semantic feature entry name Variable semantic feature expression [CHIMEI] | Translated variable semantic feature expression |
|---|---|
| nyuyoku nyuyoku | New York |
| shikago shikago | Chicago |
| rondon rondon | London |
| okkusufodo okkusufodo | Oxford |

At step S127, the character strings of the unreplaced variable semantic feature corresponding to the pertinent variable semantic feature name in the generated conversational sentence example are replaced with the variable semantic feature entry name and translated variable semantic feature expression of the variable semantic feature selected at step S126 by the feature element replacer 42. A new conversational sentence example thus generated is stored in the work memory 35.

In the present example, the unreplaced character strings "nyuyoku" and "New York" corresponding to the variable semantic feature name {CHIMEI} in the previously generated conversational sentence example 4' are replaced with the selected variable semantic feature entry name "shikago" and its translated variable semantic feature expression "Chicago", respectively. Thus, the following new conversational sentence example is generated.

Conversational sentence example:

slotdiff (diff)

{shikago} KARA {nyuyoku} MADE IKURA DESUKA.

How much is it from {Chicago}$1$ to {New York}$2$?

{CHIMEI} KARA {CHIMEI} MADE IKURA DESUKA

At step S128, the display tablet 32 is driven by the display driver 33 so that the first-language and second-language sentences of the newly generated conversational sentence example stored in the work memory 35 are read out and displayed on the display screen 46.

In the present example, the following newly generated first-language and second-language sentences:

{shikago} KARA {nyuyoku} MADE IKURA DESUKA.

How much is it from {Chicago} to {New York}?

are displayed.

After that, the conversational sentence example display subroutine and the conversational sentence example translating operation are ended.

It is noted that if both the flag, slotdiff, in this example and the flag, twinslot, in the preceding example are used at the same time, the variable semantic feature element replacement process is carried out with the replacement position, and the replacement method for an unreplaced variable semantic feature specified.

Next, another example of the conversational sentence example display subroutine is explained below.

The conversational sentence example display subroutine in the present example is a subroutine specifying a replacement process directed to an unreplaced variable semantic feature under the conditions that the selected conversational sentence example has variable semantic features whose variable semantic feature entry names are relating to each other, and that only part of the plurality of variable semantic features have been replaced as a result of executing the foregoing variable semantic feature element replacement subroutine.

In the present example, a flag is annexed as shown below to conversational sentence examples that have variable semantic features whose variable semantic feature entry names are relating to each other or one another, out of all the conversational sentence examples stored in the bilingual database 37 of the ROM 36.

Conversational sentence example 5:

slotno[(station, train) (station, subway)]

{EKI} HE IKU {basu} HA ARIMASUKA.

Is there {bus}$2$ to {the station}$1$?

{BASHO} IKU {KOTSUKIKAN} ARIMASUKA

In this case, the flag, slotno, is described on the first line. This flag, slotno, is described in the form of "slotno [(variable semantic feature entry name, variable semantic feature entry name). . . ]". In the parentheses "( )" of the flag slotno, a variable semantic feature entry name that is of a first variable semantic feature name and a variable semantic feature entry name that is of a second variable semantic feature name and that relates to the first variable semantic feature entry name are described in succession with a comma "," interposed therebetween.

This flag, slotno, is used to specify a reforming method for reforming a generated conversational sentence example immediately before its display, for example by compulsively replacing unreplaced character strings in the generated conversational sentence example in which character strings corresponding to a plurality of variable semantic feature names in the conversational sentence example have been replaced according to the combination of variable semantic feature names in the semantic feature string.

In the case of the conversational sentence example 5, as a result of executing the aforementioned variable semantic feature element replacement subroutine, if the character string "basu" (meaning "bus") corresponding to the variable semantic feature name "KOTSUKIKAN" (meaning "means of transportation") in the first-language sentence of the conversational sentence example 5 is replaced with "DENSHA" meaning "train" or "CHIKATETSU" meaning "subway" as follows, "{EKI} HE IKU {DENSHA} HA ARIMASUKA."or

"{EKI} HE IKU {CHIKATETSU} HA ARIMASUKA.", then, the result is an odd expression in Japanese. Thus, in the present example, such a measure as compulsively replacing the unreplaced character string "EKI" or no displaying the generated conversational sentence example as a translation result is taken, instead of displaying the first-language and second-language sentences of the generated conversational sentence example as they are.

It is noted that when a plurality of parentheses "( )" are present in the flag slotno, there are a plurality of variable semantic feature entry names that become the target of this process.

Also in the present example, it matters how an unreplaced variable semantic feature should be replaced after the variable semantic feature element replacement subroutine is executed. Thus, the CPU 31 in FIG. 14 comprises, in addition to the analyzer 40, the semantic searcher 41, the feature element replacer 42, and the controller 43, a flag discriminator for discriminating whether or not the flag, slotno, has been added, an unreplaced character string detector for detecting a character string of an unreplaced variable semantic feature name designated by the flag slotno, and a variable semantic feature dictionary searcher for searching the variable semantic feature dictionary 39 to obtain a variable semantic feature entry name other than the character string of the unreplaced variable semantic feature entry name, as well as its translated variable semantic feature expression.

The preparation of partial character strings by the analyzer 40 as well as the search for semantic features and the selection of a conversational sentence example by the semantic searcher 41 are carried out according to the flow chart of conversational sentence translating operation shown in FIG. 16. Further, the variable semantic feature element replacement by the feature element replacer 42 is carried out by the variable semantic feature element replacement subroutine shown in FIG. 20 or the like. After that, a conversational sentence example display subroutine shown in FIG. 27 is carried out by the flag discriminator, the semantic searcher 41, the unreplaced character string detector, the variable semantic feature dictionary searcher, the feature element replacer 42, and the display driver 33.

Figure 27:
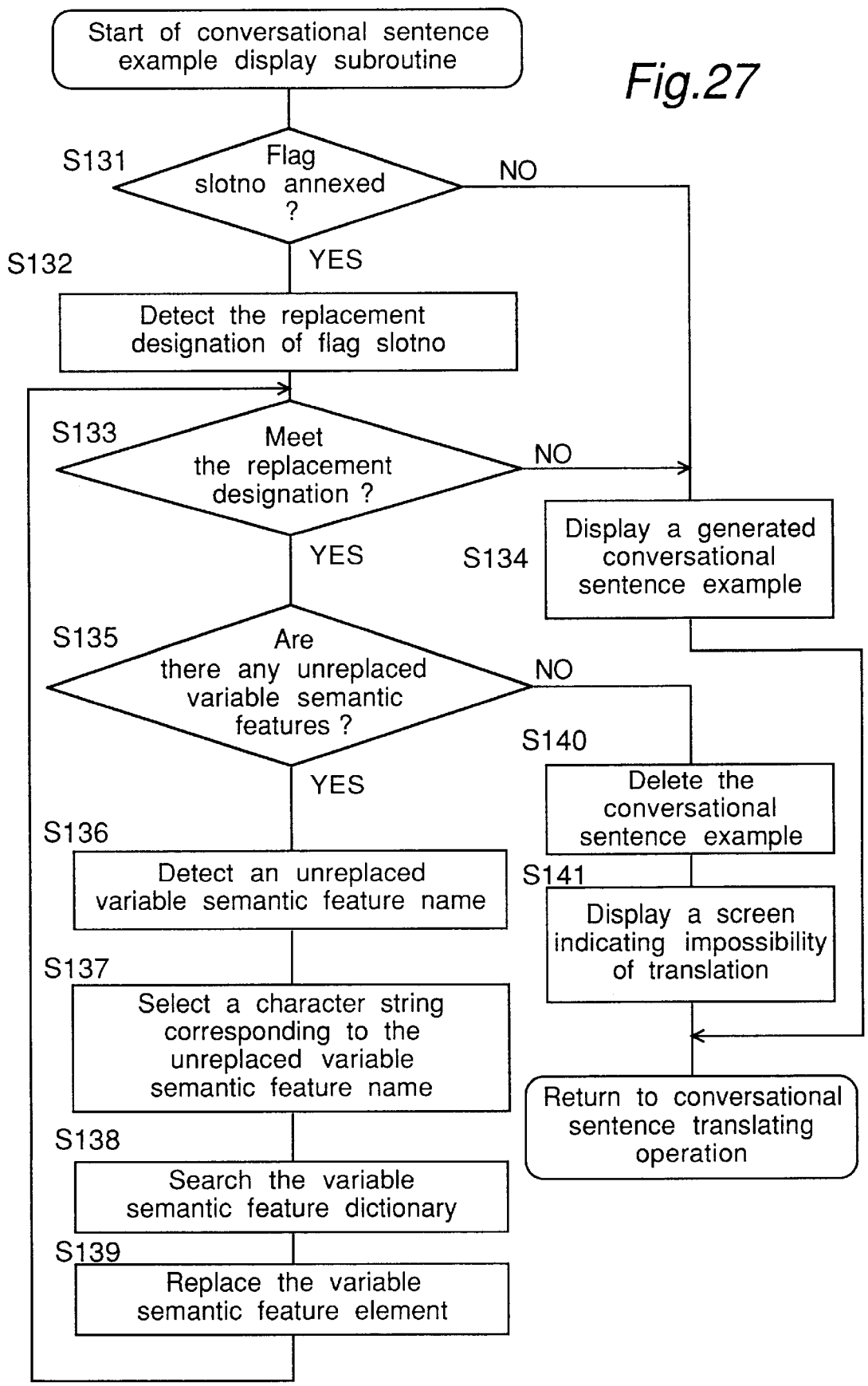
FIG. 27 is a flow chart of another conversational sentence example display subroutine.

Now the conversational sentence example display subroutine shown in FIG. 27 is explained below.

In this case, it is assumed that the input conversational sentence is "DAIEIHAKUBUTSUKAN HE IKU DENSHA HA ARIMASUKA." (which means "Is there a train to the British Museum?" in English). It is also assumed that the semantic feature dictionary 38 has the following semantic feature information registered therein, in addition to the aforementioned semantic feature information.

| Semantic feature name | Semantic feature expression |
|---|---|
| IKU | IKU |
| | IKU |
| ARIMASUKA | ARIMASUKA |
| | ARUDESHOKA |

It is also assumed that the variable semantic feature dictionary 39 has the following variable semantic feature information registered therein, in addition to the aforementioned variable semantic feature information:

| Variable semantic feature name | Variable semantic feature entry name | Variable semantic feature expression | Translated variable semantic feature expression |
|---|---|---|---|
| {KOTSUKIKAN} | | | |
| | DENSHA | | Train |
| | | DENSHA | |
| | | DENSHA | |
| {BASHO} | | | |
| | hoteru | | the hotel |
| | | hoteru | |
| | | YADO | |
| | EKI | | the station |
| | | EKI | |
| | | TEISHAJO | |
| | KUKO | | the airport |
| | | KUKO | |
| | | HIKOJO | |

Now assume that steps S51 to S59 in the flow chart of conversational sentence translating operation shown in FIG. 16 have been executed, that the input conversational sentence, "DAIEIHAKUBUTSUKAN HE IKU DENSHA HA ARIMASUKA" has been entered, that variable and invariable semantic features have been found as shown in FIG. 28, and that a conversational sentence example 5 has been selected. It is also assumed that no variable semantic features having a variable semantic feature expression of "DAIEIHAKUBUTSUKAN" have been registered in the variable semantic feature dictionary 39, so that the semantic feature "DAIEIHAKUBUTSUKAN" is not detected from the input conversational sentence.

Next, assume that the variable semantic feature element replacement subroutine has been executed at step S60, as a result of which the character string "basu" (which means "bus") corresponding to the variable semantic feature name "KOTSUKIKAN" (which means "means of transportation") in the first-language sentence of the selected conversational sentence example 5 has been replaced with the character string "DENSHAI" (which means "train") corresponding to the variable semantic feature name "KOTSUKIKAN" in the input conversational sentence, while the corresponding character string "bus" in the second-language sentence has been replaced with the translated variable semantic feature expression "train", so that the following conversational sentence example has been newly generated.

In this case, the occurrence order number "2" of the replaced character string "basu" in the first-language sentence with respect to the variable semantic feature name is stored in the work memory 35.

Generated conversational sentence example:
slotno[(EKI, DENSHA) (EKI, CHTKATETSU)]
{EKI} HE IKU {DENSHA} HA ARIMASUKA.
Is there {train}$2$ to {the station}$1$?
{BASHO} IKU {KOTSUKIKAN} ARIMASUKA When the conversational sentence example display screen is set at step S61 in the flow chart of conversational sentence translating operation shown in FIG. 16, the conversational sentence example display subroutine is started.

At step S131, it is decided by the flag discriminator whether or not the flag slotno has been annexed to the conversational sentence example newly generated in the variable semantic feature element replacement subroutine (i.e., generated conversational sentence example) and stored in the work memory 35. As a result, if it has, the program goes to step S132, and if not, goes to step S134.

In the present example, since the flag slotno has been annexed, the program goes to step S132.

At step S132, the replacement designation of the flag slotno (the description contents in the brackets "[ ]" in "slotno[(variable semantic feature entry name, variable semantic feature entry name). . . ]") is detected by the unreplaced character string detector, and stored in the work memory 35.

In the present example, a replacement designation [(EKI, DENSHA), (EKI, CHIKATETSU)] is detected.

At step S133, it is decided by the unreplaced character string detector whether or not a combination of character strings corresponding to different variable semantic feature names that occurs in the first-language and second-language sentences of the generated conversational sentence example corresponds to the combination of variable semantic feature entry names described in the replacement designation detected at step S132. As a result, if it does, the program goes to step S135, and if not, goes to step S134.

In the present example, the combination of character strings that appear in the generated conversational sentence example is "EKI, DENSHA", and the replacement designation by the flag slotno is "[(EKI, DENSHA), (EKI, CHIKATETSU)]". Because the combination in the generated conversational sentence example corresponds to the replacement designation, the program goes to step S135.

At step S134, the display and tablet 32 is driven by the display driver 33 so that the first-language and second-language sentences of the generated conversational sentence example stored in the work memory 35 are read out and displayed on the display screen 46.

At step S135, whether or not there are any unreplaced variable semantic features in the generated conversational sentence example stored in the work memory 35 is decided by the unreplaced character string detector in the following way. As a result, if there is, the program goes to step S136, and if not, goes to step S140.

The decision is made as follows. The occurrence order numbers of the variable semantic features replaced in the variable semantic feature element replacement subroutine are stored in the work memory 35. Accordingly, whether or not there is an unreplaced variable semantic feature is decided by deciding the coincidence between the number of variable semantic features present in the first-language sentence of the generated conversational sentence example and the number of occurrence order numbers stored in the work memory 35.

In the present example, the only one occurrence order number "2" is stored in the work memory 35. Meanwhile, the number of variable semantic features present in the generated conversational sentence example is two. This means that an unreplaced variable semantic feature is still present in the generated conversational sentence example. Therefore, the program goes to step S136.

At step S136, by referring to the number of occurrence order numbers stored in the work memory 35, the unreplaced character string detector detects the variable semantic feature name corresponding to the unreplaced variable semantic feature from the semantic feature string of the generated conversational sentence example.

In the present example, since the occurrence order number "2" is stored in the work memory 35, the first variable semantic feature name {BASHO} is detected.

At step S137, the unreplaced character string corresponding to the variable semantic feature name detected at step S136 is selected from the first-language sentence of the generated conversational sentence example by the unreplaced character string detector. Then, the selected character string is stored in the work memory 35.

In the present example, the unreplaced character string "EKI" corresponding to the variable semantic feature name "BASHO" is selected.

At step S138, by taking as the key the variable semantic feature name detected at step S136, the variable semantic feature dictionary 39 of the ROM 36 is searched by the variable semantic feature dictionary searcher for a variable semantic feature that is registered next to the variable semantic feature whose variable semantic feature expression is the unreplaced character string selected at step S137. A variable semantic feature entry name and translated variable semantic feature expression of the found variable semantic feature are selected and stored in the work memory 35.

In the present example, with the variable semantic feature name {BASHO} taken as the key, a variable semantic feature entry name "KUKO" and its translated variable semantic feature expression "the airport" of the variable semantic feature registered next to the unreplaced character string "EKI" are selected.

At step S139, the selected unreplaced character strings in the generated conversational sentence example are respectively replaced by the feature element replacer 42 with the variable semantic feature entry name and translated variable semantic feature expression of the variable semantic feature selected at step S138. A conversational sentence example generated once more in this way is stored in the work memory 35. In this process, the occurrence order number of the replaced character string is stored in the work memory 35.

In the present example, the character strings "EKI" and "the station" corresponding to the unreplaced variable semantic feature name {BASHO} in the generated conversational sentence example are replaced with the above selected variable semantic feature entry name "KUKO" and its translated variable semantic feature expression "the airport". Thus, the following new conversational sentence example is generated.

Conversational sentence example:
slotno[(EKI, DENSHA) (EKI, CHIKATETSU)]
{KUKO} HE IKU {DENSHA} HA ARIMASUKA.
Is there {train}$2$ to {the airport}$1$?
{BASHO} IKU {KOTSUKIKAN} ARIMASUKA Subsequently, the program returns to step S133, to carry out the process of detecting a combination of character strings corresponding to the replacement designation indicated by the flag slotno. If it is decided that no more combination of character strings corresponding to the replacement specification is present, then the first-language and second-language sentences of the new conversational sentence example stored in the work memory 35 are read out and displayed on the display screen 46 at step S134.

In the present example, the combination of character strings that occurs in the re-generated conversational sentence example is "KUKO, DENSHA", and the replacement designation indicated by the flag slotno is "[(EKI, DENSHA), (EKI, CHIKATETSU)]". Therefore, no more pertinent combination is present. So the program goes to step S134, where the following first-language and second-language sentences of the re-generated conversational sentence example stored in the work memory 35 are displayed.

{KUKO} HE IKU {DENSHA} HA ARIMASUKA.
Is there {train}$2$ to {the airport}$1$?

After that, the conversational sentence example display subroutine and hence the conversational sentence translating operation are ended.

If it is decided at step S135 that no unreplaced variable semantic feature is present, it cannot be decided which variable semantic feature should be compulsively replaced in a generated conversational sentence example or a conversational sentence example generated still once more from the generated conversational sentence example. Thus, it is considered that the input conversational sentence is improper, and the following process is carried out to display that the input conversational sentence is impossible to translate.

At step S140, the generated conversational sentence example or re-generated conversational sentence example stored in the work memory 35 is deleted by the semantic searcher 41.

At step S141, the display and tablet 32 is driven by the display driver 33, so that a message representing that the input conversational sentence is impossible to translate is displayed on the display screen 46, as shown in FIG. 17F. After that, the conversational sentence translating operation is ended.

The combination of two variable semantic feature entry names described in succession with a comma "," interposed therebetween in the parentheses "( )" of the flag slotno is not limited to the combinations of "(EKI, DENSHA)" and "(EKI, CHIKATETSU)". In short, it has only to be a combination of variable semantic feature entry names that correspond to different variable semantic feature names and that are relating to each other.

The algorithms of the conversational sentence translating operation, variable semantic feature element replacement subroutine, and conversational sentence example display subroutine in the foregoing examples are not limited to the flow charts of FIG. 16, FIGS. 20 to 23, and FIGS. 25 to 27.

As described above, in the present embodiment, when a variable semantic feature element replacement process is carried out by the feature element replacer 42, the post-positioned semantic feature name of a character string corresponding to the processing-target variable semantic feature name in a conversational sentence example selected by the semantic searcher 41 is detected, and also, the post-positioned semantic feature name of a partial character string corresponding to the variable semantic feature name in the input conversational sentence is detected. Then, if the two post-positioned semantic feature names are coincident with each other, the character string in the conversational sentence example is replaced with the partial character string in the input conversational sentence. Therefore, for example, when a plurality of variable semantic features having a variable semantic feature name of {CHIMEI} are present in at least one of the input conversational sentence and the conversational sentence example, and when one of such variable semantic features represents a "start point" and another represents an "arrival point", a character string representing a "start point" can be prevented from being replaced with a partial character string representing an "arrival point".

For instance, according to the present embodiment, when the input conversational sentence is "rondon KARA okkusufodo MADE IKURA DESUKA" (which means "How much is it from London to Oxford?"), and when the conversational sentence example is "{nyuyoku} MADE IKURA DESUKA" (which means "How much is it to New York?"), there can be eliminated such a possibility that the character string "nyuyoku" in the conversational sentence example is replaced with the partial character string "rondon" in the input conversational sentence with the result that an erroneous conversational sentence example "rondon MADE IKURA DESUKA." (which means "How much is it to London?") is generated.

When the input conversational sentence is "rondon MADE IKURA DESUKA" (which means "How much is it to London?"), and when the conversational sentence example is "{nyuyoku} KARA {shikago} MADE IKURA DESUKA." (which means "How much is it from New York to Chicago?"), there can be eliminated such a possibility that the character string "nyuyoku" in the conversational sentence example is replaced with the partial character string "rondon" in the input conversational sentence with the result that an erroneous conversational sentence example "rondon KARA shikago MADE IKURA DESUKA." (which means "How much is it from London to Chicago?") is generated.

When the input conversational sentence is "okkusufodo MADE rondon KARA IKURA DESUKA." (which means "How much is it from London to Oxford?"), and when the conversational sentence example is "{nyuyoku} KARA {shikago} MADE IKURA DESUKA" (which means "How much is it from New York to Chicago?"), there can be eliminated such a possibility that the character strings "nyuyoku" and "shikago" in the conversational sentence example are replaced with the partial character strings "okkusufodo" and "rondon" in the input conversational sentence, respectively, with the result that an erroneous conversational sentence example "okkusufodo KARA rondon MADE IKURA DESUKA." (which means "How much is it from Oxford to London?") is generated.

In the present embodiment, the flag twinslot that specifies the position of the character string of a variable semantic feature that can be a target of replacement in the conversational sentence example is added to every conversational sentence example in which a plurality of variable semantic features having the same variable semantic feature name are present. In the variable semantic feature element replacement process by the feature element replacer 42, if the flag twinslot has been added to a conversational sentence example selected by the semantic searcher 41, then the specified position described in the flag twinslot is decoded, and the character string corresponding to the variable semantic feature name present at the decoding-result position in the conversational sentence example is replaced with the partial character string corresponding to the pertinent variable semantic feature name in the input conversational sentence. Therefore, for example, when the conversational sentence example contains a plurality of variable semantic features whose variable semantic feature names are all { CHIMEI} and when one of them represents a "start point" and the other represents an "arrival point", the character string representing the "start point" is prevented from being replaced with the partial character string representing the "arrival point".

Accordingly, such erroneous conversational sentence examples as described above are prevented from being generated.

In the present embodiment, the flag slotdiff that specifies the replacement method for an unreplaced variable semantic feature out of the plurality of variable semantic features corresponding to the variable semantic feature name in the conversational sentence example is added to every conversational sentence example in which a plurality of variable semantic features having the same variable semantic feature name are present. In the conversational sentence example display process by the flag discriminator, the semantic searcher 41, the replacement method detector, the variable semantic feature dictionary searcher, the feature element replacer 42, and the display driver 33, if the flag slotdiff is annexed to a conversational sentence example that has been selected by the semantic searcher 41 and has undergone the variable semantic feature element replacement by the feature element replacer 42, then the replacement method described in the flag slotdiff is decoded, and the variable semantic feature dictionary 39 is searched based on the decoding result to obtain a variable semantic feature that corresponds to the pertinent variable semantic feature name and that is other than the replacement-processed variable semantic feature. Then, the unreplaced character string corresponding to the variable semantic feature name in the conversational sentence example is detected, and the unreplaced character string is replaced with the variable semantic feature entry name and translated variable semantic feature expression found through the search.

Therefore, the unreplaced character string corresponding to the variable semantic feature name in the conversational sentence example is prevented from resulting in the same character string as the replacement-processed character string corresponding to the variable semantic feature name as a result of the variable semantic feature element replacement process.

For instance, according to the present embodiment, when the input conversational sentence is "nyuyoku MADE IKURA DESUKA" and the conversational sentence example is "{nyuyoku} KARA {shikago} MADE IKURA DESUKA", and when the latter has been changed to "{nyuyoku} KARA {nyuyoku} MADE IKURA DESUKA.", the unreplaced character string "(first-occurrence) nyuyoku" is replaced with a character string other than "nyuyoku" and the result is displayed. In this way, a semantically unnatural conversational sentence example is prevented from being displayed.

In the present embodiment, the flag slotno that specifies the combination of mutually associated variable semantic feature entry names that are targeted for replacement in the conversational sentence example that has undergone the variable semantic feature element replacement process, is annexed to every conversational sentence example having variable semantic features whose variable semantic feature entry names are associated with each other or one another. In the conversational sentence example display process carried out by the flag discriminator, the semantic searcher 41, the unreplaced character string detector, the variable semantic feature dictionary searcher, the feature element replacer 42, and the display driver 33, if the flag slotno is annexed to a conversational sentence example that has been selected by the semantic searcher 41 and that has undergone the variable semantic feature element replacement by the feature element replacer 42, then the specification of a combination of variable semantic feature entry names, or indication, described in the flag slotno is decoded, and a character string of the variable semantic feature entry name that corresponds to the decoding result and that corresponds to an unreplaced variable semantic feature name is detected from the conversational sentence example. The variable semantic feature dictionary 39 is subsequently searched to obtain a variable semantic feature registered next to a variable semantic feature corresponding to the unreplaced variable semantic feature name. Then, the detected unreplaced character strings in the conversational sentence example are replaced respectively with the variable semantic feature entry name and translated variable semantic feature expression of the variable semantic feature found by the search.

Therefore, according to the present embodiment, the combination of character strings corresponding to variable semantic feature entry names that are relating to each other or one another is prevented from resulting in an odd combination as a result of the variable semantic feature element replacement process.

For instance, when the input conversational sentence is "DENSHA DE IKEMASUKA." (which means "Accessible by train?") and the conversational sentence example is "{EKI} HE IKU {basu} HA ARIMASUKA." (which means "Is there a bus to the station?"), and when it has been changed to "{EKI} HE IKU {DENSHA} HA ARIMASUKA." (which means "Is there a train to the station?") as a result of the variable semantic feature element replacement, the unreplaced character string "EKI" in the conversational sentence example that has undergone the variable semantic feature element replacement process is replaced with the character string registered next to "EKI". In this way, display of an odd conversational sentence example as Japanese is avoided.

Fourth Embodiment

The foregoing third embodiment is intended to eliminate the possibility in the second embodiment that erroneous conversational sentence examples or semantically unnatural conversational sentence example are outputted when a plurality of character strings having the same variable semantic feature name or a plurality of character strings whose variable semantic feature entry names are relating to each other or one another are present in the input conversational sentence or conversational sentence examples.

As problems common to the first to third embodiments, there are issues as follows:

First, only a single semantic feature string is set to each of the conversational sentence examples registered in the bilingual database. As a result, one conversational sentence example cannot manage many input conversational sentences. Accordingly, even in the case where first-language sentences are a little different from each other but their corresponding second-language sentences are the same, it is necessary to register different conversational sentence examples with the semantic feature string extracted from each of the first-language sentences.

For example, an input conversational sentence "IMA, NANJI DESU KA." (which means "What time is it now?") and an input conversational sentence "IMA, NANJI KA OSHIETE KUDASAI." (which means "Please tell me what time it is now.") are both associated with the same second-language sentence "What time is it now?". However, the semantic feature string extracted from the former input conversational sentence "IMA, NANJI DESU KA." is "IMA NANJI DESU KA", while the semantic feature string extracted from the latter input conversational sentence " IMA, NANJI KA OSHIETE KUDASAI." is "IMA NANJI OSHIERU KUDASAI". So, two sets of a first-language sentence, a second-language sentence, and a semantic feature string are prepared, which means that two conversational sentence examples are necessitated for the same translation.

Some conversational sentences should be translated in different ways depending on the conversational situation or persons to which the conversational sentences are spoken. Therefore, some conversational sentence examples to be displayed on input of such conversational sentences may be unusable depending on the contents of their second-language sentences, or may be used in improper situations.

For example, consider a case where the input conversational sentence is "RYOKIN HA IKURA DESU KA." In this case, "RYOKIN" corresponds to "charge", "fare", or "fee" depending on the situation. However, it could not be decided from the input conversational sentence what the situation is. As a result, for example, a conversational sentence example of asking the bus fare may be displayed, whereas actually the theater admission fee is inquired.

In the second embodiment, weight information is added to the individual semantic features composing the semantic feature string of a conversational sentence example, so that evaluations are calculated by using the weight in the process of evaluating the propriety of the selected conversational sentence example. Therefore, on condition that a semantic feature of low semantic significance (i.e., the meaning of the input conversational sentence would little vary depending on whether or not that semantic feature is present) is contained in a conversational sentence example, when an input conversational sentence without that semantic feature is entered, the evaluation is calculated with the weight of the semantic feature regarded as a minimum of "10", based on the fact that the semantic feature name of the semantic feature is described in the semantic feature string of the conversational sentence example. As a result, the evaluation would be lower than those of conversational sentence examples in which the semantic feature name alone is not described but all the other semantic feature names are identical, with respect to the same input conversational sentence.

For example, conversational sentences, "NIPPON KARA KIMASHITA" (which means "Came from Japan."), and, "WATASHI HA NIPPON KARA KIMASHITA" (which means "I came from Japan."), could be regarded as "speaker=WATASHI" (meaning "I") from the viewpoint of the situation under which the present conversational sentence translation apparatus is used. Accordingly, it is natural that the evaluations of two conversational sentence examples whose first-language sentences are the above conversational sentences should be of the same. However, with regard to the conversational sentence example whose first-language sentence is "WATASHI HA NIPPON KARA KIMASHITA", its evaluation with the input conversational sentence "NIPPON KARA KIMASHITA" would be lower than that with the input conversational sentence "WATASHI HA NIPPON KARA KIMASHITA".

Such a thing means that trivial differences in input expression may make it difficult to select an optimal conversational sentence example.

In the foregoing embodiments, the semantic feature expressions of variable are invariable semantic features are defined by a collection of characters in the first language. Accordingly, when numerical strings such as room numbers, amounts of money, or house numbers, or alphabetical strings such as geographical names, or building names frequently occur in the input conversational sentence, which would often be the case in travel conversations, no conversational sentence examples are selected.

Furthermore, each conversational sentence example includes component elements (words) of the first-language sentence and a second-language sentence composed of component elements (words) in the second language corresponding to the component elements of the first-language sentence. Accordingly, it is not permitted to omit the description of part of the elements from only one of the first and second language sentences. This means that even such words that will not be so frequently used cannot be omitted in describing the first-language sentence.

Therefore, below described is a conversational sentence translation apparatus according to the fourth embodiment which is able to treat different input conversational sentences with one conversational sentence example, and to treat an input conversational sentence that should result in different translations depending on the situation of use or counterpart, and which eliminates the possibility that the presence of semantic features of low significance may affect evaluations, and which is able to treat input conversational sentences containing numerical strings or alphabetical strings, and further which allows omission of a component element or elements in one of the first and second languages making a pair with its or their counterparts in the other language.

Figure 29:
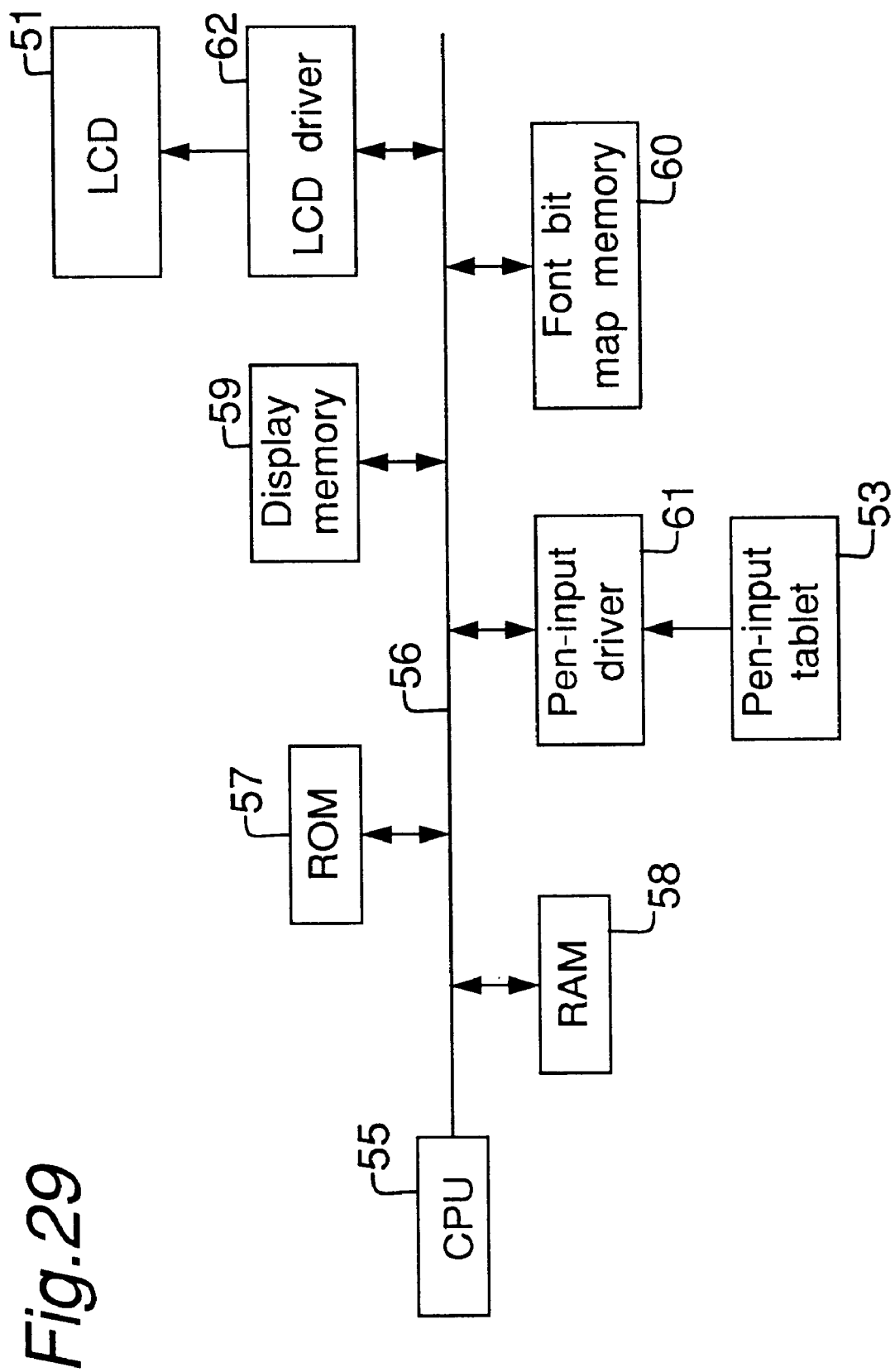
FIG. 29 is a schematic block diagram of a conversational sentence translation apparatus according to a fourth embodiment of the present invention.
Figure 30:
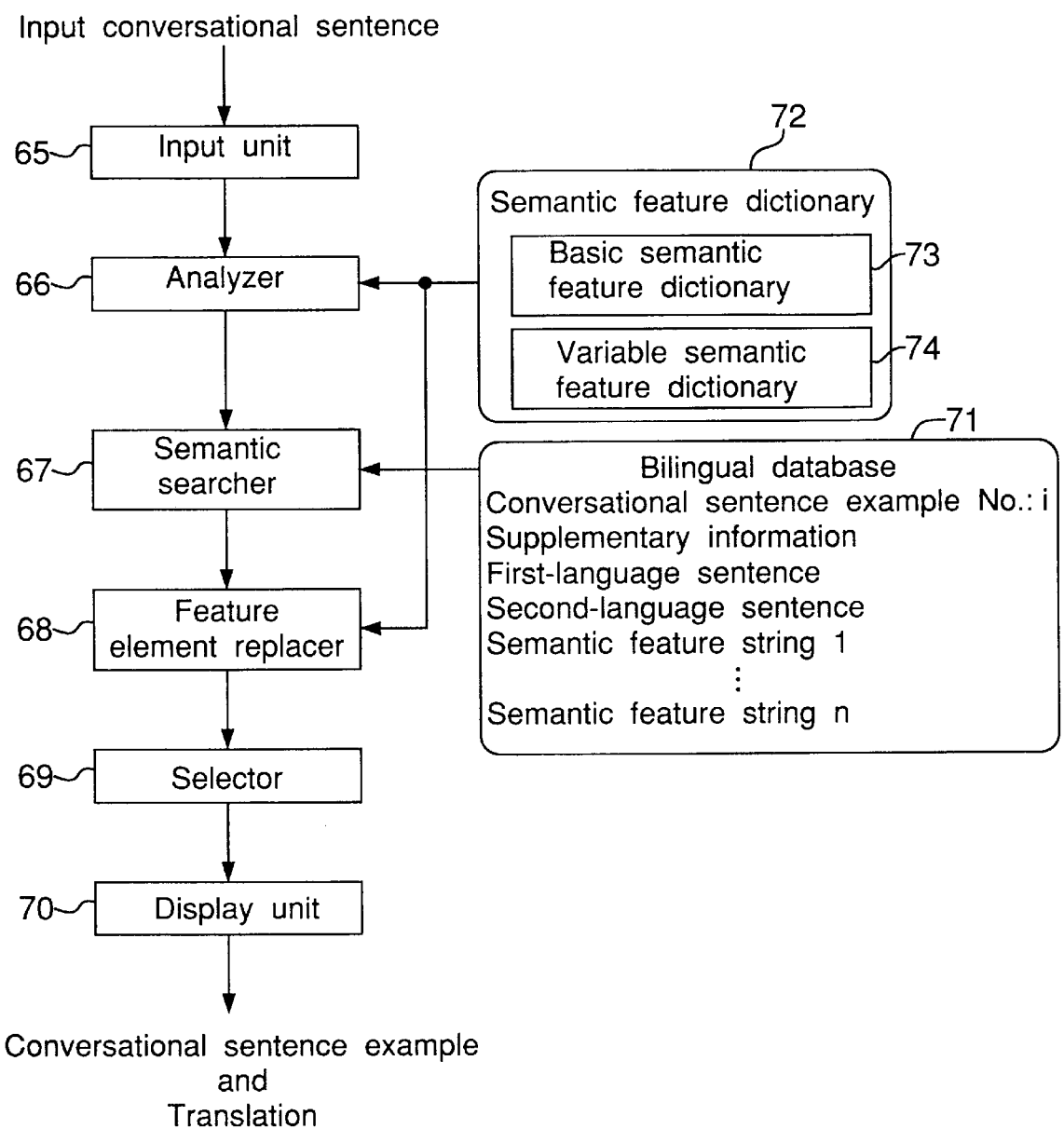
FIG. 30 is a functional block diagram of the conversational sentence translation apparatus shown in FIG. 29.

FIG. 29 is a schematic arrangement diagram of the conversational sentence translation apparatus of the fourth embodiment. FIG. 30 is a functional block diagram and FIG. 31 is an occurrence view of the conversational sentence translation apparatus.

Figure 31:
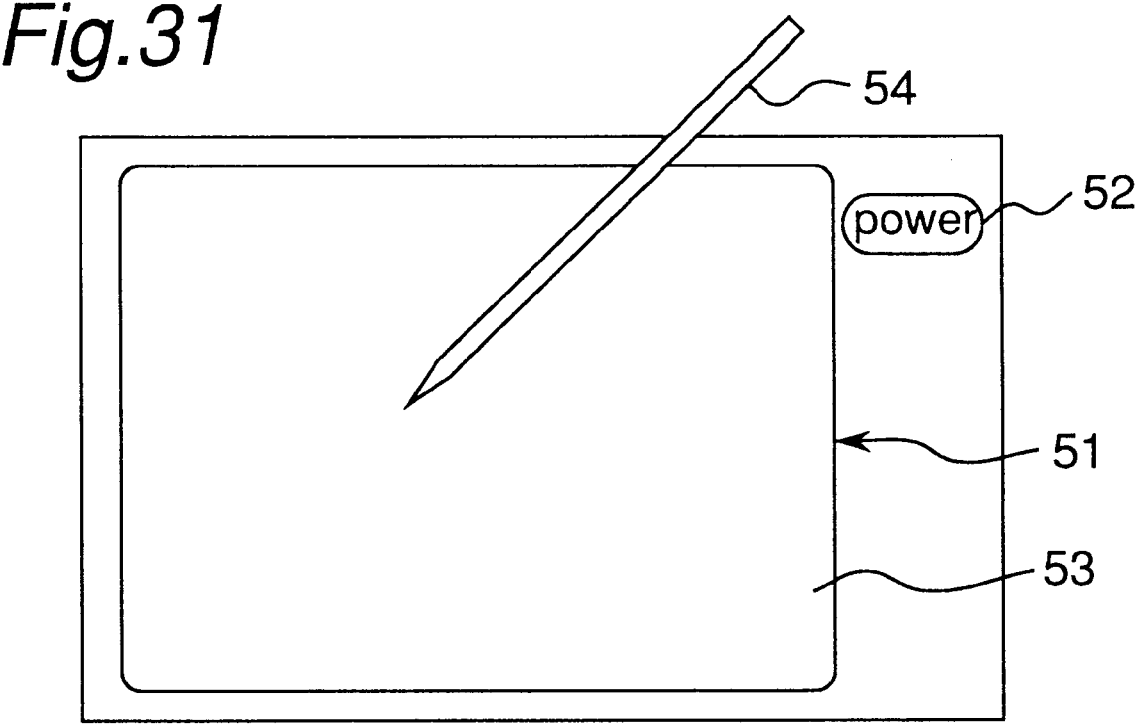
FIG. 31 illustrates an appearance of the conversational sentence translation apparatus shown in FIG. 29.

As shown in FIG. 31, the conversational sentence translation apparatus of the present embodiment is made palm sized and 200 g or so weighing so as to be convenient for portable use in travels, like the third embodiment.

An LCD (liquid crystal display) 51 is formed on the front side, with a power switch 52 beside it. The power switch 52 has a toggle function so that each time it is pressed, the power for the apparatus turns on and off repeatedly. The LCD 51 has a pen-input tablet 53 of the same size stacked thereon so that information inputted to the pen-input tablet 53 with an attached electronic pen 54 can be displayed on the LCD 51.

In summary, the display and tablet in the third embodiment is made up of the stacked LCD 51 and pen-input tablet 53.

Operational functions other than the pen-input function are implemented, as detailed below, all by giving respective commands from the pen-input tablet 53 with a touch by the electronic pen 54 of buttons, menus, and the like presented in GUI (Graphic User Interface) on the LCD 51.

FIG. 29 is a schematic arrangement diagram for implementing those operational functions.

The conversational sentence translation apparatus of the fourth embodiment comprises a ROM 57, a RAM 58, a display memory 59, a font bit map memory 60, a pen-input driver 61, and an LCD driver 62 all connected to a CPU 55 via a bus 56. Further, the pen-input tablet 53 is connected with the pen-input driver 61, while the LCD 51 is connected with the LCD driver 62.

In the ROM 57, a bilingual database and semantic feature dictionaries are stored in specified positions, in addition to programs and data to be used when the CPU 55 performs various types of control. The RAM 58 is used as work memory such as an input/output buffer that retains various types of states of the present apparatus, and also as work buffer where information found in conversational sentence translating operations is temporarily stored.

In the font bit map memory 60, Japanese and English character patterns are preliminarily stored, and bit map data obtained from character codes based on these character patterns are retained in the display memory 59. Then, based on the bit map data, characters and graphics are displayed on the display screen of the LCD 51.

With this arrangement, when the electronic pen 54 makes a touch with the pen-input tablet 53, the touch is detected by the pen-input driver 61. Information representing the position of the touch on the display screen is transmitted to the CPU 55 via the bus 56. This is the way how the CPU 55 detects the specified position on the display screen.

Characters written on the pen-input tablet 53 by the electronic pen 54 are recognized by a character recognition module of the CPU 55 according to a character recognition program stored in the ROM 57 based on the traces of the touch positions detected by the pen-input driver 61. The characters recognized in this way are echoed back on the LCD 51. Besides, the recognized character information is stored in the character input buffer of the RAM 58 for use in the application.

The process of displaying characters onto the LCD 51 is carried out as follows. First, font bit map data corresponding to the character codes of output characters are read out from the font bit map memory 60, and written at a specified position of the display memory 59. The bit map data thus retained in the display memory 59 are referenced by the LCD driver 62 at regular intervals, and the contents of the bit map data are displayed on the LCD 51.

FIG. 30 is a functional block diagram of the present conversational sentence translation apparatus. The following is a brief explanation of the correspondence between FIG. 30 and FIG. 29.

An analyzer 66, a semantic searcher 67, a feature element replacer 68, and a selector 69 in FIG. 30 are constituted by the CPU 55 to execute a conversational sentence translating operation. Character data of conversational sentence examples obtained from an input conversational sentence are written into the output buffer.

The bilingual database 71 and the semantic feature dictionary 72 are stored at specified positions in the ROM 57, respectively, and referenced by the analyzer 66, the semantic searcher 67, or the feature element replacer 68, as required.

An input unit 65 is implemented by the pen-input tablet 53, the pen-input driver 61, and the CPU 55. The CPU 55 recognizes input characters based on coordinate data transmitted from the pen-input driver 61 connected to the pen-input tablet 53. Character codes of the characters recognized in this way are stored in the input buffer of the RAM 58.

A display unit 70 is implemented by the CPU 55, the display memory 59, the font bit map memory 60, the LCD driver 62, and the LCD 51. The CPU 55 writes, into the display memory 59, character bit map data stored in the output buffer, and the LCD driver 62 displays characters on the LCD 51 based on the bit map data.

The conversational sentence translation apparatus of the present embodiment having the above arrangement is described in detail below.

The conversational sentence translation apparatus of the present embodiment is able to treat a plurality of input conversational sentences with a single conversational sentence example registered in the bilingual database 71. This is realized by describing a plurality of semantic feature strings for one conversational sentence example.

For the conversational sentence example in the fourth embodiment, as shown in FIG. 30, a conversational sentence example number is described on the first line, supplementary information is described on the second line as required, an input conversational sentence in the first-language sentence (Japanese sentence) is described on the third line, a second-language sentence (English sentence) corresponding to the first-language sentence is described on the fourth line, and a semantic feature string (a plurality of sets as required) to which weight is added is described on the fifth and following lines. FIG. 32 shows concrete examples of the conversational sentence example. However, the aforementioned supplementary information is omitted in FIG. 32.

Referring to FIG. 32, for the conversational sentence example No. 3, three semantic feature strings, "KONO CHIKAKU BYOIN OSHIERU KUDASAI", "BYOIN BASHO SHIRITAI", and "KIBUN WARUI" are described. A weight in the form of "@ (integer of not smaller than 0)" is added to a variable semantic feature name {FURO} in the conversational sentence example No. 2. A semantic feature with the description of this weight value omitted is evaluated as having a weight value of "10".

When a plurality of semantic feature strings are prepared, semantic features including variable and invariable semantic features in the first semantic feature string 1 are obtained by being extracted from the first-language sentence. Semantic features constituting the second and following semantic feature strings n are extracted from an assumed first-language sentence which is semantically identical or similar to the first-language sentence. For example, of the three semantic feature strings described in the conversational sentence example 3 of FIG. 32, the first semantic feature string 1 is extracted from the first-language sentence:

"KONO CHIKAKU NI ARU BYOIN WO OSHIETE KUDASAI." (which means "Could you tell me the nearest hospital?") The second semantic feature string 2 is extracted from an assumed sentence:

"BYOIN NO BASHO WO SHIRITAI." (which means "I want to know the place of a hospital.")

Likewise, the semantic feature string 3 is extracted from an assumed sentence:

"KIBUN GA WARUI NO DESU GA." (which means "I feel sick.")

By doing so, a conversational sentence example whose first-language sentence is "KONO CHIKAKU NI ARU BYOIN WO OSHIETE KUDASAI." is retrieved in any case of the similar three input sentences in the first-language sentence, "KIBUN GA WARUI.", "BYOIN NO BASHO WO SHIRITAI NO DESU GA.", and "KONO CHIKAKU NI ARU BYOIN WO OSHIETE KUDASAI."

Consequently, describing a plurality of semantic feature strings for a conversational sentence example allows the conversational sentence example to be efficiently retrieved with one first-language sentence associated with input sentences expressed in various ways.

The bilingual database 71 shown in FIG. 32 is constructed as shown in FIGS. 33A and 33B in actual cases. Linked with pointers from the conversational sentence example data index, data are stored in specified areas of the ROM 57, and referenced by the semantic searcher 67.

Conversational sentence example data linked with the conversational sentence example data index as shown in FIG. 33A are described in the order of a first-language sentence, a second-language sentence, and a semantic feature string, as shown in FIG. 33B, where the NULL code (\0) is written for each delimitation. Even when a plurality of semantic feature strings are described, the semantic feature strings are described together as each delimited by the NULL code.

In the semantic feature dictionary 72, a basic semantic feature dictionary 73 and a variable semantic feature dictionary 74 are included. In the basic semantic feature dictionary 73, which corresponds to the semantic feature dictionary in the third embodiment, basic semantic features representing fixed semantic concepts that could not be replaced with any other character strings of proper nouns, verbs, or the like. In the variable semantic feature dictionary 74, variable semantic features that can be replaced with some nouns or the like according to a specified condition, such as type of hotel rooms or sightseeing places, are stored, as in the case. of the second and third embodiments. In addition, the basic semantic feature can be a variable semantic feature element.

The basic semantic feature dictionary 73 in the fourth embodiment, as shown in FIG. 34, has fundamentally the same description form as in FIG. 7 of the second embodiment. The variable semantic feature dictionary 74, as shown in FIG. 35, has fundamentally the same description form as in FIG. 8 of the second embodiment.

Part of the basic semantic feature dictionary 73 and the variable semantic feature dictionary 74 is actually constructed as shown in FIGS. 36A–36C. They are stored in specified areas of the ROM 57 in such a form that semantic feature entry words, which are the contents of the basic semantic feature expressions and variable semantic feature expressions are correspondingly associated with the conversational sentence example number list, as shown in FIGS. 36B and 36C. FIG. 36A shows the binary search index, symbols A, B, C and D in FIG. 36B indicate the columns of semantic feature entry words, semantic feature codes, typical pointers, and conversational sentence example list pointers, respectively, and FIG. 36C shows the conversational sentence example No: list.

Pointers from the binary search index of fixed length are linked with the semantic feature entry words, so that the semantic feature entry words can be found by binary search in a look-up of the basic semantic feature dictionary 73. The semantic feature entry words delimited by the NULL code each have a semantic feature code, a typifier pointer that is a pointer to the typifier (the typifier itself is nil), and a conversational sentence example number list pointer that is a pointer to the conversational sentence example number list to which the basic semantic feature or variable semantic feature belongs.

The semantic feature code, the typifier pointer, and the conversational sentence example number list pointer are stored all in fixed length. The basic semantic feature dictionary 73 and the variable semantic feature dictionary 74 differ from each other in area where the semantic feature codes are assigned (e.g., the semantic feature code is set as a code of up to two digits for the variable semantic feature dictionary 74). Therefore, it can be decided whether a semantic feature code belongs to the basic semantic feature dictionary 73 or the variable semantic feature dictionary 74.

The conversational sentence example number list in FIG. 36C is stored as variable-length records. This conversational sentence example number list is described not merely as a set of conversational sentence example numbers to which a (variable) semantic feature belongs, but in the form of "conversational sentence example numbers (semantic feature string numbers)", as seen in a conversational sentence example number list linked from the semantic feature entry word, "BYOIN" in FIG. 36B. Note that the semantic feature string number may be omitted, in which case the semantic feature string number is regarded as "1". That is, the semantic feature string 1 in the conversational sentence example is designated.

Which semantic feature string a certain (variable) semantic feature belongs to can be easily known by associating the semantic feature entry words with the conversational sentence example number lists as shown in FIGS. 36A–36C. Besides, many semantic feature strings are permitted to be assigned to one conversational sentence example. This allows many input sentences to be accepted efficiently with the dictionary capacity smaller than those of the first to third embodiments.

Figure 37A:
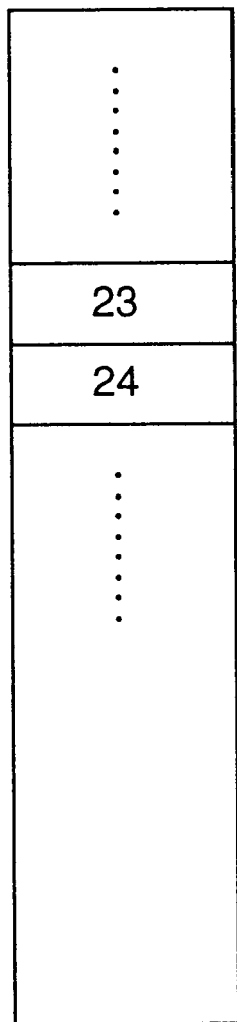
Figure 37B:
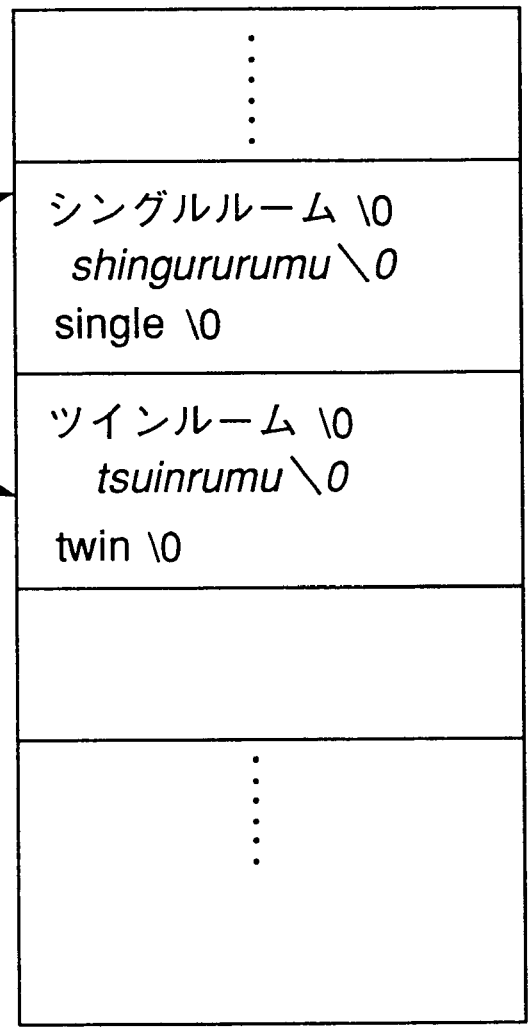

As for the rest of the variable semantic feature dictionary 74, semantic feature codes shown in FIG. 37A are linked with variable semantic feature entry name/translated variable semantic feature expression data shown in FIG. 37B, and stored in specified areas of the ROM 57. This can be regarded as a replacement candidate list for character strings corresponding to a given variable semantic feature in the conversational sentence example.

Now the conversational sentence translating operation to be executed by the conversational sentence translation apparatus having the above arrangement is explained below.

Figure 38:
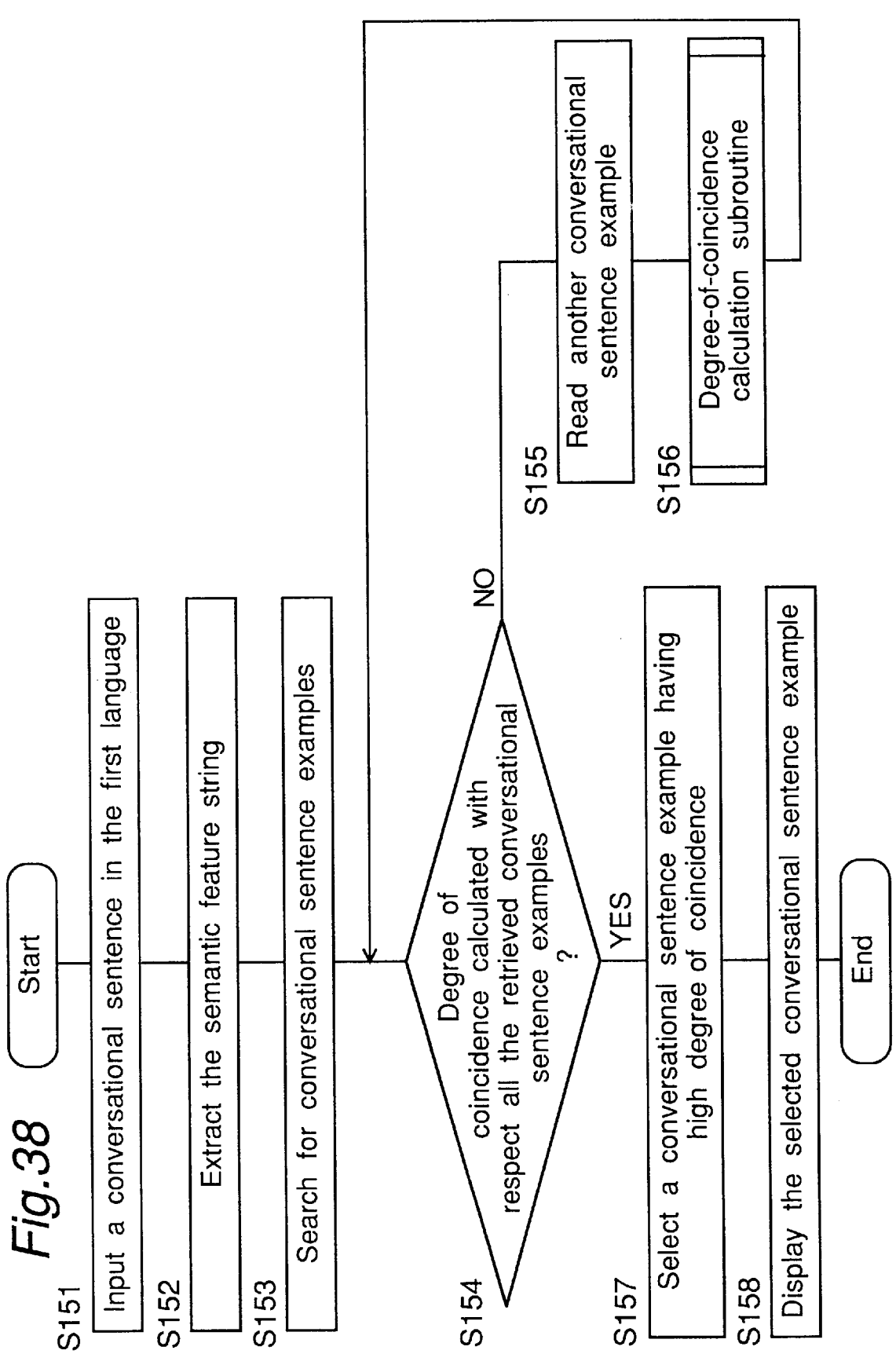
FIG. 38 is a flow chart of a conversational sentence translating operation to be executed by the input unit, analyzer, semantic searcher, feature element replacer, selector, and display unit of FIG. 30.

FIG. 38 is a flow chart of conversational sentence translating operation to be executed by the input unit 65, the analyzer 66, the semantic searcher 67, the feature element replacer 68, the selector 69, and the display unit 70. Referring to FIG. 38, below described in detail is a conversational sentence translating operation in the case where a free conversational sentence in the first language, "KONO ATARI NI ARU BYOIN WO OSHIETE KUDASAIT" is entered.

At step S151, by the input unit 65, a first-language conversational sentence input with the pen operation by the user is recognized and stored in the input buffer.

At step S152, by the analyzer 66, the input conversational sentence stored in the input buffer is analyzed with reference to the semantic feature dictionary 72, where basic semantic feature names and variable semantic feature names (hereinafter, the basic semantic feature names and the variable semantic feature names will collectively be referred to simply as semantic feature names, and the basic semantic features and the variable semantic features will collectively be referred to simply as semantic features) are extracted and stored in the input buffer.

The extraction of semantic feature names is carried out as follows. First, partial character strings taking all the character positions of the input conversational sentence as start positions are determined as in the third embodiment, followed by matching of the character strings with the semantic feature entry words as shown in FIG. 36B (dictionary look-up). It is noted that the character matching between the partial character strings and the semantic feature entry words is implemented by making a binary search by using the binary search index as shown in FIG. 36A.

Next, out of all the semantic feature entry words obtained by the dictionary look-up, only one such combination of the semantic feature entry words is determined that the input conversational sentence is covered to the widest extent. The determined combination of semantic feature entry words is taken as the semantic feature name string extracted from the input conversational sentence. This operation is intended to make it possible that, when one semantic feature serves also as a partial character string of any other semantic feature like the case of "NIMOTSU" (which means "load" or "baggage") and "TENIMOTSU" (which means "baggage"), a semantic feature having the longest possible character string can be extracted if some semantic features correspond to the same semantic feature name.

The semantic feature name extraction can be implemented by another method that a plurality of semantic feature name strings are determined from the input conversational sentence. In such a case, in the process of conversational sentence example search to be executed later, it is necessary to specify an optimal conversational sentence example by executing the matching with semantic feature strings of the conversational sentence examples registered in the bilingual database 71 with respect to each of the plurality of semantic feature name strings of the input sentence. In the present example, however, only one semantic feature name string is extracted from the input conversational sentence for a simplified conversational sentence translating process.

In the present example, the basic semantic feature dictionary 73 and the variable semantic feature dictionary 74 have such contents as shown in FIGS. 34 and 35. Therefore, from the following input conversational sentence:

"KONO ATARI NI ARU BYOIN WO OSHIETE KUDASAI.", the following six semantic features:
KONO CHIKAKU ARU BYOIN OSHIERU KUDASAI
are extracted.

As shown in FIG. 34, the basic semantic feature dictionary 73 of this example lists "ATARI" as well as "CHIKAKU" as basic semantic feature expressions of the basic semantic feature name "CHIKAKU" (which means "near"). As a result, the basic semantic feature name "CHIKAKU" is extracted from the partial character string "ATARI" in the input conversational sentence. In this way, by describing semantically similar basic semantic feature expressions or variable semantic feature expressions under the same basic semantic feature name or variable semantic feature name, it is made possible to extract a unique basic semantic feature name or variable semantic feature name from semantically similar but different input conversational sentences. Thus, a single conversational sentence example can be assigned to input conversational sentences having more or less differences in expression.

When the semantic feature name extracted in this way is a variable semantic feature name (with a three-digit semantic feature code), the character string of a typifier (variable semantic feature entry name) obtained by following the typifier pointer of FIG. 36B is also stored in addition to the semantic feature entry word (variable semantic feature name). For example, for an input conversational sentence "tsuin NO HEYA GA HOSHII" (which means "I would like a twin room."), two semantic feature names and one variable semantic feature name {HEYA NO SHURUI}: tsuinrumu, HEYA HOSHII are extracted.

In this case, this extraction result indicates that the conversational sentence contains a variable semantic feature whose variable semantic feature name is {HEYA NO SHURUI} (which means "room type"), and that its variable semantic feature entry name is "tsuinrumu" (which means "twin room").

At step S153, by the semantic searcher 67 referencing the conversational sentence example number list pointer of FIG. 36B, all the conversational sentence examples in which the at least one of semantic feature names extracted at step S152 is contained in the semantic feature string are retrieved. Then, the retrieved conversational sentence examples are stored in the work buffer.

In the present example, the semantic feature names extracted from the input conversational sentence, "KONO ATARI NI ARU BYOIN WO OSHIETE KUDASAI", are "KONO CHIKAKU ARU BYOIN OSHIERU KUDASAI". Therefore, conversational sentence examples having the following first-language sentences are retrieved:
1. KOKO KARA BYOIN HE IKU HOHO WO OSHIETE KUDASAI.
2. KONO CHIKAKU DE ICHIBAN YUMEI NA BYOIN WO OSHIETE KUDASAI.
3. KONO ATARI NI ARU BYOIN WO OSHIETE KUDASAI.
4. BYOIN HE TSUITARA OSHIETE ITADAKEMASU KA.
5. KONO HON WO KUDASAI.
6. . . .

As apparent from their expressions, these conversational sentences are first-language sentences each having at least one of the basic semantic feature names or variable semantic feature names, "KONO", "CHIKAKU", "ARU", "BYOIN", "OSHIERU", and "KUDASAI", in their semantic feature strings.

Here, as in the conversational sentence example 3 in FIG. 32, if the sentence example has a plurality of semantic feature strings and if two or more of the semantic feature strings contain any identical basic semantic feature name or variable semantic feature name, then the same conversational sentence example is extracted for each of the two or more semantic feature strings. That is, the search process for conversational sentence examples in this step is carried out in the units of semantic feature strings rather than in the units of conversational sentence examples, so that conversational sentence examples associated with the individual semantic feature strings are extracted together.

This can be understood from the fact that when a basic semantic feature name, "BYOIN", is extracted from the input conversational sentence, then the same conversational sentence example 3 is retrieved twice as "conversational sentence example number (semantic feature number)"= "0003(1)" and "0003(2)", from the conversational sentence example number list as shown in FIG. 36C.

At step S154, it is decided by the semantic searcher 67 whether or not the degree of semantic coincidence (hereinafter, referred to simply as degree of coincidence) of the input sentence has been calculated for every conversational sentence example that has been retrieved at step S153, in combination with the input conversational sentence. As a result, if it has, the program goes to step S157, and if not, it goes to step S155.

At step S155, one unprocessed conversational sentence example is read by the semantic searcher 67 out of the conversational sentence examples stored in the work buffer, and then it is stored in the work buffer.

At step S156, a degree-of-coincidence calculation subroutine for calculating the degree of coincidence between the input conversational sentence and the conversational sentence example read out at step S155 is executed by the semantic searcher 67. In that process, a variable semantic feature replacement process by the feature element replacer 68 is carried out as well. After that, the program returns to step S154, where if it is decided that the degrees of coincidence of all the conversational sentence examples have been calculated, then the program moves to step S157.

At step S157, conversational sentence examples are selected by the selector 69 in the order of decreasing degree of coincidence calculated at step S156.

In that process, how many conversational sentence examples should be selected depends on the value of degree of coincidence or the size of the display screen of the display unit 70. In the present example, up to five sentences presenting 60% or more degrees of coincidence are selected.

At step S158, the first-language and second-language sentences of the conversational sentence examples selected at step S157 are displayed in the display screen by the display unit 70. After that, the conversational sentence translating operation is ended.

Next, the degree-of-coincidence calculation subroutine to be executed at step S156 in the FIG. 38 flow chart of conversational-sentence translating operation is described in detail. This subroutine is to calculate the degree of semantic coincidence between an input conversational sentence and individual conversational sentence examples, which is used to select the semantically closest conversational sentence example out of the conversational sentence examples retrieved at step S153 in the FIG. 38 flow chart of conversational sentence translating operation.

The degree of coincidence between the input conversational sentence and conversational sentence example is calculated by the following equation:

Degree of coincidence (%)={(sum of weights of coincident semantic features)−(sum of weights of semantic features that are present in the conversational sentence example but not in the input conversational sentence)}*100/(sum of all semantic features extracted from the input conversational sentence)

As seen above, the degree of coincidence is determined not merely by the number of coincident elements of the semantic feature strings of conversational sentence examples, which are coincident with the basic semantic feature names or variable semantic feature names extracted from the input conversational sentence, but when-some basic semantic feature names or variable semantic feature names that are not contained in the input conversational sentence are present in the semantic feature strings of the conversational sentence examples, the value of degree of coincidence would become lower.

Figure 39:
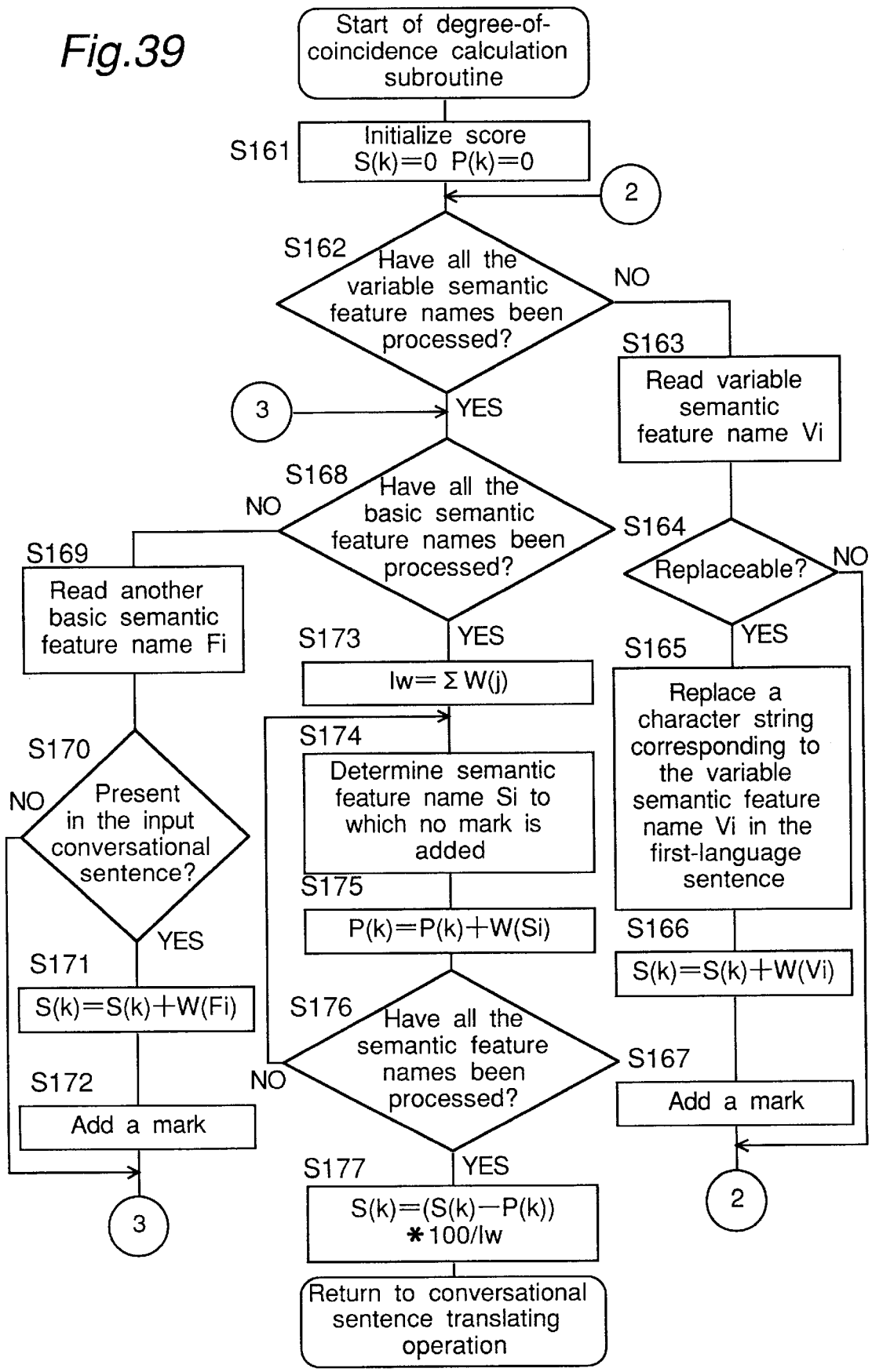
FIG. 39 is a flow chart of a degree-of-coincidence calculation subroutine to be executed in the conversational sentence translating operation shown in FIG. 38.

When one of the unprocessed conversational sentence examples is read at step S155 in the flow chart of conversational sentence translating operation of FIG. 38, the degree-of-coincidence calculation subroutine shown in FIG. 39 starts.

At step S161, a score $S(k)$, which is a positive value of degree of coincidence, and a penalty $P(k)$, which is an absolute value of a negative value, are initialized to zeroes. It is noted that "k" is the number of a semantic feature string to be processed in the pertinent conversational sentence example-.

At step S162, it is decided whether or not all the variable semantic feature names present in the semantic feature string k have been completely processed. As a result, if they have, the program goes to step S168, and if not, goes to step S163.

At step S163, from the semantic feature string k of the conversational sentence example stored in the work buffer, a variable semantic feature name $V_i$ (where "i" is the number of a semantic feature name in the semantic feature string k) is read out.

At step S164, it is decided whether or not the same variable semantic feature name as the read variable semantic feature name $V_i$ has been extracted from the input conversational sentence at step S152 in the FIG. 38 flow chart of conversational sentence translating operation. By this process, it is decided whether or not the character string corresponding to the variable semantic feature name Vi in the first-language sentence of the conversational sentence example is replaceable with the character string in the input conversational sentence. As a result, if it is replaceable (i.e. if the same variable semantic feature name has been extracted), the program goes to step S165. If not, the program returns to step S162, where it is decided whether or not the processing of all the variable semantic feature names has been completed.

At step S165, by the feature element replacer 68, the character string corresponding to the variable semantic feature name Vi of the first-language sentence of the conversational sentence example is replaced with the variable semantic feature entry name of the character string corresponding to the same variable semantic feature name of the input conversational sentence. Further, the character string corresponding to the variable semantic feature name Vi of the second-language sentence is replaced with the translated variable semantic feature expression corresponding to the variable semantic feature entry name.

At step S166, weight W(Vi) given to the variable semantic feature name Vi is added to the point S(k).

At step S167, after a mark is given to the variable semantic feature name Vi, the program returns to step S162, where it is decided whether or not the processing for all the variable semantic feature names has been completed. If it is decided that the processing for all the variable semantic feature names present in the semantic feature string k has been completed, the program goes to step S168.

At step S168, it is decided whether or not the processing for all the basic semantic feature names present in the semantic feature string k has been completed. As a result, if it has been completed, the program goes to step S173, and if not, the program goes to step S169.

At step S169, a basic semantic feature name Fi is read from the semantic feature string k of the conversational sentence example stored in the work buffer.

At step S170, it is decided whether or not the same basic semantic feature name as the read basic semantic feature name Fi has been extracted from the input conversational sentence at step S152 in the FIG. 38 flow chart of conversational sentence translating operation. As a result, if the same basic semantic feature name has been extracted, the program goes to step S171. If the same basic semantic feature name has not been extracted, the program returns to step S168, where it is decided whether or not the processing for all the basic semantic feature names has been completed.

At step S171, the weight W(Fi) of the basic semantic feature name Fi is added to the point S(k).

At step S172, after a mark is given to the basic semantic feature name Fi, the program returns to step S168, where it is decided whether or not the processing for all the basic semantic feature names has been completed. If it is decided that the processing for all the basic semantic feature names present in the semantic feature string k has been completed, the program goes to step S173.

At step S173, the sum Iw of weights W(j) (where "j" is a semantic feature name in the input conversational sentence) of all the semantic feature names extracted from the input conversational sentence is calculated.

At step S174, a semantic feature name S1 to which no mark is given at step S167 or step S172 is determined.

At step S175, the weight W(Si) of the semantic feature name S1 is added to the penalty P(k).

At step S176, it is decided whether or not the processing for all the semantic feature names present in the semantic feature string k has been completed. As a result, if it has been completed, the program goes to step S177. If not, the program returns to step S174 to process the next semantic feature name Si to which no mark has been added.

At step S177, the degree of coincidence S(k) (%) is calculated by using the values of finally obtained point S(k), penalty P(k), and sum Iw of weights W(j) according to the following equation:

$$S(k)=(S(k)-P(k))*100/Iw$$

After that, the degree-of-coincidence calculation subroutine is ended, where the program returns to step S154 in the flow chart of conversational sentence translating operation as shown in FIG. 38.

As seen above, in the present example, the semantic feature strings of conversational sentence examples are described as a plurality of sets of a semantic feature string extracted from the first-language sentence and a semantic feature string extracted from an assumed sentence semantically identical or similar to the first-language sentence. Then, in the construction of the basic semantic feature dictionary 73, semantic feature entry words with which pointers from the binary search index are linked and conversational sentence example number lists described in the form of "conversational sentence example number (semantic feature string number)" are linked with each other via the conversational sentence example number list pointers.

Accordingly, in the case that identical semantic feature names are present in the plurality of semantic feature strings of a conversational sentence example, when the basic semantic feature dictionary 73 is searched with the semantic feature name taken as the key, the conversational sentence example is retrieved a plurality of times for the individual semantic feature strings having the semantic feature name.

Therefore, according to the present example, semantically identical or similar input conversational sentences can be managed with one conversational sentence example. This eliminates the need of registering in the bilingual database 71 a large number of conversational sentence examples having semantically identical first-language sentences. As a result, compared with the first to third embodiments, the capacity of the bilingual database 71 can be reduced.

Next described is a conversational sentence translating process that allows the handling of an input conversational sentence which should result in a different translation depending on the situation of use or conversational counterpart.

Figure 40:
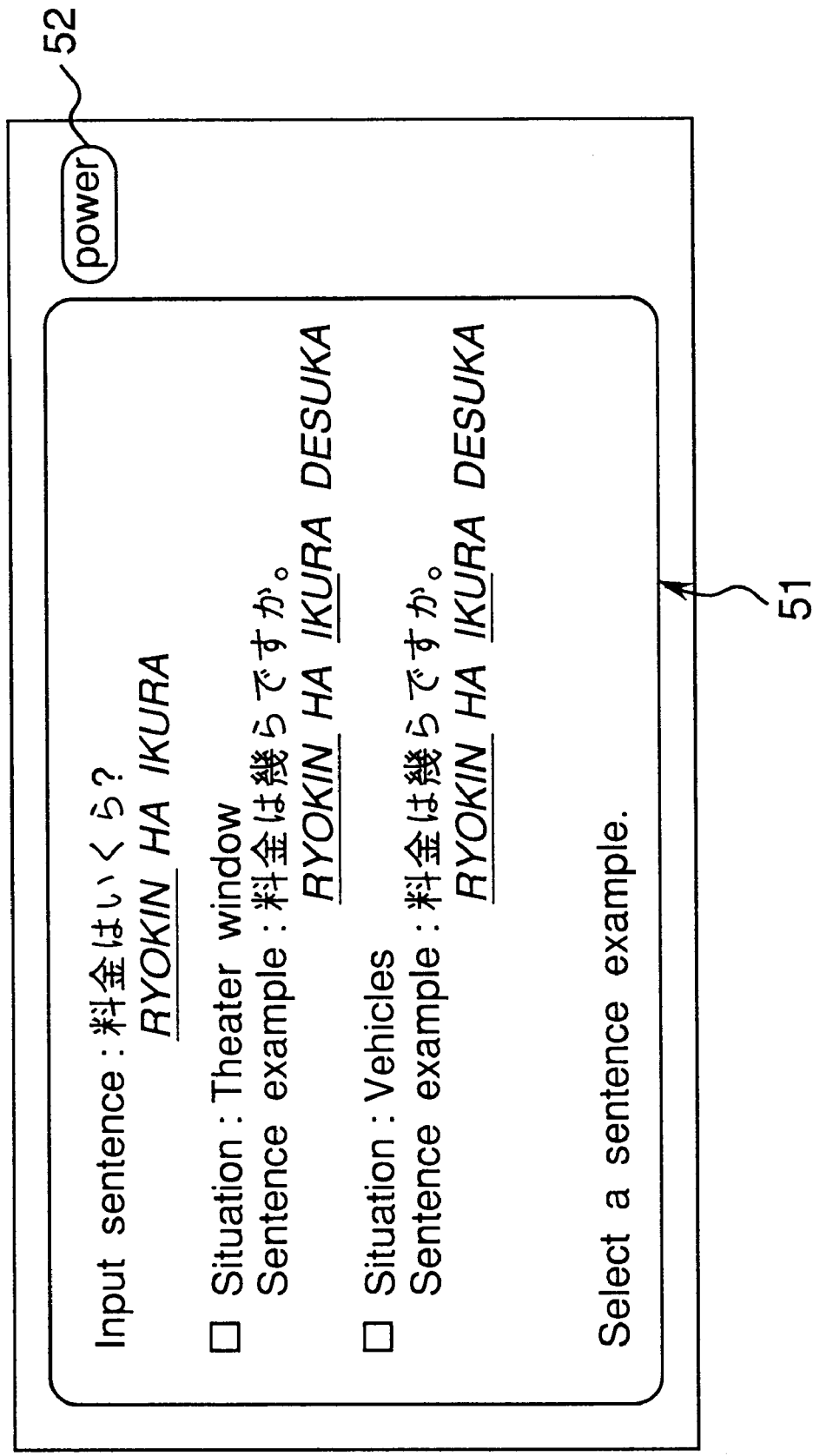
FIG. 40 is a view showing a display example of the first language sentence and supplementary information retrieved by the semantic searcher of FIG. 30.

In the present example, as shown in FIG. 40, when an input conversational sentence, "RYOKIN HA IKURA?", is entered, the first-language sentence of a conversational sentence example found by search by the semantic searcher 67 is displayed on the LCD 51. In this process, supplementary information, such as "situation" under which the first-language sentence is used, is displayed together.

The supplementary information is not limited to the aforementioned "situation", and may be "sex", which shows whether the sentence is primarily used by men or women, "style", which shows whether the sentence is formal or informal or the like. What information is given as supplementary information depends on the nature of the second-language sentence of a conversational sentence example to which the supplementary information is given.

In order to allow the display of such supplementary information, the conversational sentence examples to be registered in the bilingual database 71 in the present example are given the supplementary information.

FIG. 41 shows examples in which the supplementary information is described. In the cases of conversational sentence example 103 and conversational sentence example 104, since two kinds of second-language sentences using different words, "fee" and "fare", are ready for the same first-language sentence, "RYOKIN HA IKURA DESU KA", supplementary information for their respective second-language sentences are described on the second line. In addition, if the first-language sentence is a sentence that clearly shows the type of transportation means, the place of entrance, or the like, such as "basu NO RYOKIN HA IKURA DESU KA." (which means "How much is the bus fare?") or "metoroporitan KAGEKIJO NO NYUJORYO HA IKURA DESU KA." (which means "How much is the admission fee of the Metropolitan Opera House?"), supplementary information is not described as in conversational sentence example 1 shown in FIG. 41.

A conversational sentence translating operation based on the bilingual database 71 in which the supplementary information is described is executed principally according to the flow chart of conversational sentence translating operation as shown in FIG. 38. The selection of conversational sentence examples to be done at step S157, however, is carried out as follows, more or less unlike the foregoing case.

First, with respect to a plurality of conversational sentence examples, selected based on the degree of coincidence, whose first-language sentences are the same, but whose second-language sentences are different from each other or one another, their first-language sentences and supplementary information are displayed as a menu screen for conversational sentence example selection, as shown in FIG. 40. Then, with one piece of supplementary information specified by the electronic pen 54, the conversational sentence example having the specified supplementary information is selected and the selection information is transmitted to the display unit 70. Subsequently, at step S158, the first-language and second-language sentences of the selected conversational sentence example are displayed.

As shown above, in the present example, supplementary information such as "situation", "sex", or "style", under which condition the first-language is used, is described to conversational sentence examples. Then, in the process of selecting a conversational sentence example at step S158 in the FIG. 38 flow chart of conversational sentence translating operation, first, with respect to a plurality of conversational sentence examples, selected based on the degree of coincidence, whose first-language sentences are the same, but whose second-language sentences are different from each other or one another, their first-language sentences are displayed along with supplementary information. Then, with one piece of supplementary information specified, the conversational sentence example to which the specified supplementary information is described is selected.

Therefore, out of a plurality of conversational sentence examples whose first-language sentences are the same and which have been retrieved by the semantic searcher 67, a conversational sentence example having a second-language sentence suited to the situation or conversational counterpart can be selected correctly. Consequently, according to the present embodiment, an input conversational sentence that should result in a different translation depending on the situation or counterpart can be managed.

Next described is a conversational sentence translating process in which the presence of a semantic feature having low semantic significance will not affect the evaluation value.

In the present example, optional semantic features are used as basic semantic features contained in the semantic feature strings of conversational sentence examples to be registered in the bilingual database 71. The optional semantic feature refers to a semantic feature that will never lower the evaluation of a conversational sentence example even if the semantic feature is absent from the input conversational sentence.

The description of the optional semantic features to semantic feature strings of conversational sentence examples is in the form of "(basic semantic feature name)"as shown in conversational sentence example 202 in FIG. 42. In this connection, the writing of a basic semantic feature name corresponding to the optional semantic feature into the basic semantic feature dictionary 73 is done by describing only a character string representing the basic semantic feature name without the parentheses "( )", like normal basic semantic feature names.

By defining the optional semantic feature in this way, in the case of the conversational sentence example 202 whose first-language sentence is "WATASHI HA NIPPON KARA KIMASHITA.", the search for conversational sentence examples by the semantic searcher 67 can be accomplished also with the input conversational sentence, "NIPPON KARA KIMASHITA.", in which "WATASHI" (which means "I") is omitted, without lowering the evaluation values.

Now a searching operation for the conversational sentence example 202 by the semantic searcher 67 is explained taking the case, by way of example, in which an input conversational sentence, "NIPPON KARA KIMASHITA.", is entered from the input unit 65 and three semantic features, "NIPPON KARA KURU", are extracted by the analyzer 66.

First, in the case of a conversational sentence example having a semantic feature string in which no optional semantic feature is defined, the semantic feature string of the conversational sentence example and the semantic feature name string extracted from the input conversational sentence are as follows:

Input conversational sentence:

NIPPON KARA KURU

Conversational sentence example:

WATASHI NIPPON KARA KURU

In this case, the weight of a semantic feature to which the weight is not added particularly in the form of "@(integer of not smaller than 0)" is regarded as 10. Accordingly, since no character string corresponding to the basic semantic feature name "WATASHI" has been extracted from the input conversational sentence, the degree of coincidence calculated by the degree-of-coincidence calculation subroutine shown in FIG. 39 results as follows.

Degree of coincidence={(weight of "NIPPON"+weight of "KARA"+weight of "KURU")−weight of "WATASHI"}*100/ (weight of "NIPPON"+weight of "KARA"+weight of " KURU")

={(10+10+10)−10)}*100/30

=66.7%,

This means that the degree of coincidence lowers because of the presence of the basic semantic feature name "WATASHI" in the semantic feature string of the conversational sentence example.

It seems that such a problem could be avoided if "WATASHI" is previously eliminated from the first-language sentence of the conversational sentence example. However, reversely, with respect to an input conversational sentence, "WATASHI HA NIPPON KARA KIMASHITA.", the semantic feature name string extracted from the input conversational sentence and the semantic feature string of the conversational sentence example whose first-language sentence has "WATASHI" eliminated therefrom are as follows:

Input conversational sentence:

WATASHI NIPPON KARA KURU

Conversational sentence example:

NIPPON KARA KURU

Accordingly, the degree of coincidence-results as follows.

Degree of coincidence=(weight of "NIPPON"+weight of "KARA"+weight of "KURU")*100/(weight of "WATASHI"+weight of "NIPPON"+weight of "KARA"+weight of "KURU")

=(10+10+10)*100/40

=75%,

This means that the degree of coincidence lowers also in this case, because of the presence of "WATASHI" in the input conversational sentence.

In principle, since the basic semantic feature name " WATASHI" has almost no semantic significance in the first-language sentence of the conversational sentence example, it is desirable that the degree of coincidence be 100%, whether or not "WATASHI" is present in the input conversational sentence.

In the present example, the basic semantic feature name, "(WATASHI)", which is an optional semantic feature, is present in the semantic feature string of the conversational sentence example 202. Therefore, the semantic feature name string extracted from the input conversational sentence and the semantic feature string of the conversational sentence example 202 are as follows.

Input conversational sentence:

NIPPON KARA KURU

Conversational sentence example 202:

(WATASHI) NIPPON KARA KURU

In this case, the degree of coincidence for the present example is calculated as follows.

Figure 43:
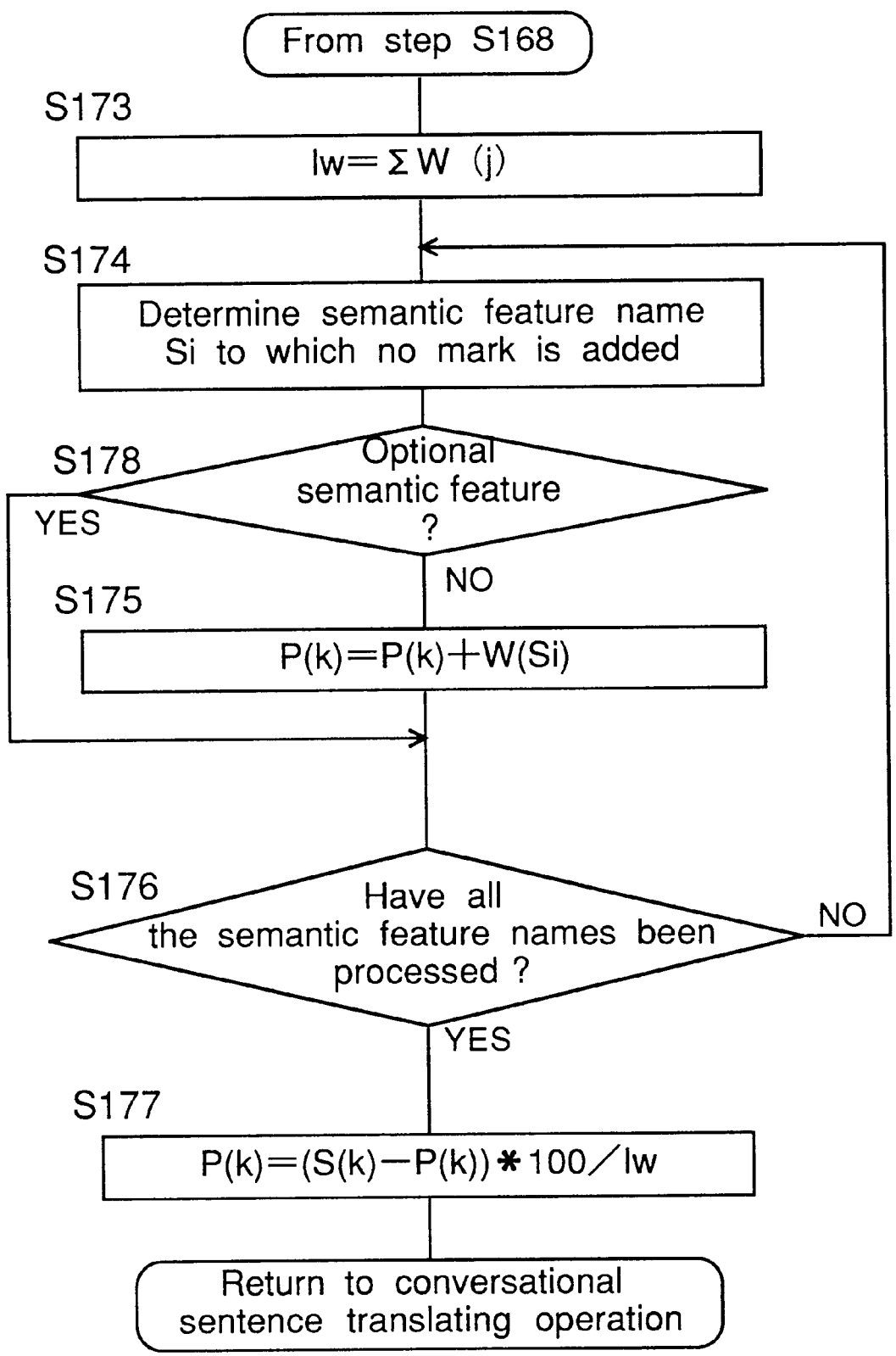
FIG. 43 is an explanatory view of the degree-of-coincidence calculation subroutine for a conversational sentence example containing an optional semantic feature.

FIG. 43 is a flow chart showing part of the degree-of-coincidence calculation subroutine in the present example. The degree-of-coincidence calculation subroutine in the present example is so arranged that the calculation of penalty P(k) at step S175 in the FIG. 39 degree-of-coincidence calculation subroutine is skipped when the semantic feature name Si having no mark added thereto is an optional semantic feature.

That is, as obvious from FIG. 43, when the semantic feature name Si having no mark added thereto is determined at step S174 in the degree-of-coincidence calculation subroutine of FIG. 39, the program moves to step S178. At step S178, it is decided whether or not the semantic feature name Si determined above is of an optional semantic feature. As a result, if it is not of an optional semantic feature, the program moves to step S175, where the penalty P(k) is updated. Conversely, if it is an optional semantic feature, step S175 is skipped so that the penalty P(k) is not updated.

As a result, in the present example, the degree of coincidence is calculated as follows.

That is, in this case of the input conversational sentence, "NIPPON KARA KIMASHITA.", the updating of the penalty P(k) for the basic semantic feature name "WATASHI", which is an optional semantic feature, is not effected. Therefore, the degree of coincidence results as follows.

Degree of coincidence=(weight of "NIPPON"+weight of "KARA"+weight of "KURU")*100/(weight of " NIPPON"+weight of "KARA"+weight of "KURU")

=(10+10+10)*100/30

=100%,

This means that the degree of coincidence is calculated as if the basic semantic feature name "WATASHI" were not present in the semantic feature string of the conversational sentence example 202. Thus, a desirable degree of coincidence is obtained.

When the input conversational sentence, "WATASHI HA NIPPON KARA KIMASHITA.", is entered, the semantic feature name string extracted from the input conversational sentence and the semantic feature string of the conversational sentence example 202 are as follows.

Input conversational sentence:

WATASHI NIPPON KARA KURU

Conversational sentence example 202:

(WATASHI) NIPPON KARA KURU

In this case, since the basic semantic feature name " WATASHI", which is an optional semantic feature, has a mark added thereto, the updating of the penalty P(k) for the basic semantic feature name "WATASHI" is not effected. Therefore, the degree of coincidence results as follows.

Degree of coincidence=(weight of "WATASHI"+weight of " NIPPON"+weight of "KARA"+weight of " KURU")*100/(weight of "WATASHI"+weight of " NIPPON"+weight of "KARA"+weight of "KURU")

=(10+10+10+10)*100/40

=100%,

This means that the degree of coincidence is calculated just as the normal basic semantic feature name "WATASHI" is present in the semantic feature string of the conversational sentence example 202. Thus, a desirable degree of coincidence is obtained.

As shown above, in the present example, optional semantic features each described in the form of "(basic semantic feature name)" and each representing a semantic feature having a low semantic significance in the semantic feature string of the conversational sentence example are defined. Further, in the degree-of-coincidence calculation subroutine of FIG. 39, the calculation of penalty P(k) for optional semantic features is skipped. Therefore, the degree of coincidence of a conversational sentence example having a semantic feature string in which an optional semantic feature is present will not be caused to lower by a non-presence of the optional semantic feature in an input conversational sentence in which an optional semantic feature is not present.

Consequently, according to the present example, the evaluation value is prevented from lowering due to trivial differences in input expressions, so that the presence of a semantic feature having a low semantic significance will never affect the evaluation.

Next, a conversational sentence translating process that enables the handling of input conversational sentences in which numerical strings or alphabetical strings are present is explained.

The analyzer 66 in this example comprises an automaton processor which scans the whole input character string to search for specific character strings (e.g., arbitrary numerical or alphabetical strings) that could not be registered directly in the semantic feature dictionary 72, and which outputs, as a search result, variable semantic feature names associated with the found specific character strings, according to a built-in automaton program.

Further, as variable semantic features constituting part of semantic feature strings in the conversational sentence examples registered in the bilingual database 71, reserved variable semantic features are used. The reserved variable semantic features are variable semantic features having character strings corresponding to the aforementioned specific character strings as variable semantic feature expressions and variable semantic feature entry names. The reserved variable semantic feature is described in the semantic feature string in the form of "(R variable semantic feature name)".

executed under the condition that variable semantic features are registered in the variable semantic feature dictionary 74 as follows.

| Variable semantic feature name | Variable semantic feature entry name | Variable semantic feature expression | Translated variable semantic feature expression |
|---|---|---|---|
| {R room number} | | | |
| 101 | | | 101 |
| | | 101 | |
| 102 | | | 102 |
| | | 102 | |
| . | | . | |
| . | | . | |
| . | | . | |
| 999 | | | 999 |
| | | 999 | |

It has been described that, at step S152 in the FIG. 38 flow chart of conversational sentence translating operation, the analyzer 66 performs the matching between the partial character strings determined from the input conversational sentence and the semantic feature entry words as shown in FIG. 36B is made and, based on the matching result, extracts semantic feature names from the input conversational sentence.

In the present example, however, before executing this semantic feature name extraction process, the automaton search process is executed by the automaton processor of the analyzer 66, as a result of which variable semantic feature names associated with specific character strings, which are found out of the input conversational sentence, are outputted. In that process, the found specific character strings themselves are also outputted as the variable semantic feature entry names of the found variable semantic feature names.

For example, assume that an algorithm for searching for specific character strings each composed of a three-digit numeral defined as a room number is set. When an input conversational sentence, "502 GO SHITSU NO KAGI WO ONEGAI SHIMASU.", is entered, an automaton search process by the automaton processor is first executed, and then the normal semantic feature name extraction process is executed. As a result, the following four semantic features:

{R room number}: 502 GOSHITSU KAGI ONEGAI are extracted. In this case, "GOSHITSU", "KAGI", and "O NEGAI" are basic semantic features registered in the basic semantic feature dictionary 73. Also, "{R room number}" expressed in the form of "{R variable semantic feature name}" is a variable semantic feature found through the automaton search process by the analyzer 66, and its variable semantic feature entry name is a character string, "502".

The preceding paragraph means that the semantic feature name extraction process has been executed as if it had been Consequently, according to the present example, numerical or alphabetical strings of arbitrary lengths can be treated as variable semantic features.

The automaton program for the automaton search process in this example is made up by directly programming the association, or correspondence, of the specific character string with the variable semantic feature name. However, the present embodiment is not limited to this makeup. The automaton program can also be constructed by previously registering in the variable semantic feature dictionary 74 the definitions by normal expressions or the like of character string patterns, which definitions are made by the system designer, and then transforming them by a transformation system such that the character string patterns can be recognized.

As shown above, in the present example, the analyzer 66 is provided with the automaton processor that searches the input conversational sentence for such a specific character string as could not be registered directly into the semantic feature dictionary 72, to output the variable semantic feature name and variable semantic feature entry name (pertinent specific character string) associated with the found specific character string. Accordingly, in the semantic feature name extraction process by the analyzer 66, a variable semantic feature name having the specific character string as its variable semantic feature entry name can be extracted as if the variable semantic feature having the specific character string as its variable semantic feature expression were registered in the variable semantic feature dictionary 74.

Consequently, such a specific character string as could not be registered directly into the semantic feature dictionary 72 can also be given a certain semantic feature, so that input conversational sentences in which numerical strings or alphabetical strings are present can be managed.

Next is described a conversational sentence translating process in which, out of paired component elements of first-language and second-language sentences, words corresponding to the component elements of the second-language sentence can be omitted.

In the present example, optional variable semantic features are defined as variable semantic features constituting part of the semantic feature strings of conversational sentence examples registered in the bilingual database 71. The optional variable semantic feature refers to a variable semantic feature corresponding to a component element. of the second-language sentence having no corresponding component element in the first-language sentence.

The description of the optional variable semantic feature in the variable semantic feature dictionary 74 is made in such a way that its variable semantic feature name is described in the form of "{S variable semantic feature name}", and that "nil (a reserved word representative of a blank character string)" is described as a variable semantic feature entry name corresponding to the translated variable semantic feature expression, as shown in FIG. 44. In this way, the fact that no characters corresponding to the character "a" in the second language are present in the first language is expressly shown.

The description of optional variable semantic features in the semantic feature strings in conversational sentence examples registered in the bilingual database 71 is also made in the form of "{S variable semantic feature name}".

The replacement process for variable semantic features in this example is carried out as follows.

Figure 45:
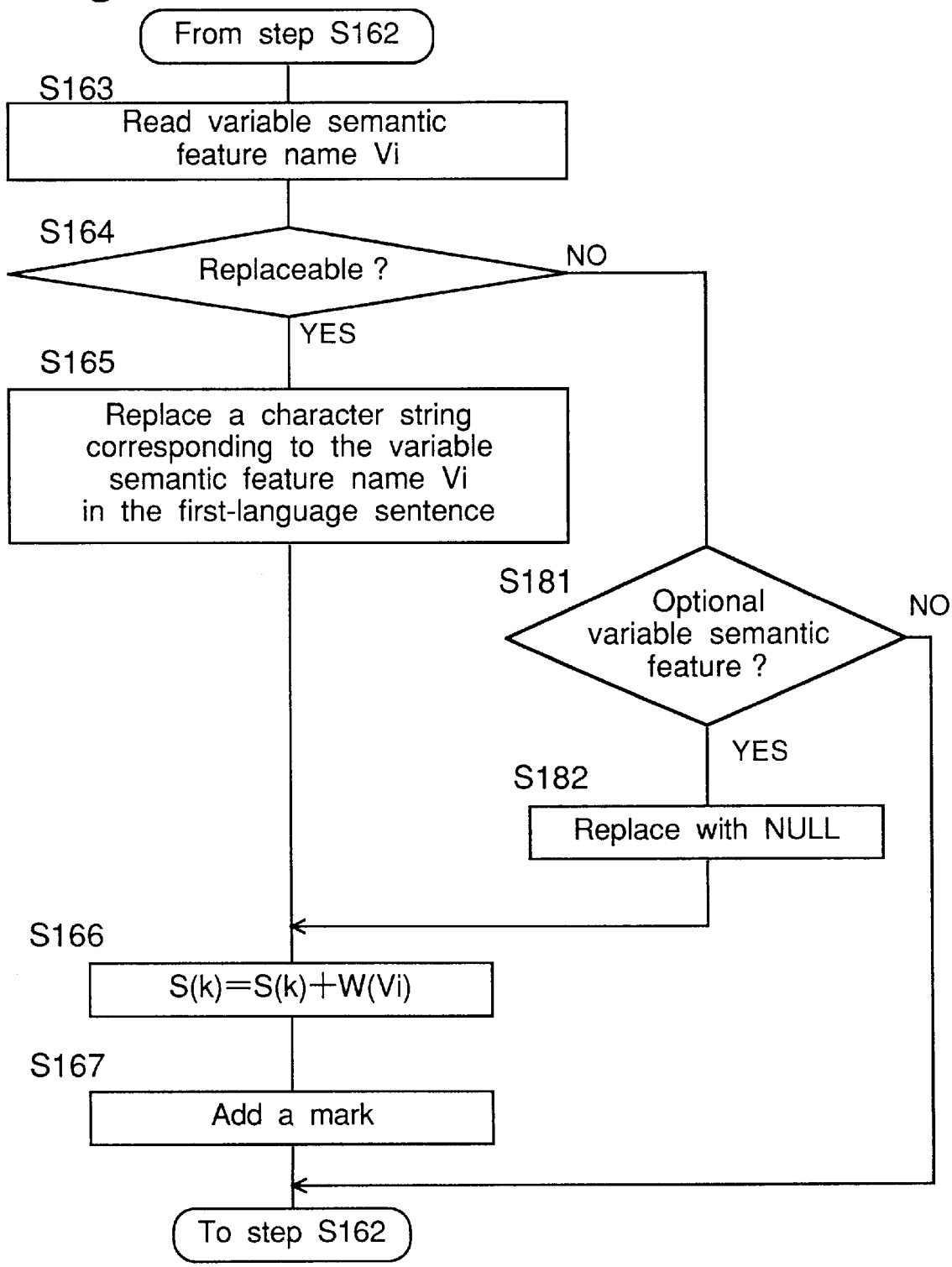
FIG. 45 is an explanatory view of the degree-of-coincidence calculation subroutine for a conversational sentence example containing an optional variable semantic feature.

FIG. 45 is a flow chart for the variable semantic feature replacement process in this example, part of the degree-of-coincidence calculation subroutine. In the replacement process of this example, if it is decided at step S164 in the FIG. 39 degree-of-coincidence calculation subroutine that the variable semantic feature is unreplaceable (i.e., no identical variable semantic feature name has been extracted from the input conversational sentence), then "NULL (blank character string)" is put for replacement when the variable semantic feature name Vi is an optional variable semantic feature.

More specifically, as shown in FIG. 45, if it is decided at step S164 in the FIG. 39 degree-of-coincidence calculation subroutine that the variable semantic feature is not replaceable, then the program goes to step S181.

At step S181, it is decided whether or not the variable semantic feature name Vi is of an optional variable semantic feature. As a result, if it is of an optional variable semantic feature, the program goes to step S182. If it is not of an optional variable semantic feature, the program returns to step S162.

The decision on the optional variable semantic feature is made depending on whether or not a code for the variable semantic feature name Vi is included in the semantic feature codes as shown in FIG. 37A.

At step S182, the character string corresponding to the variable semantic feature name Vi in the first-language sentence of the conversational sentence example is replaced with "NULL (blank character string)". Further, the character string corresponding to the variable semantic feature name Vi in the second-language sentence is replaced with a translated variable semantic feature expression corresponding to the variable semantic feature entry name "nil". After that, the program goes to step S166 in the FIG. 39 degree-of-coincidence calculation subroutine.

The conversational sentence translating process in this example is now concretely described on the cases, by way of example, where the input conversational sentence is "SONO HON WO KUDASAI.T", and where the input conversational sentence is "HON WO KUDASAI."

Now assume that the contents of the variable semantic feature dictionary 74 are as shown in FIG. 44, and that the following conversational sentence examples are registered in the bilingual database 71.

Conversational sentence example n:
{KONO} HON WO KUDASAI.
I'd like to buy {this} book.
{S KONO·SONO} HON KUDASAI
When the input conversational sentence is "SONO HON WO KUDASAI.", the following semantic features:

{S KONO·SONO}: SONO HON KUDASAI are extracted. In this case, a variable semantic feature name {S KONO·SONO} is present in the semantic features extracted from the input conversational sentence, and the variable semantic feature name {S KONO·SONO} is present also in the semantic feature string of the conversational sentence example n. Therefore, at step S164 in the flow chart shown in FIG. 45, it is decided that the variable semantic feature name {S KONO·SONO} is replaceable. So, a combination of the variable semantic feature entry name "SONO" and the translated variable semantic feature expression "the" is retrieved from the variable semantic feature dictionary 74 shown in FIG. 44, and subjected to the aforementioned replacement processing. As a result, new first-language and second-language sentences are obtained as follows:

First-language sentence: {SONO} HON WO KUDASAI.
Second-language sentence:
I'd like to buy {the} book.

Next, when the input conversational sentence is "HON WO KUDASAI.", the following semantic features:

HON KUDASAI
are extracted. In this case, the variable semantic feature name {S KONO·SONO}, which is present in the semantic feature string of the conversational sentence example n, is not present in the semantic features extracted from the input conversational sentence. Therefore, it is decided at step S164 in the FIG. 45 flow chart that the variable semantic feature name {S KONO·SONO} is unreplaceable. However, since the variable semantic feature name {S KONO·SONO} present in the semantic feature string of the conversational sentence example n is an optional variable semantic feature, the translated variable semantic feature expression, "a", which corresponds to the variable semantic feature entry name "nil", is obtained from the variable semantic feature dictionary 74 shown in FIG. 44, and then subjected to the replacement processing. As a result, new first-language and second-language sentences are obtained as follows:

First-language sentence: HON WO KUDASAI.
Second-language sentence:
I'd like to buy {a} book.

Thus, even if a conversational sentence in which the word equivalent to a definite or indefinite article is omitted is entered, an appropriate article is added so that a natural second-language sentence is obtained.

As shown above, in the present example, a variable semantic feature whose variable semantic feature entry name corresponding to the translated variable semantic feature expression is not present in an input sentence is defined as an optional variable semantic feature whose variable semantic feature name is expressed as "{S variable semantic feature name}" and whose variable semantic feature entry name is "nil". And if it is decided at steps S164 and S181 in the FIG. 45 degree-of-coincidence calculation subroutine that the variable semantic feature name of the conversational sentence example is unreplaceable and also an optional variable semantic feature name, then the character string corresponding to the optional variable semantic feature name in the first-language sentence of the conversational sentence example is replaced with the character string "NULL" and the character string corresponding to the optional variable semantic feature name in the second-language sentence is replaced with a translated variable semantic feature expression corresponding to the variable semantic feature entry name "nil".

Therefore, it is possible to manage such cases where a word equivalent to a component element of the first-language sentence of the conversational sentence example is omitted from the input conversational sentence.

Consequently, in the present example, even if Japanese words equivalent to articles in English, which are rarely used in Japanese, are omitted from the input conversational sentence in Japanese, an appropriate article is automatically added so that a natural English sentence is obtained.

Next described is a conversational sentence translating process in which a component element of the second-language sentence, which pairs with a component element of the first-language sentence, can be omitted from the second-language sentence.

In the present example, passive variable semantic features are defined as variable semantic features constituting part of the semantic feature strings of conversational sentence examples registered in the bilingual database 71. The passive variable semantic feature refers to a variable semantic feature corresponding to a component element of the first-language sentence having no corresponding component element in the second-language sentence (i.e., blank character string).

The description of the passive variable semantic feature in the variable semantic feature dictionary 74 is made in such a way that the variable semantic feature name is described in the form of "{S variable semantic feature name}", and that "nil (a reserved word representative of a blank character string)" is described as the translated variable semantic feature expression corresponding to the variable semantic feature entry name, as shown in FIG. 46.

The description of passive variable semantic features in the semantic feature strings in conversational sentence examples registered in the bilingual database 71 is also made in the form of "{S variable semantic feature name}".

It is noted that the internal decision as to whether or not a certain variable semantic feature is a passive variable semantic feature is made depending on whether or not a semantic feature code as shown in FIG. 37A is present.

The replacement processing for variable semantic features in this example is carried out as follows.

Figure 47:
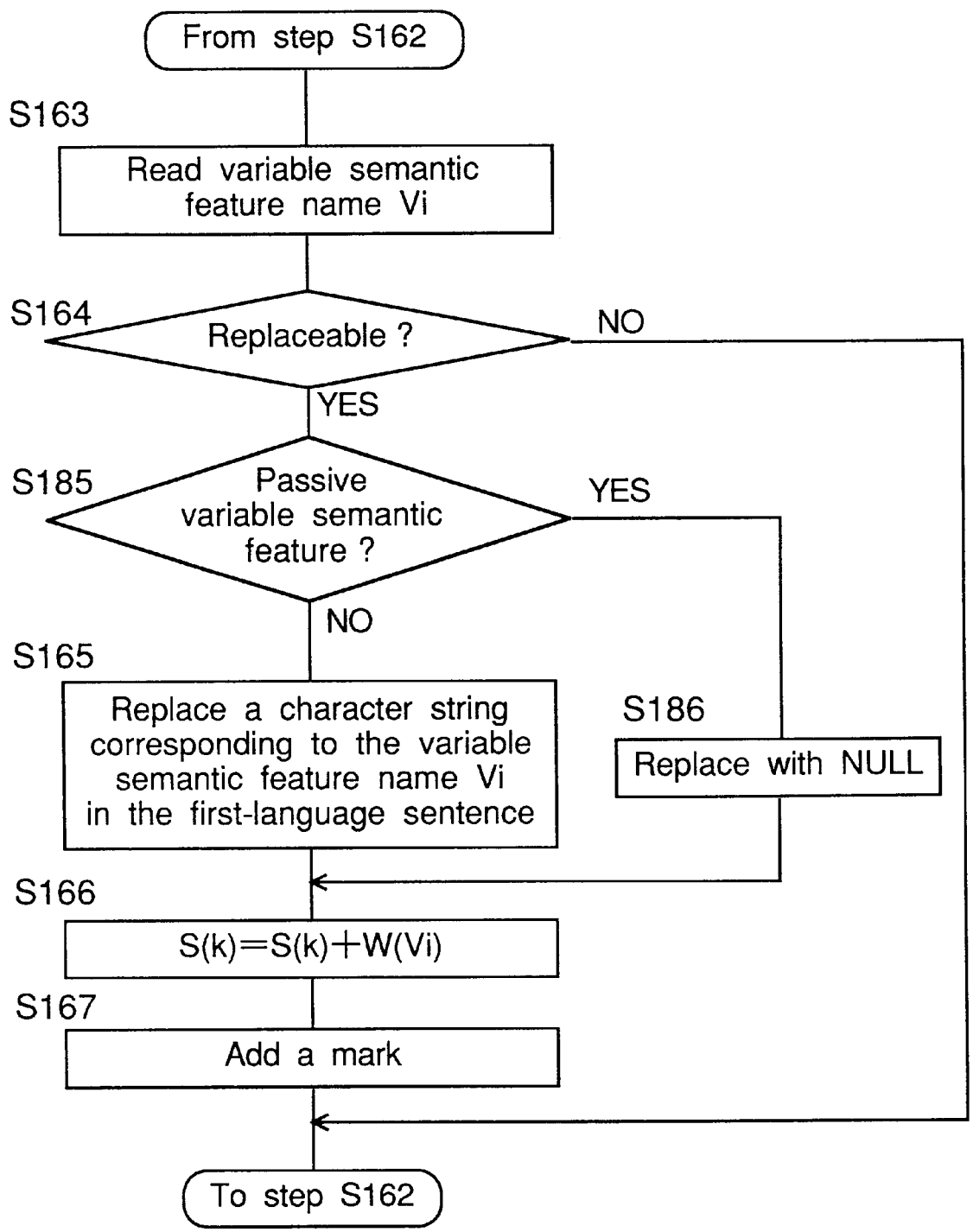
FIG. 47 is an explanatory view of the degree-of-coincidence calculation subroutine for a conversational sentence example containing a passive variable semantic feature.

FIG. 47 is a flow chart for the variable semantic feature replacement process in this example, part of the degree-of-coincidence calculation subroutine. In the replacement process of this example, if it is decided at step S164 in the FIG. 39 degree-of-coincidence calculation subroutine that the variable semantic feature is replaceable (i.e., an identical variable semantic feature name has been extracted from the input conversational sentence), then "NULL (blank character string)" is put as replacement in the second-language sentence when the variable semantic feature name Vi is a passive variable semantic feature.

More specifically, as shown in FIG. 47, if it is decided at step S164 in the FIG. 39 degree-of-coincidence calculation subroutine that the variable semantic feature is replaceable, then the program goes to step S185.

At step S185, it is decided whether or not the variable semantic feature name Vi is a passive variable semantic feature. As a result, if it is a passive variable semantic feature, the program goes to step S186. If it is not a passive variable semantic feature, the program goes to step S165, where a normal replacement process is carried out, and then the program goes to step S166.

At step S186, the character string corresponding to the variable semantic feature name Vi in the second-language sentence of the conversational sentence example is replaced with "NULL (blank character string)". After that, the program goes to step S166.

The conversational sentence translating process in this example is now concretely described on the case, by way of example, where the input conversational sentence is "koppu WO FUTATSU ONEGAI SHIMASU." (which means "Two glasses, please."). In this case, a suffix, "TSU", which has no English equivalent and which is used to help the expression of "numbers", is present in the input conversational sentence.

Now, assuming that the registration contents of the variable semantic feature dictionary 74 are as shown in FIG. 46, the semantic features extracted from the input conversational sentence are as follows.

koppu {n SUJI} {S TAN'I} ONEGAI, where "SUJI" means "number" and "TAN'I" means "unit". In this case, a passive variable semantic feature name {S "TAN'I"} is present in the semantic feature string of the found conversational sentence example, while no character string corresponding to the variable semantic feature name {S TAN'I} is described in the second-language sentence. Therefore, at step S186 in the flow chart shown in FIG. 47, the translated variable semantic feature expression "NULL (blank character string)" corresponding to the variable semantic feature entry name "TSU" is obtained from the variable semantic feature dictionary 74 shown in FIG. 46, and subjected to the replacement processing. As a result, a new conversational sentence example m is obtained as follows:

Conversational sentence example m:
koppu WO {FUTA} {TSU} ONEGAI SHIMASU.
{2} glasses, please
koppu {n SUJI} {S TAN'I} ONEGAI As a result, even if a word in the first language having no corresponding word in the second-language sentence, such as a suffix which is added to a numeral, is present in the input conversational sentence, the word in the second-language sentence of the found conversational sentence example is replaced with a blank character string, by which a natural second-language sentence is obtained.

As shown above, in the present example, passive variable semantic features whose variable semantic feature names are "{S variable semantic feature name}" and whose translated variable semantic feature expressions are "nil" are defined as variable semantic features having no translated variable semantic feature expressions corresponding to the variable semantic feature entry names. And if it is decided at steps S164 and S185 in the degree-of-coincidence calculation subroutine shown in FIG. 47 that the variable semantic feature name of the conversational sentence example is replaceable and is also a passive variable semantic feature name, then the character string corresponding to the passive variable semantic feature name in the second-language sentence of the conversational sentence example is replaced with "NULL".

Therefore, it is possible to manage such input conversational sentences that an equivalent to a component element of the first-language sentence is not present in the second-language sentence.

Consequently, in the present example, even if a word which would not appear in English, such as the suffix, "TSU", which is added to a numeral in Japanese, is present in the input conversational sentence in the Japanese language, the word is automatically replaced with a blank character string in the corresponding second-language sentence so that a natural English sentence is obtained.

As described above, in the present embodiment, the semantic feature strings of conversational sentence examples are described as a plurality of sets of a semantic feature string extracted from the first-language sentence and a semantic feature string which is extracted from an assumed sentence semantically identical or similar to the first-language sentence. When the conversational sentence examples are searched for by the semantic searcher 67, the search is made in the units of the individual semantic feature strings in the conversational sentence examples. Therefore, if the identical semantic feature name is present in a plurality of individual semantic feature strings of a conversational sentence example, the same conversational sentence example is retrieved a plurality of times as a result of the search taking the semantic feature name as the key.

Consequently, according to the present embodiment, one conversational sentence example will do for semantically identical input conversational sentences or semantically similar input conversational sentences, so that the capacity of the bilingual database 71 can be reduced.

In the present embodiment, supplementary information such as "situation", "sex", or "style", under which the first-language is used, is described to conversational sentence examples. Then, in the process of selecting a conversational sentence example by the selector 69, a pair of a first-language sentence and supplementary information is displayed for each of the conversational sentence examples selected based on the degree of coincidence and being identical in the first-language sentence but different in the second-language sentence, so that a conversational sentence example associated with supplementary information specified by the user is selected. Thus, out of conversational sentence examples having an identical first-language sentence, a conversational sentence example having a second-language sentence suited to the situation of use or conversational counterpart can be selected correctly. This makes it possible to handle input conversational sentences that should result in different translations depending on the situation of use or conversational counterpart.

Further, in the present embodiment, optional semantic features described in the form of "(basic semantic feature name)" are defined as basic semantic features. And, in the process of calculating the penalty P(k) by the feature element replacer 68, the calculation of penalty P(k) for optional semantic features is skipped. Therefore, the degree of coincidence will never lower even if a word or phrase corresponding to an optional semantic feature is not present in the input conversational sentence.

In other words, according to the present embodiment, by taking as an optional semantic feature a basic semantic feature that is often omitted from the first-language sentence because of its low semantic significance, the evaluation value can be prevented from lowering due to trivial differences in input expression.

Also, in the present embodiment, the analyzer 66 comprises an automaton processor, so that specific character strings that could not be registered directly into the semantic feature dictionary 72 are found by automaton search from the input conversational sentence. Therefore, a variable semantic feature name whose variable semantic feature entry name is a specific character string can be extracted from the input conversational sentence, as if variable semantic features whose variable semantic feature expressions are specific character strings were registered in the variable semantic feature dictionary 74.

As a result, according to the present embodiment, it is possible to handle input conversational sentences in which such numerical strings or alphabetical strings as could not be registered directly into the semantic feature dictionary 72 are present.

Further, in the present embodiment, optional variable semantic features whose variable semantic feature name is expressed in the form of "{S variable semantic feature name}" and whose variable semantic feature entry name is "nil" are defined as variable semantic features having no variable semantic feature entry name corresponding to the translated variable semantic feature expression. Then, in the replacement process for an optional variable semantic feature by the semantic searcher 67 and feature element replacer 68, an unreplaceable character string corresponding to the optional variable semantic feature name in the first-language sentence of the conversational sentence example is replaced with "NULL", while a character string corresponding to the optional variable semantic feature name in the second-language sentence is replaced with the translated variable semantic feature expression corresponding to the variable semantic feature entry name "nil".

Therefore, according to the present embodiment, even if a Japanese equivalent of an English article "a", which is rarely used in Japanese, does not occur in the input conversational sentence in Japanese, an appropriate article "a" is automatically added so that a natural English sentence can be obtained.

Furthermore, in the present embodiment, passive variable semantic features whose variable semantic feature names are expressed in the form of "{S variable semantic feature name}" and whose translated variable semantic feature expression is "nil" are defined as variable semantic features which have no translated variable semantic feature expression corresponding to the variable semantic feature entry name. In the replacement process for a passive variable semantic feature by the semantic searcher 67 and feature element replacer 68, a character string corresponding to the passive variable semantic feature name in the second-language sentence of the conversational sentence example is replaced with "NULL".

Therefore, even if any word such as the suffix, "TSU", which is added to a numeral and which would not be used in English, is present in the input conversational sentence in Japanese, the word is automatically replaced with a blank character string in the corresponding second-language sentence so that a natural English sentence can be obtained.

Fifth Embodiment

In the first embodiment, a conversational sentence translation apparatus has been proposed in which semantic features are extracted from the input conversational sentence with reference to dictionaries, conversational sentence examples to each of which a semantic feature string extracted from the first-language sentence is added are registered in the bilingual database, a conversational sentence example having a semantic feature string well matching the extracted semantic features of the input sentence, and the first-language and second-language sentences of the selected conversational sentence example are displayed. The second embodiment aims to reduce the number of registered conversational sentence examples by defining variable semantic features as one type of the semantic features, such as traffic means or places, which are changeable depending on the contents of the input conversational sentence. The third embodiment is designed to prevent output of erroneous conversational sentence examples or output of unnatural conversational sentence examples in the case where variable semantic features having the same variable semantic feature name are present in the input conversational sentence or conversational sentence examples. The fourth embodiment aims to produce a high quality translation, by obtaining a conversational sentence example suited to the situation of use or conversational counterpart with an appropriate measure for semantically different input conversational sentences or trivial differences in input expression without involving so many conversational sentence examples.

However, in the conversational sentence translation apparatuses described above, there would still arise cases where in spite of laborious input a first-language sentence just matching the input sentence is not displayed. For example, when a conversational sentence, "<u>ASU</u> NO 3<u>JI</u> NI hisuro KARA <u>TOKYO</u> HE <u>IKU</u> <u>HIKOKI</u> NO <u>KIN'ENSEKI</u> WO <u>YOYAKU</u> SHITE <u>HOSHII</u>." (which means "I would like you to reserve a seat in the non-smoking section of a flight at 3:00 p.m. tomorrow from Heathrow to Tokyo."), is entered, a possible result may be, for example, that a first-language sentence of registered conversational sentence examples, "<u>ASU</u> NO <u>HIKOKI</u> WO <u>YOYAKU</u> SHITAI" (which means "I would like to make a flight reservation for tomorrow."), is the closest to the input conversational sentence, in which case the effort of entering a long sentence results in one half the original sentence in vain.

Accordingly, described is a conversational sentence translation apparatus of the present embodiment which allows a targeted conversational sentence example to be obtained with a simple input sentence. This is realized by correcting a short input conversational sentence so that a conversational sentence example to be selected is gradually approached.

Figure 48:
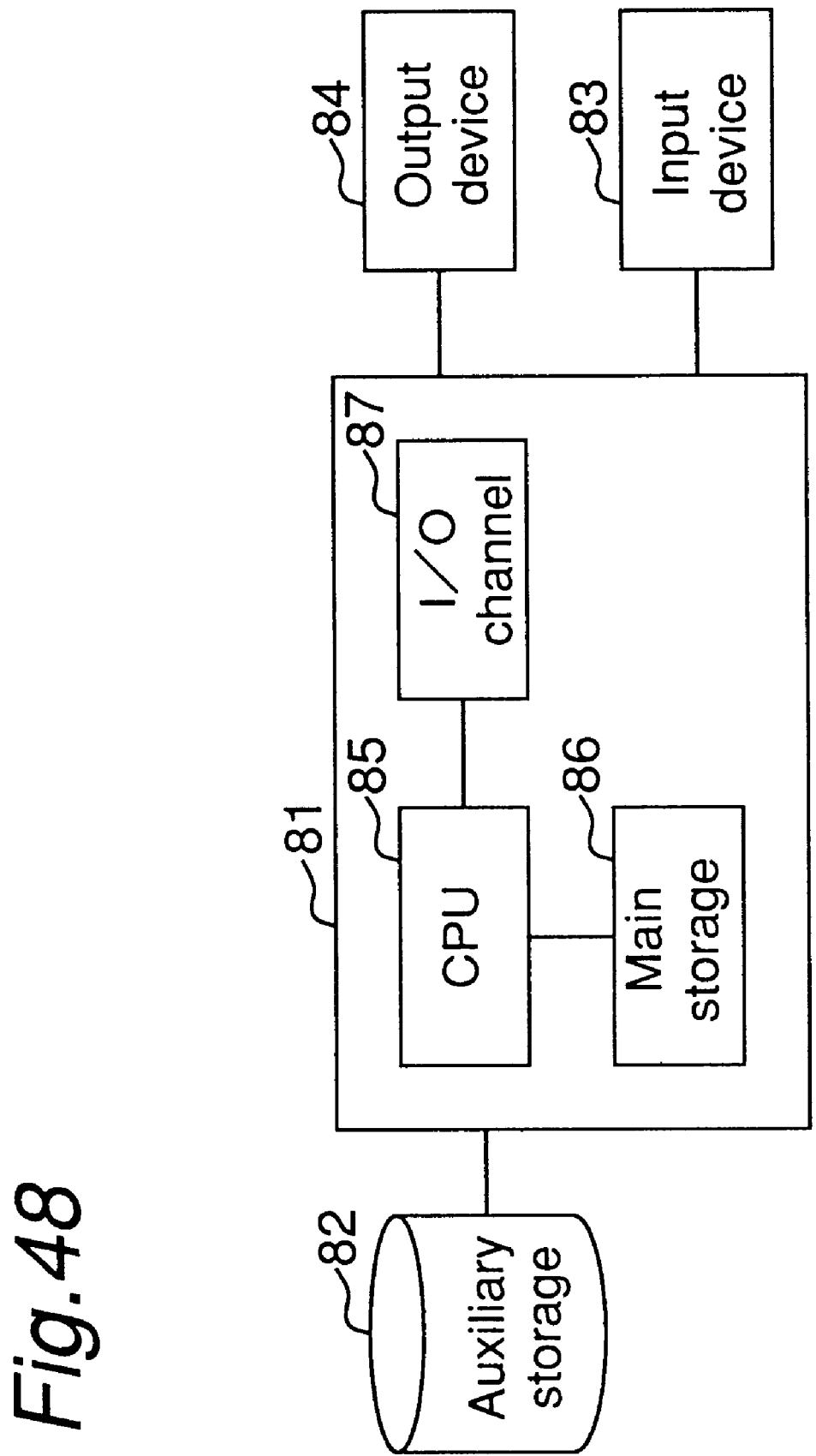
FIG. 48 is a schematic block diagram of a conversational sentence translation apparatus according to a fifth embodiment of the present invention.
Figure 49:
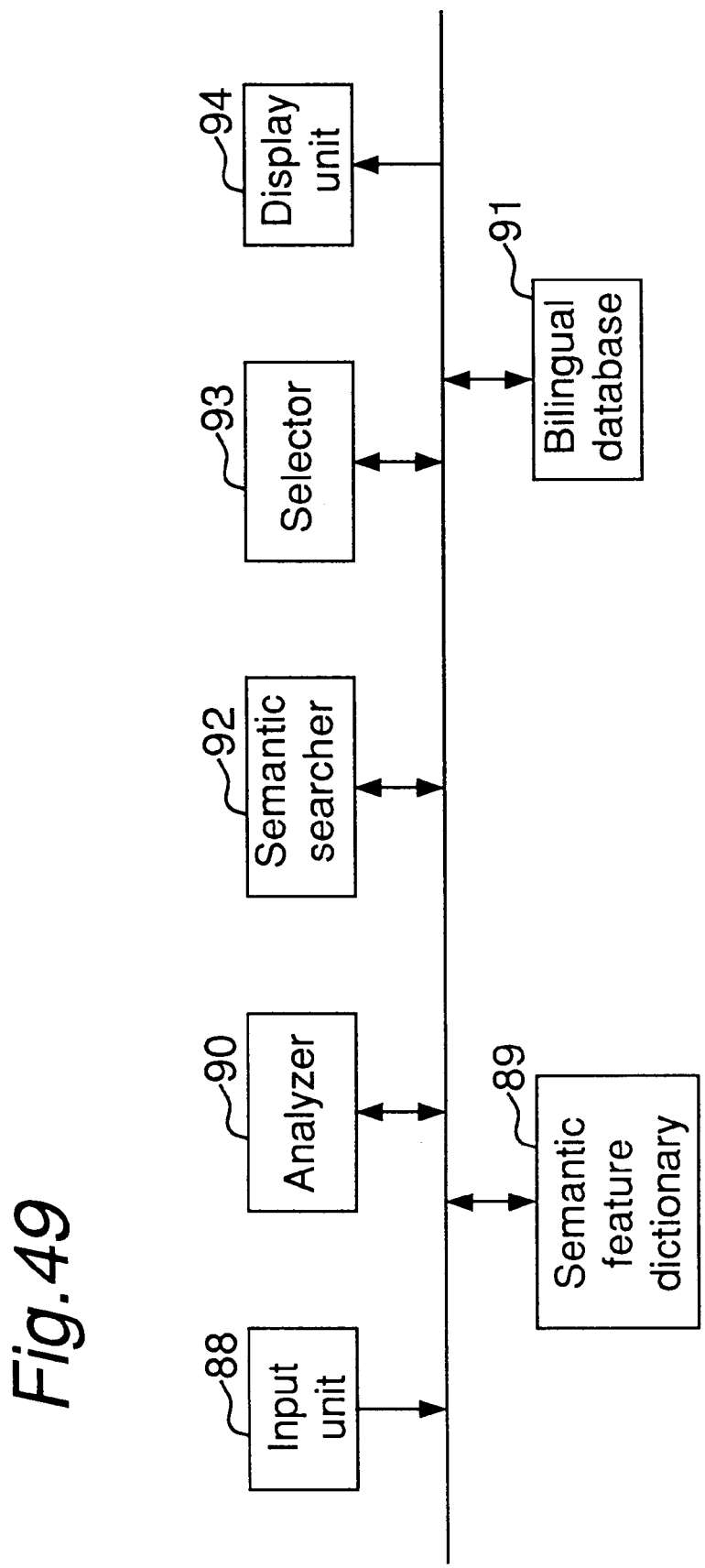
FIG. 49 is a functional block diagram of the conversational sentence translation apparatus shown in FIG. 48.

FIG. 48 is a schematic arrangement diagram of the fifth embodiment. FIG. 49 is a functional block diagram of the same.

As shown in FIG. 48, the conversational sentence translation apparatus is essentially constituted of a translation processing unit having a CPU 85, a main storage 86, and an input/output channel 87 and serving for translating an input conversational sentence, an auxiliary storage 82 for storing dictionaries to be used in the translating process, an input device 83 provided by a keyboard, hand-writing recognition device or speech recognition device through which a free conversational sentence in the first language is input and entered, and an output device 84 provided by a CRT or the like by which selected conversational sentence examples or the like are displayed.

Referring to FIG. 49, an input unit 88, which is implemented by the input device 83, the CPU 85, and the like, transforms a first-language conversational sentence or corrected sentence entered by the user into character strings, and transmits them to an analyzer 90 character by character.

A semantic feature dictionary 89, which is stored in the auxiliary storage 82, has a description form composed of semantic feature name and semantic feature expression, as in FIG. 2 of the first embodiment. The semantic feature dictionary 89 is used in the process of extracting semantic feature names from the input first-language conversational sentence. The semantic feature dictionary 89 in the present embodiment is assumed to have such description contents as shown in FIG. 50.

The analyzer 90, which is implemented by the CPU 85, extracts semantic feature names from a first-language conversational sentence entered through the input unit 88 by using the semantic feature dictionary 89.

In a bilingual database 91, which is stored in the auxiliary storage 82, conversational sentence examples each composed of a first-language sentence that is a source sentence, a second-language sentence that is a target sentence of translation, and a semantic feature string that is a string of semantic feature names extracted from the first-language sentence, are registered. It is assumed that conversational sentence examples as shown in FIG. 51 are registered in the bilingual database 91 of the present embodiment.

A semantic searcher 92, which is implemented by the CPU 85, compares semantic feature name strings extracted by the analyzer 90 with semantic feature strings of the conversational sentence examples registered in the bilingual database 91 to select conversational sentence examples having any coincident semantic feature names. Then, based on the selected semantic feature strings of conversational sentence examples and the semantic feature name string extracted from the input conversational sentence, the selected conversational sentence examples are evaluated for their validity as a sentence example for the input conversational sentence. Further based on the evaluation results, a plurality of conversational sentence examples are selected. The method for this process is not limited particularly.

A selector 93, which is implemented by the CPU 85, the main storage 86, the output device 84, and the like, selects one conversational sentence example through a dialogue with the user.

A display unit 94, which is implemented by the CPU 85, the main storage 86, the output device 84, and the like, displays the first-language sentence and the second-language sentence of the selected conversational sentence example.

In the fifth embodiment, semantic features are not classified into willed semantic features, contextual semantic features, or variable semantic features, unlike the foregoing embodiments. However, it is also possible that the semantic features are classified into such types of semantic features as required, and that the feature element replacer is provided to allow a flexible translating operation.

Now the conversational sentence translating operation to be executed by the conversational sentence translation apparatus with the above constitution is explained.

Figure 52:
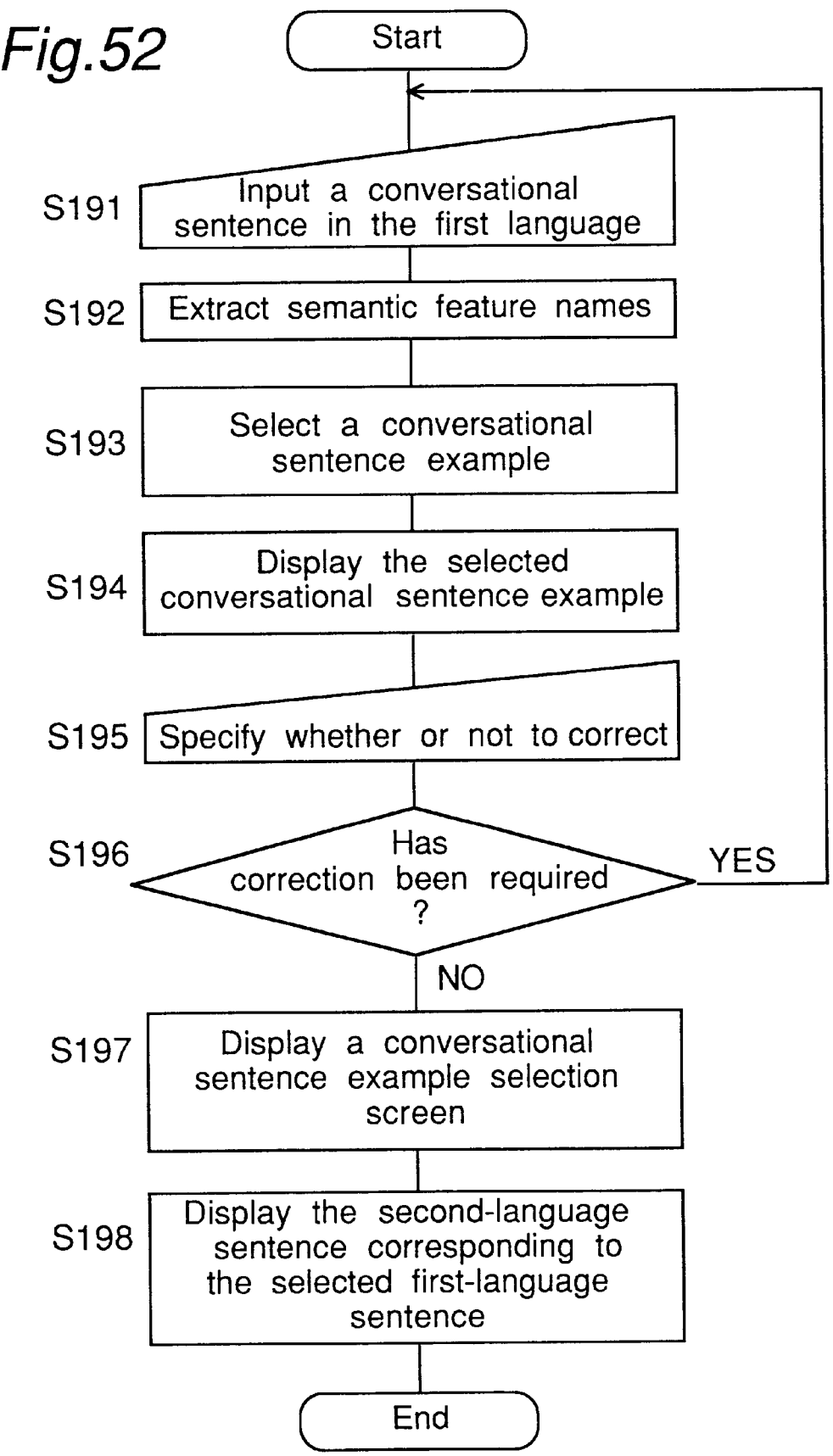
FIG. 52 is a flow chart of a conversational sentence translating operation to be executed by the input unit, analyzer, semantic searcher, selector, and display unit of FIG. 49.

FIG. 52 shows a flow chart of the conversational sentence translating operation to be executed by the input unit 88, the analyzer 90, the semantic searcher 92, the selector 93, and the display unit 94. The following describes a conversational sentence translating operation in the present embodiment according to FIG. 52.

The conversational sentence translating process in the present embodiment is designed to obtain a conversational sentence example having a first-language sentence closer to a targeted first-language sentence than any other, from a simple input conversational sentence, by correcting the input conversational sentence with reference to the first-language sentences of conversational sentence examples selected based on the conversational sentence entered by the user.

At step S191, a conversational sentence in the first language is inputted to the input unit 88. Then, the input conversational sentence is transformed into character strings and transmitted to the analyzer 90.

At step S192, the input conversational sentence is analyzed with the use of the semantic feature dictionary 89 by the analyzer 90, as a result of which semantic feature names contained in the input conversational sentence are extracted.

At step S193, the bilingual database 91 is searched by the semantic searcher 92 so that conversational sentence examples in which the semantic feature names extracted at step S192 are contained in their semantic feature strings are selected. The selected conversational sentence examples are evaluated with respect to their validity, so that a plurality of conversational sentence examples are selected.

At step S194, the first-language sentence of a conversational sentence example selected at step S193 is displayed, along with an-inquiry sentence, "Do you correct the sentence? (Y/N)", to ask whether or not the input conversational sentence needs to be corrected.

At step S195, "Y" is entered when the user requires correction, and "N" is entered when not. Then, the key code of "Y" or "N" is transmitted to the selector 93 by the input unit 88.

At step S196, it is decided by the selector 93 whether or not "Y" has been entered so that "correction" is specified, based on the key code transmitted from the input unit 88. As a result, if "correction" has not been specified, or required, the program goes to step S197. If it has, the program returns to step S191 to attend to processing on a corrected sentence.

The "corrected sentence" refers to an input conversational sentence resulting from adding some limitative phrases to a previously entered conversational sentence, the limitative phrases (additional sentence) further limiting the meaning of the conversational sentence. Increasingly limiting the meaning expressed by an input conversational sentence in this way leads the first-language sentence of a selected conversational sentence example to a targeted conversational sentence. Then, when it is decided by the user that a conversational sentence example having the targeted first-language sentence has been selected, "N" is entered at step S196. As a result, the program goes to step S197.

At step S197, a menu screen is displayed by the selector 93 to allow the user to select one out of the first-language sentences of currently selected conversational sentence examples. Then, the selected first-language sentence is recognized.

At step S198, the display contents of the display screen are switched to a second-language sentence corresponding to the selected first-language sentence by the display unit 94. After that, the conversational sentence translating operation is ended.

As a consequence, the conversational sentence in the second language that the user really wants can be obtained.

Hereinbelow, the conversational sentence translating operation is explained in more detail according to the transition of the input conversational sentence (corrected sentence) and displayed first-language sentences as shown in FIG. 53, on a case where a conversational sentence example having a Japanese (first language) sentence, "hoteru HE IKU MICHIJUN WO OSHIETE KUDASAI", is selected.

It is assumed here that conversational sentence examples other than those shown in FIG. 51 are also registered in the bilingual database 91. It is also assumed that the semantic searcher 92 determines an evaluation, for example, like the degree of coincidence (%) in the fourth embodiment to select the highest five conversational sentence examples in the order of this evaluation.

First, an input conversational sentence, "OSHIETE", is entered by the user. Then, with reference to the semantic feature dictionary 89 as shown in FIG. 50, the analyzer 90 extracts a semantic feature name, "OSHIERU", having a semantic feature expression, "OSHIE" (step S192). Then, the bilingual database 91 is searched by the semantic searcher 92 for conversational sentence examples having the semantic feature name, "OSHIERU", and the evaluations of the searched conversational sentence examples are calculated. Thus, five conversational sentence examples are selected in the order of decreasing evaluation (step S193). As a result, as shown in FIG. 53, out of all the conversational sentence examples that have the semantic feature name, "OSHIERU", extracted from the first-time input conversational sentence, "OSHIETE", first-language sentences of "MIDOKORO WO OSHIETE KUDASAI.", "WATASHI NO DENWABANGO WO OSHIEMASU.", "SHINRYOJO WO SHOKAI SHITE KUDASAI.", "kyanseru GA ATTARA OSHIETE KUDASAI.", and "SEKI GA AITARA YONDE KUDASAI." are selected and displayed on the display unit 94 (step S194).

In the present example, it is assumed that the degree of coincidence of the first-language sentence, "hoteru HE IKU MICHIJUN WO OSHIETE KUDASAI.", to the first-time input conversational sentence, "OSHIETE", is so small that no conversational sentence examples having the first-language have been selected.

Now if it is the way to the hotel that the user wants to know, then the information the user wants to know is not contained at all in the five displayed first-language sentences. Accordingly, the user enters a "Y" in response to the inquiry sentence, "Do you correct the sentence? (Y/N)" (step S195). Then, according to the correction screen on which the first-time input conversational sentence, "OSHIETE", is displayed, a phrase, "hoteru", which further limits the meaning of the input conversational sentence, is additionally entered. Subsequently, as with the first-time input conversational sentence, the extraction of semantic feature names and the selection of conversational sentence examples are carried out based on the second-time input conversational sentence "OSHIETE, hoteru". As a result, as shown in FIG. 53, five conversational sentence examples are selected out of all the conversational sentence examples having, in their semantic feature strings, the semantic feature names, " OSHIERU hoteru", extracted from the second-time input conversational sentence, "OSHIETE, hoteru", and then they are displayed on the display unit 94 (step S194). It is noted that, in the present example, a conversational sentence example having the targeted first-language sentence has not yet been selected.

Because what the user wants to know is not contained at all in the five displayed first-language sentences, correction of the input sentence is required by the user (step S195). Then, a phrase, "HE NO MICHI", which further limits the meaning of the second-time input conversational sentence, " OSHIETE, hoteru", is entered on the correction screen. Subsequently, the extraction of semantic feature names and the selection of conversational sentence examples are carried out based on the third-time input conversational sentence, "OSHIETE, hoteru HE NO MICHI". As a result, as shown in FIG. 53, a conversational sentence example, "hoteru HE IKU MICHIJUN WO OSHIETE KUDASAI.", which has, in its semantic feature string, the semantic feature names of "OSHIERU hoteru IKIKATA" extracted from the third-time input conversational sentence, "OSHIETE, hoteru HE NO MICHI", is selected and displayed on the display unit 94 (step S194).

Now, what the user wants to know is contained enough in the displayed first-language sentence, "hoteru HE IKU MICHIJUN WO OSHIETE KUDASAI.". Accordingly, the user enters an "N" in response to the inquiry sentence, "Do you correct the sentence? (Y/N)" (step S195). Then, the display screen is switched to a menu screen to choose one of the currently displayed first-language sentences, where the user selects the first-language sentence, "hoteru HE IKU MICHIJUN WO OSHIETE KUDASAI.". Then, the second-language sentence, "Could you show me the way to the hotel?", corresponding to the first-language sentence is displayed (step S198).

As described above, a short conversational sentence is entered first, and then, correction to the input conversational sentence is iterated several times, so that a conversational sentence example having a targeted first-language sentence can be approached easily. As a result, the targeted first-language sentence can be obtained with a simple input conversational sentence, eliminating the possibility that a proper conversational sentence example cannot be obtained in spite of the laborious input of a long conversational sentence.

Next described is a conversational sentence translating process in which, in correcting the input conversational sentence with reference to the selected first-language sentences of conversational sentence examples, the number of the selected conversational sentence examples is also displayed so that the user is allowed to correct the input conversational sentence, taking into consideration the number of the selected conversational sentence examples.

In the present example, the semantic searcher 92 has a counter for counting the number of sentence examples, and the conversational sentence translating operation to be executed by the input unit 88, analyzer 90, semantic searcher 92, selector 93, and display unit 94 is carried out as shown below according to the flow chart of conversational sentence translating operation shown in FIG. 54.

At step S201, a conversational sentence in the first language is entered to the input unit 88, and the input conversational sentence is transformed into character strings and transmitted to the analyzer 90 by the input unit 88.

At step S202, the input conversational sentence is analyzed by the analyzer 90 with the use of the semantic feature dictionary 89, so that semantic feature names contained in the input conversational sentence are extracted.

At step S203, the bilingual database 91 is searched by the semantic searcher 92 so that conversational sentence examples in which the semantic feature names extracted at step S202 are contained in their semantic feature strings are selected. Out of these selected conversational sentence examples, appropriate ones for the input conversational sentence are further selected.

At step S204, the number of the conversational sentence examples selected by the semantic searcher 92 are counted.

At step S205, the first-language sentences of the conversational sentence examples selected at step S203, and the count of selected conversational sentence examples counted at step S204 are displayed by the selector 93 along with an inquiry sentence, "Do you correct the sentence? (Y/N)", to ask whether or not the input conversational sentence needs to be corrected.

At step S206, "Y" is entered to the input unit 88 when the user requires correction, and "N" is entered when not. Then, the key code of "Y" or "N" is transmitted to the selector 93 by the input unit 88.

At step S207, it is decided by the selector 93 whether or not "Y" has been entered so that "correction" is specified, or required. As a result, if "correction" has not been specified, the program goes to step S208. If it has, the program returns to step S201, to attend to the processing on the corrected sentence.

Then, when it is decided by the user that a conversational sentence example having the targeted first-language sentence has been selected, "N" is entered at step S206. Then, the program goes to step S208.

At step S208, a menu screen is displayed by the selector 93 to allow the user to select any one out of the first-language sentences of currently selected conversational sentence examples. Then, the selected first-language sentence is recognized.

At step S209, the display contents of the display screen are switched to a second-language sentence corresponding to the selected first-language sentence by the display unit 94. After that, the conversational sentence translating operation is ended.

As described above, in the present example, the user is allowed to make reference to the number of selected conversational sentence examples. Therefore, in the process of entering a corrective sentence, when a very large number of selected conversational sentence examples are involved, the user can input a phrase that limits the meaning of the preceding input conversational sentence more strictly, so that a conversational sentence example having a targeted first-language sentence is obtained promptly.

For instance, as in the foregoing example, in the case where the first-time input conversational sentence " <u>OSHIETE</u>", the second-time input conversational sentence " <u>OSHIETE</u>, hoteru", and the third-time input conversational sentence "<u>OSHIETE</u>, hoteru HE NO <u>MICHI</u>" are entered by the user, the transition of input conversational sentences (corrected sentences) and displayed first-language sentences is as shown in FIG. 55.

In the present example, since the number of displayed conversational sentence examples in which the semantic feature name "<u>OSHIERU</u>" extracted from the first-time input conversational sentence "<u>OSHIETE</u>" is contained in their semantic feature strings is as many as 20 as shown in FIG. 55, entering an increased number of words "<u>OSHIETE</u>, hoteru HE NO <u>MICHI</u>" as a second-time input conversational sentence further restricts the meaning of the sentence, and allows a conversational sentence example having the targeted first-language sentence, "hoteru HE <u>IKU MICHIJUN</u> WO <u>OSHIETE KUDASAI</u>.", to be obtained at once.

Next described is a conversational sentence translating process in which a comparison result between the selection result of conversational sentence examples based on the preceding input conversational sentence and the selection result of conversational sentence examples based on the current input conversational sentence can be displayed.

Figure 56:
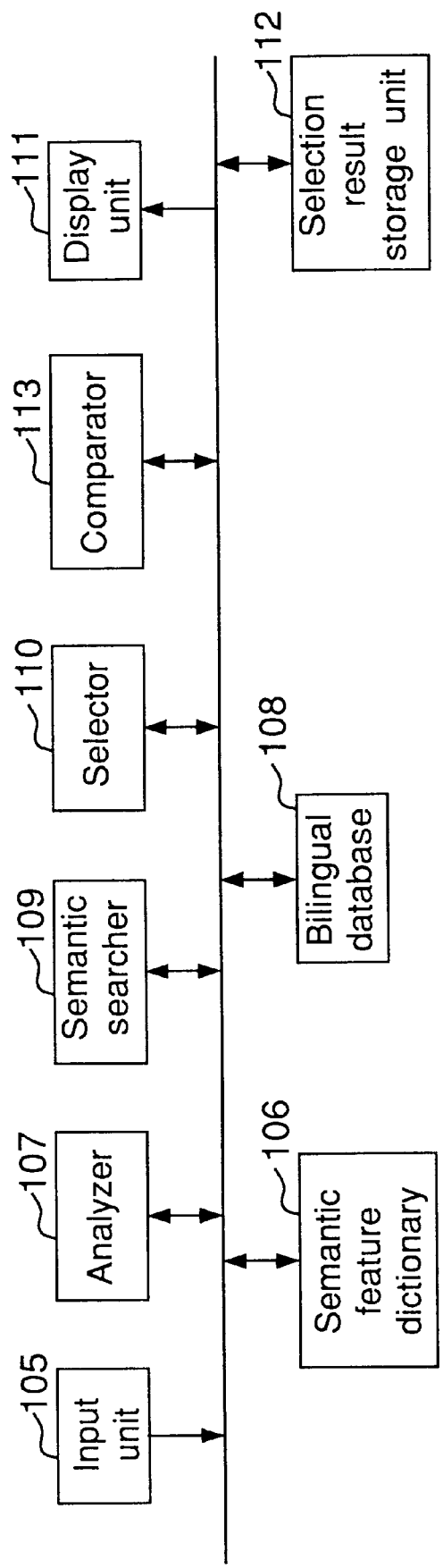
FIG. 56 is another functional block diagram of the conversational sentence translation apparatus shown in FIG. 48.

FIG. 56 is a functional block diagram of a modification of the conversational sentence translation apparatus shown in FIG. 49.

An input unit 105, a semantic feature dictionary 106, an analyzer 107, a bilingual database 108, a semantic searcher 109, a selector 110, and a display unit 111 in FIG. 56 have constructions and functions similar to those of the input unit 88, the semantic feature dictionary 89, the analyzer 90, the bilingual database 91, the semantic searcher 92, the selector 93, and the display unit 94 shown in FIG. 48. The conversational sentence translation apparatus in the present example has a selection result storage unit 112 for storing the preceding input conversational sentence entered last time by the user and the selection result of conversational sentence examples based on this input conversational sentence, and a comparator 113 for making a comparison between the preceding selection result stored in the selection result storage unit 112 and a current selection result. The selector 110 in this example has a function of displaying the comparison result made by the comparator 113 in an emphatic manner for a user's better understanding during a dialogue with the user, in addition to the function of the selector 93 shown in FIG. 48.

In the selection result storage unit 112, as shown in FIG. 57, the preceding input conversational sentence and the selection result based on the preceding A* input conversational sentence are stored. In the case of FIG. 57, the preceding input conversational sentence is "OSHIETE, hoteru", and the bilingual database 108 has been searched based on semantic feature names "OSHIERU" and "hoteru" extracted from this input conversational sentence " OSHIETE, hoteru", resulting in that three conversational sentence examples having the first-language sentences of "hoteru HE TSUITARA OSHIETE ITADAKEMASUKA.", "hoteru NO JUSHO TO DENWABANGO WO OSHIETE KUDASAI.", and "hoteru HE IKU MICHIJUN WO OSHIETE KUDASAI." have been selected.

The comparator 113 checks whether or not the first-language sentence of a currently selected conversational sentence example is included in the first-language sentences of the precedingly selected conversational sentence examples stored in the selection result storage unit 112. Then, the comparator 113 determines a difference between the first-language sentences of the precedingly selected conversational sentence examples and the first-language sentences of the currently selected conversational sentence examples.

This difference is determined in the following way. For example, assume that the first-language sentences of the precedingly selected conversational sentence examples, "hoteru HE TSUITARA OSHIETE ITADAKEMASUKA.", "hoteru NO JUSHO TO DENWABANGO WO OSHIETE KUDASAI.", and "hoteru HE IKU MICHIJUN WO OSHIETE KUDASAI.", are stored in the selection result storage unit 112 as shown in FIG. 57, and that the first-language sentence of a conversational sentence example selected for a current input conversational sentence, " OSHIETE, hoteru HE NO MICHI", is "hoteru HE IKU MICHIJUN WO OSHIETE KUDASAI.". Then, the first-language sentences, "hoteru HE TSUITARA OSHIETE ITADAKEMASUKA." and "hoteru NO JUSHO TO DENWABANGO WO OSHIETE KUDASAI.", which are contained in the preceding selection result but not contained in the current selection result, are obtained as the difference.

Figure 58:
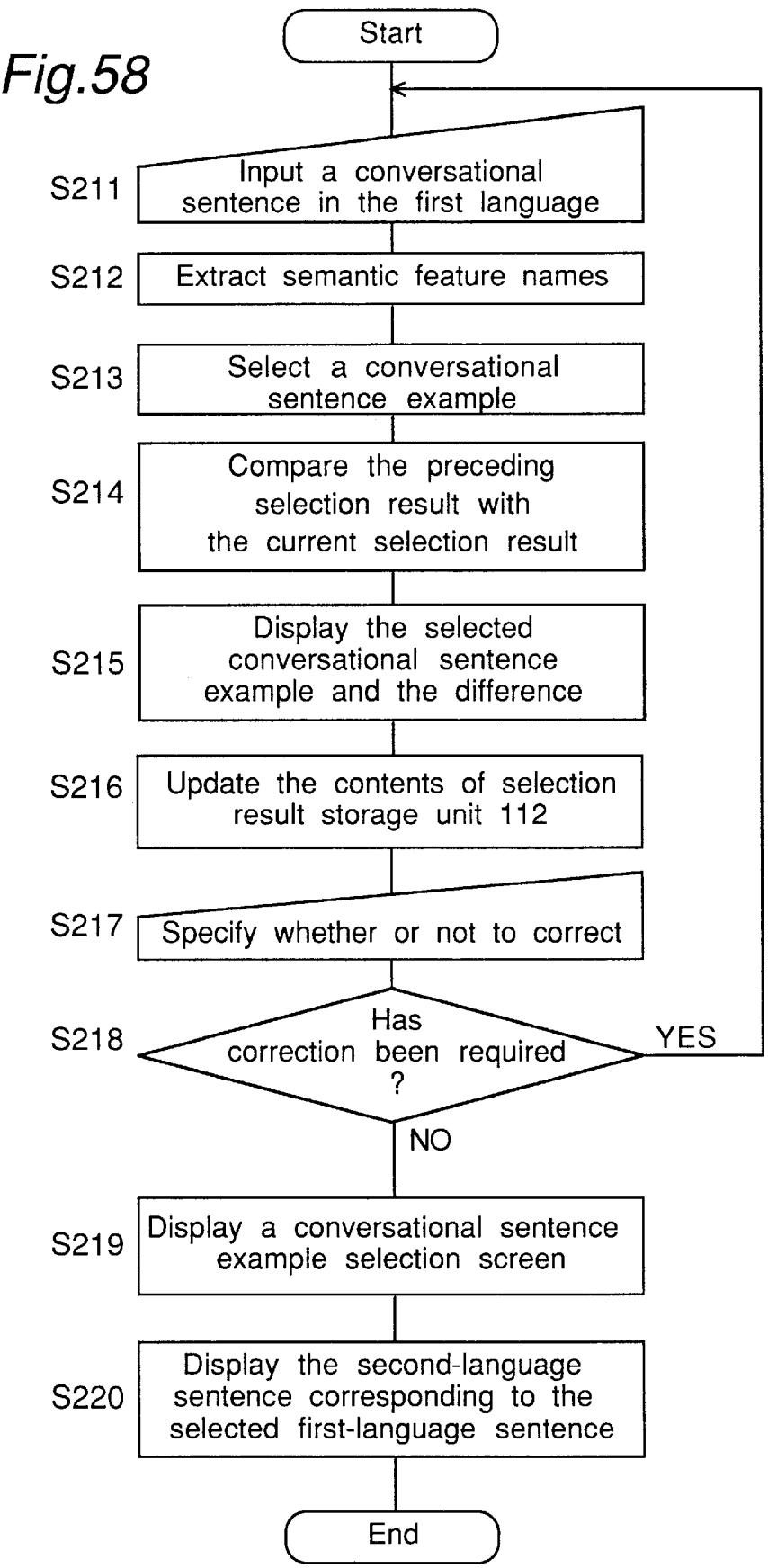
FIG. 58 is a flow chart of a conversational sentence translating operation to be executed by the input unit, analyzer, semantic searcher, selector, comparator, and display unit of FIG. 56.

FIG. 58 is a flow chart of the conversational sentence translating operation to be executed by the input unit 105, the analyzer 107, the semantic searcher 109, the selector 110, the comparator 113, and the display unit 111. Below, the conversational sentence translating operation in the present example is explained according to FIG. 58.

At step S211, a conversational sentence in the first language is inputted to the input unit 105. The input conversational sentence is transformed into character strings and transmitted to the analyzer 107 by the input unit 105.

At step S212, the input conversational sentence is analyzed by the analyzer 107 with the use of the semantic feature dictionary 106, and semantic feature names contained in the input conversational sentence are extracted.

At step S213, the bilingual database 108 is searched by the semantic searcher 109 so that conversational sentence examples in which the semantic feature names extracted at step S212 are contained in their semantic feature strings are selected. Out of these selected conversational sentence examples, those appropriate as a sentence example for the input conversational sentence are further selected.

At step S214, a comparison between the preceding selection result stored in the selection result storage unit 112 and the current selection result obtained at step S213 is made by the comparator 113 as described above, by which the difference is determined.

At step S215, the first-language sentences of the conversational sentence examples selected at step S213, the difference obtained at step S214, and an inquiry sentence, "Do you correct the sentence? (Y/N)", asking whether or not the input conversational sentence needs to be corrected, are displayed by the selector 110.

At step S216, the contents of the selection result storage unit 112 are updated by the comparator 113 with the input conversational sentence entered at step S211 and the first-language sentences of the conversational sentence examples selected at step S213.

At step S217, "Y" is entered to the input unit 105 when the user requires "correction", and "N" is entered when not. Then, the key code of "Y" or "N" is transmitted to the selector 110 by the input unit 105.

At step S218, it is decided by the selector 110 whether or not "Y" has been entered so that "correction" is required. As a result, if "correction" has not been required or specified, the program goes to step S219. If it has, the program returns to step S211, to attend to the process on the corrected sentence.

Then, when it is decided by the user that a conversational sentence example having the targeted first-language sentence has been selected, "N" is entered at step S217, so that the program goes to step S219.

At step S219, a menu screen is displayed by the selector 110 to allow the user to select one of the first-language sentences of currently selected conversational sentence examples. Then, the selected first-language sentence is recognized.

At step S220, the display contents of the display screen are switched to a second-language sentence corresponding to the selected first-language sentence by the display unit 111. After that, the conversational sentence translating operation is ended.

As seen above, in the present example, the user is allowed to see from the displayed number or content of the difference between preceding selection result and current selection result whether or not the correction to the input conversational sentence can restrict the selected conversational sentence examples to a targeted conversational sentence example. Therefore, a conversational sentence example having a targeted first-language sentence can be obtained promptly.

For instance, in the case where the first-time input conversational sentence "OSHIETE, hoteru", and the second-time input conversational sentence "OSHIETE, hoteru HE NO MICHI" are entered by the user, the transition of input conversational sentences (corrected sentences), displayed first-language sentences, and the difference is as shown in FIG. 59.

In the present example, first-language sentences selected based on the first-time input conversational sentence, " OSHIETE, hoteru", are the following three:

"hoteru HE TSUITARA OSHIETE ITADAKEMASUKA.";

"hoteru NO JUSHO TO DENWABANGO WO OSHIETE KUDASAI."; and

"hoteru HE IKU MICHIJUN WO OSHIETE KUDASAI.".

In contrast, a conversational sentence example selected based on the second-time input conversational sentence, " OSHIETE, hoteru HE NO MICHI", which is obtained by correctively adding a phrase, "HE NO MICHI" to the first-time input conversational sentence, is "hoteru HE IKU MICHIJUN WO OSHIETE KUDASAI.", where the difference is "hoteru HE TSUITARA OSHIETE ITADAKEMASUKA."; and "hoteru NO JUSHO TO DENWABANGO WO OSHIETE KUDASAI.".

Therefore, it can be seen that a targeted conversational sentence example has been approached accurately by the first correction.

In this connection, if the difference derived from the once corrected input conversational sentence (i.e., the second-time input conversational sentence) is very small and if a first-language sentence semantically close to the targeted first-language sentence is included in the selected sentence examples, then the user can consider that the direction of approaching a desired conversational sentence example is correct but the degree of approach is insufficient. Accordingly, an appropriate phrase that limits the meaning of the input conversational sentence more strictly should be entered for the next correction.

Meanwhile, if any first-language sentence close to the targeted first-language sentence is included in the resulting difference, the direction of approaching a desired conversational sentence example can be considered to be incorrect. Accordingly, with a reconsideration of the meaning of the first-language sentence of the targeted conversational sentence example, a phrase that correctly limits the meaning of the input conversational sentence should be entered at the next correction.

Next described is a conversational sentence translating process in which a sentence selection operation is carried out automatically each time one phrase or one word is entered.

Figure 60:
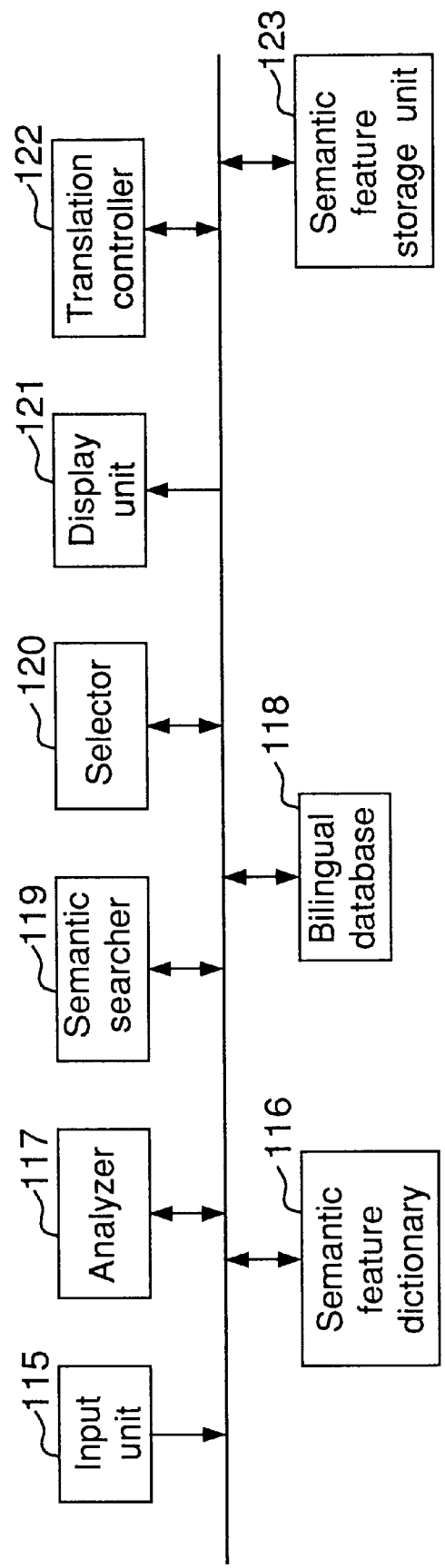
FIG. 60 is still another functional block diagram of the conversational sentence translation apparatus shown in FIG. 48.

FIG. 60 is a functional block diagram of another modification of the conversational sentence translation apparatus shown in FIG. 49.

An input unit 115, a semantic feature dictionary 116, an analyzer 117, a bilingual database 118, a semantic searcher 119, a selector 120, and a display unit 121 in FIG. 60 have constructions and functions similar to those of the input unit 88, the semantic feature dictionary 89, the analyzer 90, the bilingual database 91, the semantic searcher 92, the selector 93, and the display unit 94 shown in FIG. 49. The conversational sentence translation apparatus in the present example has a translation controller 122 for activating the semantic searcher 119 to make it carry out a selection operation of conversational sentence examples, when having decided based on kana kanji transformation codes or the like transferred from the input unit 115 that one phrase or one word has been entered by the user. The conversational sentence translation apparatus also has a semantic feature storage unit 123 for storing semantic feature strings extracted from the input phrase or word.

The translation controller 122, as described above, decides that one phrase or one word has been entered by the user, based on a kana kanji transformation code or the like transmitted from the input unit 115. Then, it activates the semantic searcher 119, while it transmits the semantic feature string stored in the semantic feature storage unit 123 to the semantic searcher 119. Subsequently, regarding the transmitted semantic feature string as the semantic feature string extracted from the input conversational sentence, the semantic searcher 119 selects conversational sentence examples.

The analyzer 117 transmits semantic features extracted from the input one phrase or one word to the semantic feature storage unit 123, so that the semantic features are added to the already stored semantic features and stored.

Figure 61:
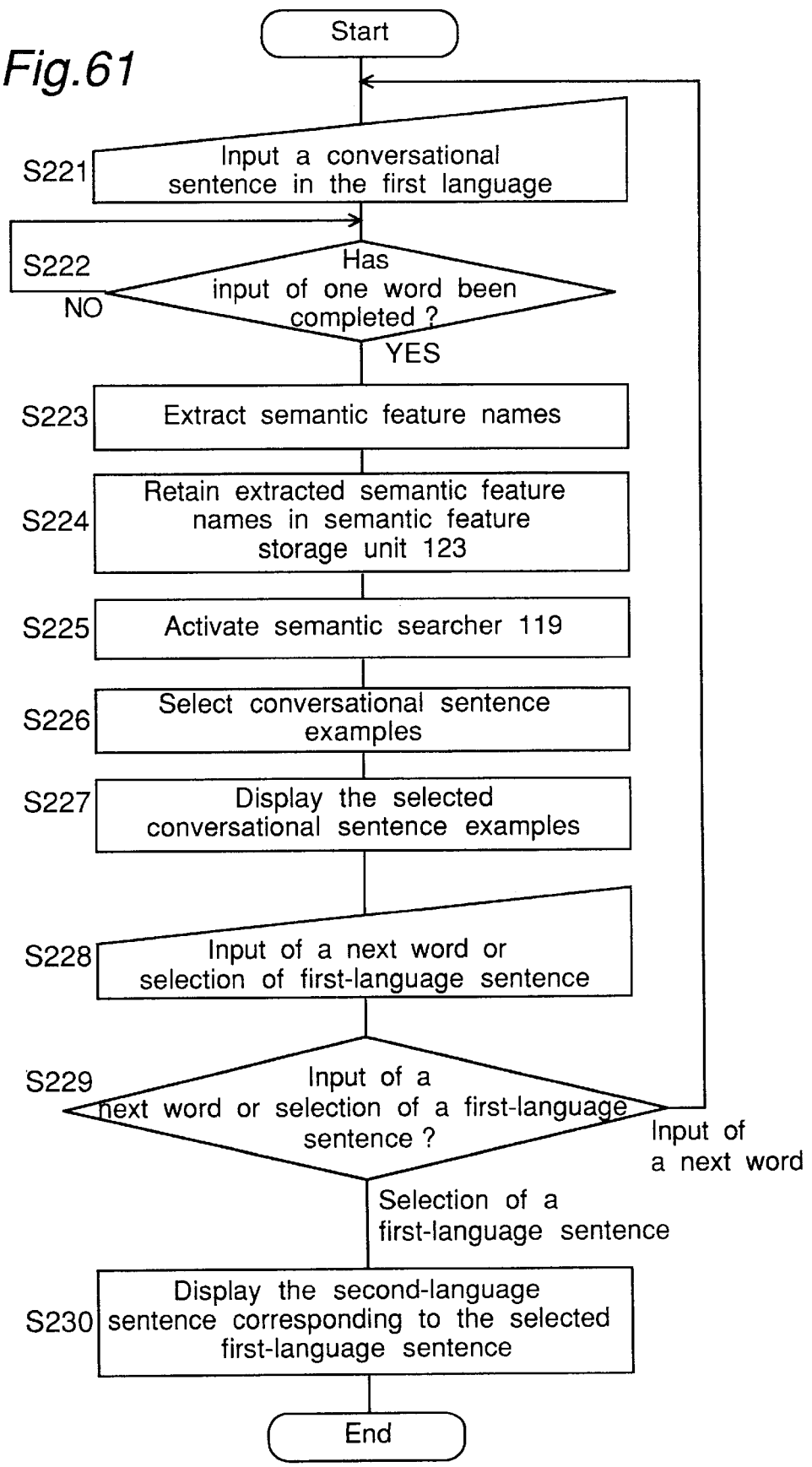
FIG. 61 is a flow chart of a conversational sentence translating operation to be executed by the input unit, analyzer, semantic searcher, selector, translation controller, and display unit of FIG. 60.

FIG. 61 is a flow chart of a conversational sentence translating operation to be executed by the input unit 115, the analyzer 117, the semantic searcher 119, the selector 120, the translation controller 122, and the display unit 121. The conversational sentence translating operation in the present example is described below according to FIG. 61.

In the conversational sentence translating operation in this example, it is assumed that the kana kanji transformation key is pressed by the user each time the user inputs one word.

At step S221, a word in the first language is entered to the input unit 115, and then, character strings constituting the word are transferred to the analyzer 117 and the translation controller 122 by the input unit 115.

At step S222, whether or not the input of one word has been completed is decided by the translation controller 122 based on the kana kanji transformation code transferred from the input unit 115. If it has been completed, the program goes to step S223.

At step S223, the input one word is analyzed with the use of the semantic feature dictionary 116 by the analyzer 117. As a result, semantic feature names are extracted.

At step S224, the extracted semantic feature names are transferred by the analyzer 117 to the semantic feature storage unit 123 to be stored therein.

At step S225, the semantic searcher 119 is activated by the translation controller 122, so that the semantic feature name string stored in the semantic feature storage unit 123 is supplied to the semantic searcher 119.

At step S226, the bilingual database 118 is searched by the semantic searcher 119 so that conversational sentence examples in which semantic feature names read from the semantic feature storage unit 123 are contained in their semantic feature strings are selected. Out of these selected conversational sentence examples, those appropriate as a sentence example for the input conversational sentence are further selected.

At step S227, a synthetic screen of a menu screen and a word input screen is displayed by the selector 120 to allow the user to select any one out of the first-language sentences of the conversational sentence examples selected at step S226.

At step S228, according to the screen displayed at step S227, a next word is entered to the input unit 115 by the user when the user wants to further limit the meaning of the input word string; when the user wants to select a conversational sentence example, a selection command is entered.

At step S229, it is decided by the selector 120 whether a next word has been entered or a first-language sentence has been selected. As a result, if a first-language sentence has been selected, the program goes to step S230. If a next word has been entered, the program returns to step S221 to proceed to a processing of a next input sentence.

Then, if it is decided by the user that a conversational sentence example having a targeted first-language sentence has been selected, the targeted first-language sentence is selected at step S228, and then the program goes to step S230.

At step S230, the selected first-language sentence is recognized by the-input unit 115. Then, the display contents of the display screen are switched to a second-language sentence corresponding to the selected first-language sentence by the display unit 121. After that, the conversational sentence translating operation is ended.

As seen above, in the present example, the extraction of semantic feature names, the selection of conversational sentence examples, and the display of first-language sentences of the selected conversational sentence examples are automatically performed each time one phrase or one word is entered by the user. Furthermore, the user is allowed to make an optimal decision as to which phrase or word to next enter, while viewing the selection result of conversational sentence examples. Thus, a conversational sentence example having a targeted first-language sentence can be obtained promptly with input of less phrases or words.

FIG. 62 shows the transition of input words and displayed first-language sentences, in the case where a word "OSHIETE" is entered for the first time, a word "hoterul" is entered for the second time, and a word "MICHI" is entered for the third time.

As described above, in the present embodiment, when first-language sentences of conversational sentence examples selected by the semantic searcher 92, 109, 119 are displayed by the selector 93, 110, 120, and if it is specified by the user that the input phrase is to be corrected, the input unit 88, 105, 115 allows the user to enter a phrase (additional sentence) that further limits the meaning of the input conversational sentence, so that the thus generated corrected sentence is transferred to the analyzer 90, 107, 117 as a new input conversational sentence.

Accordingly, a short phrase is entered at the beginning, and correction to the input phrase is iterated several times, by which a conversational sentence example having a targeted first-language sentence can be approached easily. As a result, according to the present embodiment, a conversational sentence example having a targeted first-language sentence can be obtained with a simple input conversational sentence.

Further, in the present embodiment, the semantic searcher 92 has a counter for counting the number of selected conversational sentence examples. Then, for the dialogue with the user, the selector 93 displays the first-language sentences of the conversational sentence examples selected by the semantic searcher 92 and the count obtained by the counter. Therefore, when a very large number of selected conversational sentence examples are involved, the user is allowed to enter a phrase that limits the meaning of the last input conversational sentence more strictly with reference to the displayed count of conversational sentence examples. Therefore, a conversational sentence example having a targeted first-language sentence can be obtained promptly.

Furthermore, in the present embodiment, the conversational sentence translation apparatus has the selection result storage unit 112 for storing the preceding input conversational sentence and the selection result of conversational sentence examples based on this input conversational sentence, and the comparator 113 for determining a difference between the first-language sentences of the precedingly selected conversational sentence examples and the first-language sentences of the currently selected conversational sentence examples. Then, in dialoguing with the user, the selector 110 displays this difference as well when it displays the first-language sentences of conversational sentence examples selected by the semantic searcher 109. Therefore, the user is allowed to see from the displayed number and/or content of the difference whether or not the correction made to the input conversational sentence was proper. Thus, by making an appropriate correction next time, the user can obtain a conversational sentence example having a targeted first-language sentence promptly.

Furthermore, in the present embodiment, the conversational sentence translation apparatus has the translation controller 122 for activating the semantic searcher 119 to make it carry out a selection operation of conversational sentence examples, when having decided that one phrase or one word has been entered, and the semantic feature storage unit 123 for retaining input phrase or word strings. Therefore, each time one phrase or one word is entered by the user, the extraction of semantic feature names, the selection of conversational sentence examples, and the display of first-language sentences of the selected conversational sentence examples are automatically performed.

Accordingly, the user is allowed to make an optimal decision as to which word to next enter, while viewing the selection result of conversational sentence examples. Thus, a conversational sentence example having a targeted first-language sentence can be obtained promptly with less phrases or words.

The foregoing embodiments have been described on the assumption that the first language is Japanese and that the second language is English. However, they can be other languages as a matter of course.

In the first embodiment, the semantic searcher 3 selects only a single conversational sentence example that has the largest number of coincident semantic features. In the second embodiment, the semantic searcher 13 selects a plurality of conversational sentence examples having evaluations larger than specified values, and the selector 15 selects a conversational sentence example closer to the input conversational sentence than any other through a dialogue with the user. Further, in the fourth embodiment, the semantic searcher 67 selects conversational sentence examples in the order of decreasing degree of coincidence calculated.

However, for the present invention, the combinations between the embodiments and the conversational sentence example evaluation algorithms are not limited to these ones. The conversational sentence example evaluation algorithms are not limited to the above three, either. In short, the algorithm is only required to allow a conversational sentence example optimum as a sentence example for the input conversational sentence to be selected from among many conversational sentence examples selected through the search of the bilingual database.

Furthermore, in the first embodiment, the semantic searcher 3 selects a conversational sentence example based on the number of retrieved semantic features. However, the present invention also permits conversational sentence examples to be selected based on the sum of weights of retrieved semantic features, where each semantic feature is given a weight. In other words, the "number of retrieved or found semantic features" used in the first embodiment equals a "sum of weights of retrieved semantic features" with the value of the weight of all the semantic features taken as "1", and corresponds to the "degree of semantic coincidence" based on the search result as recited in the appended claims.

That is, "the degree of semantic coincidence" as recited in the appended claims represents a concept containing the "sum of weights of retrieved semantic features" with the value of the weight of all the semantic features taken as "1", the "sum of weights of retrieved semantic features" with each semantic feature given any arbitrary weight, and the value of "evaluation 1" in the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conversational sentence translation apparatus comprising:

input means through which a free conversational sentence in a first language is inputted in the apparatus;

a semantic feature dictionary in which information on various semantic features is stored, said information on each semantic feature including a name of the semantic feature and at least one character string in the first language having the semantic feature, said character strings serving as elements of sentences in the first language;

a bilingual database in which information on various conversational sentence examples is stored, said information on each conversational sentence example including a conversational sentence example in the first language, a translation in a second language of the conversational sentence example, and a string of semantic features contained in the conversational sentence example;

an analyzer for, with reference to the semantic feature dictionary, extracting semantic features from the conversational sentence input through the input means;

a semantic searcher for searching the bilingual database for the semantic features extracted by the analyzer to determine a degree of semantic coincidence between each conversational sentence example and the input conversational sentence and select a conversational sentence example having a highest degree of semantic coincidence; and display means for displaying the conversational sentence example selected by the semantic searcher and the translation thereof.

2. The conversational sentence translation apparatus according to claim 1, wherein said semantic searcher selects a plurality of conversational sentence examples having highest degrees of semantic coincidence in the order of decreasing degree of semantic coincidence;

said apparatus further comprises a selector for selecting, through a dialogue with a user, a conversational sentence example semantically closer to the input conversational sentence than any other, from among the plurality of conversational sentence examples selected by the semantic searcher; and said display means displays the conversational sentence example selected by the selector and the translation thereof.

3. The conversational sentence translation apparatus according to claim 1, wherein the semantic feature dictionary includes:

a willed semantic feature dictionary listing the names and character strings of willed semantic features, each willed semantic feature representing a will of a sentence in the first language;

a contextual semantic feature dictionary listing the names and character strings of contextual semantic features other than the willed semantic features, each contextual semantic feature representing a context of a sentence in the first language.

4. The conversational sentence translation apparatus according to claim 1, wherein the semantic searcher includes a coverage calculating means for calculating a coverage that represents a ratio at which, with respect to each conversational sentence example, character strings of the input conversational sentence corresponding to the semantic features of the conversational sentence example found by the semantic searcher cover the entire character strings of the input conversational sentence, and the semantic searcher determines the degree of semantic coincidence by using the coverage.

5. The conversational sentence translation apparatus according to claim 1, wherein a weight is added to each of the semantic features registered for the individual conversational sentence examples in the bilingual database, and wherein the semantic searcher determines the degree of semantic coincidence by using the weights.

6. The conversational sentence translation apparatus according to claim 1, wherein the semantic feature dictionary includes a variable semantic feature dictionary in which information on variable semantic features is stored, each variable semantic feature being such a semantic feature that its corresponding character string is replaceable with another character string, said information on each variable semantic feature including a name of the variable semantic feature, one or more entry names of the variable semantic feature, one or more character strings in the first language for each entry name which are elements of sentences in the first language, and a translation in the second language of each entry name;

in the bilingual database, variable semantic feature information for specifying a variable semantic feature is annexed to each conversational sentence example and its translation and the semantic feature string for the conversational sentence example, respectively;

said apparatus further comprises a feature element replacer for, with reference to the variable semantic feature dictionary and the variable semantic feature information, replacing character strings corresponding to a variable semantic feature in the conversational sentence example selected by the semantic searcher and its translation with an entry name of a variable semantic feature in the input conversational sentence and a translation in the second language of the entry name, respectively.

7. The conversational sentence translation apparatus according to claim 1, wherein the semantic feature dictionary includes a variable semantic feature dictionary in which information on variable semantic features is stored, each variable semantic feature being such a semantic feature that its corresponding character string is replaceable with another character string, said information on each variable semantic feature including a name of the variable semantic feature, one or more entry names of the variable semantic feature, one or more character strings in the first language for each entry name which are elements of sentences in the first language, and a translation in the second language of each entry name;

in the bilingual database, variable semantic feature information for specifying a variable semantic feature is annexed to each conversational sentence example and the translation thereof, respectively; and said apparatus further comprises a feature element selector for, with reference to the variable semantic feature dictionary and the variable semantic feature information and-through a dialogue with a user, selectively replacing a character string corresponding to a variable semantic feature in the conversational sentence example selected by the semantic searcher and the translation thereof with an entry name specified by the user of the variable semantic feature and a translation in the second language of the specified entry name, respectively.

8. The conversational sentence translation apparatus according to claim 1, wherein the information on each conversational sentence example in the bilingual database further includes category information indicative of a category of the conversational sentence example;

the apparatus further comprises a category storage means for storing the category information of a conversational sentence example precedingly selected by the semantic searcher and established to be a targeted conversational sentence example; and the semantic searcher includes a coincidence deciding means for deciding whether or not the category information of each conversational sentence example and the category information stored in the category storage means are coincident with each other, and preferentially selects a conversational sentence example having a category information coincident with the category information stored in the category storage means as a conversational sentence example semantically close to the input conversational sentence.

9. The conversational sentence translation apparatus according to claim 2, wherein the information on each conversational sentence example in the bilingual database further includes category information indicative of a category of the conversational sentence example; and said selector comprises a category information display means for displaying category information of each of a plurality of conversational sentence examples selected by the semantic searcher, and a restricting means for restricting the plurality of conversational sentence examples selected by the semantic searcher to fewer conversational sentence examples according to a category information selected from among the displayed category information through a dialogue with a user.

10. The conversational sentence translation apparatus according to claim 2, wherein said selector is enabled to select a plurality of conversational sentence examples semantically closest to the input conversational sentence through the dialogue with the user; and the display means is enabled to display both the plurality of conversational sentence examples selected by the selector and the translations thereof.

11. The conversational sentence translation apparatus according to claim 6, wherein said feature element replacer comprises:

a character string detecting means for, with reference to the semantic features extracted by the analyzer, detecting a character string corresponding to a variable semantic feature that is a replacement object in the input conversational sentence; and a coincidence deciding means for, with reference to the semantic features extracted from the input conversational sentence by the analyzer and the variable semantic feature information, deciding whether or not a semantic feature present at a specified position relative to the replacement-object variable semantic feature in the conversational sentence example selected by the semantic searcher is coincident with a semantic feature present at the specified position relative to the character string detected by the character string detecting means in the input conversational sentence, and for, if the decision result is a non-coincidence, making the character string detecting means detect another character string, wherein if the decision result by the coincidence deciding means is a coincidence, then the feature element replacer replaces the character string corresponding to the replacement-object variable semantic feature in the selected conversational sentence example and in the translation thereof with a variable semantic feature entry name corresponding to the character string detected by the character string detecting means and a translation of the variable semantic feature entry-name, respectively.

12. The conversational sentence translation apparatus according to claim 6, wherein said feature element replacer comprises:

a character string detecting means for, with reference to the variable semantic feature information, detecting a character string corresponding to a variable semantic feature that is a replacement object, from the conversational sentence example selected by the semantic searcher; and a coincidence deciding means for, with reference to the semantic features extracted by the analyzer and the variable semantic feature information, deciding whether or not a semantic feature present at a specified position relative to the replacement-object variable semantic feature in the input conversational sentence is coincident with a semantic feature present at the specified position relative to the character string detected by the character string detecting means in the selected conversational sentence example, and for, if the decision result is a non-coincidence, making the character string detecting means detect another character string, wherein if the decision result by the coincidence deciding means is a coincidence, then the feature element replacer replaces the character string detected by the character string detecting means in the selected conversational sentence example and a corresponding character string in the translation of the selected conversational sentence example with an entry name of the replacement-object variable semantic feature in the input conversational sentence -and a translation of the entry name, respectively.

13. The conversational sentence translation apparatus according to claim 6, wherein the feature element replacer comprises:

a first character string detecting means for, with reference to the semantic features extracted by the analyzer, detecting a character string corresponding to a variable semantic feature that is a replacement object, from the input conversational sentence;

a second character string detecting means for, with reference to the variable semantic feature information, detecting a character string corresponding to a variable semantic feature that is a replacement object, from the conversational sentence example selected by the semantic searcher; and a coincidence deciding means for, with reference to the semantic features extracted by the analyzer and the variable semantic feature information, deciding whether or not a semantic feature present at a specified position relative to the character string detected by the first character string detecting means in the input conversational sentence is coincident with a semantic feature present at the specified position relative to the character string detected by the second character string detecting means in the selected conversational sentence example, and for, if the decision result is a non-coincidence, making either one of the first or second character string detecting means detect another character string, wherein if the decision result by the coincidence deciding means is a coincidence, then the feature element replacer replaces the character string detected by the second character string detecting means in the selected conversational sentence example and a corresponding character string in the translation of the selected conversational sentence example with a variable semantic feature entry name of the character string detected by the first character detecting means in the input conversational sentence and a translation of the entry name, respectively.

14. The conversational sentence translation apparatus according to claim 6, wherein the information on a conversational sentence example registered in the bilingual database further includes a flag for specifying a position of a character string corresponding to a variable semantic feature that becomes a replacement object in the conversational sentence example;

the feature element replacer comprises a character string position detecting means for detecting the position of the character string specified by the flag; and the feature element replacer replaces both a character string present at the position detected by the character string position detecting means in the conversational sentence example selected by the semantic searcher, and a corresponding character string in the translation of the selected conversational sentence example, with an entry name of the replacement-object variable semantic feature in the input conversational sentence, and an translation of the entry name, respectively.

15. The conversational sentence translation apparatus according to claim 6, wherein the information on a conversational sentence example registered in the bilingual database further includes a flag for specifying a replacement method for an unreplaced character string corresponding to a replacement-object variable semantic feature in the conversational sentence example, said apparatus further comprising:

a flag discriminator for discriminating whether or not the flag is set for a conversational sentence example of which a character string and a corresponding character string in the translation of the conversational sentence example have been replaced with a variable semantic feature entry name and its translation, respectively, of a variable semantic feature of the input conversational sentence by the feature element replacer;

a replacement method detector for detecting a replacement method specified by the flag with respect to a conversational sentence example on which it has been discriminated by the flag discriminator that the flag is set; and a variable semantic feature dictionary searcher for searching the variable semantic feature dictionary to obtain a variable semantic feature entry name which corresponds to a replacement-object variable semantic feature, which is different from the variable semantic feature entry name used in the preceding replacement, and which is suited to the replacement method detected by the replacement method detector, and a translation of the variable semantic feature entry name, wherein the feature element replacer replaces the unreplaced character string in the conversational sentence example which has been discriminated by the flag discriminator that the flag is set, and a corresponding unreplaced character string in the translation of the conversational sentence example, with the variable semantic feature entry name and its translation obtained by the variable semantic feature dictionary searcher.

16. The conversational sentence translation apparatus according to claim 6, wherein the information on a conversational sentence example registered in the bilingual database further includes a flag for specifying an impermissible combination of variable semantic feature entry names, said apparatus further comprising:

a flag discriminator for discriminating whether or not the flag is set for a conversational sentence example of which a character string and a corresponding character string in the translation of the conversational sentence example have been replaced with a variable semantic feature entry name and its translation, respectively, of a variable semantic feature of the input conversational sentence by the feature element replacer;

an unreplaced character string detector for detecting an unreplaced character string corresponding to an element of a combination of variable semantic feature entry names specified by the flag with respect to a conversational sentence example on which it has been discriminated by the flag discriminator that the flag is set; and a variable semantic feature dictionary searcher for searching the variable semantic feature dictionary to obtain a variable semantic feature entry name which is of a variable semantic feature identical to the variable semantic feature of the unreplaced character string detected by the unreplaced character string detector and which is different from the variable semantic feature entry name of the unreplaced character string, as well as a translation of the variable semantic feature entry name, wherein the feature element replacer replaces the unreplaced character string in the conversational sentence example which has been discriminated by the flag discriminator that the flag is set, and a corresponding unreplaced character string in the translation of the conversational sentence example, with the variable semantic feature entry name and its translation obtained by the variable semantic feature dictionary searcher.

17. The conversational sentence translation apparatus according to claim 1, wherein the information on a conversational sentence example registered in the bilingual database further includes one or more semantic feature strings of one or more assumed sentences semantically similar to the conversational sentence example, in addition to the semantic feature string of the conversational sentence example itself, and the semantic searcher performs the operation to search the bilingual database for the semantic features extracted by the analyzer to select a conversational sentence example, for each of the plurality of semantic feature strings of the pertinent conversational sentence example, independently.

18. The conversational sentence translation apparatus according to claim 17, further comprising an index for associating a semantic feature with a set composed of a conversational sentence example registered in the bilingual database and a semantic feature string that is one of the semantic feature strings for the conversational sentence example and that contains the pertinent semantic feature, such that the set of the conversational sentence example and the semantic feature string is obtained from the semantic feature, wherein the semantic searcher searches the individual semantic feature strings of each conversational sentence example registered in the bilingual database for the semantic features extracted by the analyzer by the use of the index.

19. The conversational sentence translation apparatus according to claim 2, wherein the information on a conversational sentence example registered in the bilingual database further includes supplementary information representing a situation under which the conversational sentence example is used; and the selector, during a dialogue with the user, presents the user a plurality of conversational sentence examples selected by the semantic searcher along with the supplementary information for those conversational sentence examples.

20. The conversational sentence translation apparatus according to claim 1, wherein an optional semantic feature is set as a semantic feature to be registered in the semantic feature dictionary;

optional semantic feature information that specifies the optional semantic feature is added to pertinent semantic feature strings registered in the bilingual database; and the semantic searcher performs the conversational sentence example selection with reference to the optional semantic feature information, by deeming that, if the input conversational sentence has no character string corresponding to the optional semantic feature present in a semantic feature string of a conversational sentence example registered in the bilingual database, the semantic feature string of the conversational sentence example contains no optional semantic feature.

21. The conversational sentence translation apparatus according to claim 6, wherein the analyzer has a specific character string detecting means for searching the input conversational sentence to detect a specific character string that cannot be registered in the semantic feature dictionary, and outputting the detected specific character string along with a variable semantic feature associated with this specific character string, so as to detect the specific character string and output the detected specific character string along with its associated variable semantic feature by means of the specific character string detecting means prior to extraction of semantic features from the input conversational sentence with the use of the variable semantic feature dictionary, and if a character string corresponding to the same variable semantic feature as the variable semantic feature outputted from the specific character string detecting means is present in the conversational sentence example selected by the semantic searcher and the translation thereof, then the feature element replacer replaces the character string with the specific character string outputted from the specific character string detecting means.

22. The conversational sentence translation apparatus according to claim 6, wherein an optional semantic feature whose variable semantic feature entry name is nil is set as a semantic feature registered in the semantic feature dictionary; and if the optional variable semantic feature is present in the conversational sentence example selected by the semantic searcher but not present in the input conversational sentence, then, in rendering the replacement on a character string corresponding to the optional variable semantic feature in the conversational sentence example selected by the semantic searcher and on a corresponding character string in the translation of the selected conversational sentence example, the feature element replacer replaces the character string in the conversational sentence example with a null character string.

23. The conversational sentence translation apparatus according to claim 6, wherein a passive variable semantic feature whose entry name has a translated expression of nil is set as a variable semantic feature registered in the variable semantic feature dictionary; and when rendering the replacement on a character string corresponding to the passive variable semantic feature in the conversational sentence example selected by the semantic searcher and in the translation of the conversational sentence example, the feature element replacer replaces the character string in the translation of the conversational sentence example with a null character string.

24. The conversational sentence translation apparatus according to claim 2, wherein the selector comprises a correction deciding means for presenting a plurality of conversational sentence examples selected by the semantic searcher prior to the selection of a conversational sentence example to decide through a dialogue with the user whether or not a correction to the conversational sentence entered through the input means is necessary, and for, if deciding that a correction is necessary, transmitting a control signal to the input means and the analyzer;

the input means, upon receiving the control signal from the correction deciding means, permits an input of an additional sentence to be added to the last input conversational sentence; and the analyzer comprises a conversational sentence retaining means for retaining an input conversational sentence, so that upon receiving the control signal from the correction deciding means, the analyzer extracts the semantic features from an input conversational sentence generated by adding the additional sentence, entered through the input means, to the input conversational sentence retained in the conversational sentence retaining means.

25. The conversational sentence translation apparatus according to claim 24, wherein the semantic searcher comprises a counting means for counting the number of conversational sentence examples in which semantic features extracted by the analyzer are contained in the semantic feature strings thereof, based on a result of searching the semantic features; and the correction deciding means presents a count value obtained by the counting means, in addition to the plurality of conversational sentence examples selected by the semantic searcher.

26. The conversational sentence translation apparatus according to claim 24, further comprising:

a selection result storage means for storing a selection result of conversational sentence examples by the semantic searcher; and a comparator for comparing a preceding selection result stored in the selection result storage means with a selection result currently obtained by the semantic searcher, to determine a difference between the preceding selection result and the current selection result, wherein the correction deciding means presents the difference obtained by the comparator, in addition to the plurality of conversational sentence examples currently selected by the semantic searcher.

27. The conversational sentence translation apparatus according to claim 24, the apparatus further comprising:

a semantic feature storage means for storing semantic feature strings extracted from character strings entered through the input means; and a translation controller for deciding whether or not a phrase in a specified lingual unit has been entered through the input means and, if it is decided that the phrase in the specified lingual unit has been entered, activating the semantic searcher and transmitting the semantic feature string stored in the semantic feature storage means to the semantic searcher, wherein the analyzer extracts semantic features from character strings sequentially transmitted from the input means, and transmits the extracted semantic features to the semantic feature storage means so that the semantic features are stored therein.

* * * * *